US009077280B2

(12) United States Patent
Conger

(10) Patent No.: US 9,077,280 B2
(45) Date of Patent: Jul. 7, 2015

(54) SOLAR ARRAY SUPPORT METHODS AND SYSTEMS

(71) Applicant: P4P Holdings, LLC, Carbondale, CO (US)

(72) Inventor: Steven J. Conger, Carbondale, CO (US)

(73) Assignee: P4P Holdings LLC, Carbondale, CO (US)

( * ) Notice: Subject to any disclaimer, the term of this patent is extended or adjusted under 35 U.S.C. 154(b) by 0 days.

(21) Appl. No.: 14/523,592

(22) Filed: Oct. 24, 2014

(65) Prior Publication Data

US 2015/0113887 A1 Apr. 30, 2015

Related U.S. Application Data

(63) Continuation of application No. 14/092,612, filed on Nov. 27, 2013, now Pat. No. 8,925,260, which is a continuation of application No. 12/817,063, filed on Jun. 16, 2010, now abandoned, which is a (Continued)

(51) Int. Cl.

| | |
|---|---|
| ***E04H 12/20*** | (2006.01) |
| ***H02S 20/10*** | (2014.01) |
| ***E04C 3/30*** | (2006.01) |

(52) U.S. Cl.

CPC . *H02S 20/10* (2013.01); *E04C 3/30* (2013.01); *E04H 12/20* (2013.01)

(58) Field of Classification Search

CPC ........... Y02E 10/47; Y02E 10/50; E04C 3/30; F24J 2/5241; F24J 2/51; F24J 2/523; H02S 20/10; H02S 20/30; E04H 12/20; H01L 31/042; H01L 31/0422

USPC ........... 52/3, 4, 23, 146, 147, 148, 149, 173.3

See application file for complete search history.

(56) References Cited

U.S. PATENT DOCUMENTS

| | | | |
|---|---|---|---|
| 2,808,913 | A | 10/1957 | Frieder et al. |
| 3,288,158 | A | 11/1966 | Gugliotta |

(Continued)

FOREIGN PATENT DOCUMENTS

| | | |
|---|---|---|
| CA | 2397850 | 2/2004 |
| DE | 3504133 | 8/1986 |

(Continued)

OTHER PUBLICATIONS

U.S. Appl. No. 14/521,182, filed Oct. 22, 2014, Conger.

(Continued)

*Primary Examiner* — Mark Wendell
*Assistant Examiner* — Keith Minter
(74) *Attorney, Agent, or Firm* — Sheridan Ross P.C.

(57) ABSTRACT

Systems and methods for disposing and supporting a solar panel array are disclosed. The embodiments comprise various combinations of cables, support columns, and pod constructions in which to support solar panels. The solar panels can incorporate single or dual tracking capabilities to enhance sunlight capture. The embodiments encourage dual land use in which installation of the systems minimizes disruption of the underlying ground. Supplemental power may be provided by vertical axis windmills integrated with the columns. Special installations of the system can include systems mounted over structures such as parking lots, roads and aqueducts. Simplified support systems with a minimum number of structural elements can be used to create effective support for solar panel arrays of varying size and shapes. These simplified systems minimize material requirements and labor for installation of the systems.

20 Claims, 153 Drawing Sheets

Related U.S. Application Data continuation-in-part of application No. 12/580,170, filed on Oct. 15, 2009, now Pat. No. 8,429,861, which is a continuation-in-part of application No. 12/466,331, filed on May 14, 2009, now Pat. No. 8,381,464, which is a continuation-in-part of application No. 12/255,178, filed on Oct. 21, 2008, now Pat. No. 8,212,140, which is a continuation-in-part of application No. 12/143,624, filed on Jun. 20, 2008, now Pat. No. 8,278,547, which is a continuation-in-part of application No. 12/122,228, filed on May 16, 2008, now abandoned, which is a continuation-in-part of application No. 11/856,521, filed on Sep. 17, 2007, now Pat. No. 7,687,706, which is a continuation of application No. 10/606,204, filed on Jun. 25, 2003, now Pat. No. 7,285,719.

(60) Provisional application No. 60/459,711, filed on Apr. 2, 2003.

(56) References Cited

U.S. PATENT DOCUMENTS 3,449,874 A 6/1969 Beaupre'
3,550,140 A 12/1970 Werner
3,588,904 A 6/1971 Broyles
3,704,560 A 12/1972 Ratliff, Jr.
3,750,349 A 8/1973 Deike
3,783,573 A 1/1974 Vaughan
4,025,786 A 5/1977 Hamilton
4,063,963 A 12/1977 Bond, Jr.
4,071,017 A 1/1978 Russell, Jr. et al.
4,076,015 A 2/1978 Mattson
4,119,863 A 10/1978 Kelly
4,122,675 A 10/1978 Polyak
4,135,493 A 1/1979 Kennedy
4,186,720 A 2/1980 Schmauder et al.
4,216,762 A 8/1980 Klaila
4,245,616 A 1/1981 Wyland
4,245,895 A 1/1981 Wildenrotter
4,269,173 A 5/1981 Krueger et al.
D260,679 S 9/1981 Mayerovitch
4,326,773 A 4/1982 Colas
4,380,996 A 4/1983 Mengeringhausen
4,386,600 A 6/1983 Eggert, Jr.
4,415,759 A 11/1983 Copeland et al.
4,429,178 A 1/1984 Prideaux et al.
4,449,347 A 5/1984 Rooney
4,457,035 A 7/1984 Habegger et al.
4,485,264 A 11/1984 Izu et al.
4,487,989 A 12/1984 Wakefield et al.
4,551,631 A 11/1985 Trigilio
4,574,535 A 3/1986 Pabsch
4,587,951 A 5/1986 Townsend
4,602,613 A 7/1986 Barr
D285,829 S 9/1986 Lock
4,632,340 A 12/1986 Duea
4,656,996 A 4/1987 Aharon
4,721,412 A 1/1988 King et al.
4,832,001 A 5/1989 Baer
4,835,918 A 6/1989 Dippel
D303,244 S 9/1989 Hanak
D311,722 S 10/1990 Cheng
5,058,565 A 10/1991 Gee et al.
5,069,540 A 12/1991 Gonder
5,125,608 A 6/1992 McMaster et al.
5,176,758 A 1/1993 Nath et al.
5,212,916 A 5/1993 Dippel et al.
5,236,378 A 8/1993 Newman
5,347,402 A 9/1994 Arbogast
D353,129 S 12/1994 Ricaud et al.
5,478,407 A 12/1995 Dorison et al.
5,524,401 A 6/1996 Ishikawa et al.
D380,191 S 6/1997 White
5,769,068 A 6/1998 Takahashi
D408,554 S 4/1999 Dinwoodie
5,937,849 A 8/1999 Myles, III et al.
5,961,099 A 10/1999 Thommen, Jr.
D425,013 S 5/2000 Lai
6,063,996 A 5/2000 Takada et al.
6,091,016 A 7/2000 Kester
6,105,316 A 8/2000 Bottger et al.
6,131,363 A 10/2000 Phillips
D442,139 S 5/2001 Sasaoka
RE37,498 E 1/2002 Thomas
6,337,436 B1 1/2002 Ganz
6,397,869 B1 6/2002 Jennings
6,443,145 B1 9/2002 Buron et al.
D469,399 S 1/2003 Shugar
6,563,040 B2 5/2003 Hayden et al.
D475,320 S 6/2003 Hensley et al.
6,930,237 B2 8/2005 Mattiuzzo
D511,576 S 11/2005 Shingleton et al.
7,285,719 B2 10/2007 Conger
D560,605 S 1/2008 McClintock et al.
D560,606 S 1/2008 McClintock et al.
7,325,543 B2 2/2008 Momii et al.
D564,443 S 3/2008 Moore
D584,223 S 1/2009 Cooper
7,557,292 B2 7/2009 Shingleton et al.
D605,585 S 12/2009 Conger
7,687,706 B2 3/2010 Conger
D625,250 S 10/2010 Conger
7,847,185 B2 12/2010 Schwarze
7,851,935 B2 12/2010 Tsao
7,866,035 B2 1/2011 Cummings et al.
D633,033 S 2/2011 Conger
7,909,567 B2 3/2011 Fein et al.
D648,269 S 11/2011 Conger
D649,112 S 11/2011 Conger
D655,672 S 3/2012 Conger
D657,737 S 4/2012 Mackler
8,212,140 B2 7/2012 Conger
8,217,526 B2 7/2012 Devitt
D664,916 S 8/2012 Conger
D665,731 S 8/2012 Conger
D669,846 S 10/2012 Conger
8,278,547 B2 10/2012 Conger
8,381,464 B2 2/2013 Conger
D679,242 S 4/2013 Conger
8,429,861 B2 4/2013 Conger et al.
8,519,257 B2 8/2013 Conger et al.
8,875,450 B2 11/2014 Conger
2002/0182946 A1 12/2002 Tanaka
2005/0091916 A1 5/2005 Faris
2005/0126621 A1 6/2005 Dinwoodie et al.
2005/0141153 A1 6/2005 Mucci et al.
2006/0071862 A1 4/2006 Aisenbrey
2006/0233635 A1 10/2006 Selsam
2008/0047546 A1 2/2008 Cummings
2008/0057776 A1 3/2008 Cummings
2008/0168981 A1 7/2008 Cummings et al.
2008/0283112 A1 11/2008 Conger
2009/0184223 A1 7/2009 Schwarze et al.
2009/0200808 A1 8/2009 Parmley
2009/0211625 A1 8/2009 Schwarze
2009/0244890 A1 10/2009 Pelken et al.
2010/0038507 A1 2/2010 Schwarze et al.
2010/0051083 A1 3/2010 Boyk
2010/0095609 A1 4/2010 Kim
2010/0183443 A1 7/2010 Thorne
2010/0212654 A1 8/2010 Trevijano
2010/0251618 A1 10/2010 Nishikawa et al.
2010/0314509 A1 12/2010 Conger
2011/0089698 A1 4/2011 Ahmadi
2011/0113705 A1 5/2011 Raczkowski
2011/0197418 A1 8/2011 Overturf et al.
2011/0221203 A1 9/2011 Miller
2011/0277809 A1 11/2011 Dalland et al.
2012/0192514 A1 8/2012 Farb et al.
2012/0216855 A1 8/2012 Conger

(56) References Cited

U.S. PATENT DOCUMENTS

| | | | |
|---|---|---|---|
| 2012/0298180 | A1 | 11/2012 | Ratti et al. |
| 2013/0220397 | A1 | 8/2013 | Conger |
| 2014/0290155 | A1 | 10/2014 | Conger |

FOREIGN PATENT DOCUMENTS

| | | |
|---|---|---|
| DE | 3643487 | 6/1988 |
| DE | 4038646 | 6/1992 |
| DE | 10050021 | 4/2001 |
| DE | 10116783 | 10/2002 |
| EP | 0373234 | 6/1990 |
| EP | 2256431 | 12/2010 |
| EP | 2261577 | 12/2010 |
| JP | 10-266499 | 10/1998 |
| JP | 2004-71805 | 9/2005 |
| WO | WO 2005/085633 | 9/2005 |
| WO | WO 2008/141813 | 11/2008 |
| WO | WO 2009/065377 | 5/2009 |
| WO | WO 2012/045129 | 4/2012 |

OTHER PUBLICATIONS

U.S. Appl. No. 29/318,111, filed May 13, 2008, Conger.

Baumgartner et al. "Solar Wings a New Lightweight PV Tracking System", 23re Eu PVSEC, Valencia, Sep. 4, 2008, invited talk 4DO. 9.5.

Berger "Structural Form in Architecture: Part 3—From Tents to Tensile Architecture," Structure Magazine, Mar. 2008, pp. 38-41.

"coolearth technology" coolearth, available at http://www.coolearthsolar.com/technology, printed May 23, 2008, p. 1-2.

Definition of "column," http://www.thefreedictionary.com/p/column, printed Dec. 14, 2010, 4 pages.

Difference between shear connection and moment connections, http://wiki.answers.com/Q/Difference_between_shear_connection_and_moment_connections, printed Dec. 14, 2010, 1 page.

Definition of "moment connection," http://mbmisteelbuildings.com/metal-building-terms#m, printed Dec. 19, 2010, 1 page.

Definition of "moment," http://www.thefreedictionary.com/p/moment, printed Dec. 19, 2010, 4 pages.

"Sharp Provides Solar Panels for Winery's "Floatovoltaic" Solar Array", available at http://solarbuss.com/News/NewsNAPR1099.htm, dated May 29, 2008 (accessed Jun. 23, 2008), pp. 1-2.

Foster + Partners "Hearst Headquarters", available at http://www.fosterandpartners.com/Projects/1124/Default.aspx, printerd Aug. 5, 2008, 11 pages.

Solyndra web pages available at http://ww.solyndra.com, printed May 11, 2009, 7 pages.

"Single Axis SunPower T20 Trackers", as early as Jul. 2007, 5 pages.

Solon Hilber—Malaga/Spain, available at http://www.solonhilber.at, translated by Google translate, available as early as Sep. 21, 2007, printed Mar. 23, 2010, 7 pages.

Tyler "Suspension Domes: Lateral stabilising cables," suspensiondomes.com (Found at: http://suspensiondomes.com/essays/lateral_cables/, waybackmachine, Apr. 27, 2007) 4 pages.

Examination Report for European Patent Application No. 04759693.7-1528, dated Apr. 27, 2007.

International Search Report for International (PCT) Patent Application No. PCT/US2004/008509, dated Oct. 22, 2004.

Written Opinion for International (PCT) Patent Application No. PCT/US2004/008509, mailed Oct. 22, 2004.

International Preliminary Report on Patentability for International (PCT) Patent Application No. PCT/US2004/008509, dated Oct. 14, 2005.

International Search Report for International (PCT) Patent Application No. PCT/US08/71414, dated Sep. 26, 2008.

Written Opinion for International (PCT) Patent Application No. PCT/US08/71414, dated Sep. 26, 2008.

International Search Report for International (PCT) Patent Application No. PCT/US09/44060, mailed Jun. 24, 2009.

Written Opinion for International (PCT) Patent Application No. PCT/US09/44060, mailed Jun. 24, 2009.

International Preliminary Report on Patentability for International (PCT) Patent Application No. PCT/US2008/071414, mailed Nov. 25, 2010.

International Preliminary Report on Patentability for International (PCT) Patent Application No. PCT/US2009/044060, mailed Nov. 25, 2010.

Extended Search Report for European Patent Application No. 09747645.1, dated Mar. 25, 2013 5 pages.

International Search Report and Written Opinion for International (PCT) Patent Application No. PCT/US2014/030968, mailed Aug. 19, 2014 11 pages.

SOLAR ARRAY SUPPORT METHODS AND SYSTEMS

CROSS REFERENCE TO RELATED APPLICATIONS

This application is a continuation of U.S. application Ser. No. 14/092,612, filed on Nov. 27, 2013, which is a continuation of U.S. application Ser. No. 12/817,063 filed on Jun. 16, 2010, which is a continuation-in-part of U.S. application Ser. No. 12/580,170 filed on Oct. 15, 2009, which is a continuation-in-part application of U.S. application Ser. No. 12/466,331, filed on May 14, 2009, which is a continuation-in-part application of U.S. application Ser. No. 12/255,178, filed on Oct. 21, 2008, which is a continuation-in-part application of U.S. application Ser. No. 12/143,624, filed on Jun. 20, 2008, which is a continuation-in-part application of U.S. application Ser. No. 12/122,228, filed on May 16, 2008, entitled "Solar Array Support Methods and Systems", which is a continuation-in-part of U.S. application Ser. No. 11/856,521, filed on Sep. 17, 2007, which is a continuation application of U.S. application Ser. No. 10/606,204, filed Jun. 25, 2003, now the U.S. Pat. No. 7,285,719, which claims priority from Provisional Application Ser. No. 60/459,711, filed Apr. 2, 2003, each prior application being fully incorporated by reference herein.

FIELD OF THE INVENTION

The present invention is related to the field of solar energy capture, and more particularly, to devices, systems, and methods relating to solar energy capture including photovoltaic (PV) solar panels supported by a system of cables and columns.

BACKGROUND OF THE INVENTION

Present systems for supporting solar panels tend to be bulky and expensive. Given the size and weight of such systems, implementation of solar panel arrays in remote locations is difficult and expensive. When large equipment is required, installation of a solar panel array in an environmentally sensitive area without significantly impacting the surrounding habitat becomes very difficult. Typically, such support systems do not allow for secondary uses of the solar panel arrays.

Photovoltaic technology continues to advance not only in the efficiency of a PV cell's capability to convert solar energy to electrical power, but also in the basic construction of PV panels used in varying installations. One advance in PV panels includes tube or cylindrical shaped PV elements. These types of PV elements have the capability to capture sunlight across greater angles and also to provide an increased surface area for capturing sunlight when the elements are packed closely together.

Despite the advances in PV technology, there are still needs for solar panel systems in which fewer and less expensive materials are used for supporting the panels. There are also developing needs for solar panel systems to provide electrical power in locations that traditionally could not employ solar panel systems because of rough terrain or because of an inadequate amount of land available for installation.

SUMMARY OF THE INVENTION

The present invention, in one preferred embodiment, includes a system for supporting a solar panel array. The system includes at least two pairs of vertical columns, where each pair includes a tall column and a short column. The pairs of vertical columns are placed some distance apart. A first support cable is secured between the short columns and a second support cable is secured between the tall columns. A guy wire or other anchoring devices may be attached to the columns to provide lateral support to the columns against the tension created by suspending the support cables between the spaced columns. The system further includes solar panel receivers or pods secured to the two support cables. The solar panel receivers or pods are used to support solar panels. The receivers/pods may include a maintenance catwalk or another element that provides access to individual receivers/pods for maintenance.

In another illustrative embodiment, the present invention includes a system for providing both shelter and electricity. The system may include columns, support cables, and one or more solar panel receivers that support solar panels as in the solar panel array support system noted above. The columns may be sized to allow an activity to occur beneath the solar panel receivers. For example, if the desired activity is to provide a shaded parking lot, the columns may have a height allowing vehicles to be parked beneath the solar panel receivers, and the columns may be spaced apart to create a sheltered area sized to correspond to the desired area of the parking lot.

In yet another illustrative embodiment, the present invention includes a system for supporting a solar panel array, the system comprising at least four anchor points, with a first support cable suspended between a first pair of anchor points, and a second support cable suspended between a second pair of anchor points. The system further includes the solar panel receivers supported by the first and second support cables, the solar panel receivers also adapted to receive one or more solar panels.

In a further embodiment, the present invention includes methods of supporting a solar panel array. The methods include the step of using cables to support solar panel receivers adapted to receive one or more solar panels. In yet another embodiment, the present invention includes a method of creating a sheltered spaced that makes use of a solar panel array that creates electricity, where the method also includes using the electricity to cool an area beneath the array. For example, the electricity produced from the array can be used to power a water pump that delivers water to a water-misting device secured to the array. A network of water lines and misting-nozzles can be distributed throughout the array to provide cooling under the array which when coupled with the shade, produced by the overhead array, can be used to effectively cool the area under the array.

In further embodiments, various combinations of curved shaped and planar shaped panel receivers are used in solar arrays sized to meet specific installation requirements.

In other embodiments, the present invention includes systems comprising various combinations of support cables, anchor lines, anchors, and support columns.

The systems and methods for supporting the solar panel arrays can be configured such that the panel arrays are supported by members that are in tension, compression, or combinations of both. To support the solar panels by tension, the main supporting cables are suspended from columns or other stationary supports, and the cables are allowed to hang with a curvature determined by the amount of tension placed on the cables between opposing columns/stationary supports. These main cables include an upper cable and a lower cable positioned vertically below the upper cable. Vertically oriented interconnecting cables interconnect the upper and lower cables. The combination of the upper cable, lower cable, and interconnecting cables can be defined as a truss. Multiple trusses can be used to support a solar panel array in which the trusses can be spaced at some distance from one another and extend substantially parallel to one another. The pods or receivers are then arranged such that they extend transversely between adjacent trusses. When cables are used for all of the elements of the truss, the truss can be further characterized as a tension truss. It is also contemplated that rigid interconnecting members can be used between the upper and lower cables to produce a truss that places the interconnecting members in compression, and therefore the truss can be further characterized as a compression truss.

The pods or receivers may be curved shaped or planer such that the solar panels either conform to a general curvature or extend in a flat, planar configuration. One manner in which to mount the pods is to create a generally convex pod mounting that follows the convex curvature of an upper or main cable. Another manner in which to mount the pods is to create a generally concave pod mounting that follows the concave curvature of a lower main cable. Combinations of both convex and concave mountings are also contemplated. The systems of the present invention are also well adapted for creating a solar panel array that may have a complex curved shape. In this complex curved shape aspect of the invention, shims can be used where the struts connect to the main cables therefore allowing the pod to maintain an irregular orientation with respect to the cables, which may or may not extend parallel to one another. Alternatively, ball joint connections may be used where the struts connect to the main cables allowing the pod to maintain an irregular orientation with respect to the cables.

In some embodiments of the invention, the solar panel arrays can be free standing structures in which the arrays are solely supported by the system of cables and columns.

In other embodiments, the solar panel arrays of the present invention may be directly supported in part by existing structures, such as buildings. In other embodiments, the columns and cables can be used to create both portable and permanent structures wherein the trusses are not only used to support the solar panel arrays, but also to support a roof of the structure.

Due to advantageous wind deflecting characteristics that can be achieved by airfoils placed at selected ends of the solar panel arrays, the solar panel arrays are ideal for incorporating windmills to supplement power generation. In one preferred form, the windmills can be vertical axis windmills that are mounted directly to the columns or other supports of the solar panel arrays. Aerodynamic characteristics of the solar panel array can be controlled to cause an increase in airflow speed as the airflow passes over the solar panels which are captured as effective wind energy for powering the windmills.

In other systems and methods of the present invention, the pods or receivers may be mounted such that the pods may be rotated along a single axis or multiple axes so that the panels can better track the movement of the sun, thereby enhancing power output. Accordingly, the invention may incorporate single and dual tracker devices that are used to selectively rotate the orientation of the solar panels.

The present invention also provides a means to selectively adjust the tensioning in the interconnecting cables by tensioning devices mounted directly to the cable trusses. For example, the tensioning devices can be mounted on the adjacent upper or lower main cables, and the diagonally or vertically extending interconnecting cables pass through a pulley mechanism of each of the tensioning devices.

In yet another aspect of the present invention, the type and arrangement of the pods/receivers and the types of PV cells are selected based upon the particular intended use of the invention, such as whether the invention is intended solely for producing power, or to also achieve a secondary function such as providing shade, serving as a structure with a roof, and others. For example, the solar panels can be conventional planar solar panels that are mounted on the receivers/pods in a desired arrangement. In another example, the solar panels may include cylindrical shaped PV cells such as those manufactured by Solyndra™ of Fremont Calif. As mentioned, one advantage of tubular/cylindrical shaped PV elements is that they provide an increased surface area for the photoaltaic cells as compared to planar arranged PV cells, and the tube shaped cells are self-tracking in that a portion of the outer surface of the tubes can be more easily oriented in a direct relationship with sunlight as sunlight angles change during the course of a day.

In another aspect of the present invention, a solar array is provided in which the number of required cables for support is reduced by anchoring additional cables to the ground. More specifically, embodiments are provided in which the lower curved support cable can be eliminated in favor of anchoring selected vertically extending cables to the ground. Ground anchors may be employed to include driven piles, screw piles, or other types of anchors having a helical distal tip which enables the anchors to be drilled for emplacement.

In another aspect of the invention, continuous support columns and tiedowns are provided that include integral anchors in which the lower ends of the columns/tiedowns are placed subsurface. The lower ends may have a screw type distal end that is anchored in the ground and further wherein, these continuous columns/foundations include various plate connectors enabling selected cables to connect to the continuous columns/foundations.

Because of the many different arrangements of solar panels that can be produced with the cable and column combinations, the present invention has the capability to be employed in many different land uses. The systems of the present invention are easily constructed in wide open spaces, but also are adaptable for installation within urban environments subject to land space constraints as well as sloping terrain. The systems of the present invention can also be easily integrated with a number of secondary use purposes such as production of shade, support for an underlying structure, supplemental power generation by incorporation of windmills, among others.

As set forth in the first embodiment, one particular advantage of the present invention is the ability to provide a solar array support system and method in which a minimum amount of materials are required. Consequently, reduced labor is required for installation. The support system and method provide a solution for supporting solar arrays in a very cost-effective, yet structurally sound and reliable manner.

One particularly advantageous arrangement of support elements in accordance with the present invention is a ground mounted system in which an array of photovoltaic panels are supported by (i) four columns, one column located at each corner of the array, (ii) first and second main cables that suspend the solar panels at an inclined angle, and (iii) a pair of longitudinal anchor lines located at opposite ends of the array. This minimum arrangement of structural elements provides an extremely efficient, yet structurally sufficient support for a solar panel array. Accordingly, the system also minimizes construction efforts as well as maintenance needs of the system.

In this simplified support system, the columns are anchored in the ground so that the columns act as vertical cantilever supports that can withstand bending moments in all directions. Preferably, there are a pair of short columns and a pair of tall columns that provide the desired angularity with respect to how the solar panels are disposed for capture of sunlight. This angularity also serves to allow drainage of liquid from the solar panels without a separate drain system. The pairs of longitudinal anchor lines provide additional structural stability, yet minimize the number of anchor lines used.

From this simplified arrangement of structural support elements, additional structural support can be provided by adding additional anchor lines, cables, and columns as set forth in the other embodiments of the present invention.

With respect to minimizing structural requirements for the solar panel receivers or pods that secure the solar panels, as also set forth in the first embodiment, the method and system of the invention contemplate utilization of the minimum number of struts to support the solar panels. One simplified arrangement for the struts includes a pair of main transverse struts that extend substantially perpendicular to and mounted to the first and second main cables. A pair of longitudinal struts may interconnect the transverse struts. Cable receivers are used to mount the cables to the main struts. Connecting brackets are used to secure the solar panels to the main struts. In this simplified pod construction, adequate structural support is provided to minimize torsional and bending forces, which could otherwise damage the solar panels; yet the number of structural elements is minimized to reduce construction costs and labor costs.

Further advantages and features of the systems and methods of the present invention will become apparent from a review of the following figures, along with the detailed description.

BRIEF DESCRIPTION OF THE DRAWINGS

FIG. 120 is a perspective view of another solar panel array that eliminates the lower supporting cables in favor of a plurality of vertically extending interior tiedowns that are anchored to the ground;

FIG. 121 is a side elevation view of the embodiment of FIG. 120;

FIG. 122 is another side elevation view of the embodiment shown in FIG. 120, taken along line 122-122 of FIG. 120;

FIG. 123 is a simplified side elevation view of the embodiment of FIG. 120 that omits a few of the cables and subsurface supports, but further shows a continuous tensioning cable that can be used to tension the solar array to a desired degree by incorporating an adjustable tension device such as shown in FIG. 66;

FIG. 124 is an enlarged fragmentary elevation view of one example of a continuous column/foundation incorporating a connecting plate used to interconnect a cable to the column as well as a supplementary subsurface support;

FIG. 125 is another enlarged fragmentary elevation view of another column/foundation incorporating a connecting plate;

FIG. 126 is yet another enlarged fragmentary elevation view of a continuous column/foundation incorporating a connecting plate;

Figure 127:
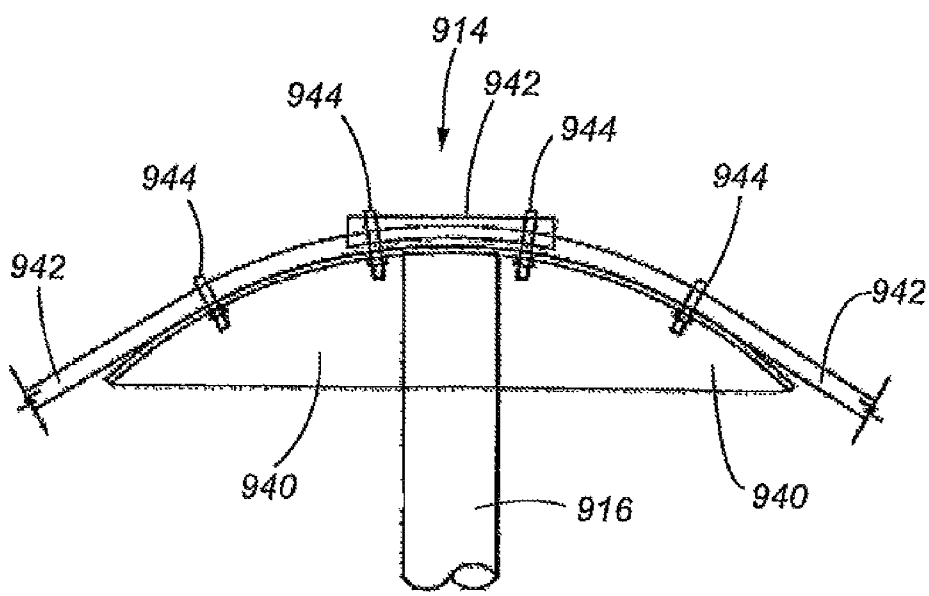
Figure 128:
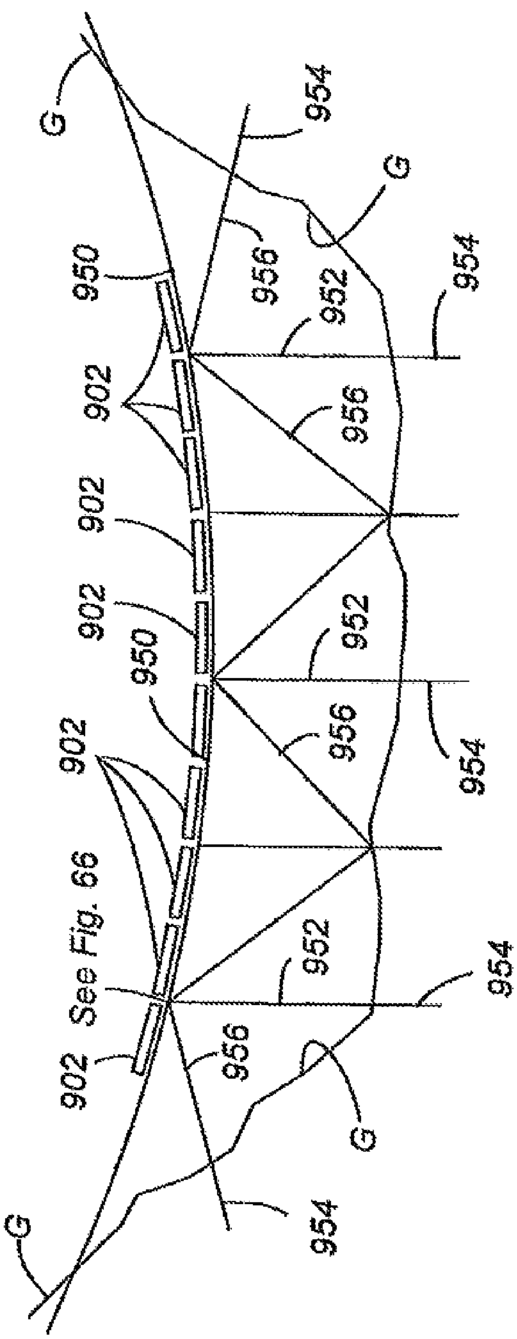

FIG. 127 is an enlarged fragmentary elevation view of a connecting bracket or saddle connection disposed on an upper end of a column; and FIG. 128 is an elevation view of another embodiment of the present invention especially adapted to be installed, for example in a valley, wherein the number of cables are reduced by anchoring selected vertically extending cables, further incorporating a continuous tensioning cable.

Figure 129:
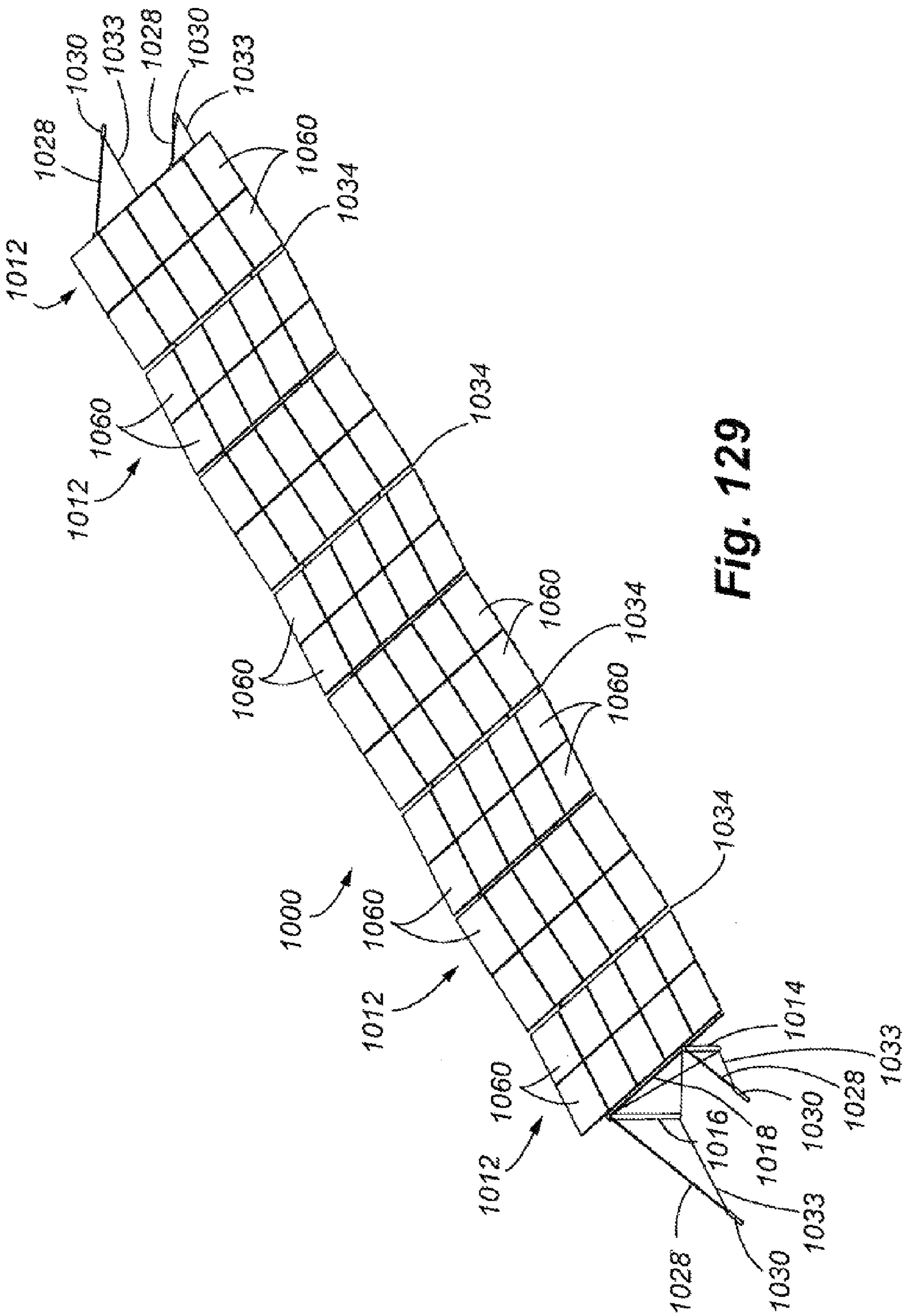
Figure 130:
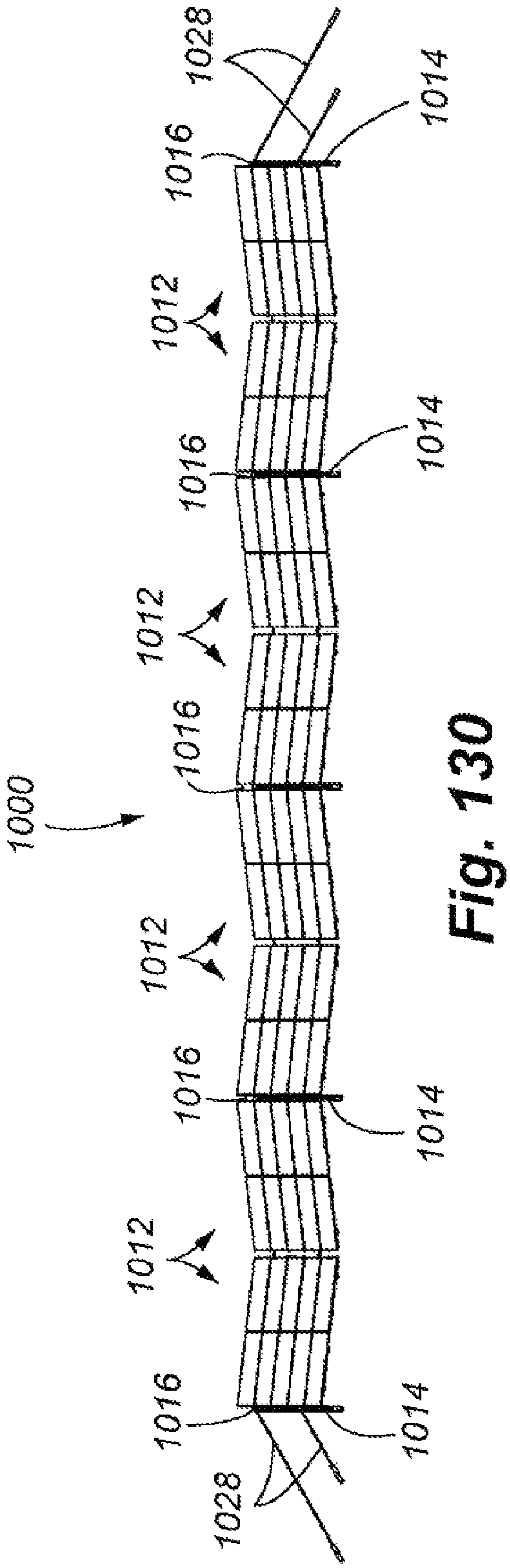
Figure 131:
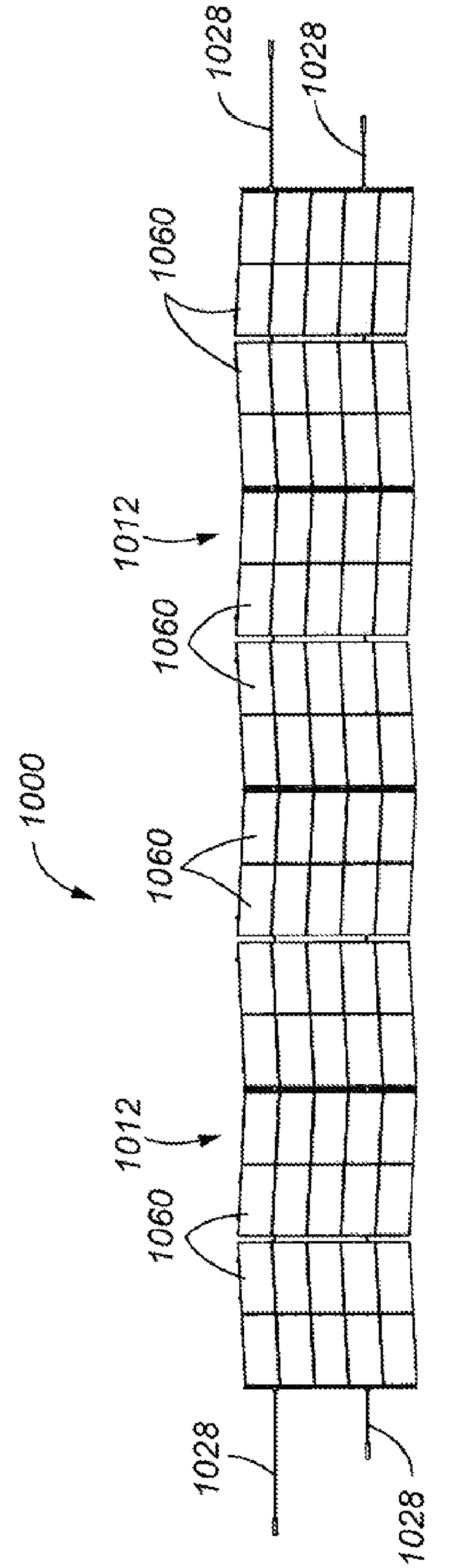
Figure 132:
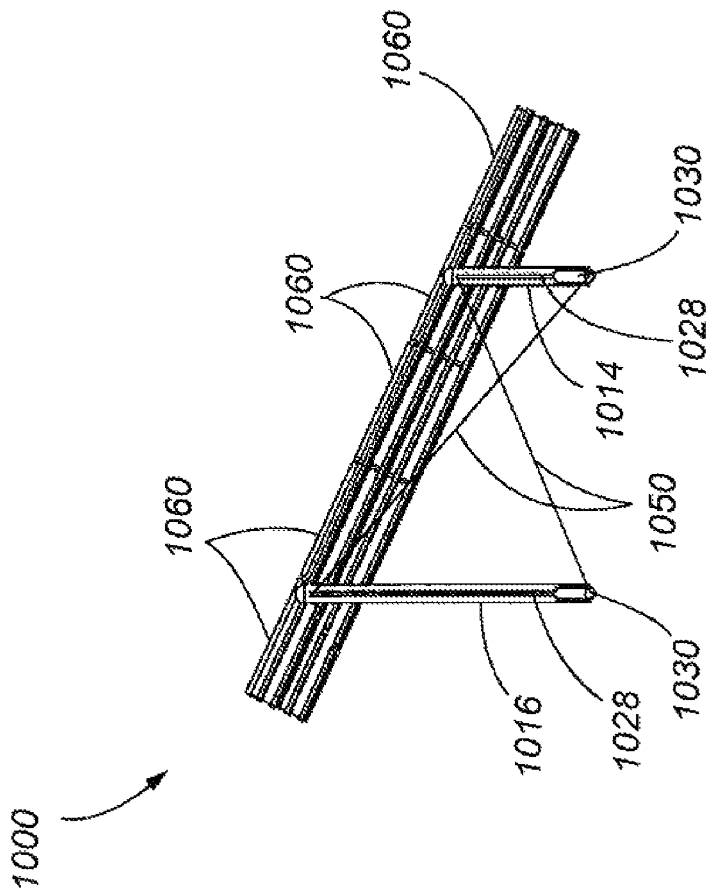
Figure 133:
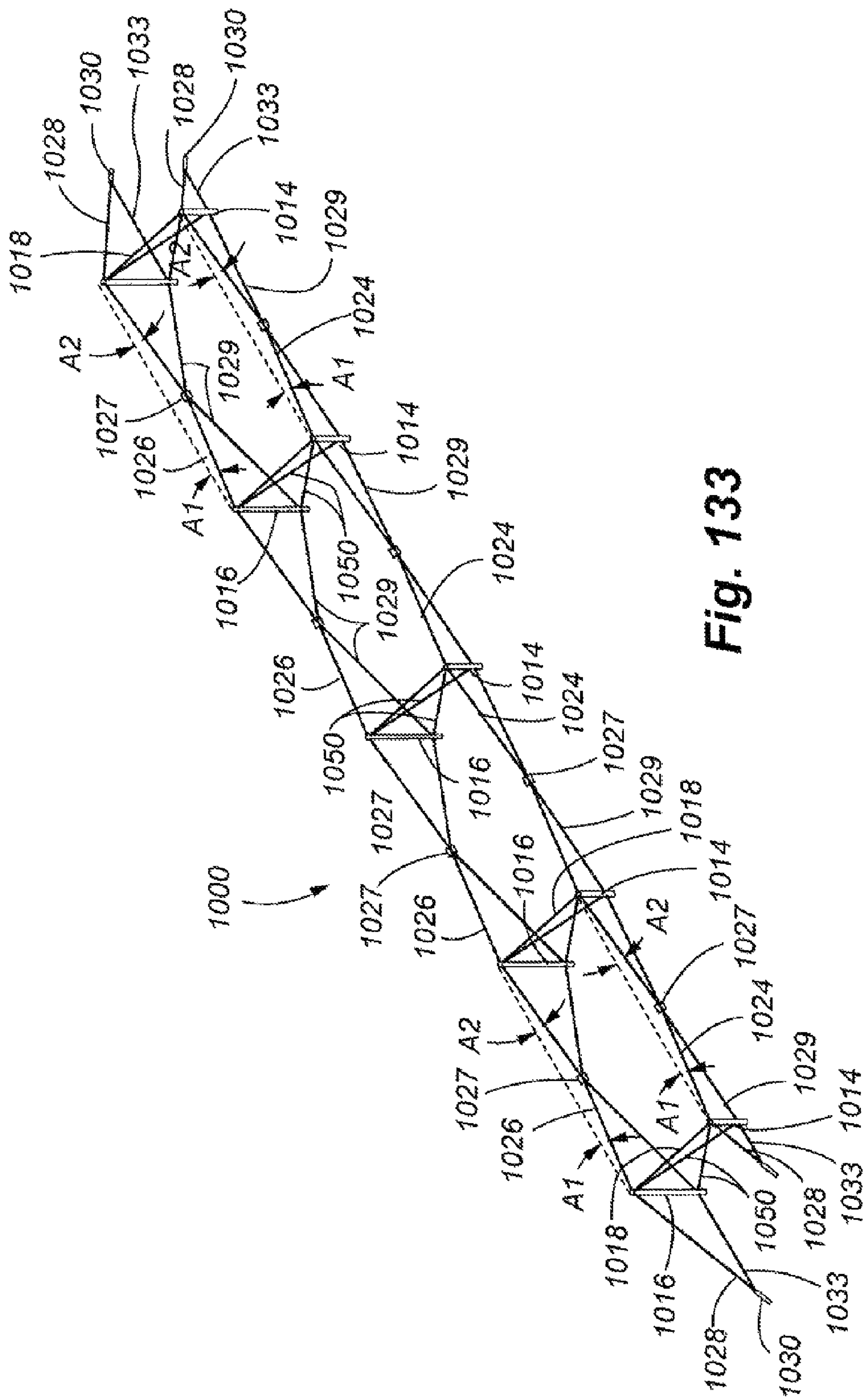
Figure 134:
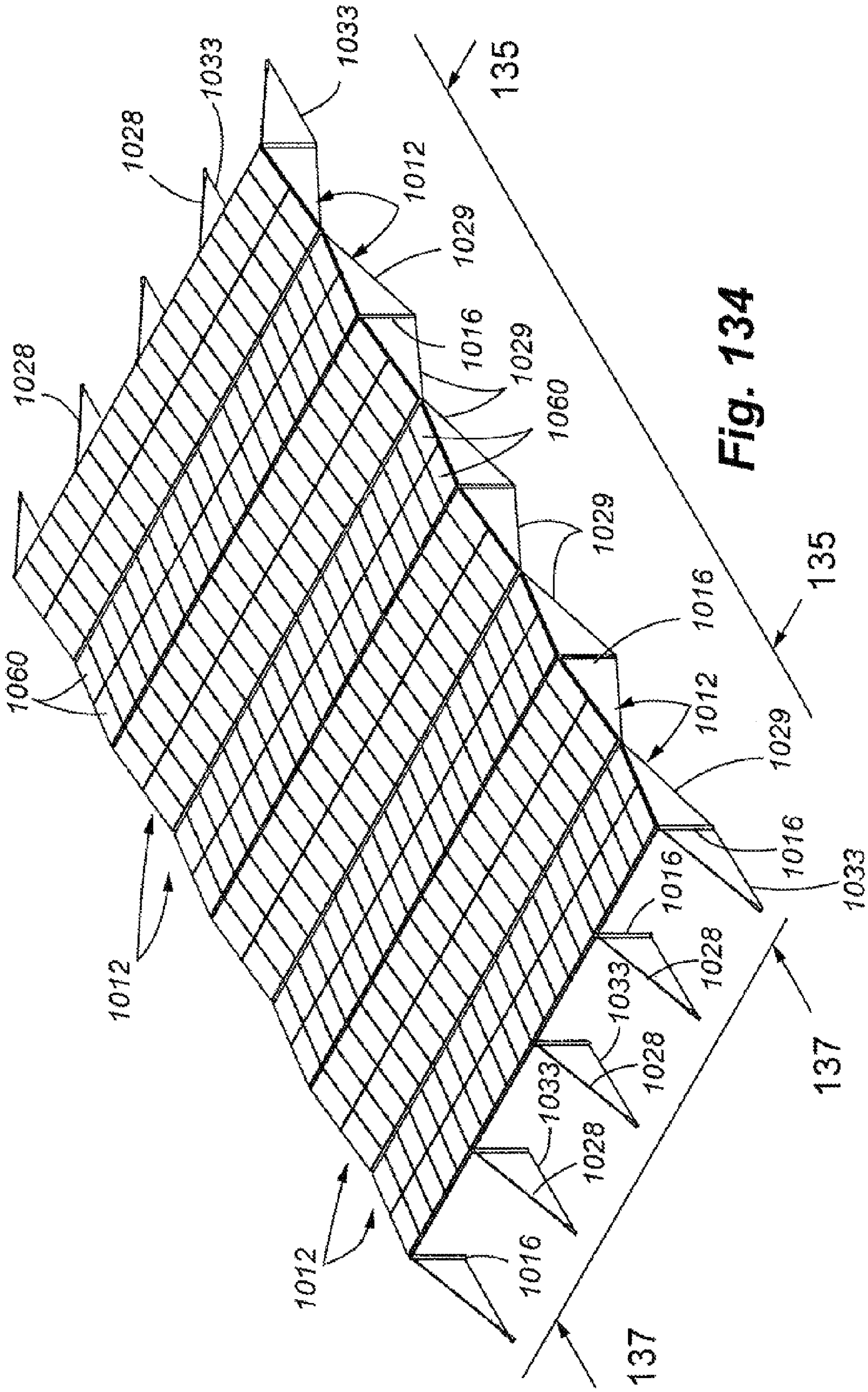
Figure 135:
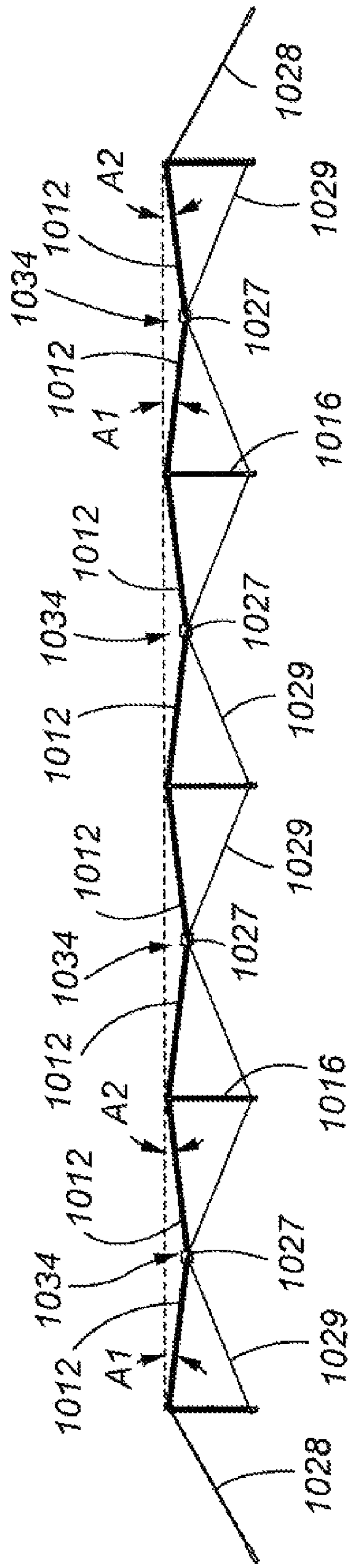
Figure 136:
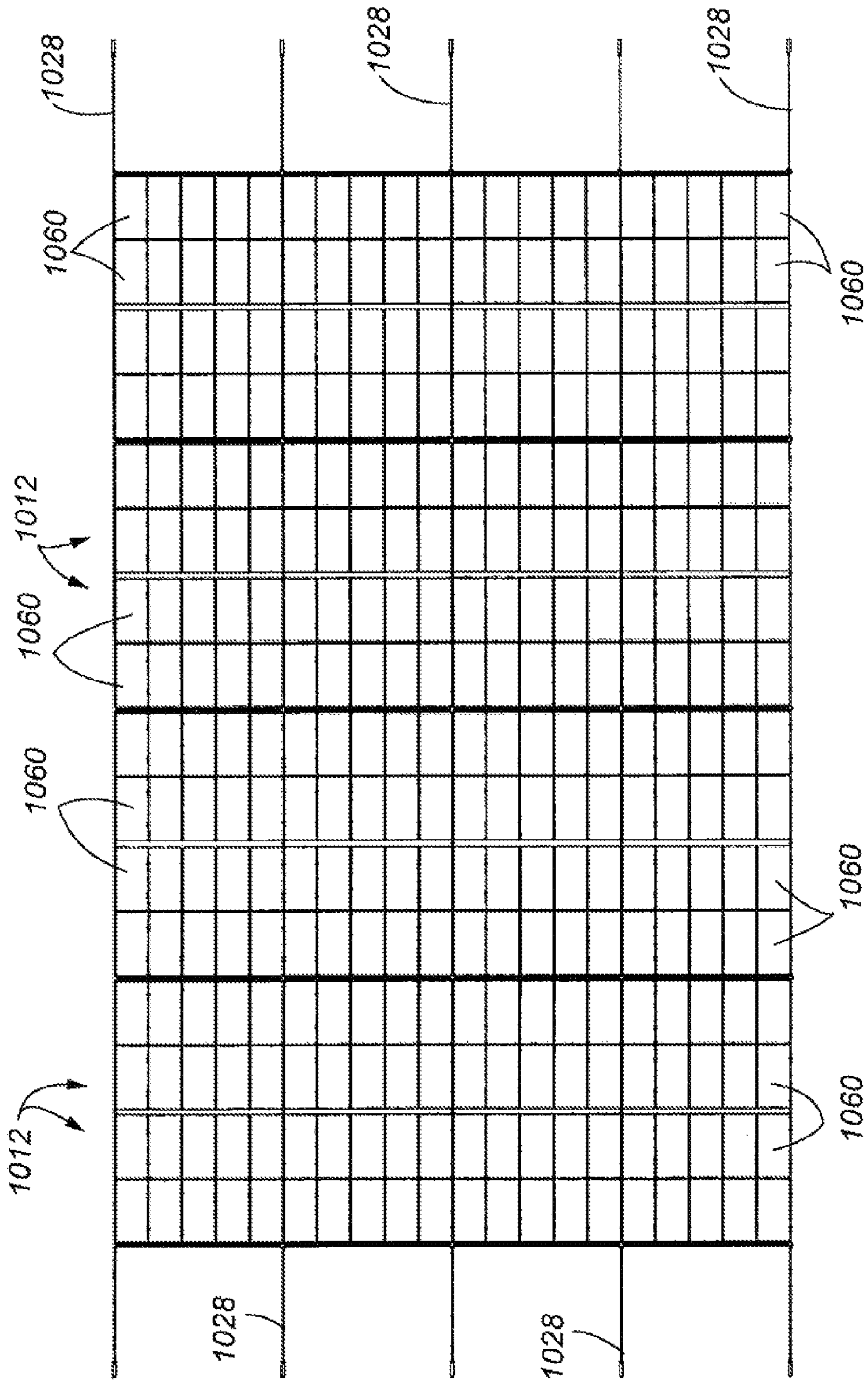
Figure 137:
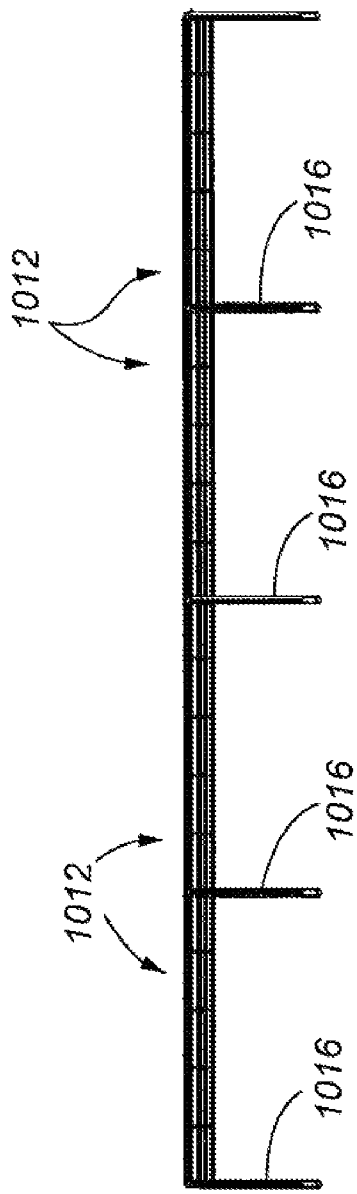
Figure 138:
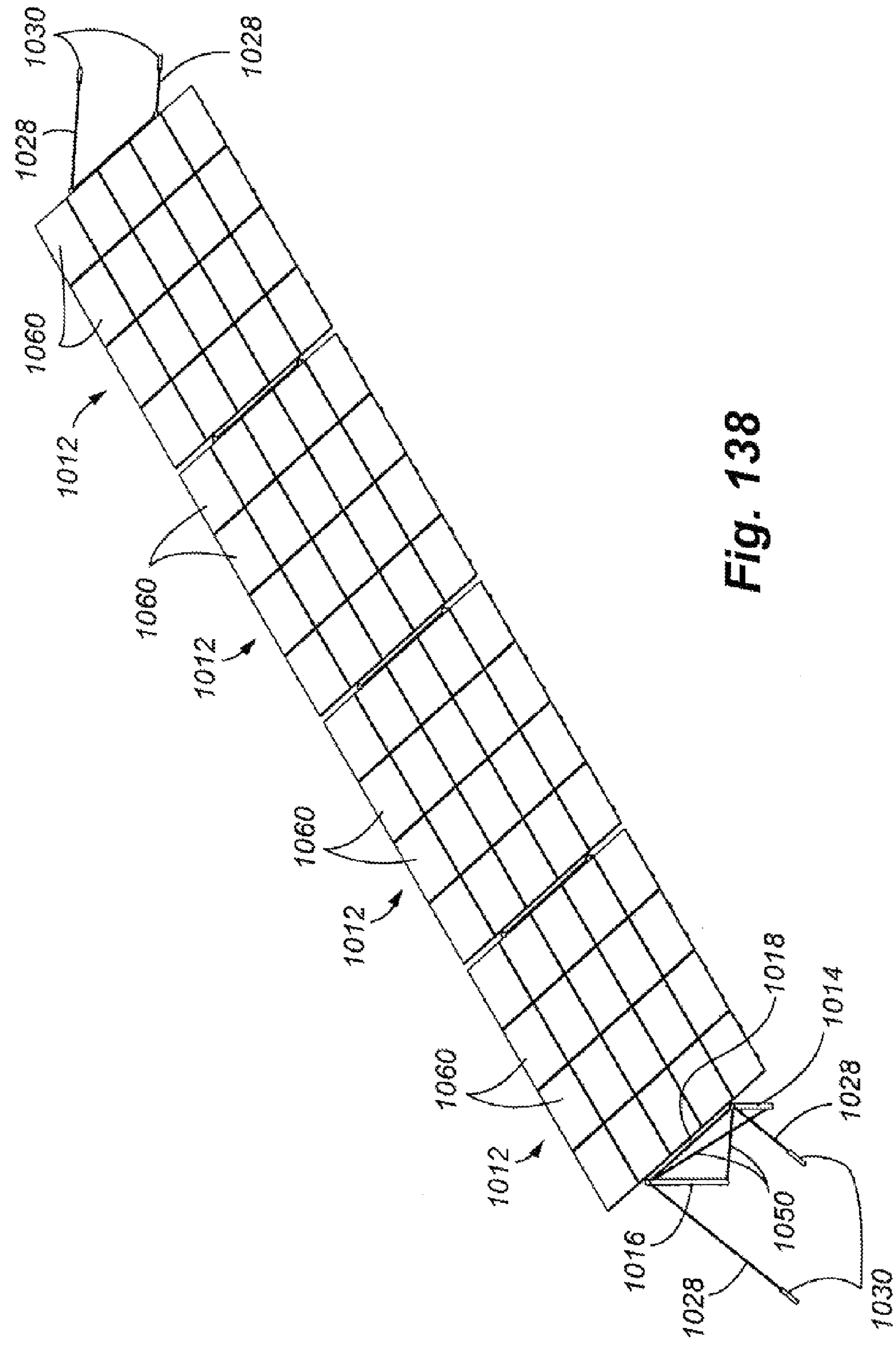
Figure 139:
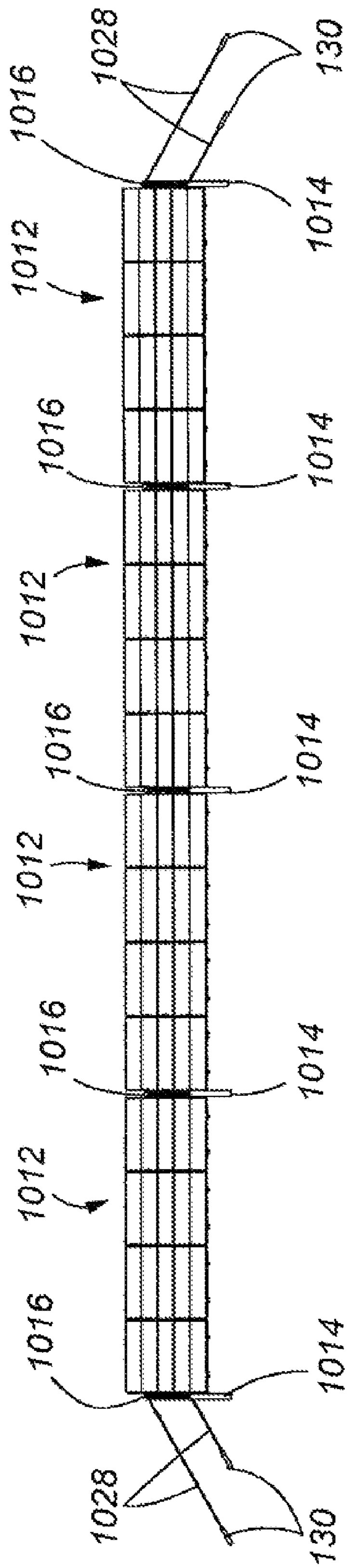
Figure 140:
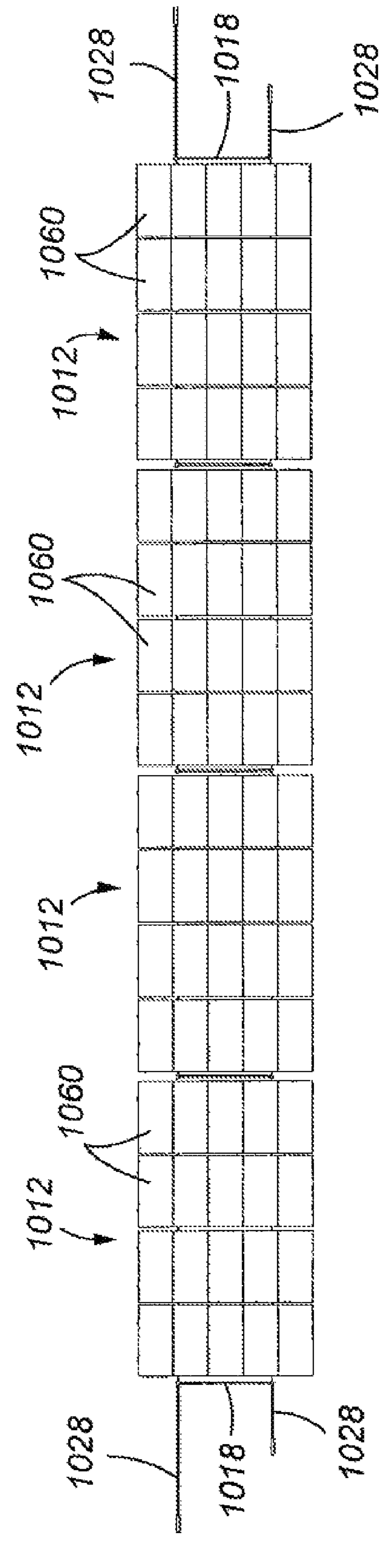
Figure 141:
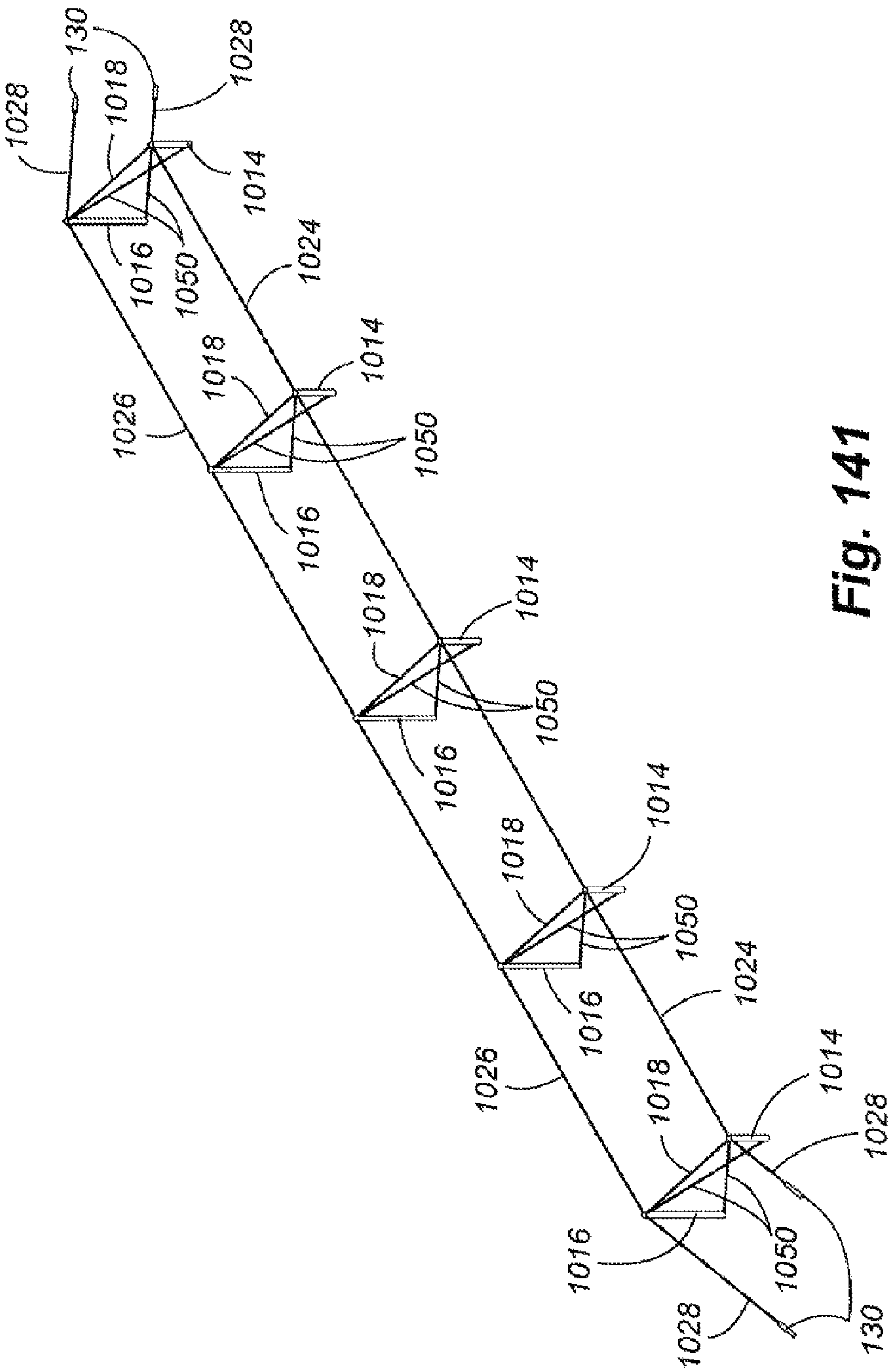
Figure 142:
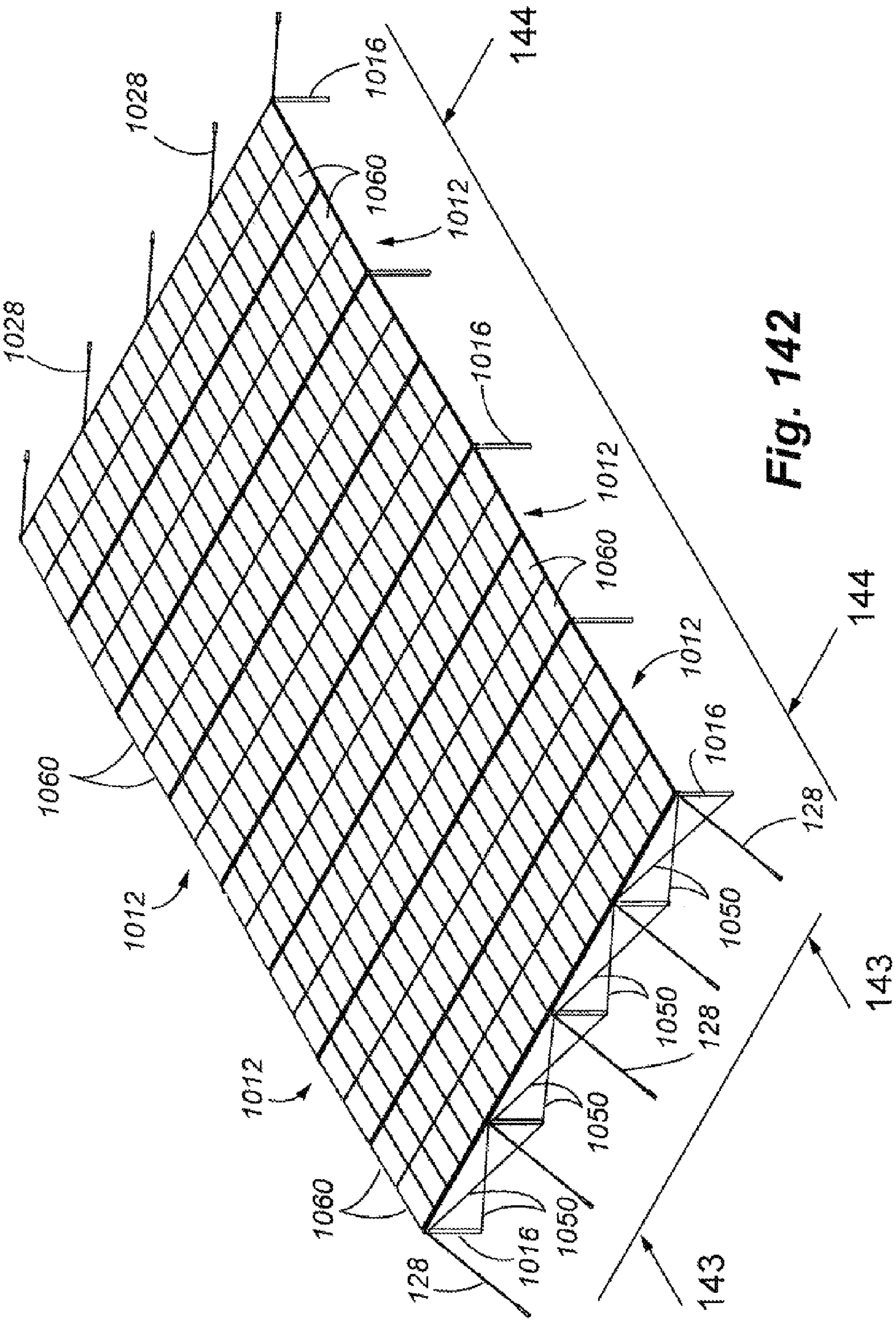
Figure 143:
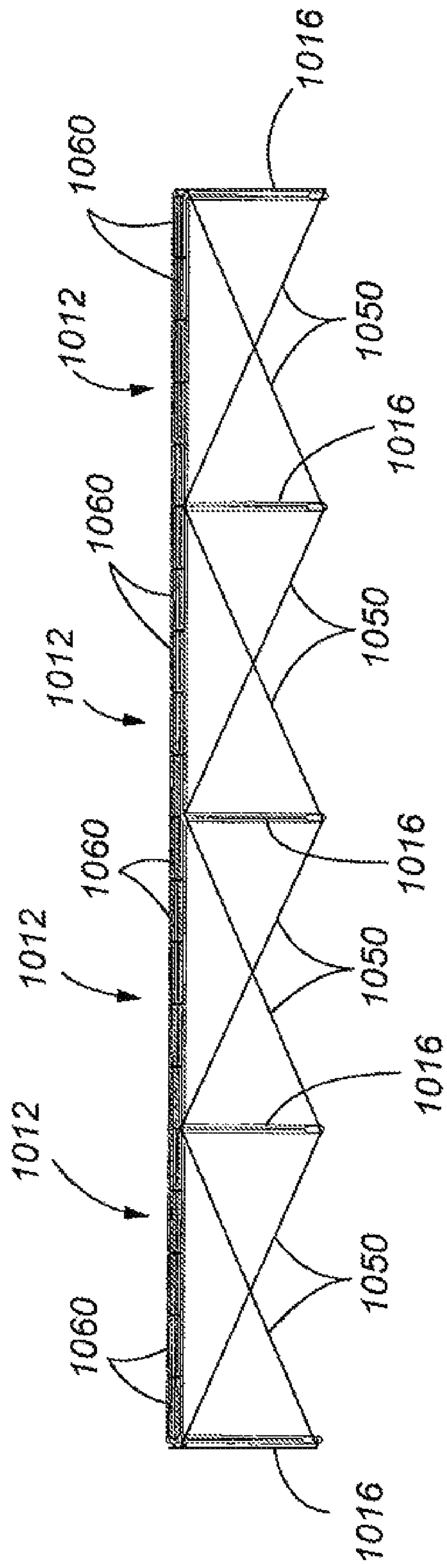
Figure 144:
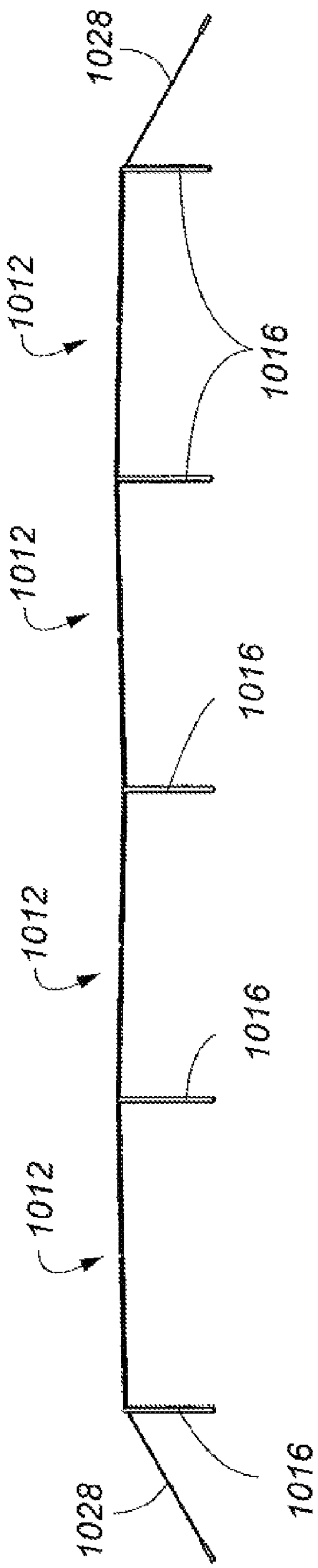
Figure 145:
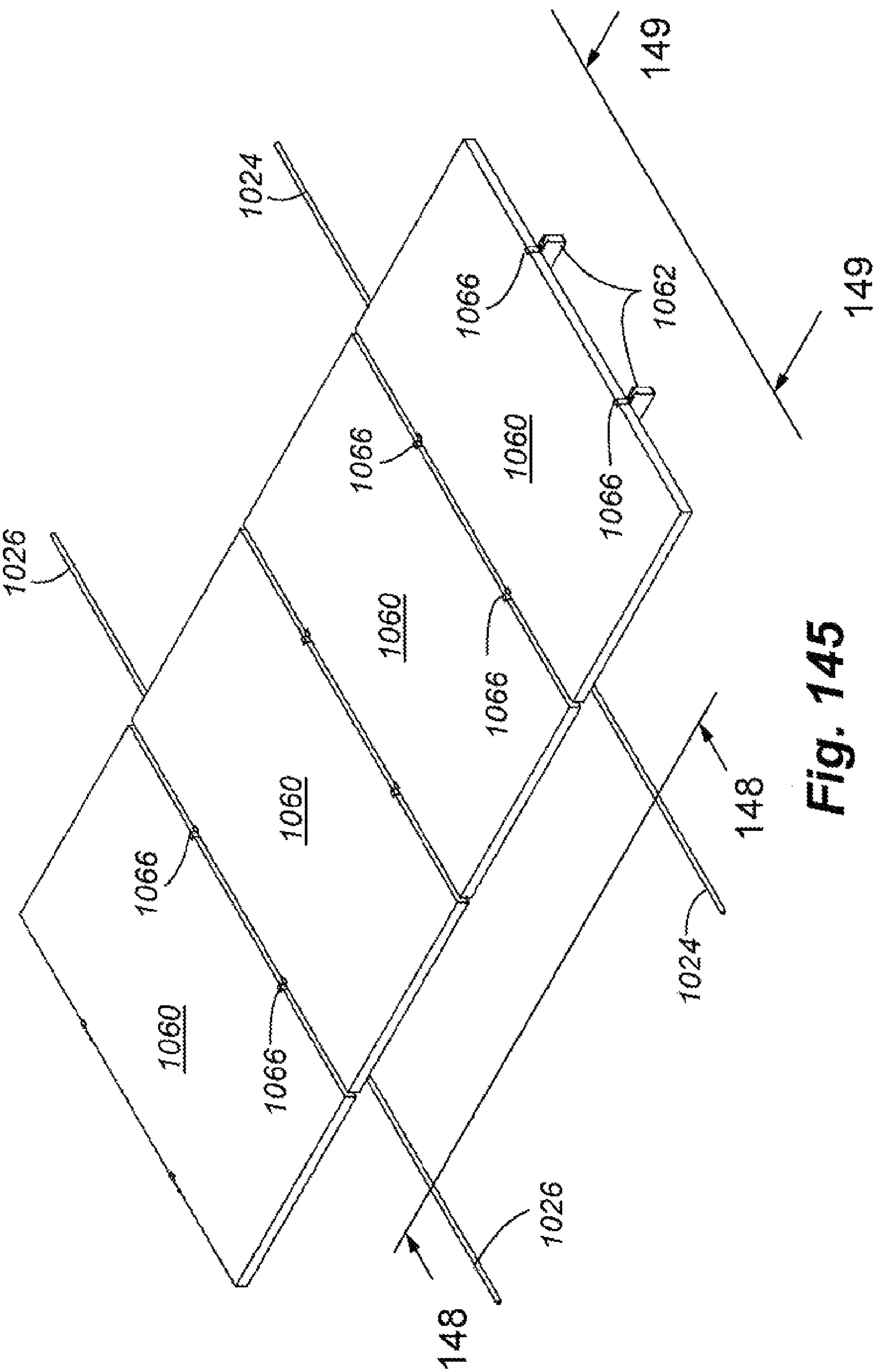
Figure 146:
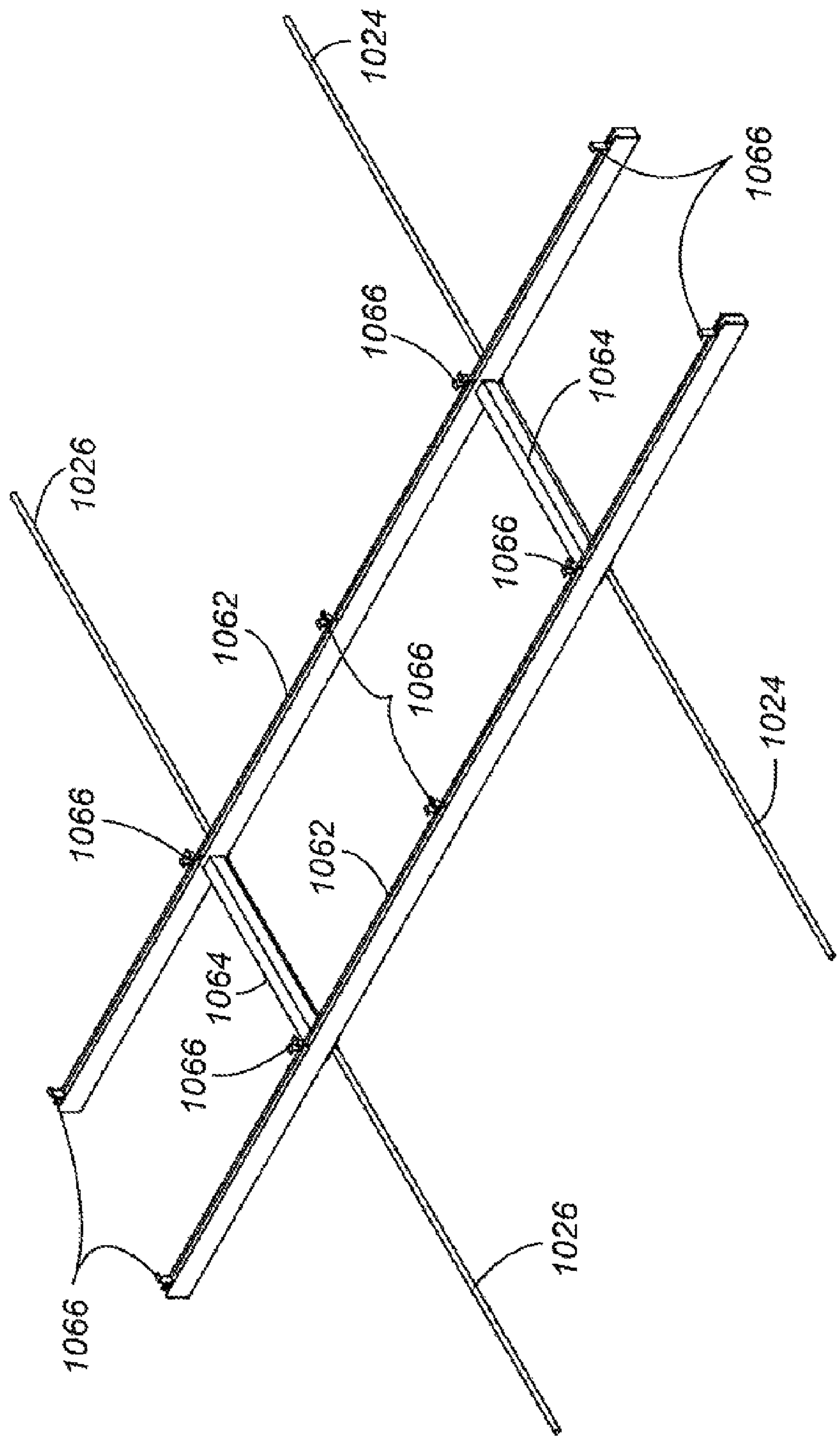
Figure 147:
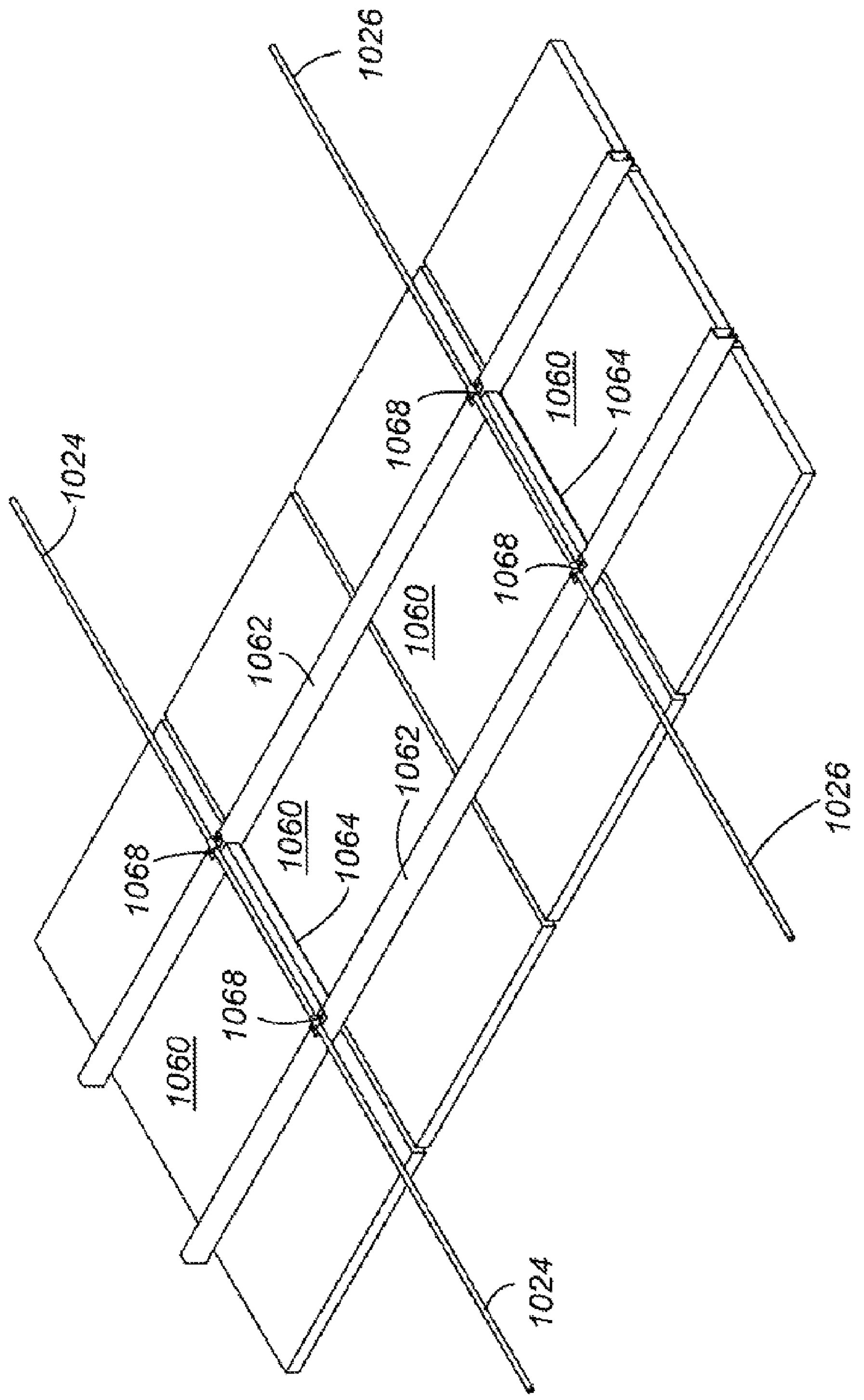
Figure 148:
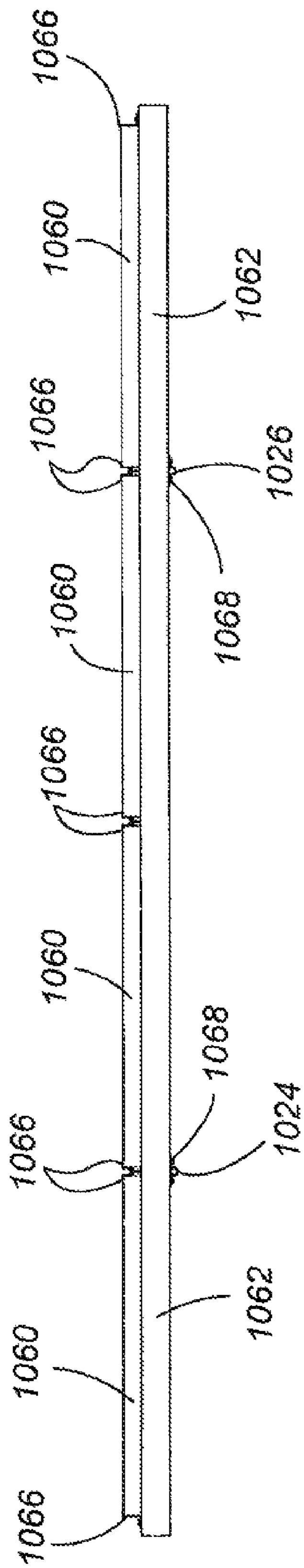
Figure 149:
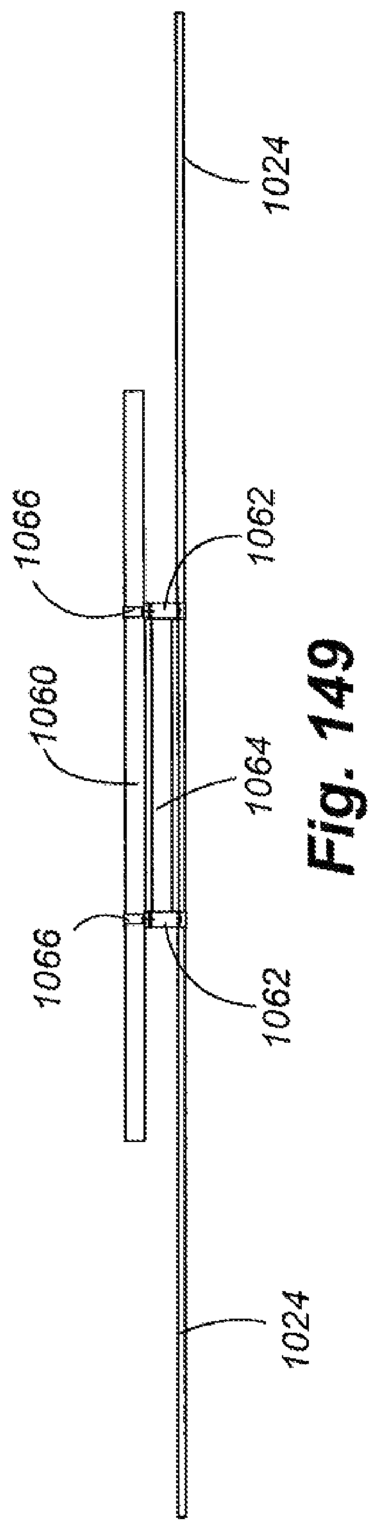
Figure 150:
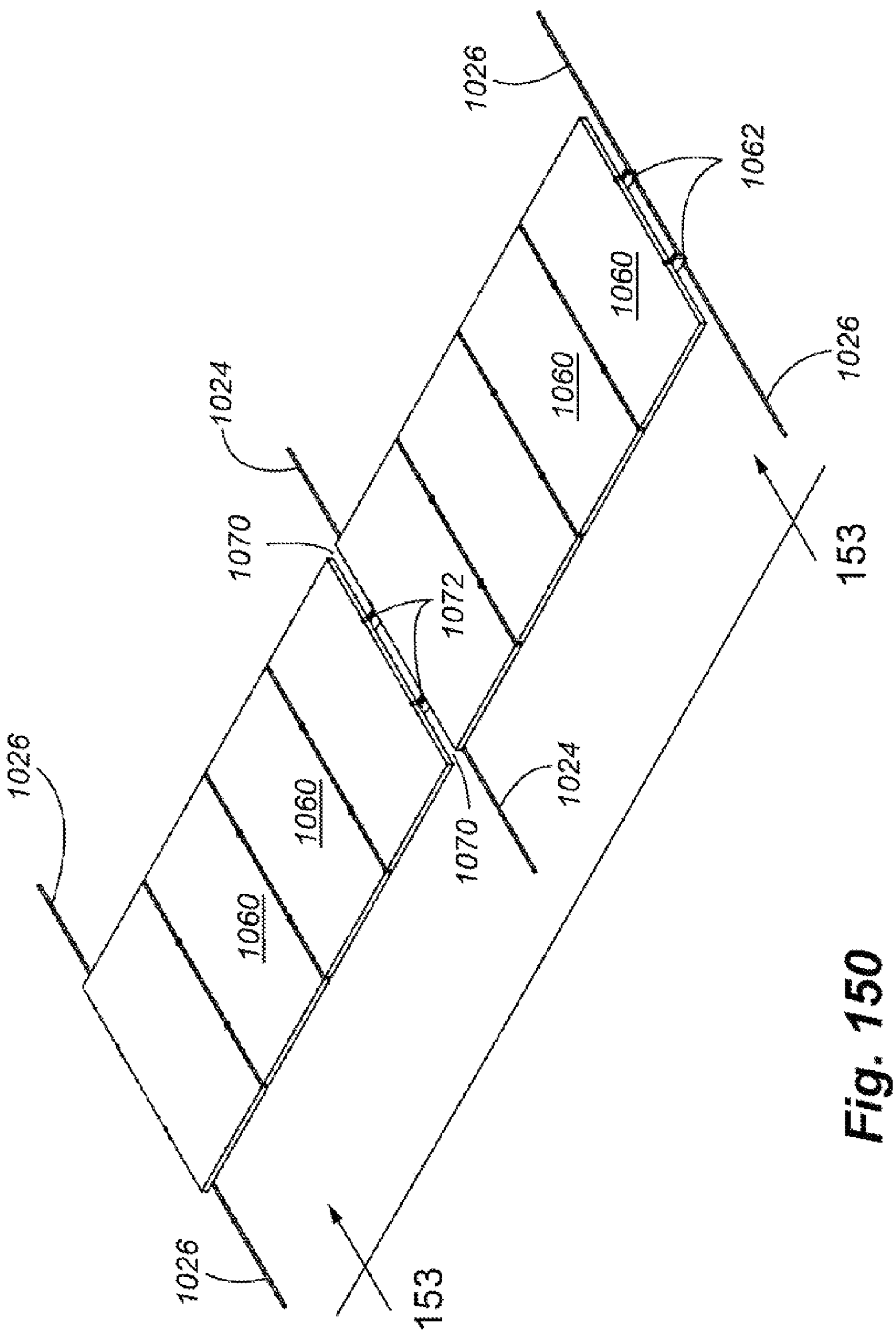
Figure 151:
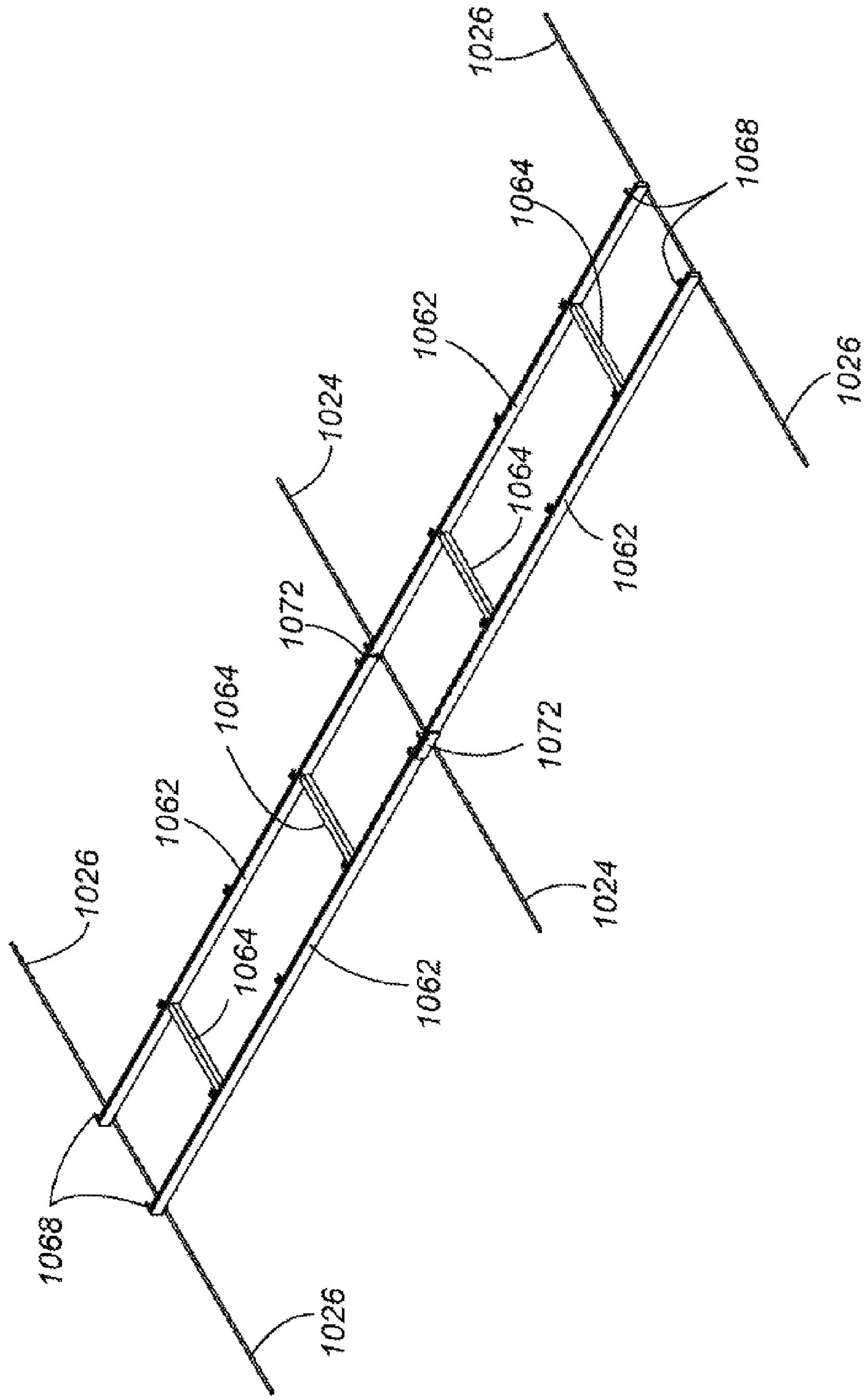
Figure 152:
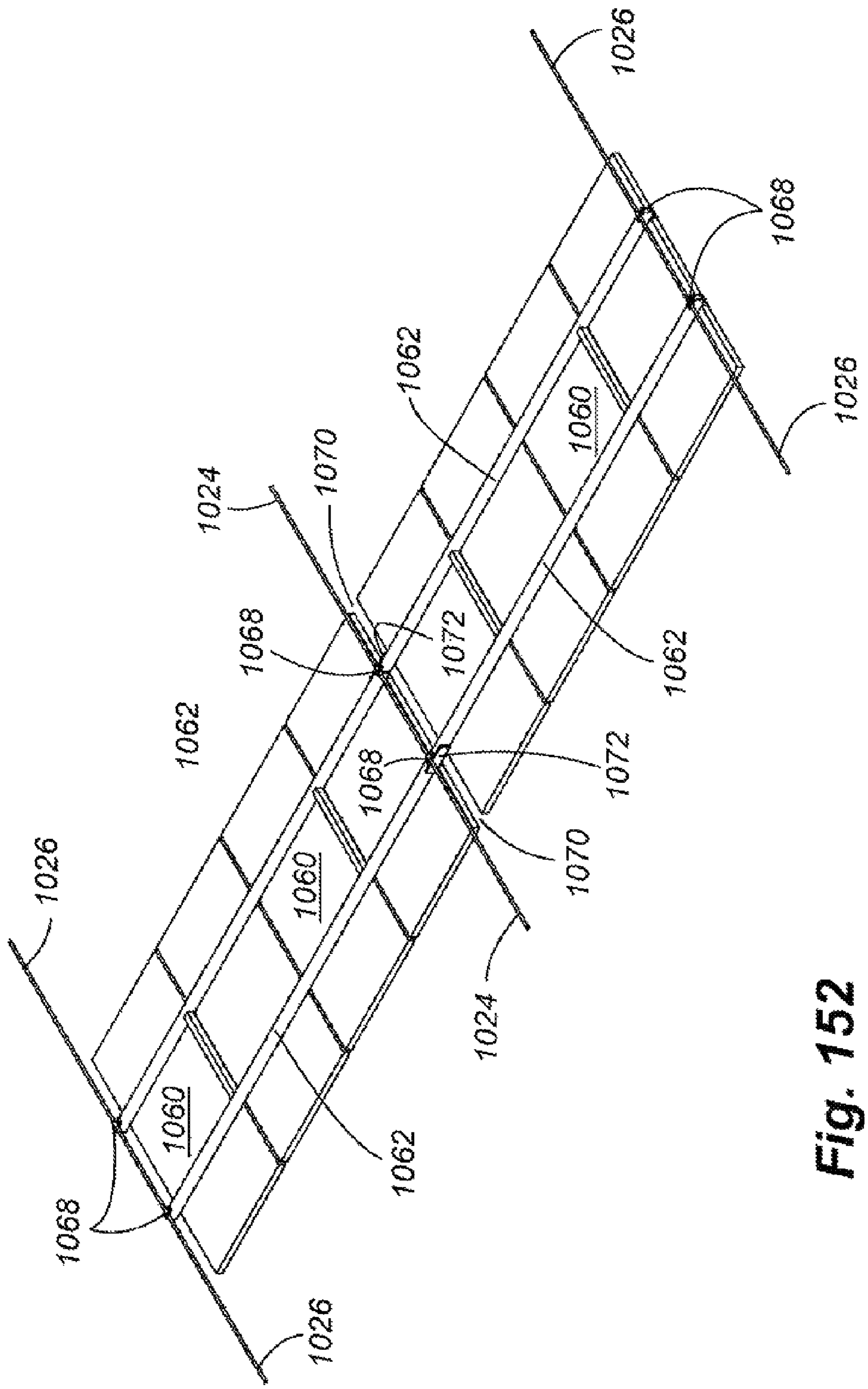
Figure 153:
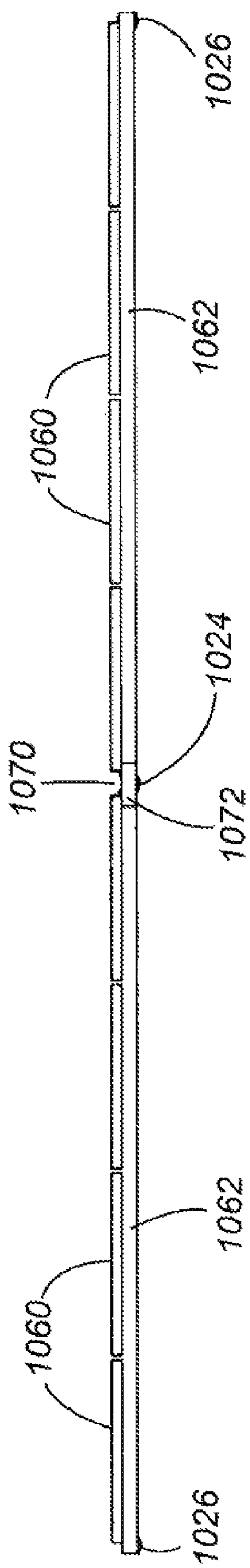
Figure 154:
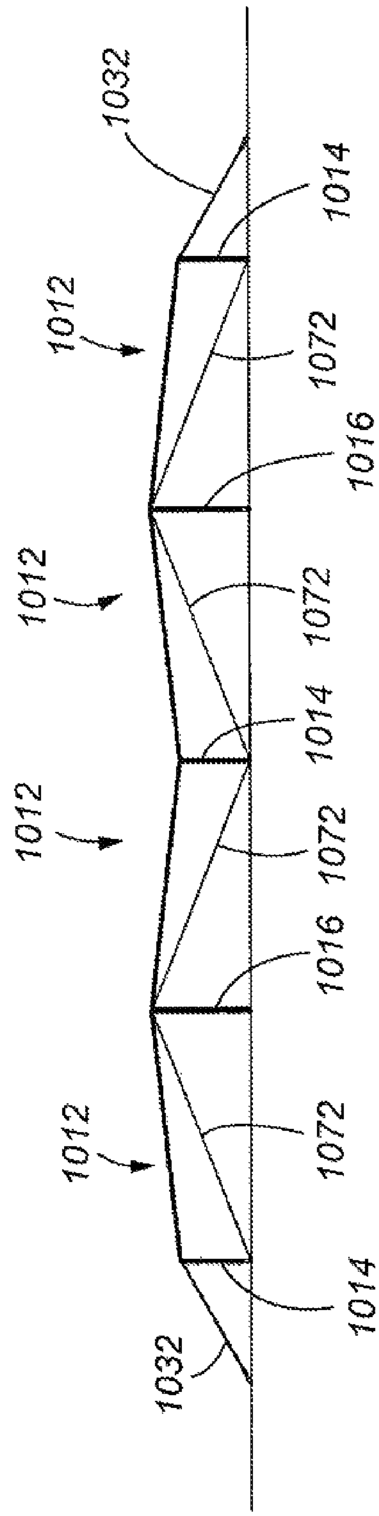
Figure 155:
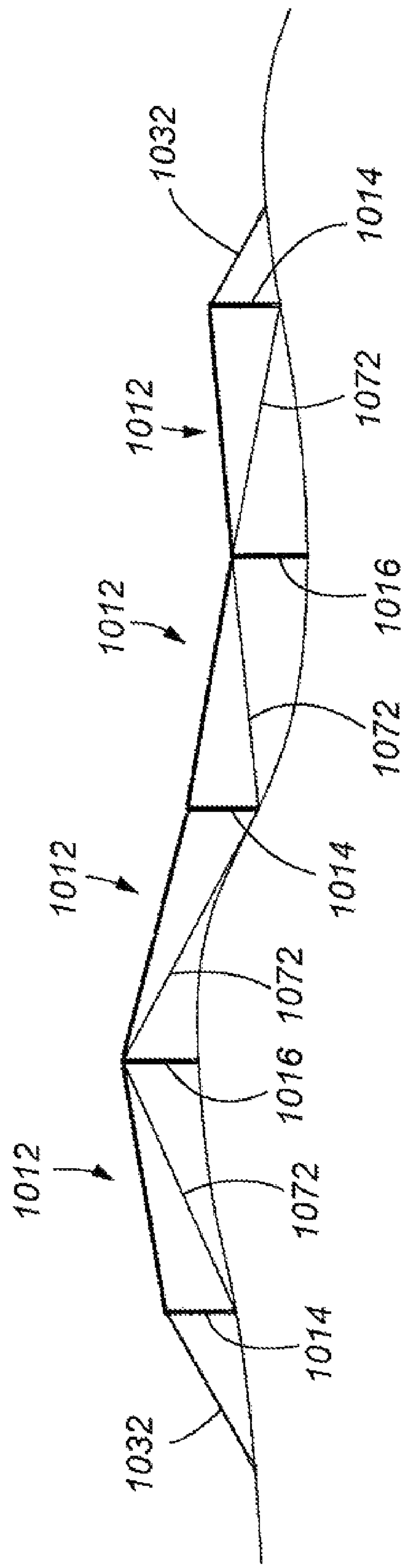

FIG. 129 is a perspective view of a solar panel array supported in accordance with an illustrative embodiment that reduces the number of structural support elements thereby reducing material costs and labor costs, yet the embodiment provides a robust and structurally sound support system;

FIG. 130 is a front elevation view of the solar panel support system of FIG. 129;

FIG. 131 is a top plan view of FIG. 129;

FIG. 132 is a side elevation view of FIG. 129;

FIG. 133 is a perspective view of the embodiment of FIG. 129, but with the solar panels and pods removed to illustrate the cable support arrangement, and further illustrating longitudinal diagonal cable arrangements extending between pairs of columns and crossing diagonal cable arrangements extending transversely between short and tall columns;

FIG. 134 is a perspective view of a plurality of solar panel support spans combined to form a larger solar panel array and constructed per the cable and column support arrangement of FIG. 133 but eliminating the transversely extending crossing diagonal cables;

FIG. 135 is an elevation view taken along line of 135-135 of FIG. 134;

FIG. 136 is a plan view of FIG. 134;

FIG. 137 is an elevation view taken along line 137-137 of FIG. 134;

FIG. 138 is another perspective view of a simplified solar panel array support system in accordance with an illustrative embodiment;

FIG. 139 is a front elevation view of FIG. 138;

FIG. 140 is a top plan view of FIG. 138;

FIG. 141 is another perspective view of the embodiment of FIG. 138 with the solar panels and pods removed to view the underlying arrangement of support cables and columns;

FIG. 142 is a perspective view of a plurality of solar panels joined to form a larger solar panel array incorporating the cable and columns support arrangement of FIG. 138 however utilizing columns of substantially the same height;

FIG. 143 is an elevation view taken along line 143-143 of FIG. 142;

FIG. 144 is an elevation view taken along line 144-144 of FIG. 142;

FIG. 145 is an enlarged perspective view illustrating solar panels mounted to a simplified pod in accordance with another illustrative embodiment of the present invention;

FIG. 146 is another perspective view of FIG. 145 with the solar panels removed to expose the underlying strut arrangement;

FIG. 147 is a reverse perspective view of FIG. 145 illustrating the underside of the support pods;

FIG. 148 is an elevation view taken along line 148-148 of FIG. 145;

FIG. 149 is an elevation view taken along line 149-149 of FIG. 145;

FIG. 150 is an enlarged perspective view illustrating solar panels mounted to a simplified pod similar to the embodiment shown in FIG. 145, but further including a connecting plate for joining abutting ends of struts;

FIG. 151 is another perspective view of FIG. 150 with the solar panels removed to expose the underlying strut arrangement;

FIG. 152 is a reverse perspective view of FIG. 150 illustrating the underside of the support pods;

FIG. 153 is an elevation view taken along line 153-153 of FIG. 150;

FIG. 154 is an elevation view of another illustrative embodiment that simplifies structural support by including single diagonal cables extending longitudinally between columns; and FIG. 155 illustrates the embodiment of FIG. 154 mounted over hilly or uneven terrain in which the arrangement of the diagonal cable supports shows an advantage in accommodating the uneven terrain without modification to the diagonal cable supports.

Figure 156:
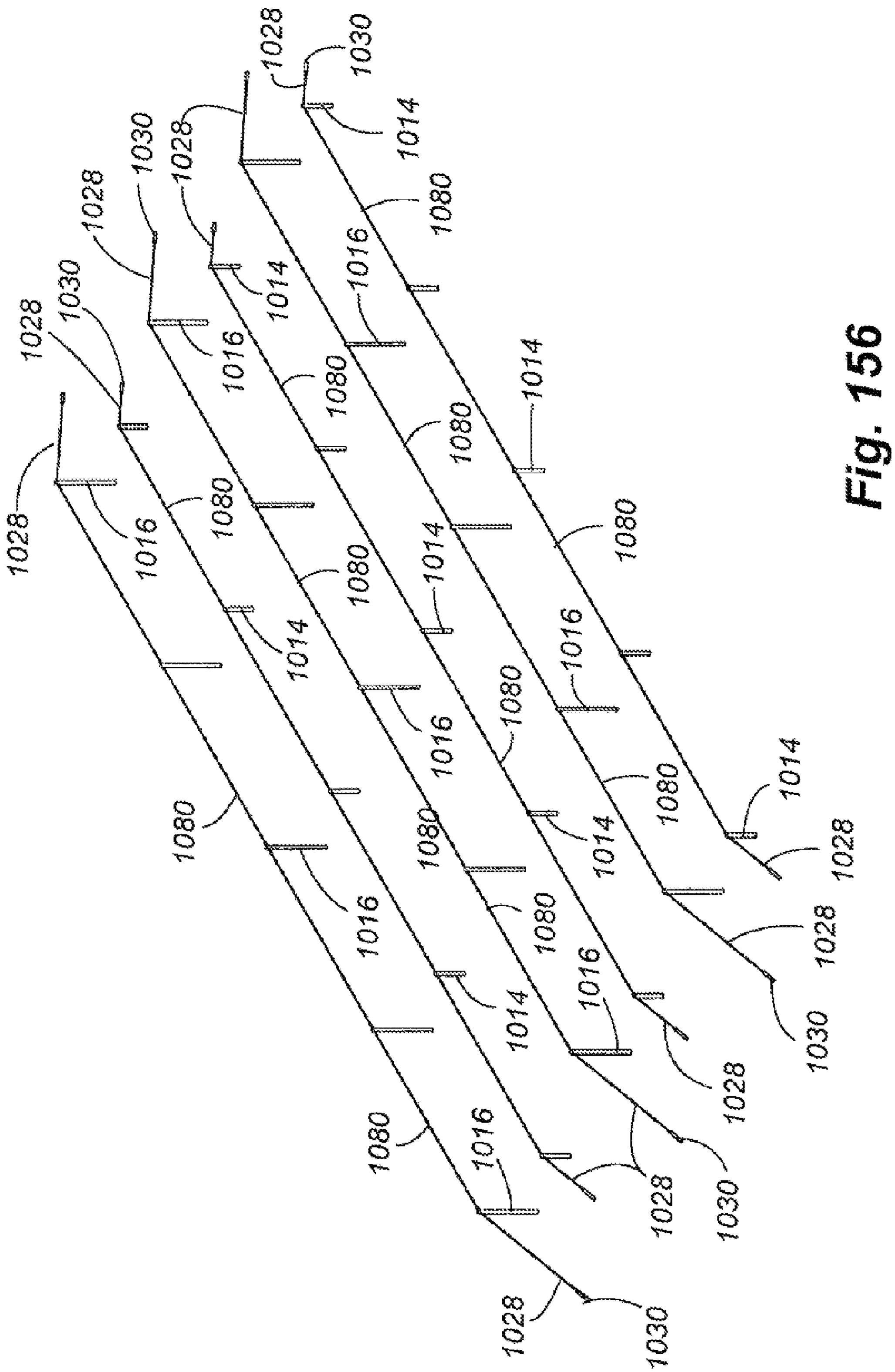
Figure 157:
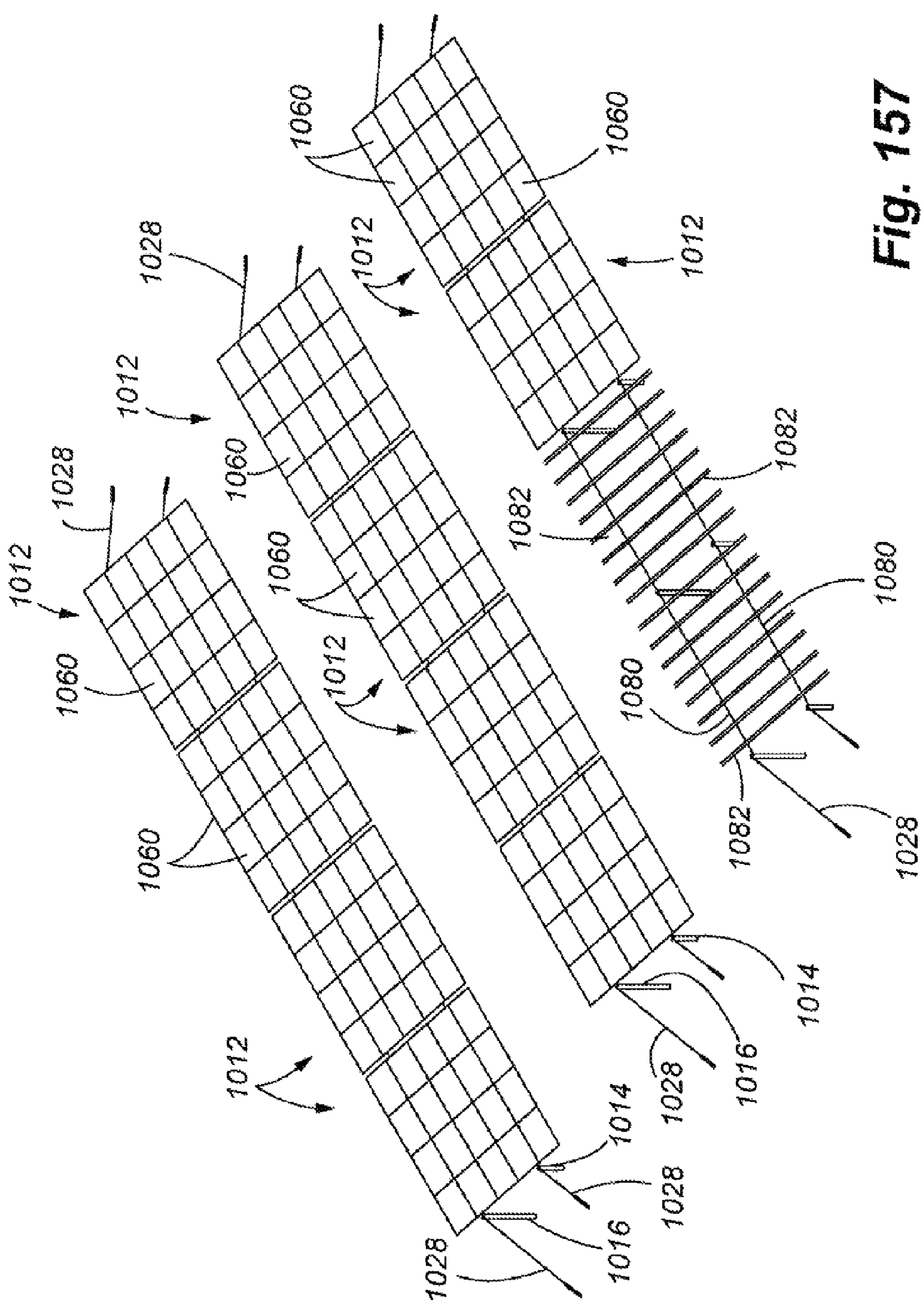
Figure 158:
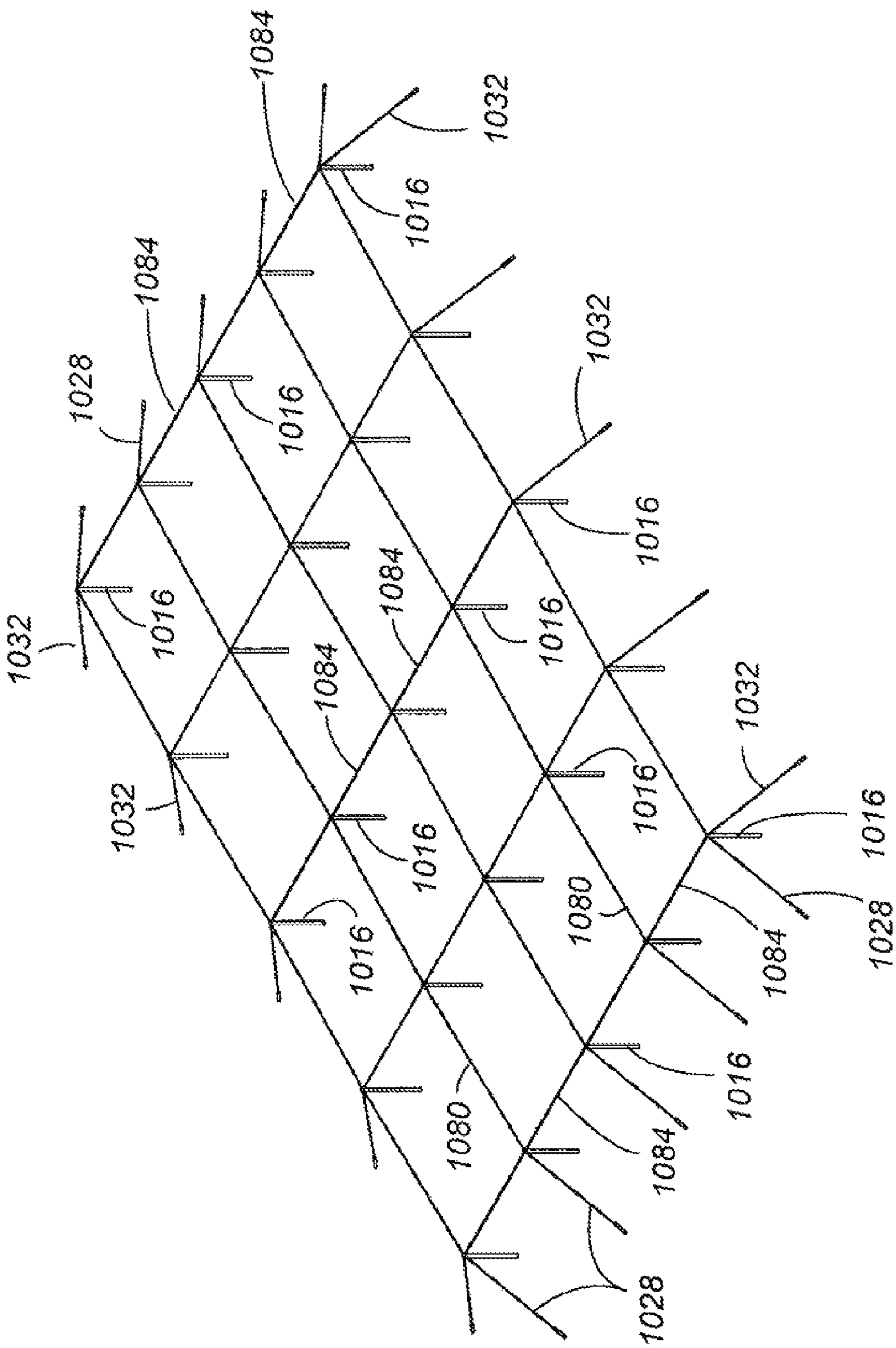
Figure 159:
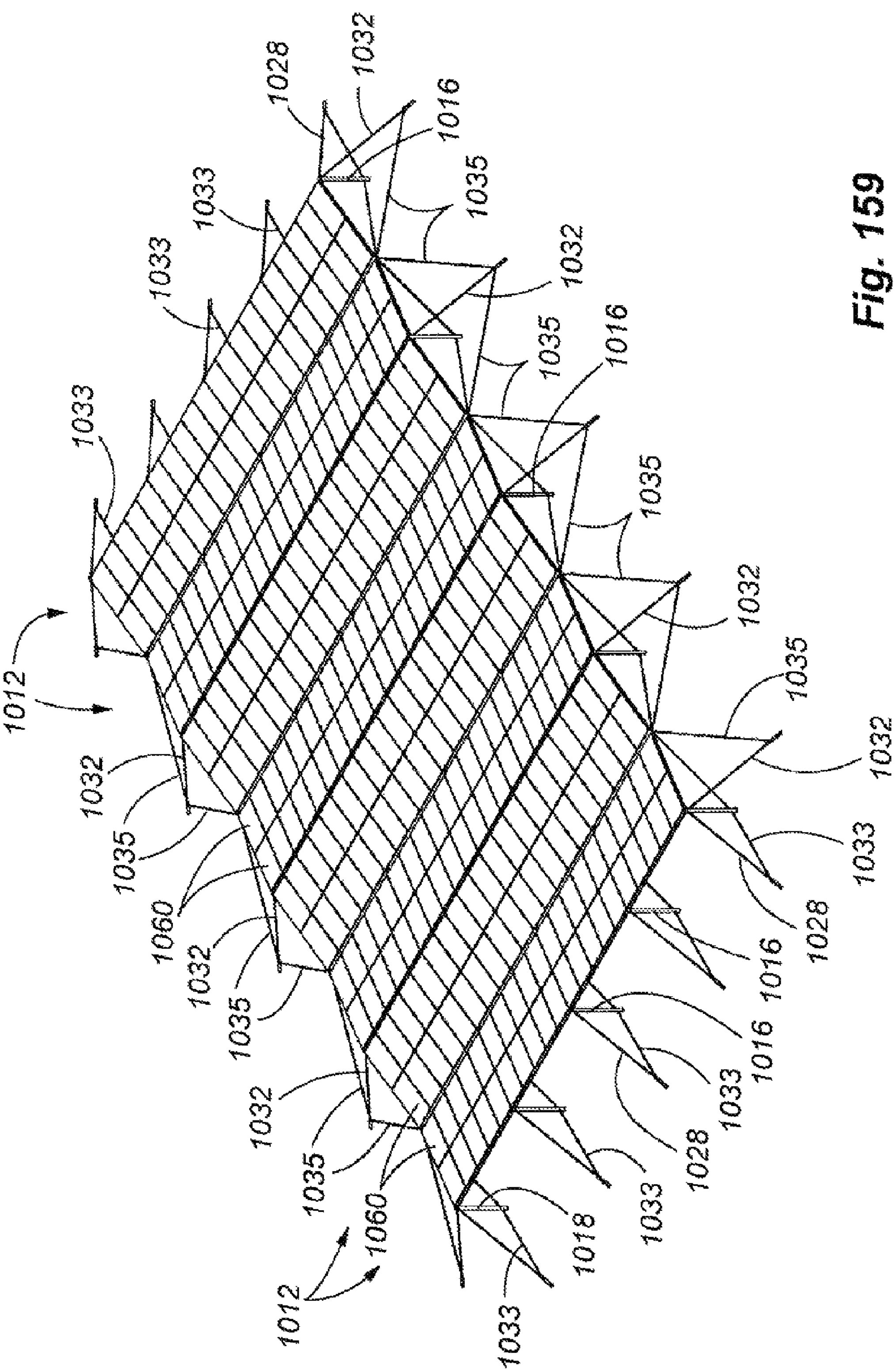

FIG. 156 is a perspective view of yet another embodiment illustrating an arrangement of cables and columns in which the columns act as stand-alone cantilever supports eliminating the need for transverse extending cables, and a single upper longitudinal cable is used between short and tall columns for supporting the struts;

FIG. 157 is a perspective view of FIG. 156 in which the solar panels have been added, and one section of the array has the solar panels removed showing the simplified arrangement of the struts mounted on the single upper longitudinal cables;

FIG. 158 is a perspective view of yet another illustrative embodiment showing an arrangement of cables and columns similar to FIG. 156 in which a transverse cable is added between columns, transverse anchor cables are added, and the columns are of a substantially same height; and FIG. 159 is a perspective view of a plurality of solar panel arrays combined to form a larger solar panel array similar to FIG. 134 and constructed per the cable and column support arrangement of FIG. 133, but adding transverse end cables and diagonal tie down cables.

DETAILED DESCRIPTION

The following detailed description should be read with reference to the drawings. The drawings, which are not necessarily to scale, depict illustrative embodiments and are not intended to limit the scope of the invention.

Figure 1:
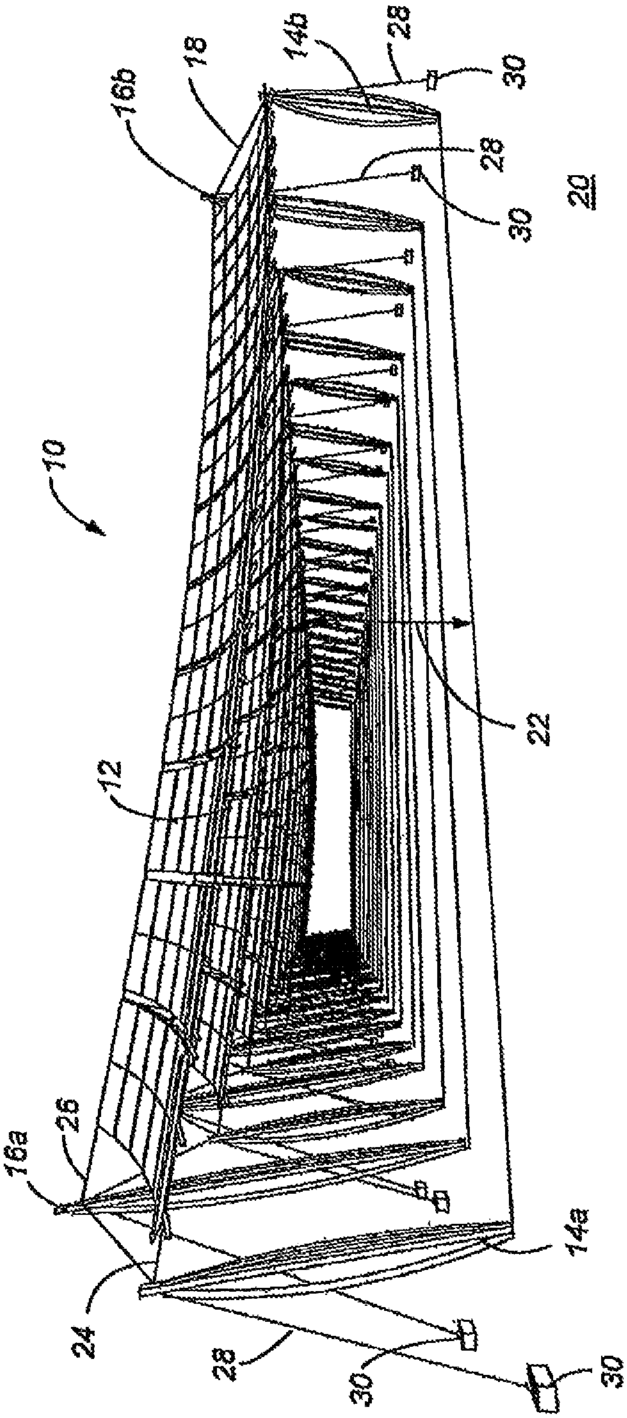
FIG. 1 is a perspective view of a solar panel array supported in accordance to an illustrative embodiment.

FIG. 1 is a perspective view of a solar panel array supported in accordance with an illustrative embodiment. A solar panel array 10 is illustrated as including a number of solar panel receivers or pods 12. Pairs of short columns 14*a*, 14*b* and tall columns 16*a*, 16*b* are aligned with one another. The pairs of columns 14*a*, 16*a* and 14*b*, 16*b* may also be connected by a stability cable 18 that runs along the edges of the array 10. The solar panel receivers 12 are held above a surface 20 at a height 22 defined by the columns 14*a*, 14*b*, 16*a*, 16*b*. A first main cable 24 is suspended between the short columns 14*a*, 14*b*, and a second main cable 26 is suspended between the tall columns 16*a*, 16*b*. The solar panel receivers 12 are designed to be supported by the cables 24, 26, so that the overall design is a lightweight, flexible and strong solar panel array 10 that leaves plenty of usable, sheltered spaced below. Anchor lines 28 and anchors 30 may be used to provide further support and to enable the use of lightweight columns 14*a*, 14*b*, 16*a*, 16*b*. Anchor lines 28 may be cables or steel rods.

The surface 20 may be, for example, a generally flat area of ground, a picnic area in a park, a parking lot, or a playground. The height 22 may be chosen to allow for a desired activity to occur beneath the array 10. For example, if a parking lot is beneath the array 10, the height 22 may be sufficient to allow typical cars and light trucks to be parked underneath the array 10, or the height may be higher to allow commercial trucks to be parked beneath the array 10. If a playground is beneath the array 10, the array 10 may have a height 22 chosen to allow installation of desired playground equipment. Any suitable material and/or structure may be used for the columns 14*a*,

14b, 16a, and 16b including, for example, concrete, metal, a simple pole, or a more complicated trussed column. In some embodiments a footing may be placed beneath the base of each of the columns 14a, 14b, 16a, and 16b to provide stability on relatively soft ground. The cables 18, 24, and 26 and anchor lines 28 may be made of any material and design include, for example, metals, composites, and/or polymeric fibers. In one embodiment the primary material used in the columns 14a, 14b, 16a, and 16b, the cables 24 and 26 and the anchor lines 28 are steel. Because the primary support technology for the array 10 is cables 24 and 26 under tension, the design is both visually and literally lightweight.

While FIG. 1 illustrates an embodiment wherein the columns 14a, 14b, 16a, and 16b are either "short" or "tall", in other embodiments all the columns may be the same height. No particular angle of elevation is required by the present invention; however, it is contemplated that, depending upon the latitude, time of year, and perhaps other factors, certain angles may be more effective in capturing incident sunlight.

Figure 2:
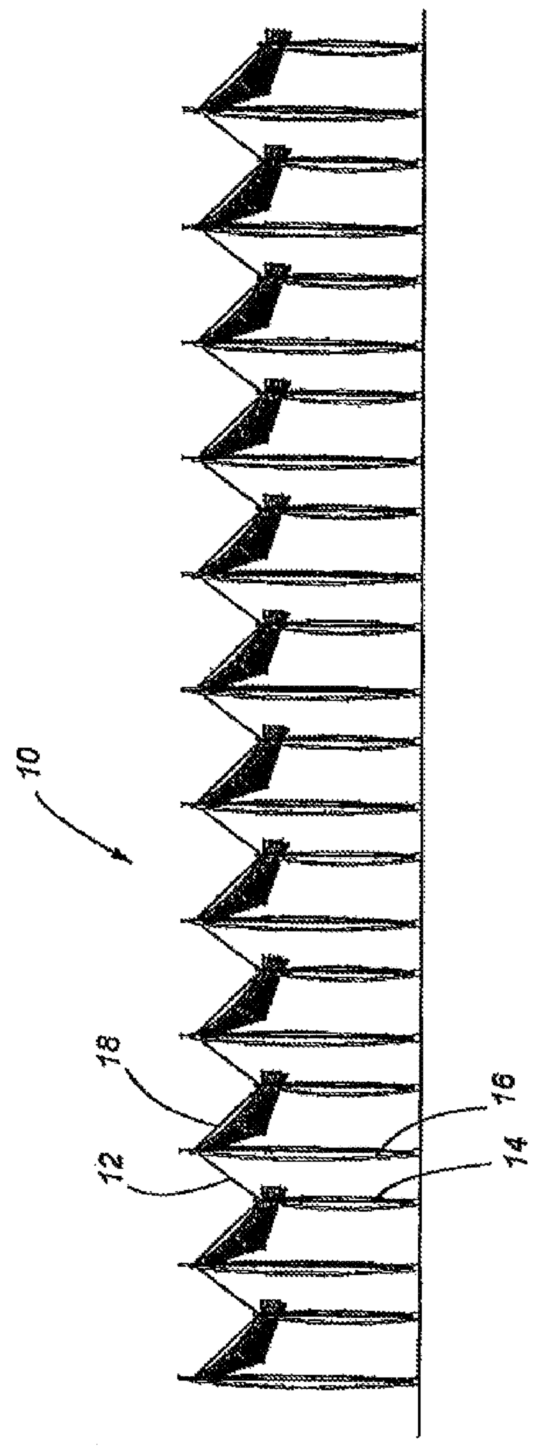
FIG. 2 is a longitudinal section view of a solar panel array supported in accordance to an illustrative embodiment.

FIG. 2 is a longitudinal section view of a solar panel array supported in accordance with an illustrative embodiment. The array 10 illustrates the relative spacing of the rows of the array 10, and helps show how the stability cable 18 connects the columns 14 and 16 of the array 10. The stability cable 18 may be coupled to an anchor member as well, though this is not shown in FIG. 2. It can be seen that the relative heights of the columns 14 and 16 help to define the angle the solar panel receivers 12 have with respect to the incident sunlight. In some embodiments, the columns 14 and 16 or the solar panel receivers 12 may include a mechanism allowing for adjustment of the angle of the solar panel receivers 12. To do so, for example, the length of the columns 14, 16 may be adjusted, or the solar panel receivers 12 may include a mechanism for changing the angle of individual panels or entire receivers 12. For example, as the season changes, the height of the sun in the sky may vary sufficiently to affect the efficiency of the solar panel receivers 12, and so it may be desirable to vary the angle of the receivers 12. Also, as the sun moves throughout the day it may be desirable to change the angle of the receivers 12 to improve light reception.

Figure 3:
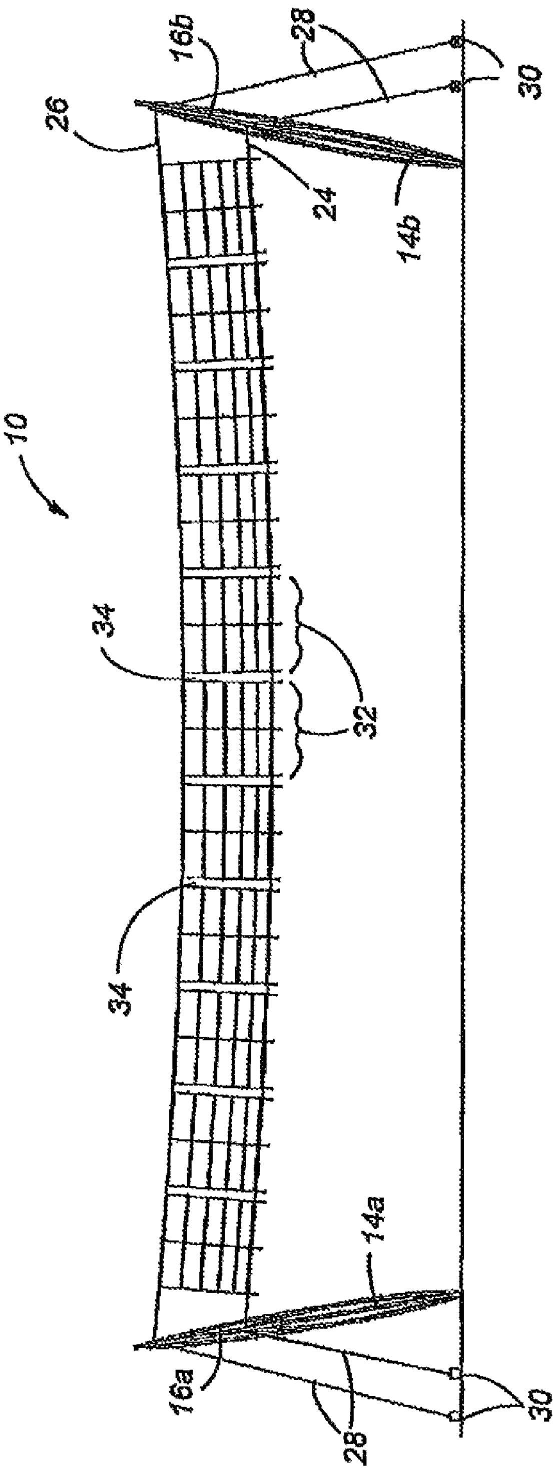
FIG. 3 is a horizontal section view of a solar panel array supported in accordance to an illustrative embodiment.

FIG. 3 is a horizontal section view of a solar panel array supported in accordance with an illustrative embodiment. As illustrated, the array 10 is supported by short columns 14a and 14b, tall columns 16a and 16b, and cables 24 and 26. Anchor lines 28 and anchors 30 are provided to improve stability and allow the use of lightweight columns 14a, 14b, 16a, and 16b. The solar panel receivers 12 are illustrated as pairs of individual units 32 having gaps 34 between each unit 32. The gaps 34 allow for air movement, reducing the amount of wind resistance of the array 10. The gaps 34 also allow for relative movement of the units 32 since the cables 24 and 26 are somewhat flexible.

Figure 4:
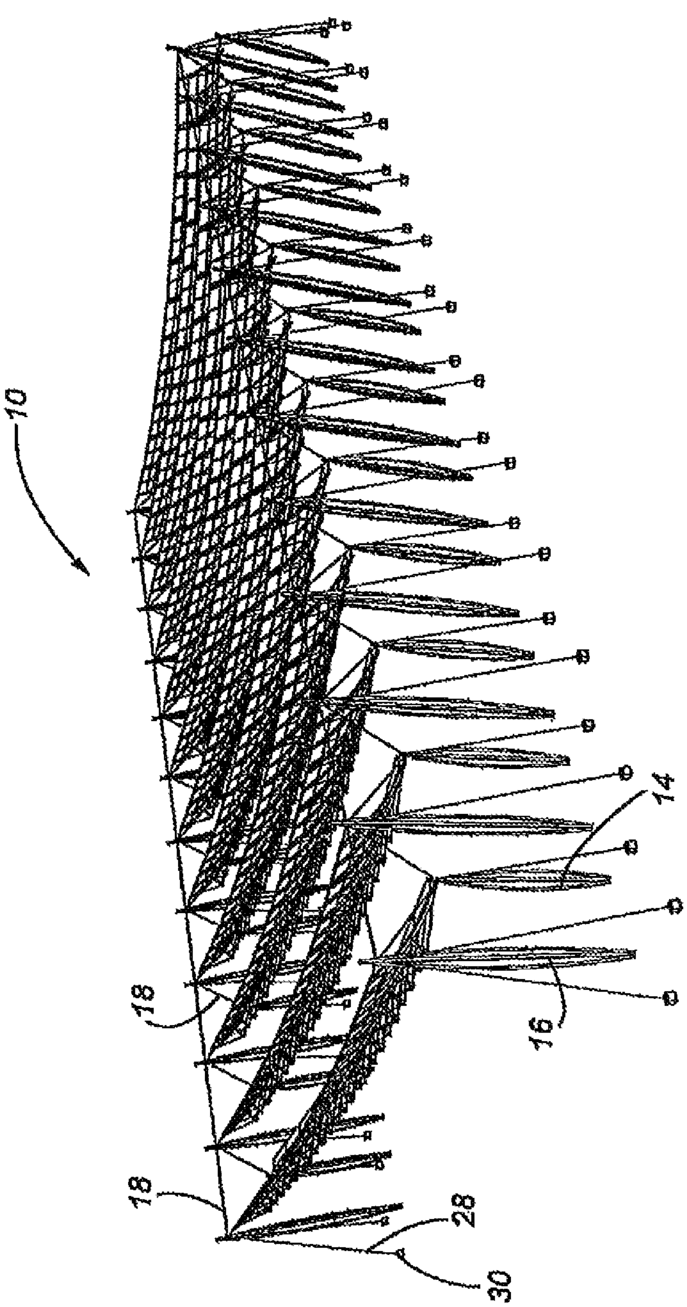
FIG. 4 is a perspective rear view of an illustrative solar panel array.

FIG. 4 is a perspective rear view of an illustrative solar panel array. It can be seen that the stability cables 18 are coupled in various configurations along the length of the array 10, linking the short columns 14 and tall columns 16 to create a linked structure. The array 10 also includes various anchor cables 28 and anchor points 30, including at the end of the array 10 that may help anchor the stability cables 18.

Figure 5:
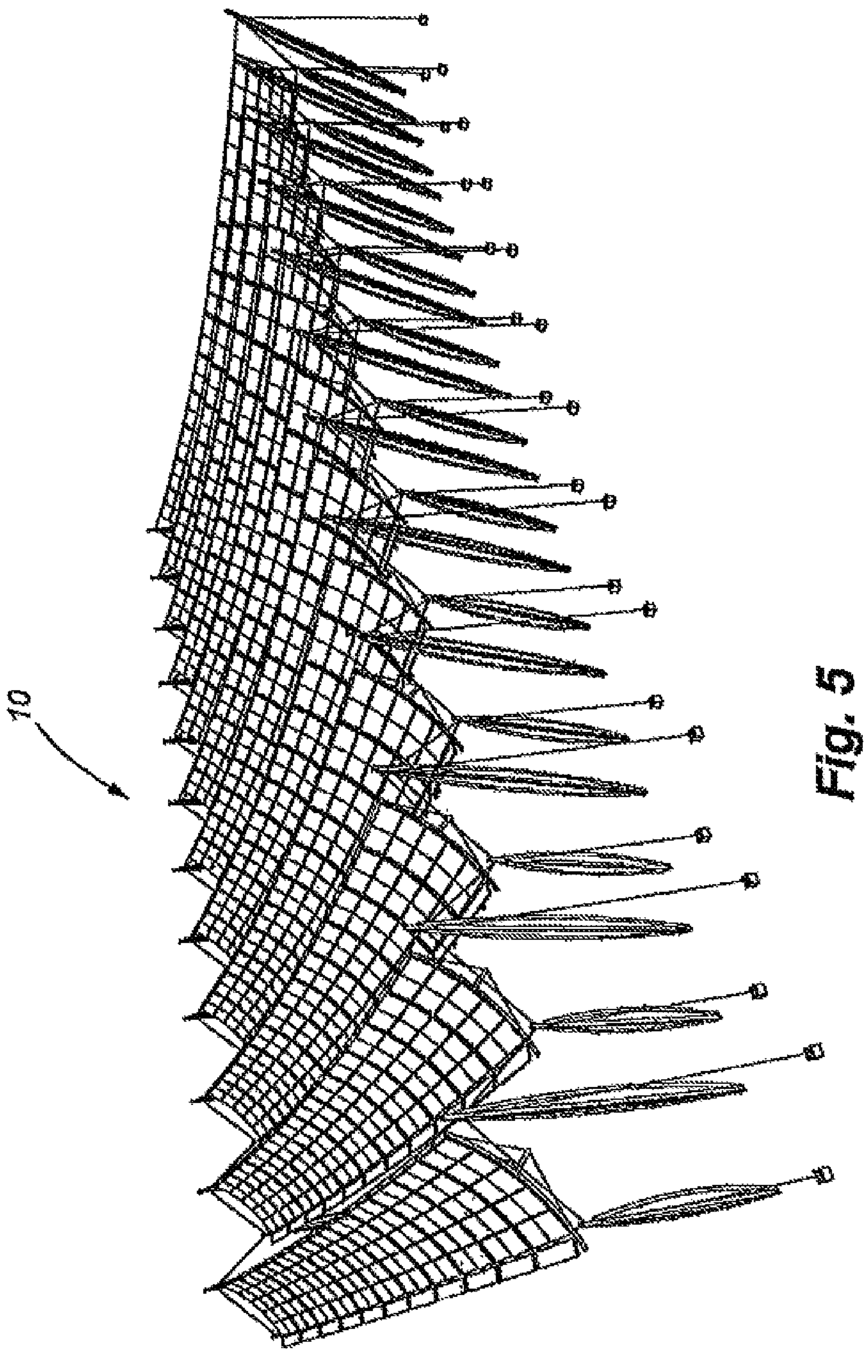
FIG. 5 is a perspective side view of an illustrative solar panel array.

FIG. 5 is a perspective side view of an illustrative solar panel array 10 that is similar to that shown in FIGS. 1-4. It can be appreciated from the several views of FIGS. 1-5 that the illustrative array 10 provides a readily usable shelter that is amenable to a variety of activities.

Figure 6:
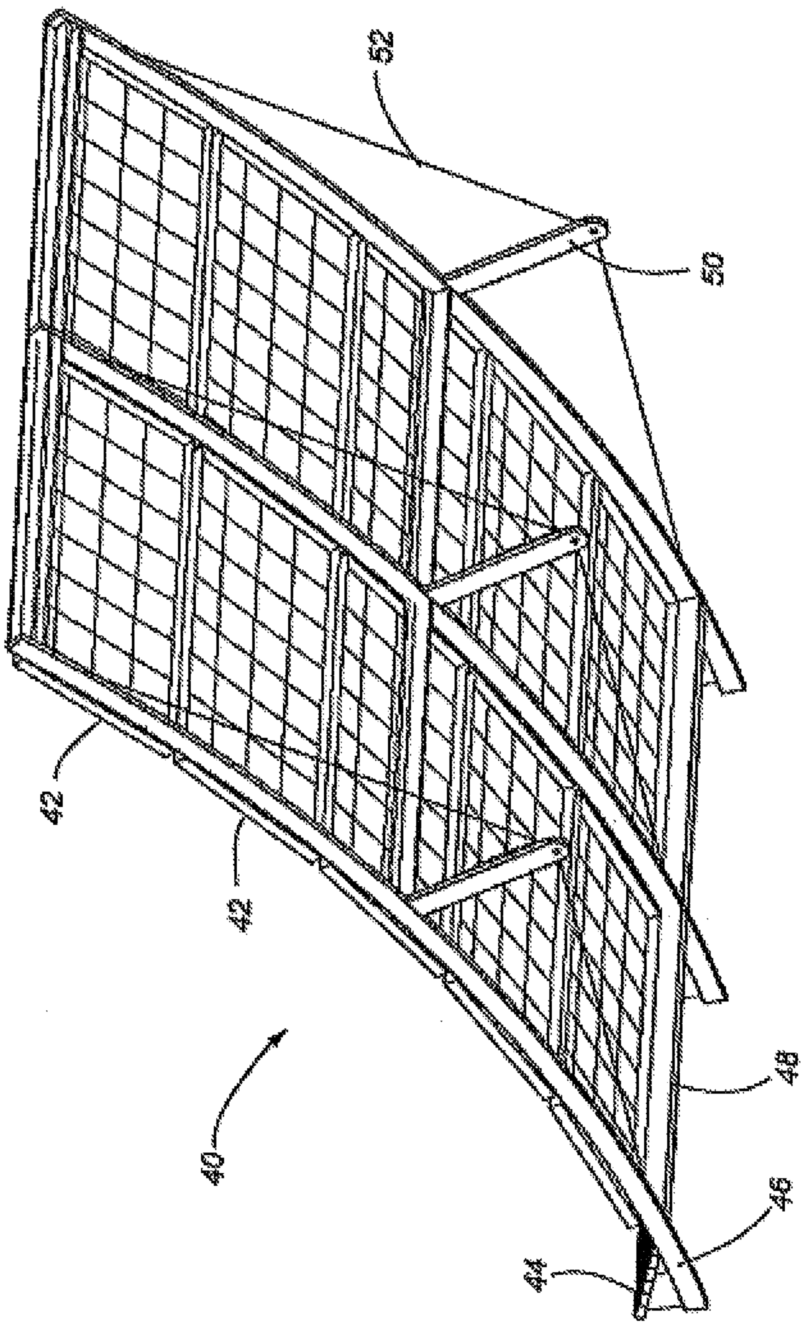
FIG. 6 is a rear perspective view of an illustrative pod showing the use of several struts and cords to create a rigid member.
Figure 7:
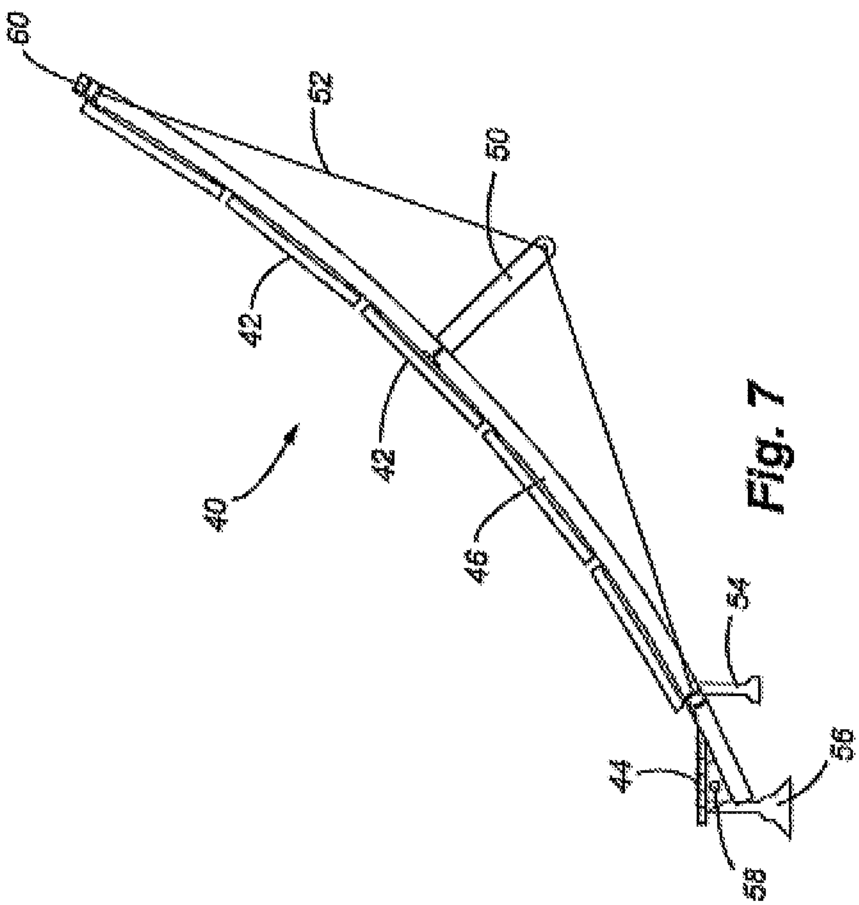
FIG. 7 is a section view of an illustrative pod including several optional features.

FIGS. 6 and 7 illustrate a pod that may be used as a solar panel receiver. The "pods" illustrated herein are intended to provide an example of a solar panel receiver that may be used with the present invention. The solar panel receiver may, of course, have a variety of other structures to perform its function of holding one or more solar panels while being adapted to couple to support cables as illustrated herein.

FIG. 6 is a rear perspective view of an illustrative pod showing the use of several struts and cords to create a rigid member. The pod 40 is shown with several solar panels 42 which may be, for example, photovoltaic panels. A maintenance walkway 44 is included as an optional feature of the pod 40. Several curved struts 46 extend vertically along the back of the pod 40, with several horizontal struts 48 coupled by moment connections to the curved struts 46. By using moment connections, the overall structure becomes a rigid yet lightweight frame for receiving the solar panels 42. A center strut 50 extends out of the back of the pod 40, and is connected to a truss cable 52 which provides another lightweight yet highly supportive aspect of the structure. The center strut 50 and truss cable 52 allow a lightweight curved strut 46 to be used, lending support to the center of the curved strut 46.

In another embodiment, rather than creating electricity with photovoltaic panels, the present invention may also be used to support solar panels that collect solar thermal energy. The solar thermal collectors could be mounted on the solar panel receivers illustrated herein, and thermal energy could be collected by the use of a heat transfer medium pumped through flexible tubing. In one such embodiment, glycol may be used as a mobile heat transfer medium, though any suitable material may be used.

FIG. 7 is a section view of an illustrative pod including several optional features. The pod 40 is shown with solar panels 42 in place. The optional maintenance walkway 44 is again shown on the lower portion of the curved member 46. The center strut 50 and truss cable 52 again provide support to the curved member 46. The pod 40 may include, for example, a mister 54 that can be used to provide evaporative cooling to the sheltered area beneath a solar array using the pod 40. The pod 40 may also include a light 56 or security camera, for example. In one embodiment, a solar array may be used to provide a parking shelter, with the solar array storing electricity during the day using, for example, fuel cells or batteries, and then discharging the stored electricity by lighting the shelter during the evening.

Two cable receivers 58 and 60 are also illustrated. While shown in the form of a simple opening that a cable may pass through, the cable receivers 58 and 60 may take on a number of other forms. For example, the cable receivers 58 and 60 may include a mechanism for releasably locking onto a cable. It can be appreciated from FIGS. 6 and 7 that the illustrative pod 40 is designed so that rain is readily directed off of the solar panels, as the water will run down the curve of the pod 40. In other embodiments, the pod 40 may be more or less flat, rather than having the curvature shown, or may have a different curvature than that shown.

Figure 8:
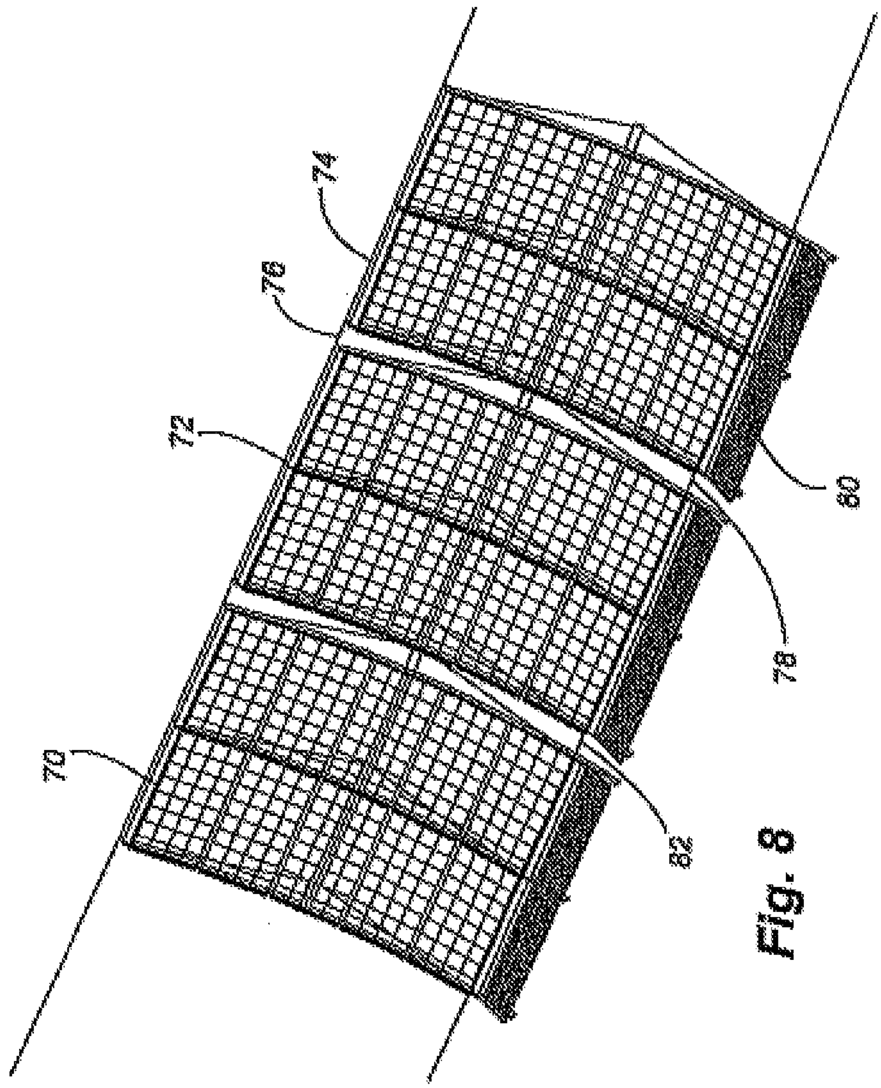
FIG. 8 is a front perspective view of several solar panel receivers linked together.

FIG. 8 is a perspective front view of several solar panel receivers linked together. A first solar panel receiver 70, a second solar panel receiver 72, and a third solar panel receiver 74 are supported by a main upper support cable 76 and a main lower support cable 78. An optional maintenance walkway 80 is illustrated as well. Also included is a flexible electric cable 82 that allows for transmission of electrical power from each of the solar panel receivers 70, 72 and 74 when solar energy is captured. The flexible electric cable 82 may also serve to distribute power to devices such as security cameras or lighting that may be provided beneath the solar panel receivers 70, 72 and 74.

Figure 9:
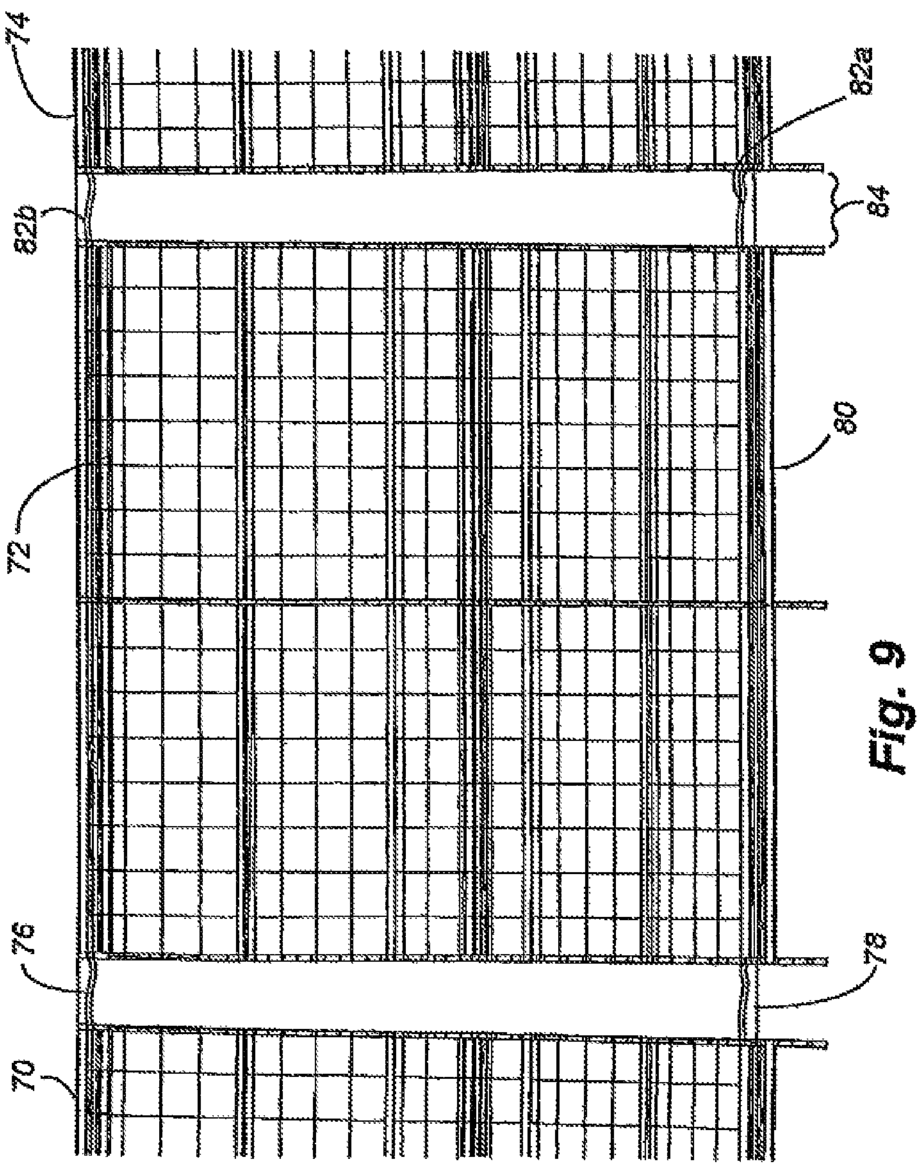
FIG. 9 is a front elevation view of several solar panel receivers linked together.

FIG. 9 is a front elevation view of several solar panel receivers linked together. Again, the solar panel receivers 70, 72 and 74 are shown supported by an upper support cable 76 and a lower support cable 78, and include an optional maintenance walkway 80. Two flexible electric cables 82*a* and 82*b* are illustrated in FIG. 9, and may serve the same purposes as that noted above with respect to FIG. 8. It is clearly shown in FIG. 9 that there is a gap 84 between the solar panel receivers 70, 72 and 74. The gap 84 allows the solar panel receivers 70, 72 and 74 to move independently, rendering the overall array less rigid and more likely to withstand high winds. The gap 84 also prevents neighboring solar panel receivers (i.e. 70 and 72 or 72 and 74) from damaging one another in windy conditions.

Depending on the desired output of the array, the flexible electric cables 82*a* and 82*b* may be coupled to a substation for gathering produced power and providing an output. For example, the electricity gathered is inherently direct current power; an array as illustrated herein may be easily used to charge batteries or fuel cells. The power may also be used with an electrolyzer to produce hydrogen and oxygen, with the hydrogen available for use as a fuel.

Figure 10:
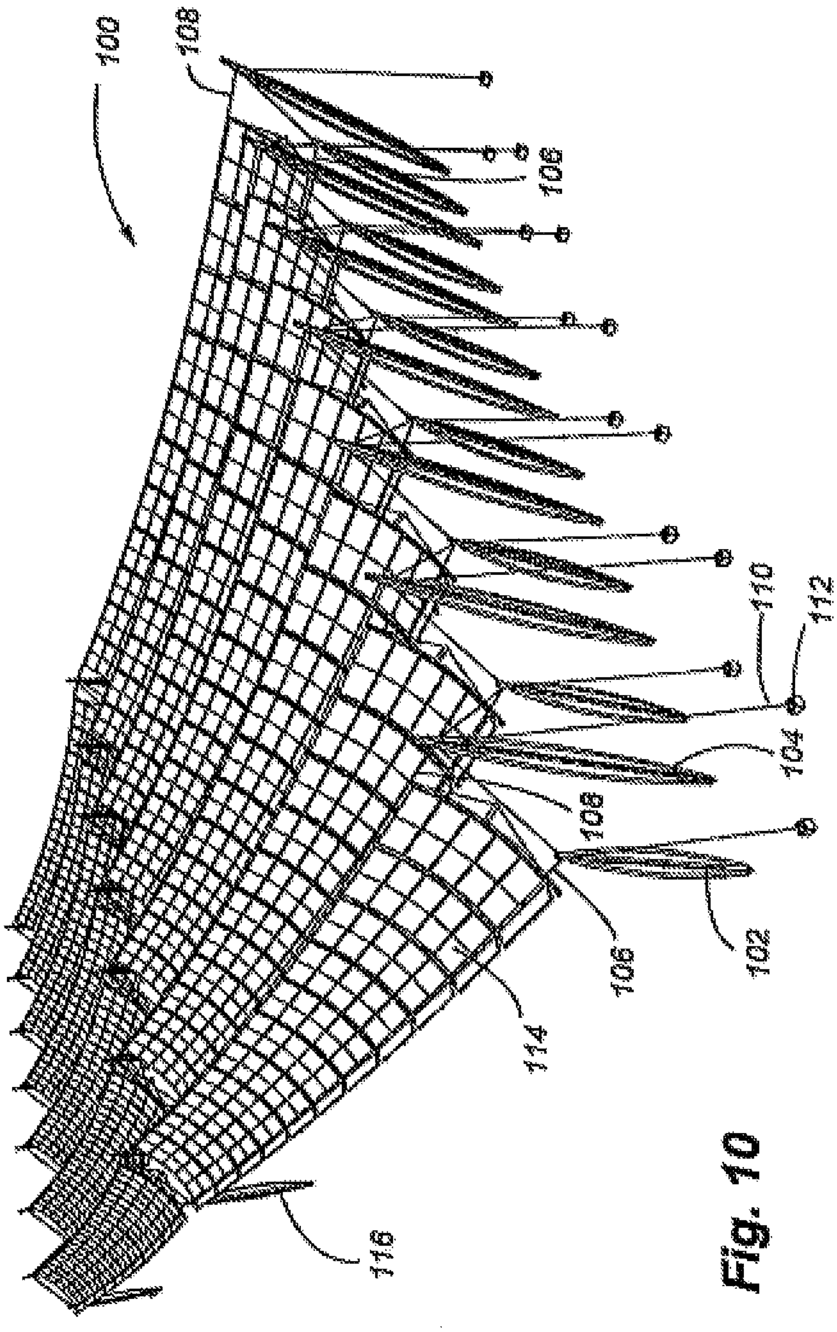
FIG. 10 is a front and side perspective view of an illustrative solar panel array including a center support member.

FIG. 10 is a perspective front and side view of an illustrative solar panel array including a center support member. The illustrative array 100 includes a number of alternating short columns 102 and tall columns 104, with main lower and upper support cables 106 and 108 suspended from the columns 102 and 104. Anchor lines 110 and anchors 112 provide additional support, and the array 100 supports a number of solar panel receivers 114. The further addition in FIG. 10 is the inclusion of a center support 116, which allows for a longer span to be covered between the columns 102 and 104, reducing the need to place additional anchors 112. Further, because the center support 116 does not have to provide stability against lateral movement, and only needs to provide vertical support, the center support 116 may be of an even lighter weight construction than the outer columns 102 and 104.

Figure 11:
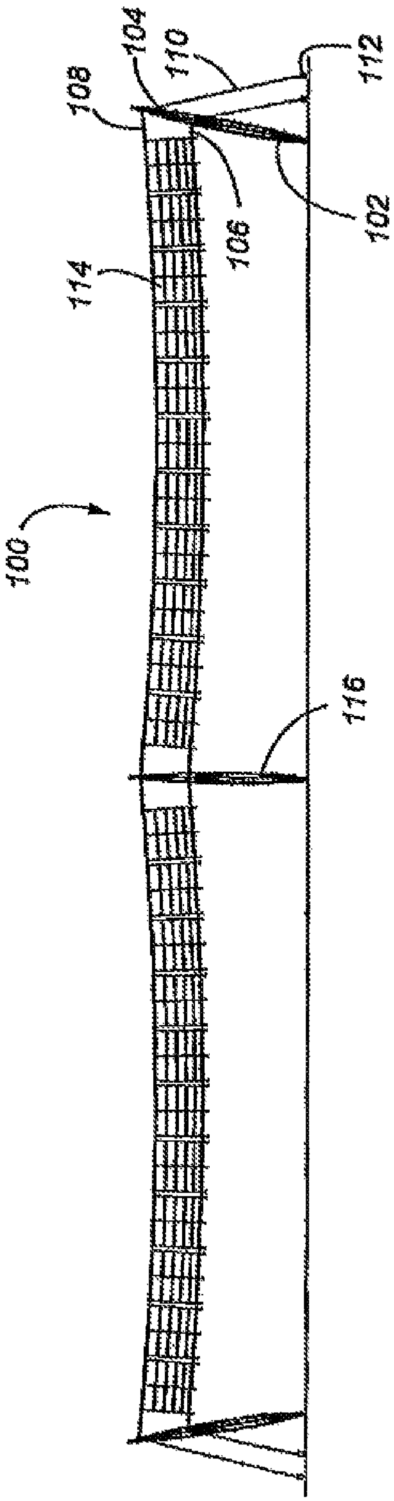
FIG. 11 is a section view showing an illustrative solar panel array including a center support member.

FIG. 11 is a section view showing an illustrative solar panel array including a center support member. Again, the array 100 is supported by the use of a short column 102, a tall column 104, a lower support cable 106 and an upper support cable 108. The array 100 is stabilized in part by the use of anchor lines 110 and anchors 112, and a number of solar panel receivers 114 are supported. The center column 116 provides a central support, but is not required to add to the lateral stability of the array 100, because there are portions of the array pulling equally on both sides of the center column 116.

Figure 12:
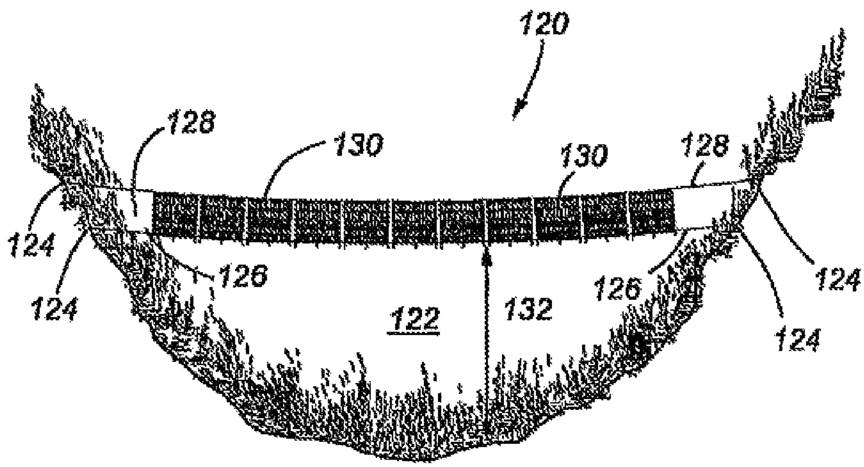
FIG. 12 is a front elevation view of an illustrative solar panel array suspended across a valley.

FIG. 12 is a front elevation view of an illustrative solar panel array suspended across a valley. An array 120 is suspended across a valley 122 by the use of four anchors 124 that enable two main support cables 126 and 128 to be suspended across the valley 122. A number of solar panel receivers 130 are supported by the support cables 126 and 128. By suspending the array 120 across the valley 122, a desired height 132 above the valley floor can be achieved by the array. The height 132 may be sufficient to allow wildlife to pass below.

A number of potential environmental benefits from this type of structure can be identified, including that the structure provides a quiet and safe energy production array, the structure provides shade and/or shelter, and the structure can be installed without requiring a large amount of heavy machinery. The use of an array over eroding ground may encourage foliage growth in highly exposed locations and thus slow erosion.

Figure 13:
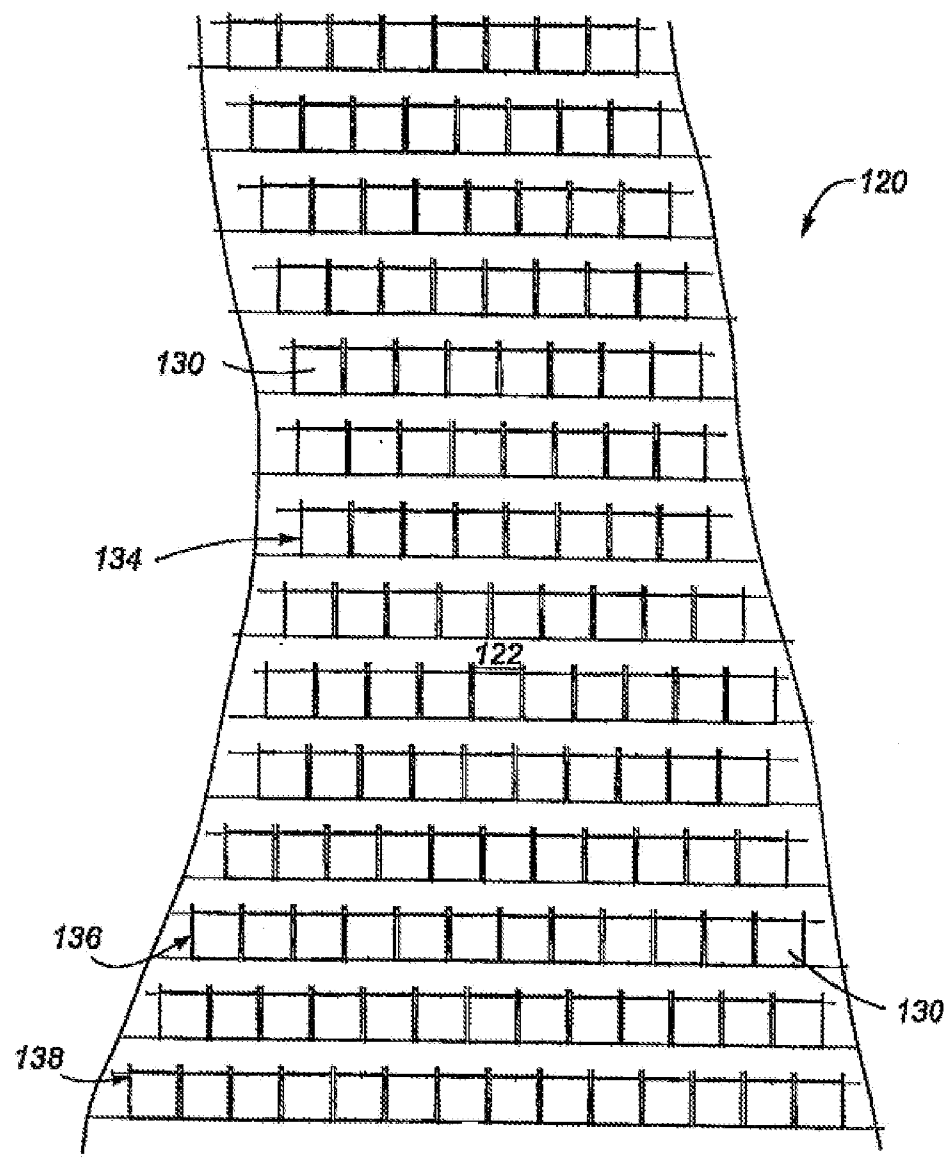
FIG. 13 is an overhead plan view of an illustrative solar panel array suspended across a valley.

FIG. 13 is an overhead plan view of an illustrative solar panel array suspended across a valley. It can be seen that the array 120 is designed to match the shape of the valley 122. In particular, the array 120 includes a number of individual lines of solar panel receivers 130. By varying the number of solar panel receivers 130 suspended by each pair of support cables, a relatively short line 134 can match a relatively narrow place in the valley 122, while longer lines 136 and 138 span a wider portion of the valley 122.

Figure 14:
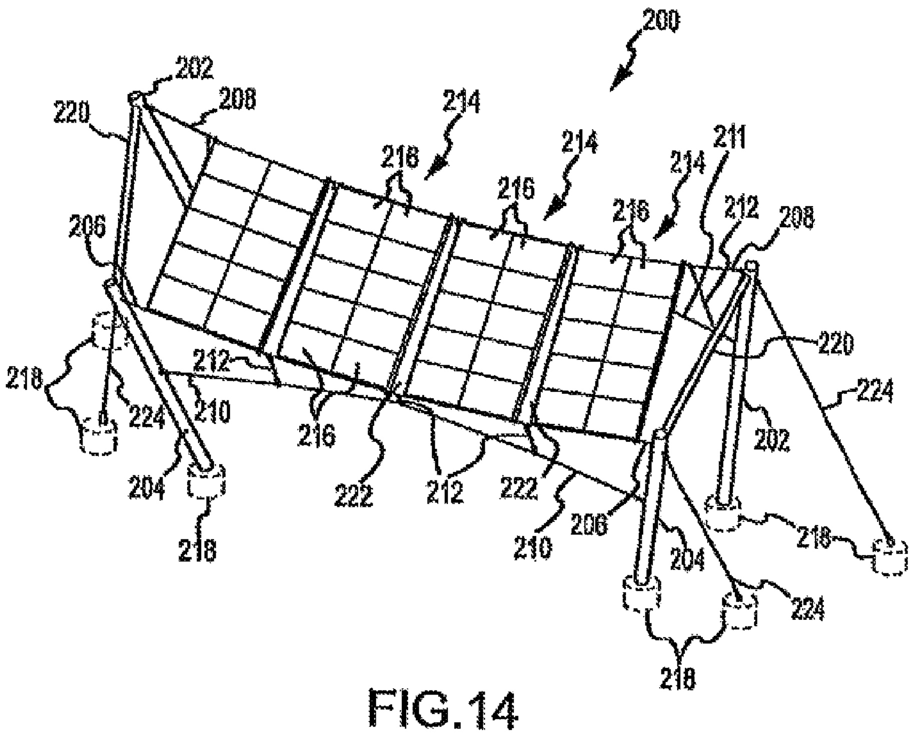
FIG. 14 is a perspective view of a solar panel array in accordance with another embodiment of the present invention.
Figure 15:
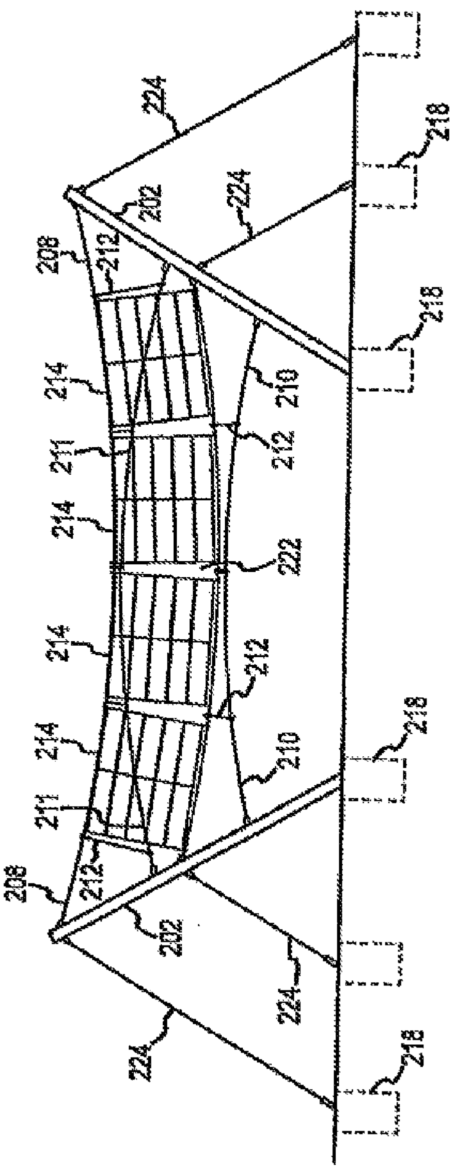
FIG. 15 is a rear elevation view of the solar panel array illustrated in FIG. 14.
Figure 16:
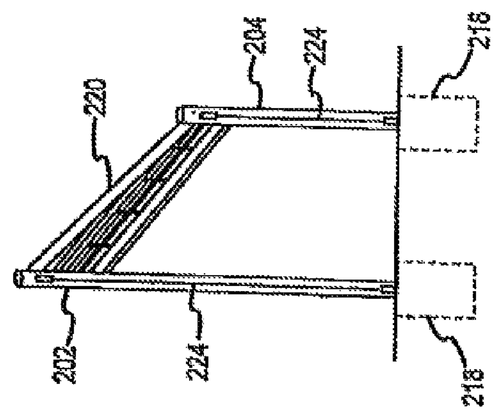
FIG. 16 is a side view of the solar panel array of FIG. 14.

FIGS. 14-16 illustrate yet another preferred embodiment of the present invention, in the form of a solar panel array 200 comprising a plurality of receivers or pods 214 supported by another arrangement of cables and columns. More specifically, FIGS. 14 and 15 illustrate a plurality of spaced pods 214 each containing a number of solar panels 216, a first main lower cable 206 supporting one end of the pods, and a second main upper cable 208 supporting an opposite end of the pods. First cable 206 is strung between short columns 204, while second cable 208 is strung between tall columns 202. A pair of complementary support cables is also provided to further support the pods 214, namely, a front complementary support cable 210 and a rear complementary support cable 211. Cables 210 and 211 are particularly useful in resisting upward forces generated by wind loads. A number of vertically oriented connecting cables 212 interconnect the complementary support cables 210 and 211 to their corresponding first and second cables 206 and 208. The embodiment of FIGS. 14-16 also includes cross-supports 220 that extend between the columns 202 and 204. Members 202, 204, and 220 may be metallic and made of material such as steel or aluminum; and these members may be configured as I-beams, channels, tubular members, and others. The gaps 222 provided between the pods 214 allow wind to pass between the pods and therefore prevent damage to the system during high wind conditions. Anchor lines 224 extend from each of the columns to respective anchors 218. It shall be understood that additional anchor lines 224 can be added to provide the necessary support to the columns. FIG. 15 is a rear elevation of the embodiment of FIG. 14, better illustrating the complementary support cables 210 and 211.

The side view of FIG. 16 also illustrates that the anchor lines 224 may be placed in-line with the columns to minimize the side profile of the system. FIGS. 14-16 also show a number of other geometrical features defining the construction and overall appearance of the system. For example, the complementary support cables 210 and 211 are coplanar with their corresponding first/second cables 206 and 208. The panel receivers or pods 214 have a first end residing at a first height, and a second end residing at a second lower height. The panel receivers or pods 214 are substantially rectangular shaped and evenly spaced from one another along the first and second cables 206 and 208. The first cable 206 defines a first curvature, and the second cable 208 defines a second curvature extending substantially parallel to the first curvature. The complementary support cables 210 and 211 have a generally opposite curvature as compared to the first and second cables 206 and 208, and the complementary support cables 210 and 211 also extend substantially parallel to one another. The gaps 222 between each panel 216 may be substantially triangular shaped such that the portions of the gaps located adjacent to the second cable 208 are smaller than the portions of the gaps located adjacent to the first cable 206. As also shown in FIGS. 15 and 16, the columns 202 and 204 extend at an angle from the mounting surface such that the upper ends of the columns 202 and 204 are further apart from one another as compared to the lower ends of the columns 202 and 204. Angling the columns towards the outside of the structure in this manner increases the structure's efficiency to resist horizontal forces such as wind or seismic loads; and thus enables a reduction in the required size of the anchor lines 224 and anchors 218.

Depending upon the location where the solar panel array is to be installed, it may be necessary to adjust the location of the columns in order to take advantage of available ground spaced and to maximize the area to be covered by the solar panel array. For example, if the solar panel array is used to cover a parking lot, it may be necessary to adjust the location of the columns based upon available spaced in the parking lot, in order to maximize the overall area covered by the solar panels by the non-vertical columns. Thus, in the embodiment of FIGS. 14-16, non-vertical columns allow the group of pods to extend over a greater overall area as opposed to use of vertical columns anchored at the same column locations. Additionally, there may also be some aesthetic benefits achieved in arranging the columns in various combinations of both vertical and angular extensions from the mounting surface.

Figure 17:
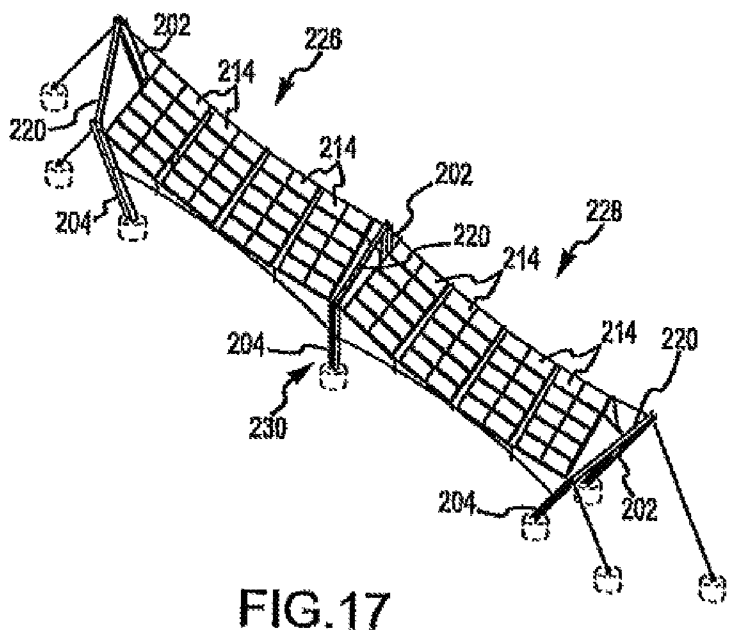
FIG. 17 is a perspective view of a solar panel array in yet another embodiment of the present invention.
Figure 18:
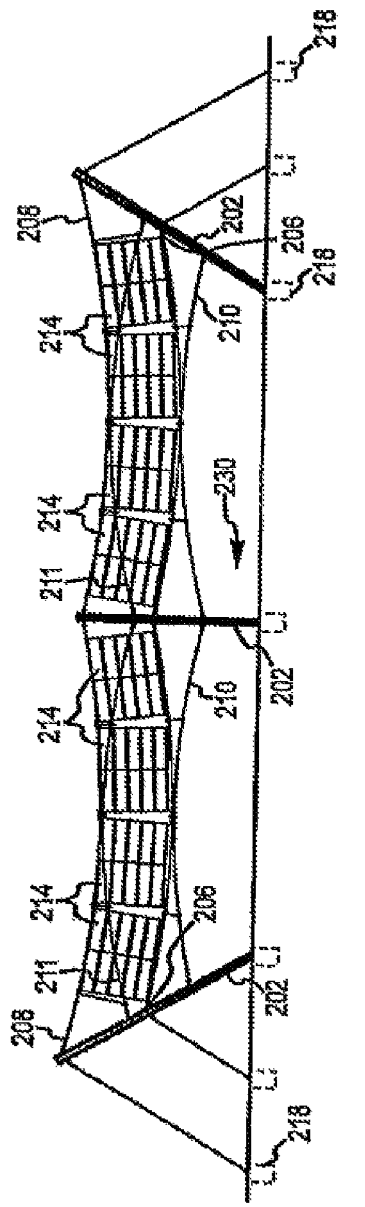
FIG. 18 is a rear elevation view of the embodiment of FIG. 17.

FIG. 17 illustrates yet another embodiment of the present invention. In this embodiment, an intermediate support 230 is provided that extends vertically from the ground, while the outside or exterior columns extend at an angle, like those illustrated in FIG. 15. In this embodiment, the receivers or pods 214 can also be defined as corresponding to a first group 226 and a second group 228. In the first group 226, the pods 214 extend between one of the exterior column pairs and the intermediate support 230, while the second group 228 of pods extends between the opposite exterior column pair and the intermediate support 230. FIG. 18 is a rear elevation view of the embodiment of FIG. 17, further disclosing particular details of this embodiment to include the complementary support cables 210 and 211.

Figure 19:
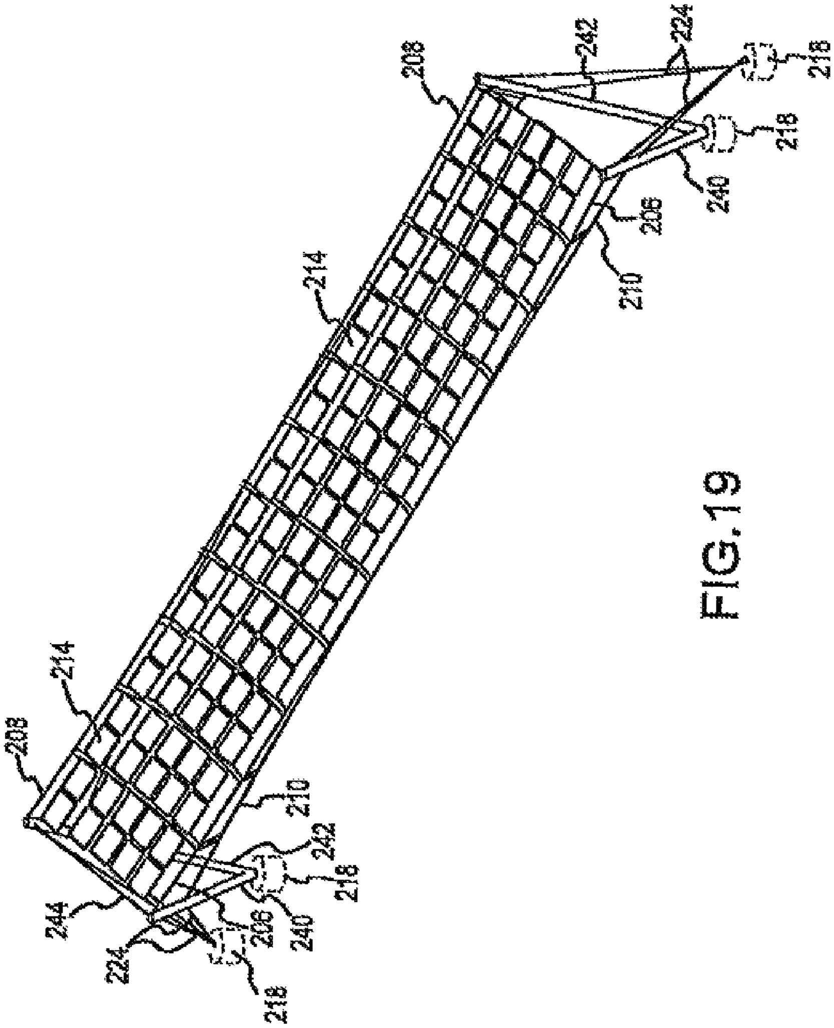
FIG. 19 is a perspective view of yet another solar panel array embodiment in accordance with the present invention.

FIG. 19 illustrates yet another preferred embodiment of the present invention. In this embodiment, in lieu of single columns that are secured to the mounting surface, the columns 240 and 242 are arranged in a V-shaped configuration. The lower ends of the columns 240 and 242 are anchored at the same location while the upper ends of the columns 240 and 242 diverge from one another. As with each of the previous embodiments, the V-configured columns 240 and 242 may be made of tubular members or other types of metallic members. As also shown, the anchor lines 224 for each pair of the V-configured columns may be oriented so that there is a single anchor point 218 from which the anchor lines extend. The V-shaped columns minimize the number of anchors 218 required for the array structure.

Figure 20:
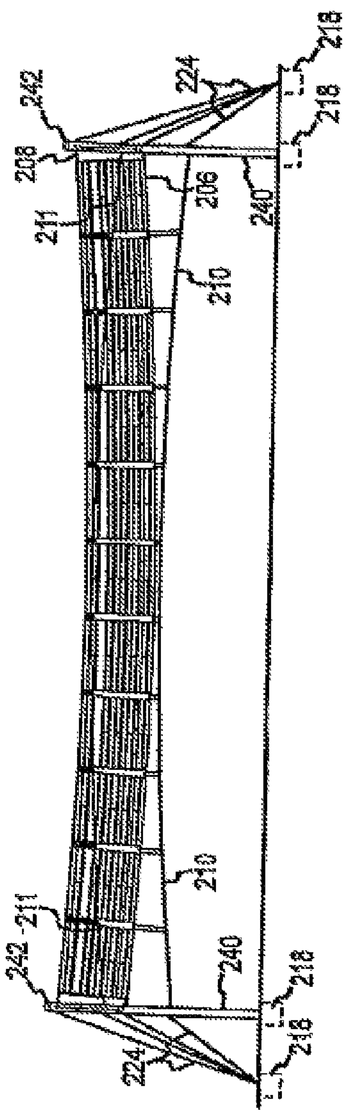
FIG. 20 is a rear elevation view of the embodiment of FIG. 19.
Figure 21:
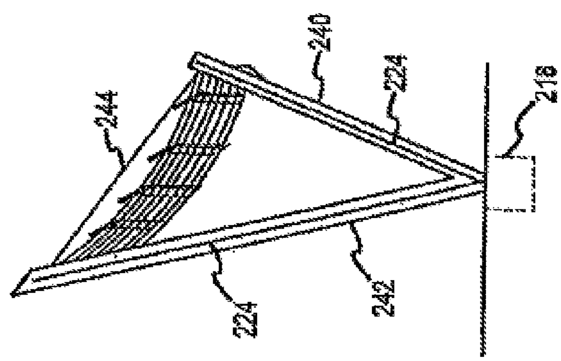
FIG. 21 is an enlarged side view of the embodiment of FIG. 19.

Referring to FIG. 20, a rear elevation view is provided of the embodiment of FIG. 19. This Figure also shows the manner in which the various anchor lines 224 for each column pair terminate at a common anchor point 218. FIG. 21 illustrates the manner in which the anchor lines 224 may extend in a V-shaped configuration to match the columns 240 and 242 and thus minimize the side profile of the system. Additionally, in this embodiment a stabilizing cable 244 may be provided that extends between the upper ends of the column pairs.

Figure 22:
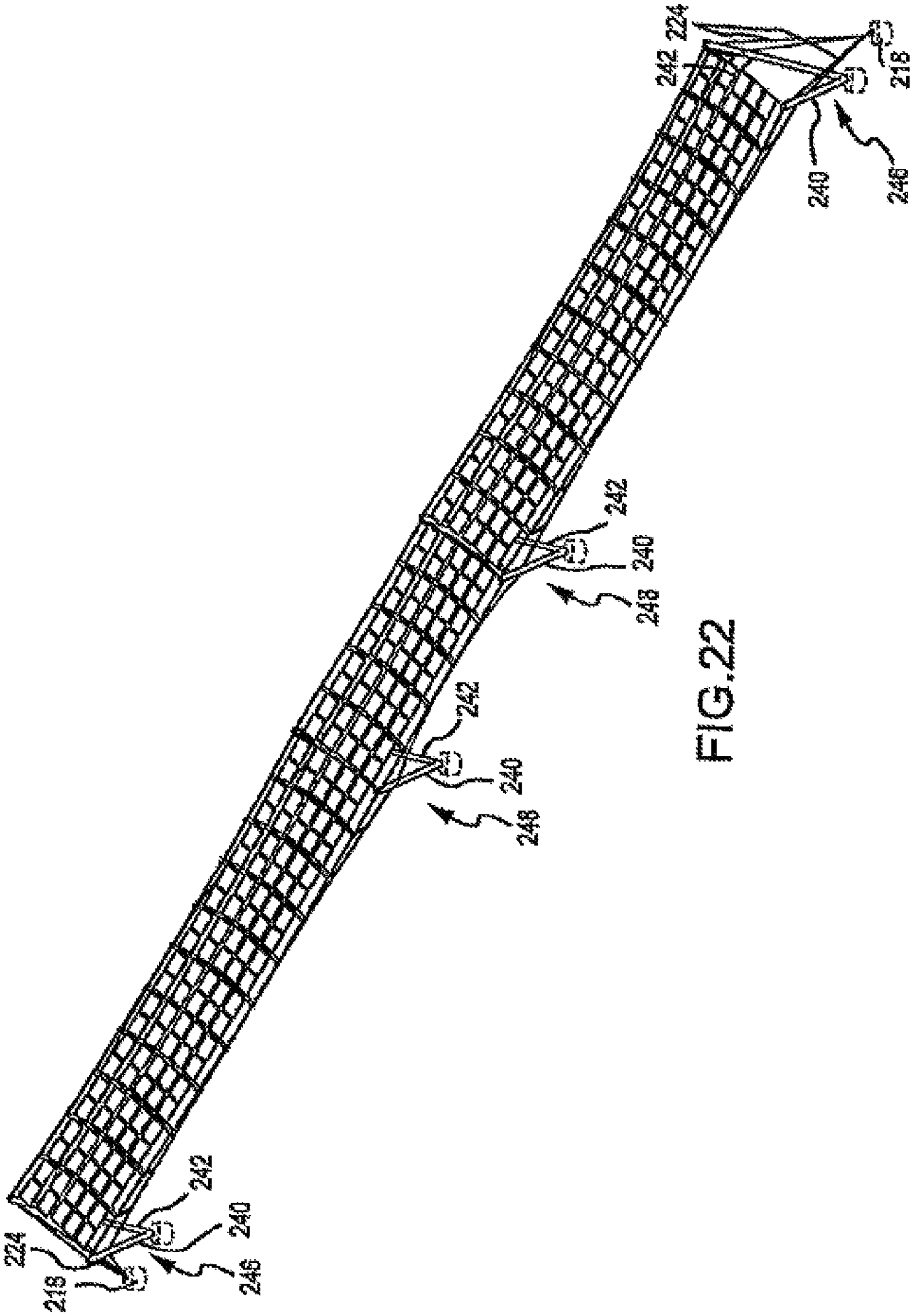
FIG. 22 illustrates yet another solar panel array embodiment in accordance with the present invention.

FIG. 22 illustrates yet another preferred embodiment of the present invention, wherein the V-shaped column supports 240 and 242 are utilized in an extended row of pods 214. More specifically, a pair of outside or end columns 246 is provided along with a pair of intermediate columns 248. Based upon the required length of the solar panel array, the necessary combination of intermediate column supports can be provided for adequate structural support.

Figure 23:
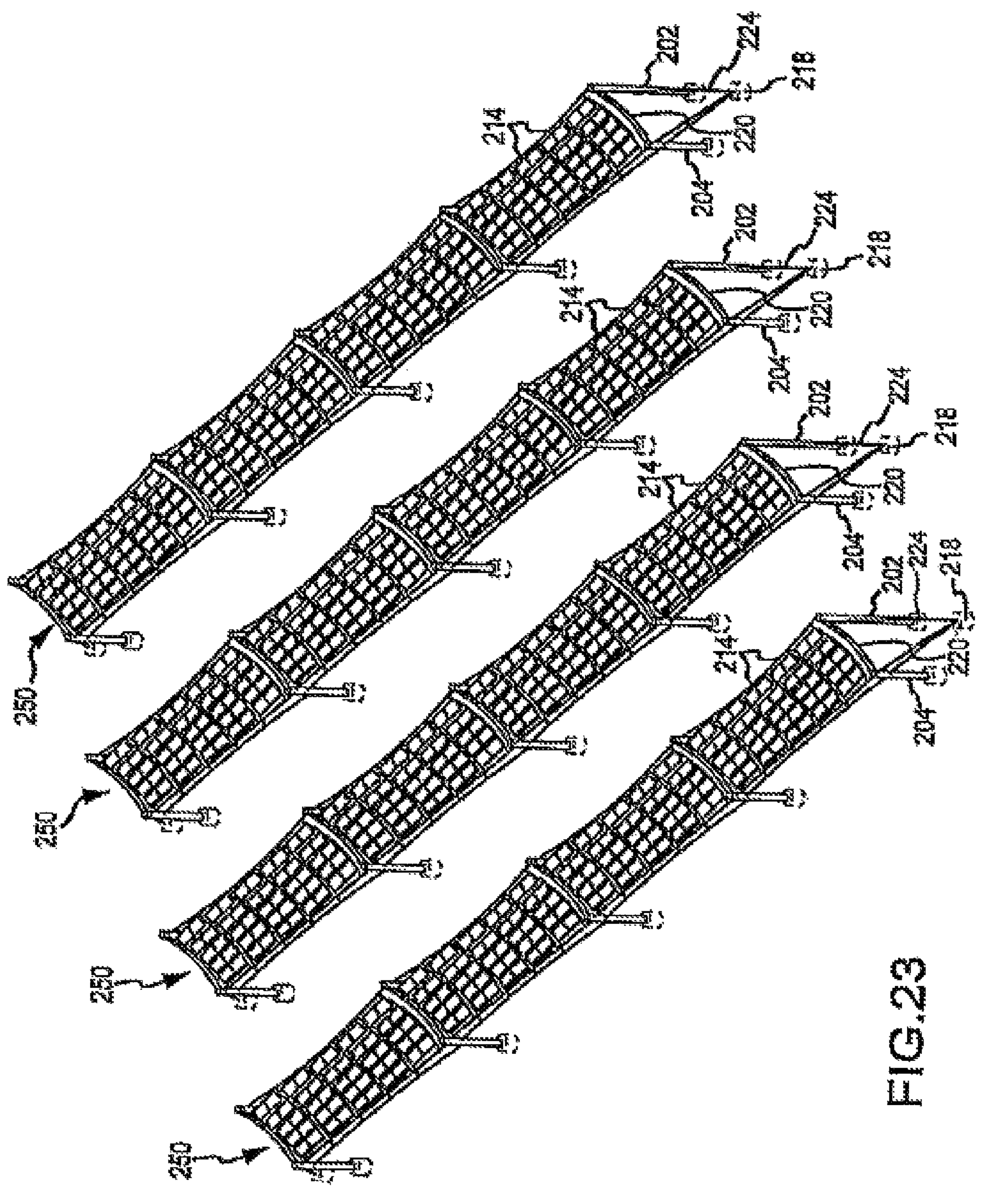
FIG. 23 is a perspective view of a plurality of rows of solar panel arrays.

Referring to FIG. 23, yet another embodiment of the present invention is illustrated comprising a plurality of rows 250 of solar panel arrays and wherein the column supports 202 and 204 extend substantially vertically from the mounting surface. In this embodiment, it is noted that the anchor lines 224 for each column pair extend to a common anchor point 218. The rows 250 may be selectively spaced from one another to provide the optimal area coverage for the solar panel arrays, as well as optimal shade in the event the arrays are used to cover a structure such as a parking lot. Thus, it shall be understood that the rows 250 may be either spaced more closely to one another, or farther apart depending upon the particular purpose of installation.

Figure 24:
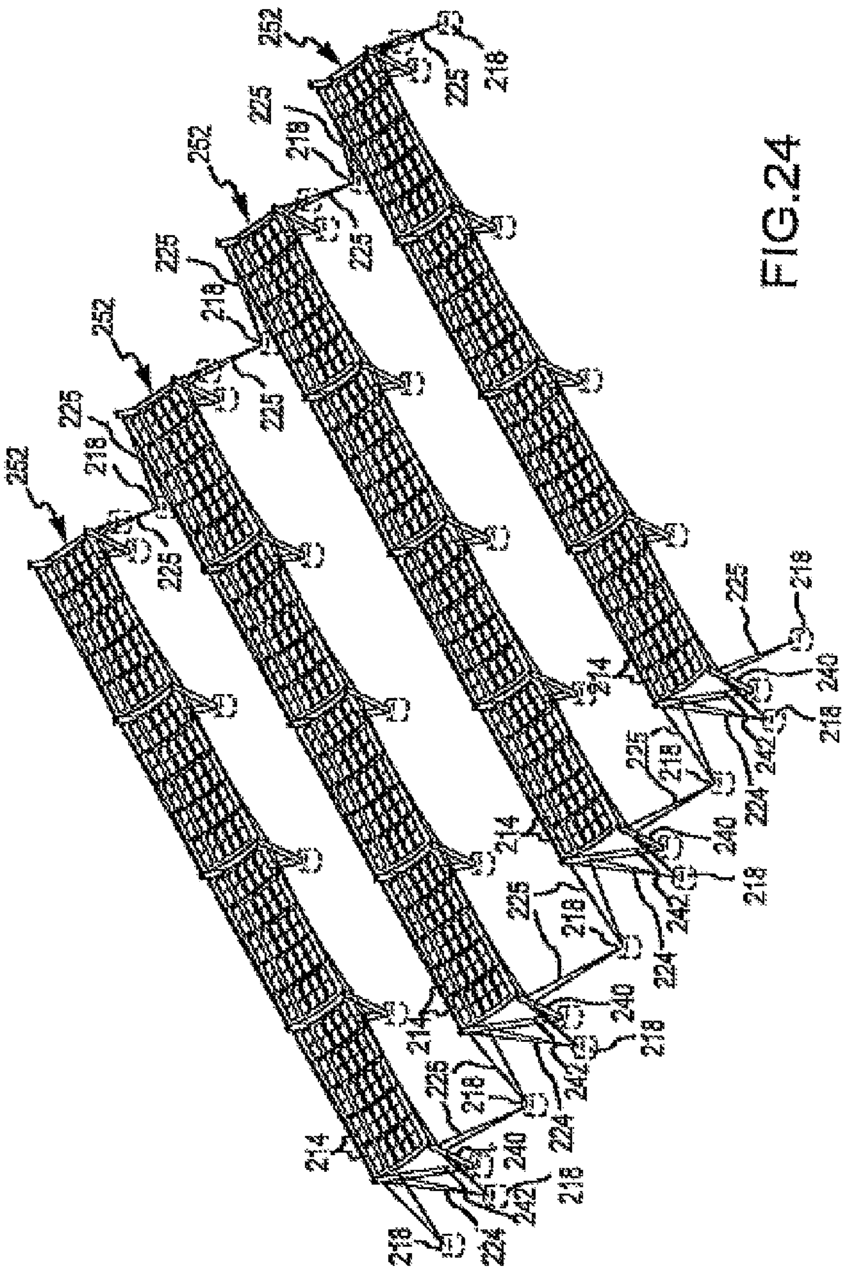
FIG. 24 is another perspective view of a plurality of rows of solar panel arrays.

FIG. 24 illustrates yet another preferred embodiment of the present invention, showing a plurality of rows 252 of solar panel arrays wherein the V-column configuration is used with column supports 240 and 242. As with the embodiment shown in FIG. 23, the rows 252 may be either spaced more closely to one another, or farther apart depending upon the particular purpose of installation. FIG. 24 also illustrates some additional anchor lines 225 that are used to further stabilize the rows 252 of solar panel arrays. These anchor lines 225 are particularly advantageous in handling laterally directed forces, such as wind.

With each of the embodiments of the present invention, it shall be understood that the particular height at which the solar panels are located can be selectively adjusted for the particular purpose of installation.

Figure 25:
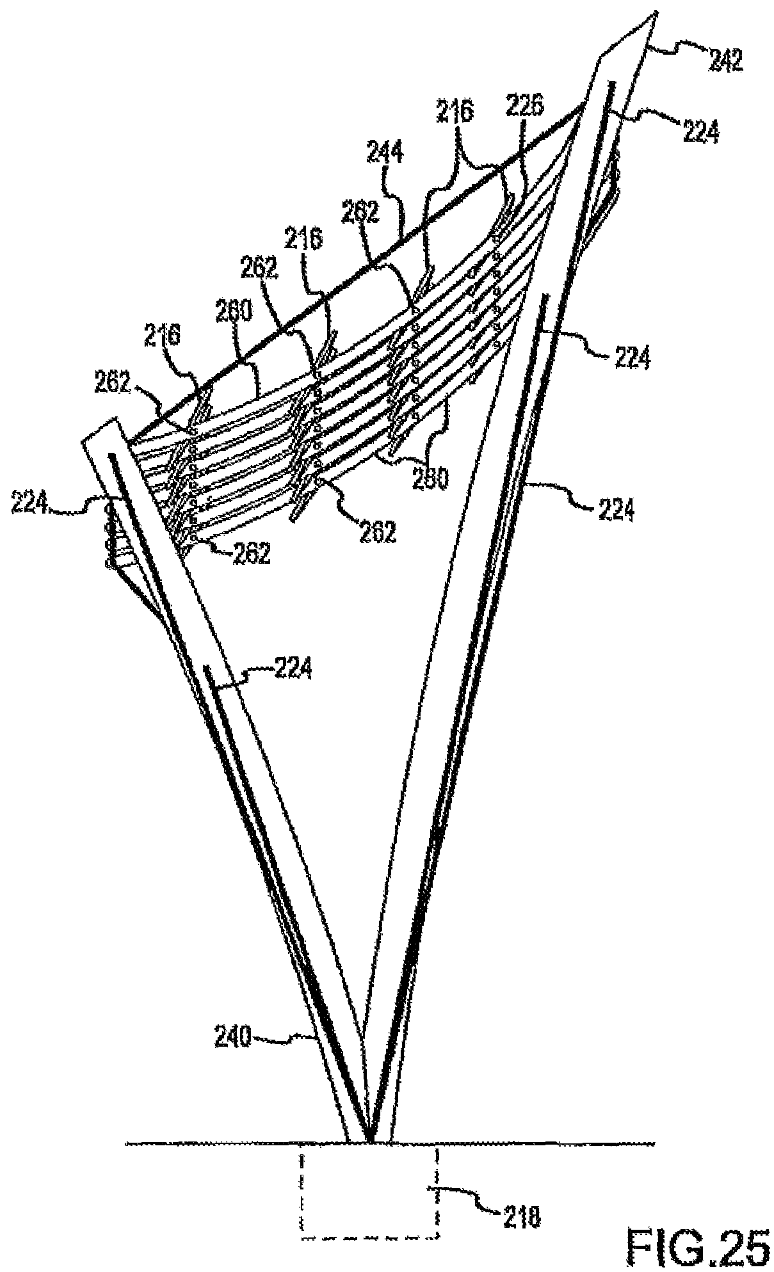
FIG. 25 is a side view of a solar panel array in yet another embodiment of the present invention.

FIG. 25 illustrates yet another preferred embodiment of the present invention, wherein each of the solar panels 216 may be rotatably mounted to their corresponding supporting pod or receiver. As shown, the embodiment of FIG. 25 incorporates curved struts 260 and pivot mounts 262 that enable each of the solar panels 216 to be disposed at a desired angle with respect to the sun. The pivot mounts 262 can take a number of forms. For example, a pivot mount 262 could include a continuous member such as a steel rod or square tubular member that extends horizontally across the corresponding receiver or pod and which is secured to an overlying solar panel 216. The rod is then rotatably mounted within the receiver or pod such that the solar panels 216 can be grasped and rotated to the desired inclination with respect to an optimal sun-capturing orientation. This configuration of mounting the solar panels on a round or square tube provides additional strength and rigidity to the pod structures, and reduces torsional and inplane forces exerted on the solar panels from wind loads that cause the pods to move in the wind.

Figure 26:
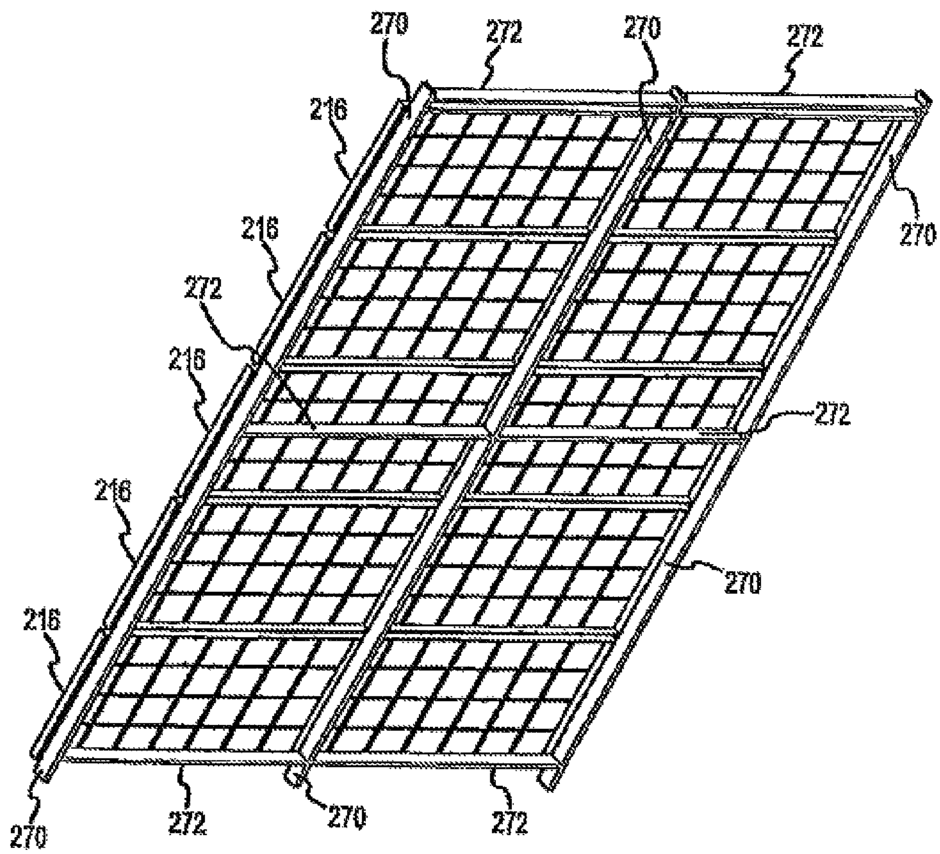
FIG. 26 is an enlarged perspective view of another illustrative pod used to support a plurality of solar panels in the present invention

FIG. 26 illustrates a receiver or pod 214 that may incorporate a group of linear or straight struts. As shown, a plurality of first struts 270, and a plurality of second orthogonally oriented struts 272 are provided to support the solar panels 216 mounted to the pod. The receiver or pod shown in FIG. 26 supports a group of ten solar panels 216 arranged in a 2 by 5 matrix. A width of the pod may be defined as the distance between the most outer or exterior first struts 270, and a height of the pod may be defined as the distance between the most outer or exterior second struts 272. The height of the pod can be increased by extending the length of the first struts 270 but not requiring the cables 206 and 208 to be secured at the opposite ends of the pod which would require the cables 206 and 208 to be spread further apart and therefore widening the overall size of the array. For this extended pod length, the cables 206 remain attached at their normal spacing and the extended ends of the struts 270 simply extend beyond the cables in a cantilevered arrangement. In this alternate pod construction, additional solar panels can be added to increase the power producing capability of the array without adjusting other design parameters. The spacing of the pods when mounted to the cables depends on a number of factors to such as the weight of the pods and panels, wind conditions, snow loading conditions and others. In one aspect of the invention, spacing the pods with gaps between the pods that does not exceed the widths of the pods is acceptable for some installations.

For the illustrative pod shown in FIG. 26, cable receivers 58 and 60 (such as shown in FIG. 7) may be incorporated thereon to allow the pod attach to the cables 206 and 208. As previously mentioned, while the cable receivers may be simply openings formed in the ends of the pods, the cable receivers may take another form such as a mechanism which selectively locks the pod onto the cable and therefore allows a pod to be removed for maintenance or replacement. Accordingly, it shall be understood that the pods can be removed from the cables as necessary to either generate another different combination of pod arrangements or to selectively replace/repair defective solar panels.

Figure 27:
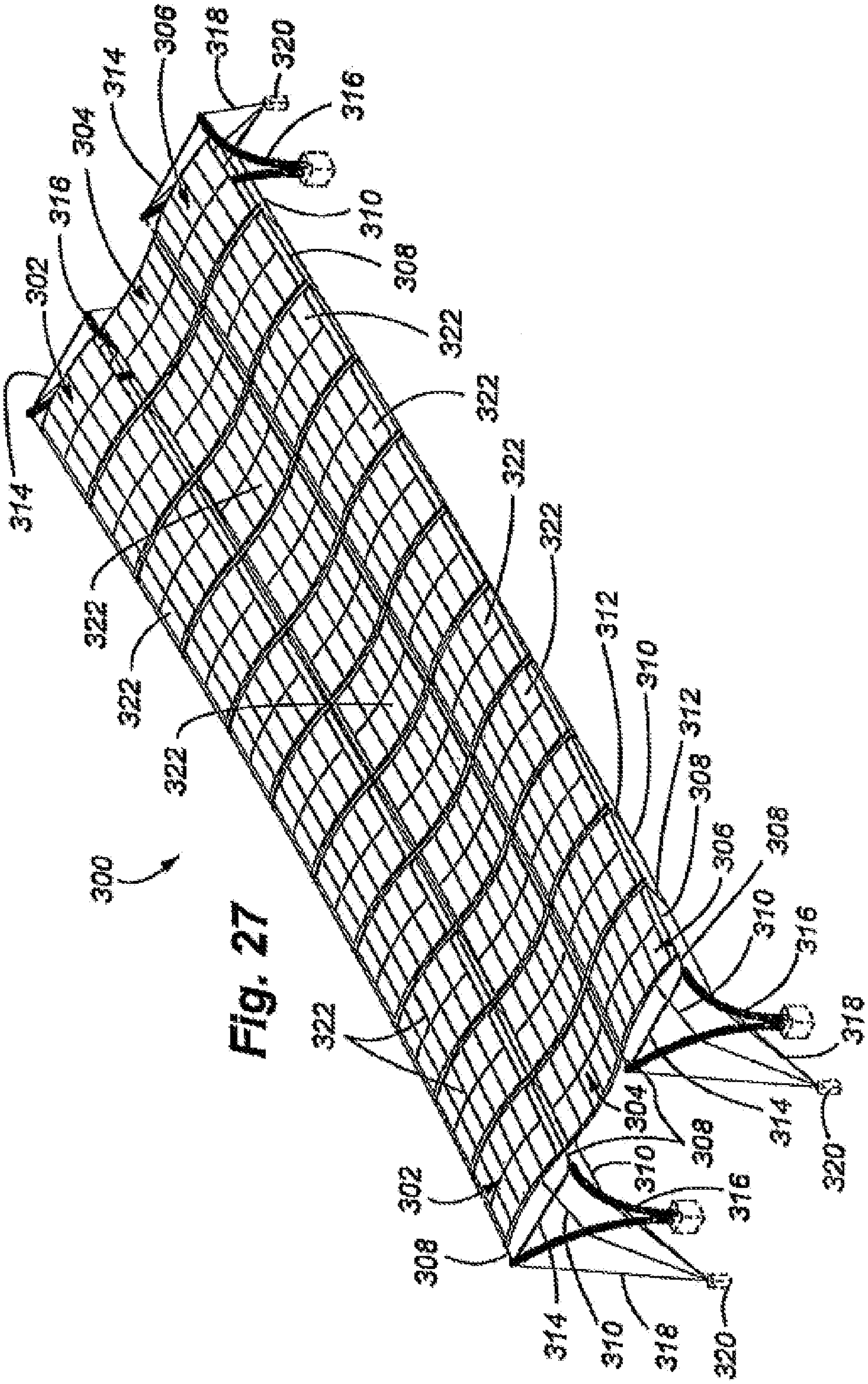
FIG. 27 is a perspective view of another embodiment of the present invention showing three rows of panel receivers/pods with both convex and concave curvatures when viewed from above.
Figure 28:
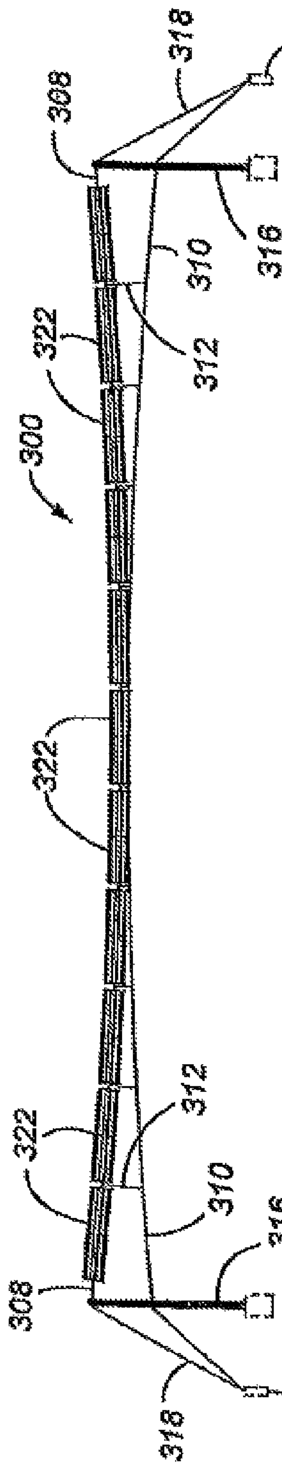
FIG. 28 is an elevation view of the embodiment of FIG. 27.

FIG. 27 illustrates another embodiment of the present invention shown as solar array 300 comprising three rows, or linear extending groups of panel receivers/pods, 302, 304, and 306. Exterior rows 302 and 306 are of the same construction, and are supported at their ends by corresponding columns 316. Thus, the columns 316 are located at the corners of the rectangular shaped solar array. In this embodiment, the columns 316 are v-shaped with their lower ends received in a common anchor/footer, and their upper ends diverging away from one another and being curved as shown. The cables used to support the pods 322 in this embodiment are similar to what is illustrated in the embodiment of FIG. 14; however, in the embodiment of FIG. 27, the pods 322 are oriented so as to extend more parallel with respect to the surface of the ground as explained in more detail below with reference to FIGS. 32 and 33. Row 304 is suspended between rows 302 and 306, and there are no end supporting columns that directly support row 304; rather, row 304 is supported only by the upper main cables 308 extending on opposite lateral sides of row 304, and which also support the respective lateral sides of the adjacent rows 302 and 306. As shown in FIG. 28, complementary lower main cables 310 are disposed below the upper cables 308, and have an opposite curvature as compared to cable 308. Vertically oriented interconnecting cables 312 connect upper cables 308 and lower cables 310. An upper cable 308, a lower cable 310, and cables 312 that interconnect the upper and lower cables can be collectively referred to as a truss. In the example of FIG. 28, the truss members are each in tension and thus the truss can be further defined as a tensioning truss or tension truss. A cross-support cable or bar 314 (shown in FIG. 32) is provided between the upper diverging ends of the column members 316. A plurality of anchor cables 318 interconnects the columns 316 and anchor points 320 as also shown in FIG. 28.

As also shown in FIG. 27, the pods 322 in row 302 and the pods 322 in row 306 have a convex curvature when viewing the array from above, while row 304 has a concave curvature when viewed from above. This compound curvature arrangement of rows 302, 304, and 306 provides a wave-like appearance, and may offer certain benefits such as limiting wind and snow loading conditions, as well as providing greater options in terms of how the array may be oriented to best capture direct sunlight.

Figure 29:
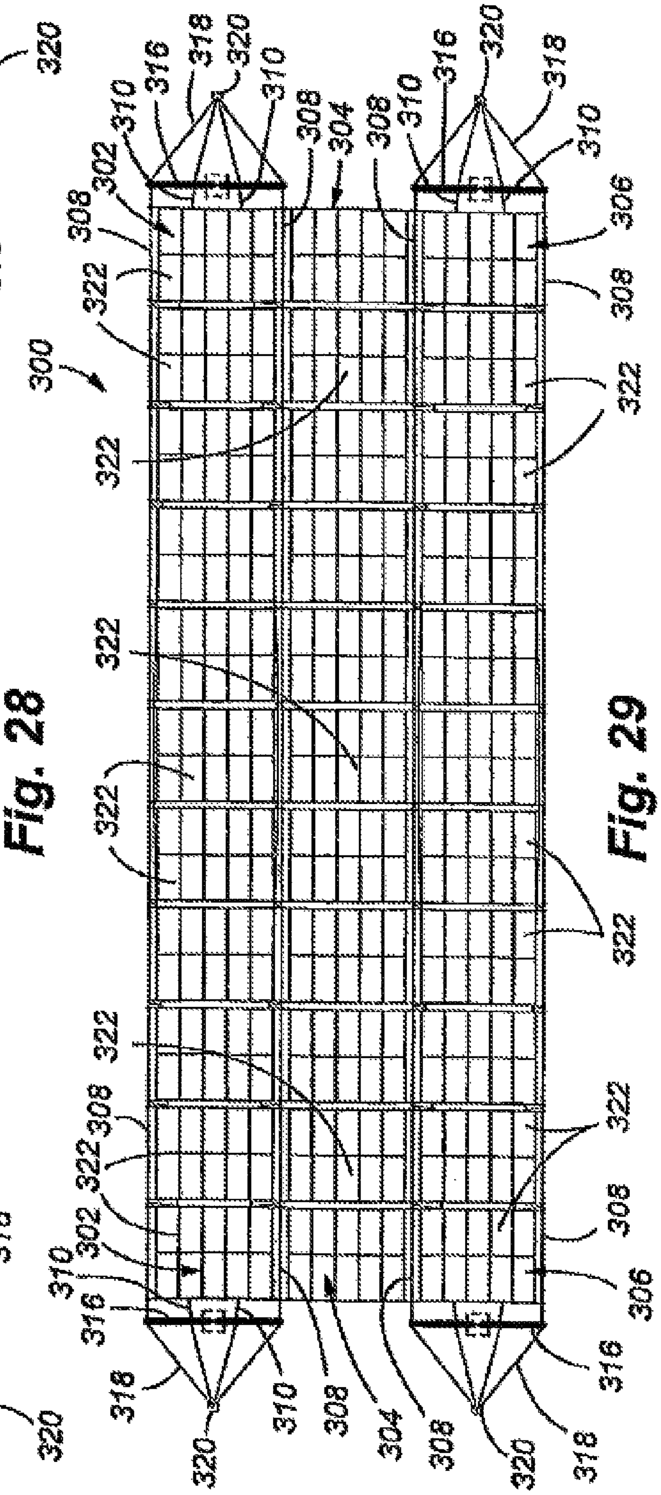
FIG. 29 is an overhead plan view of the embodiment of FIG. 27.

Referring to FIG. 29, it is shown that the rows 302, 304, and 306 extend straight or linearly, and parallel to one another. The embodiment of FIG. 27 provides an array of pods in a 3×11 configuration; however, it shall be understood that the length of the array may be modified to best fit the particular installation needs and therefore the rows of pods may incorporate less or more pods as needed. If the length of the pod is to be increased, then interior columns may be provided between spans as explained below with reference to embodiments such as shown in FIGS. 36-41.

Figure 30:
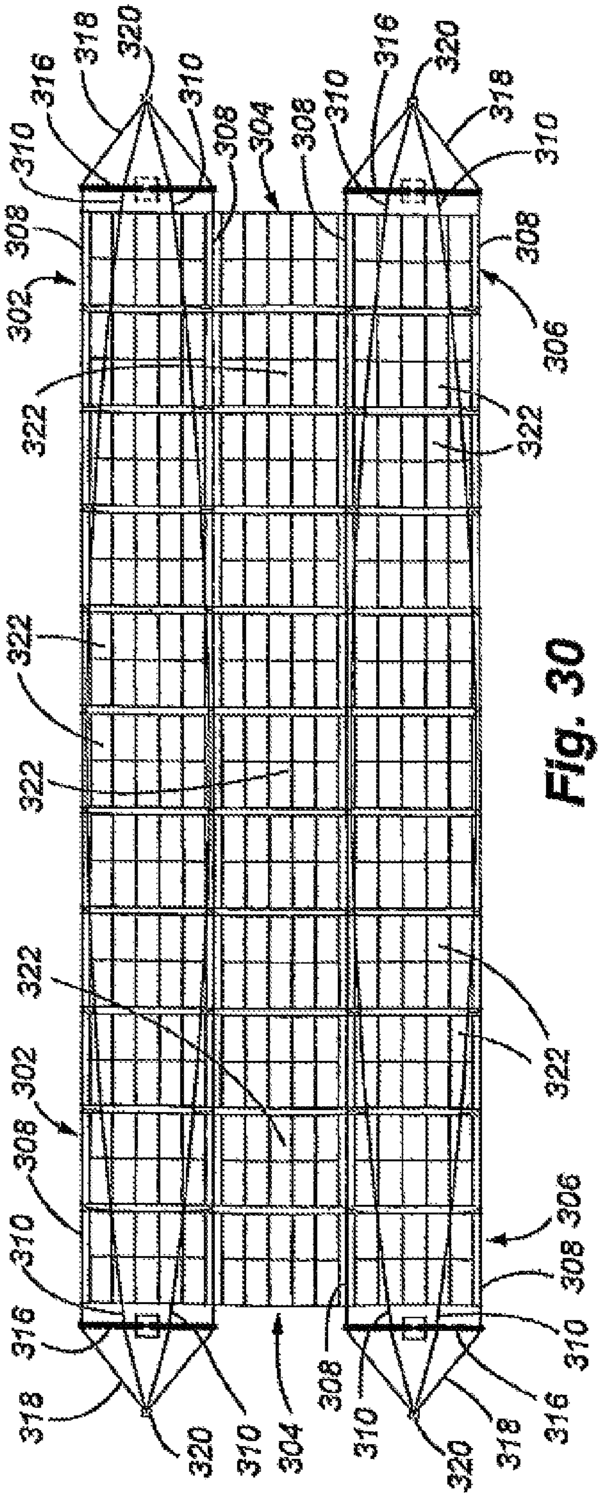
FIG. 30 is a bottom plan view of the embodiment of FIG. 27.
Figure 31:
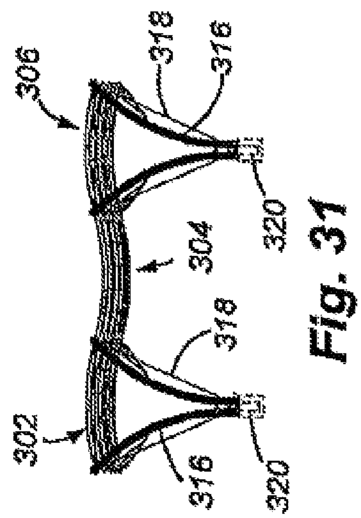
FIG. 31 is a side view of the embodiment of FIG. 27.

The bottom plan view of FIG. 30 further illustrates the particular arrangement of cables to include how complementary lower cables 310 are secured to the respective column members 316, and then extend in an arc or curve along the length of the respective rows. FIG. 31 further illustrates the convex and concave compound curvatures of the array when viewed from a side view of the array.

Figures 32, 32A:
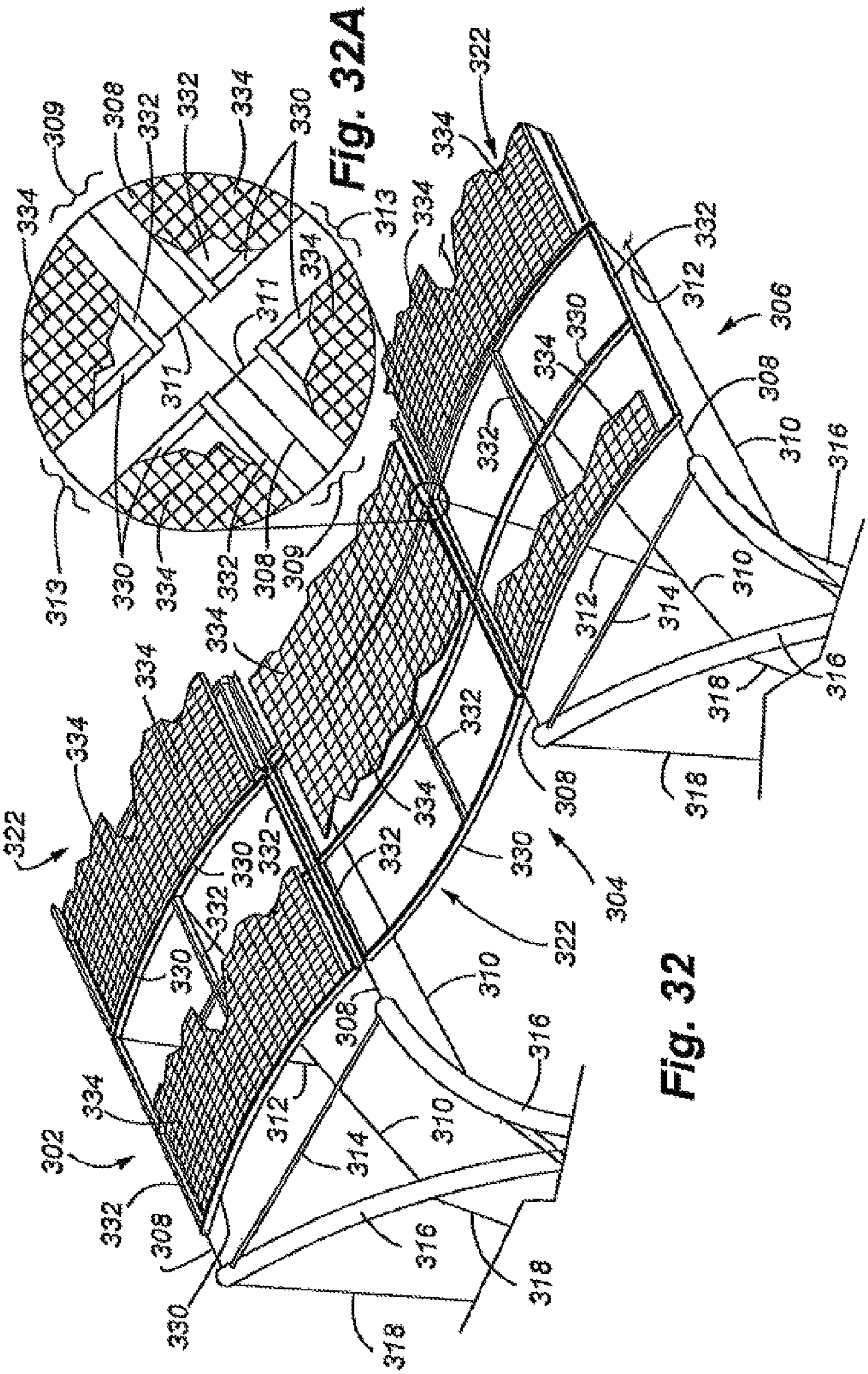
FIG. 32 is an enlarged fragmentary perspective view of the embodiment of FIG. 27 illustrating details of the pod constructions, cable connections, and the manner in which the solar panels are mounted to the curved struts of the panel receiver/pod rows.
FIG. 32A is a greatly enlarged section of FIG. 32 illustrating the intersection of four panel receivers/pods and showing the gaps between each pod and the cable arrangement providing support.

Referring to FIG. 32, this enlarged fragmentary perspective view illustrates the manner in which the solar panels 334 may be mounted to the panel receivers/pods. The solar panels 334 are mounted to the collection of curved struts 330 and perpendicularly oriented and straight/linear struts 332. Specifically, each pod 322 is shown as having a group of three curved struts 330, and three straight struts 332; however depending upon loading conditions, enough structural support may be provided by the use of two curved struts 330 and two straight struts 332. The spacing of such a 2×2 strut arrangement can be designed to provide maximum support to the overlying solar panels. For example, it may be desirable to space the 2×2 arrangement of struts so that there is some overhang of the solar panels beyond the outside edges of the struts. For rows 302 and 306, the curved struts are placed in an orientation such that the ends curve downward and the middle portion or area of the curved struts extends above the ends. For row 304, the curved struts are reversed so that the ends curve upward and the middle area of the struts are disposed below the ends. The curvature of struts 330 in rows 302 and 306 provides the overhead convex appearance, while the curvature of struts 330 in row 304 provides the overhead concave appearance.

Referring to FIG. 32A, a greatly enlarged plan view of a section of FIG. 32 is shown. This view shows the intersection of four panel receivers/pods wherein a longitudinal gap 309 separates the pods between rows, and a transverse gap 313 separates the transverse group of three pods across the width of the array. The upper cable 308 bisects the longitudinal gap 309 between the facing struts 332. Interconnecting members 311 span the gap 309 and interconnect the facing ends of struts 332. Interconnecting members 311 may be, for example small sections of cable, or could be more rigid members such as rods or plates. In the event more rigid members such as rods or plates are used, a moment connection can be incorporated where the members 311 attach to the respective ends of the struts 332. It is also contemplated that in order to increase array rigidity or stability, additional members 311 may be placed to span the gaps 313 and therefore interconnect the facing curved struts 330.

Figure 33:
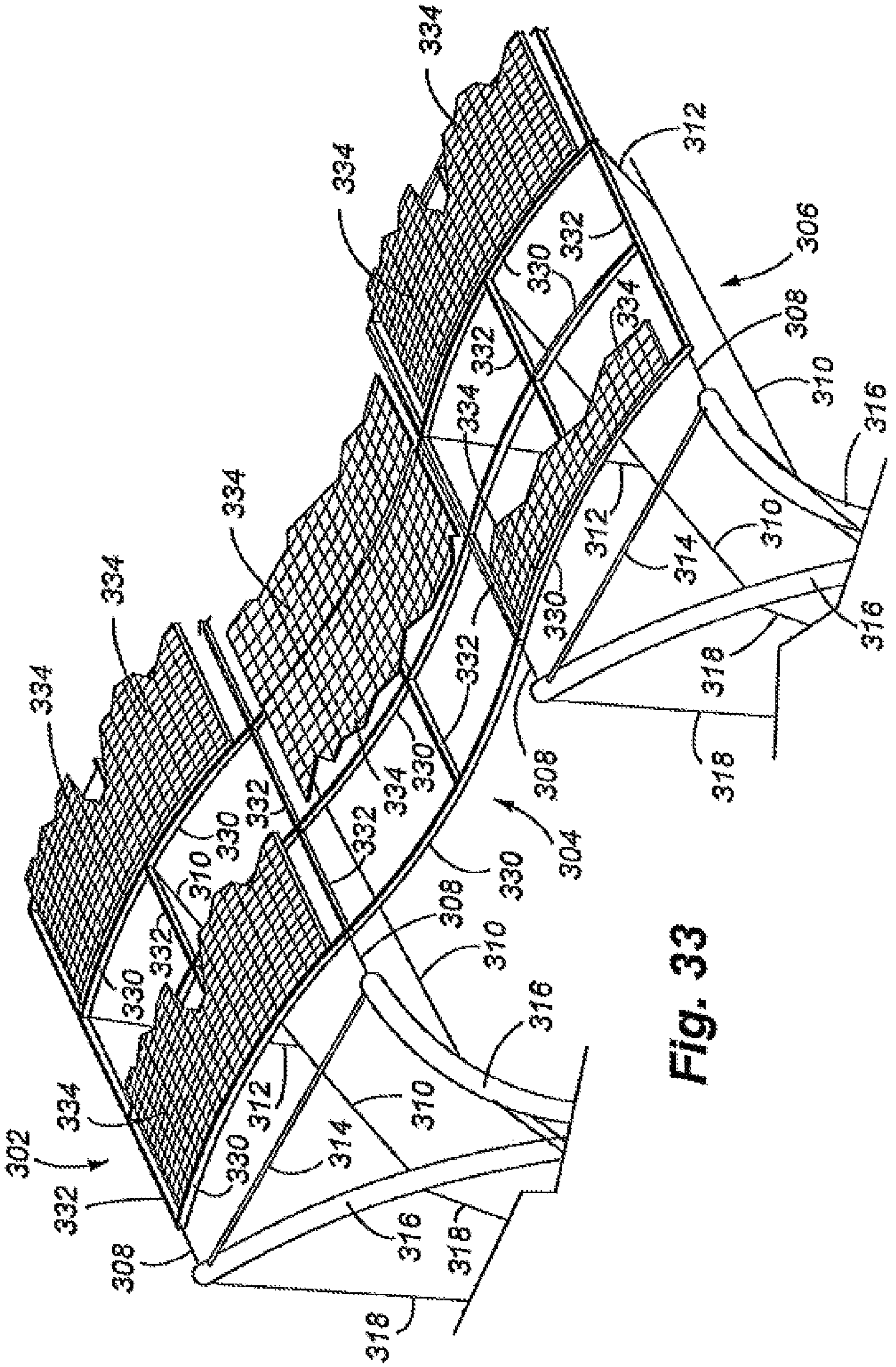
FIG. 33 is another enlarged fragmentary perspective view of the embodiment of FIG. 27, but illustrating an alternative construction for the curved struts that extend continuously across the rows of pods.

Now referring to FIG. 33, a different arrangement of struts is illustrated wherein curved struts 330 are continuous across the entire width or transverse section of the array. In this embodiment, the array is more rigid since there is no gap or separation 309 between row 304 and the exterior rows 302 and 306. The array still maintains the same wave-like shape, but has greater rigidity in the transverse or lateral direction. Thus, this strut arrangement can increase the structure's resistance to horizontal loading from wind or seismic events especially when cables 308 are sized to handle such anticipated loads.

Figure 34:
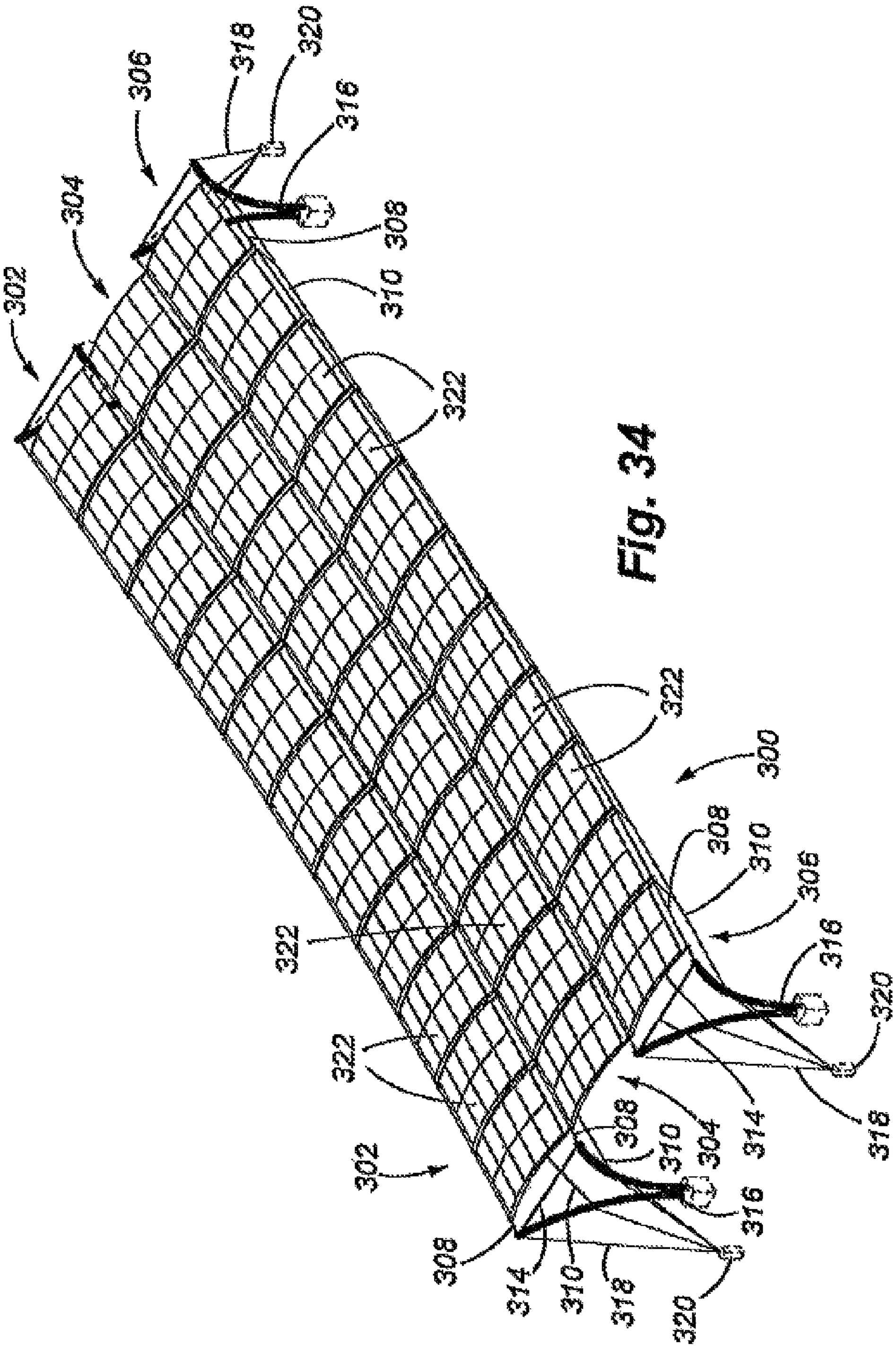
FIG. 34 is a perspective view of another embodiment of the present invention showing three rows of panel receivers/pods with convex curvatures when viewed from above.

Referring now to FIG. 34, another embodiment of a solar array 300 is illustrated wherein the intermediate or interior row 304 has a convex configuration as opposed to the concave configuration illustrated in FIG. 27. Therefore, the curved struts 330 for row 304 are oriented in the same manner as the curved struts used in rows 302 and 306 so that the opposite ends of the struts curve downward. This particular arrangement of the pods may also provide benefits with respect to managing wind or snow loading conditions, maximizing direct sunlight exposure, as well as to provide a different aesthetic appearance. Additionally, more complete water drainage is achieved by providing the convex shaped upper surface and therefore this pod arrangement is especially suited for those climates that may experience heavy precipitation.

Figure 35:
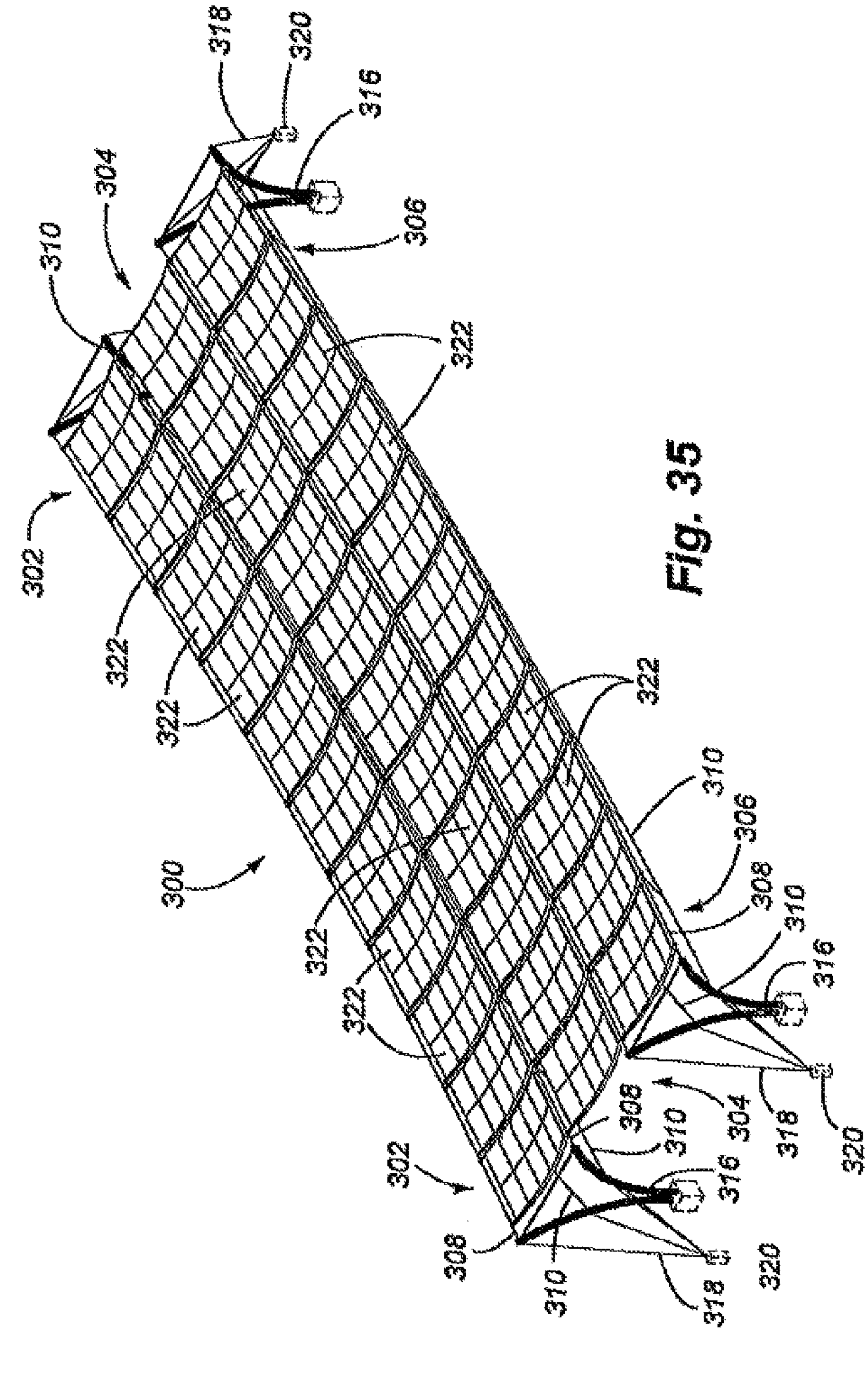
FIG. 35 is a perspective view of another embodiment of the present invention showing three rows of panel receivers/pods with concave curvatures when viewed from above.

Referring to FIG. 35, yet another configuration of an array 300 is provided wherein each of the rows 302, 304 and 306 have a concave configuration, like the configuration of row 304 in FIG. 27. Thus, the struts 330 are each oriented so that the opposite ends curve upward. This embodiment too may offer some benefits with respect to loading, maximizing sunlight capture, and a different aesthetic appearance.

Figure 36:
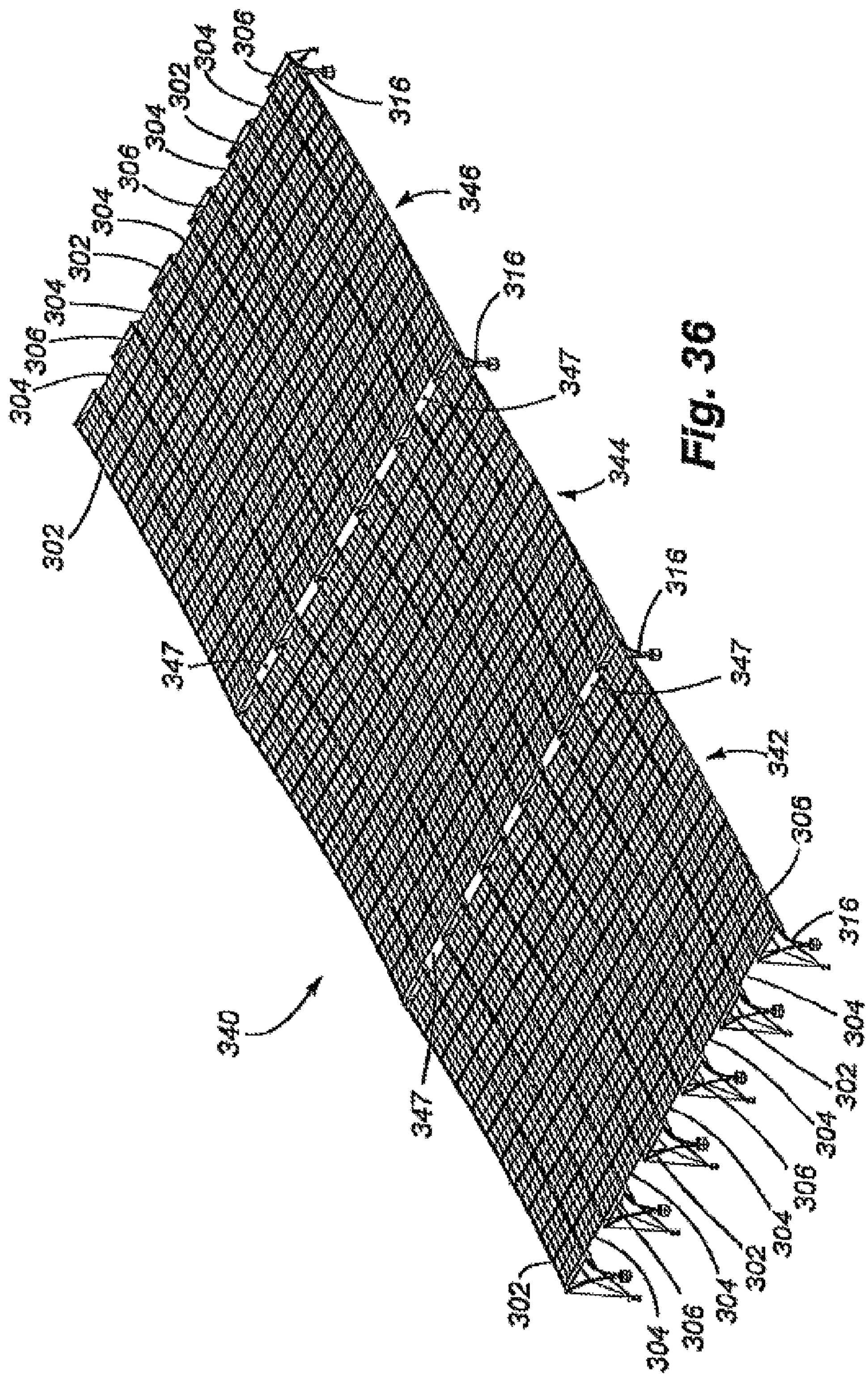
FIG. 36 is a perspective view of another embodiment of the present invention showing a plurality of three row configurations joined to form an array with three primary spans.

Referring to FIG. 36, another embodiment of the present invention is shown in a larger solar array system 340 comprising three primary spans 342, 344, and 346. The spans are defined as running transversely in relation to the rows of pods. This embodiment includes a plurality of sets of the three-row configuration of FIG. 27 as well as interconnecting rows 304 between the sets. Accordingly, FIG. 36 shows the rows of pods 302, 304, and 306 connected to one another in series. FIG. 36 also illustrates gaps 347 between the spans 342, 344, and 346 that accommodate mounting of intermediate columns 316. The embodiment of FIG. 36 is ideal for those installations when it is desired to maximize coverage of solar panels in a defined spaced, for example, to maximize electricity production and/or to provide a shaded area under the solar panels.

Figure 37:
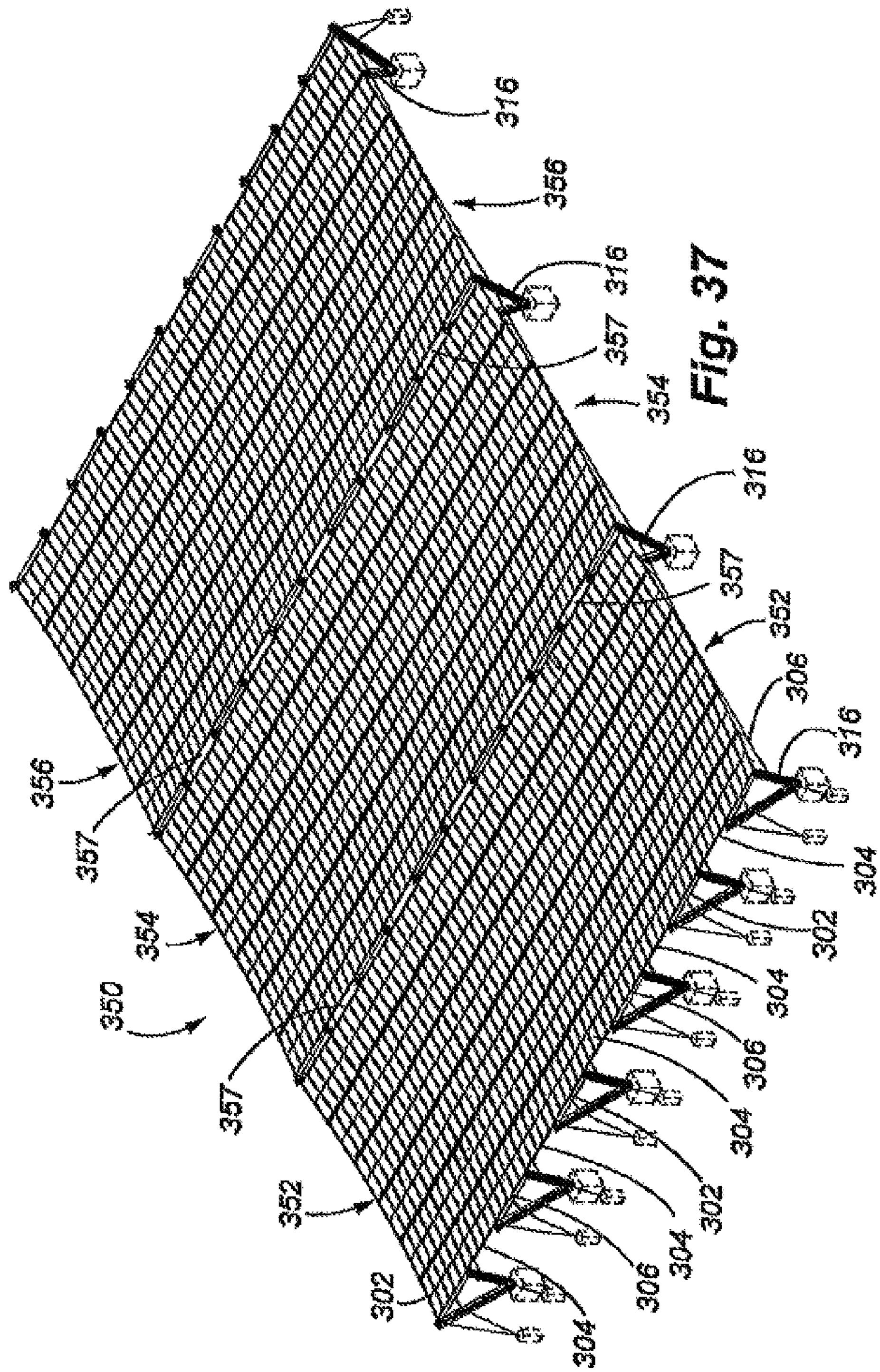
FIG. 37 is a perspective view of yet another embodiment of the present invention showing a plurality of three row configurations joined to form an array with three primary spans.

FIG. 37 illustrates yet another embodiment of the present invention showing an array 350 comprising three transversely oriented spans 352, 354, and 356. This embodiment also incorporates the sets of three row configurations of pods 302, 304, and 306 arranged in series to one another and including an interconnecting row 304 between each three-row grouping. The columns 316 are shown as v-shaped members and without curvature as compared to the columns 316 of FIG. 36. Gaps 357 are provided to allow mounting of the intermediate columns 316. FIG. 37 also represents that the pods incorporate continuous struts in the lateral or transverse direction thus eliminating gaps 309 if viewing FIG. 32A, but maintaining gaps 313.

Figure 38:
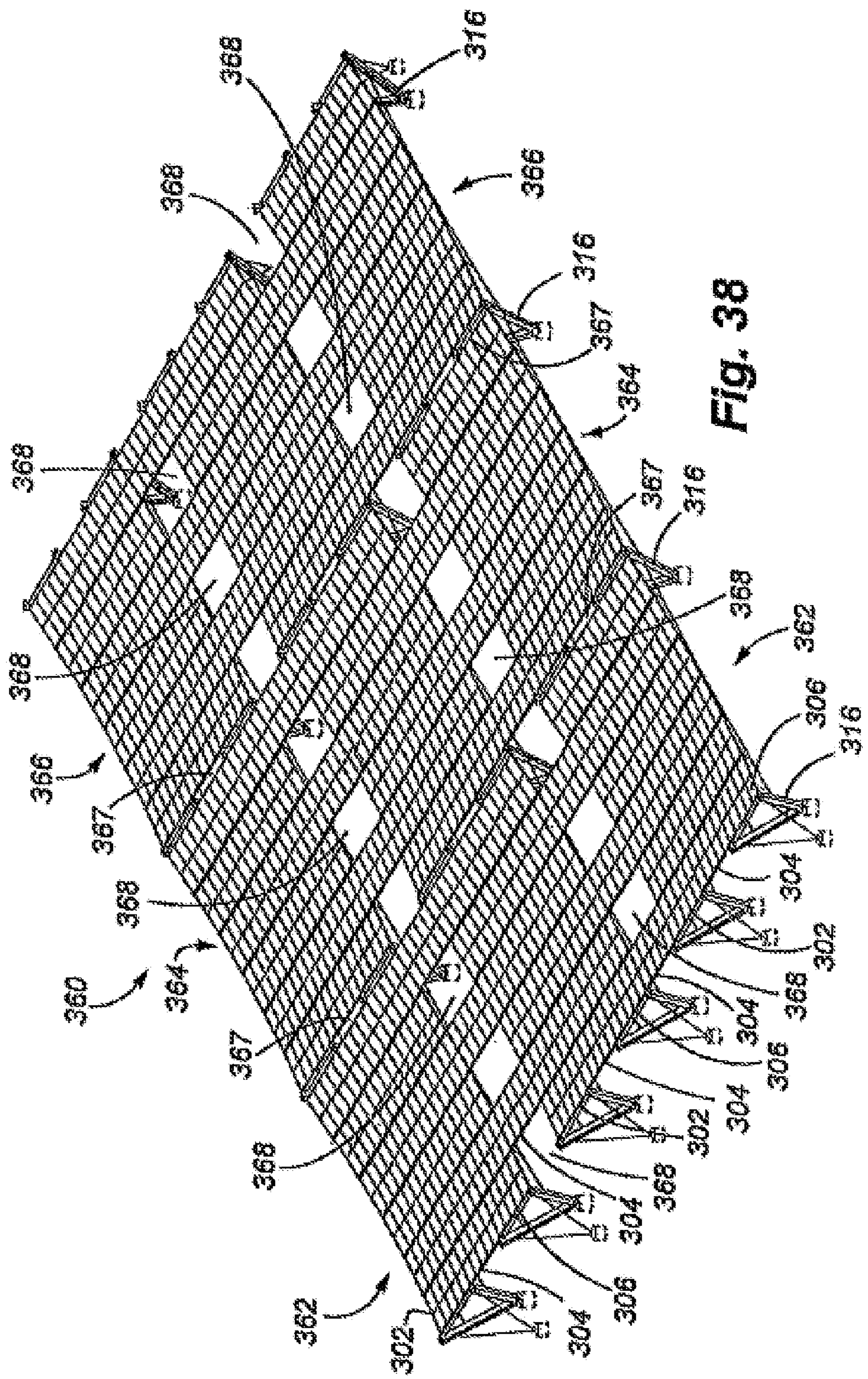
FIG. 38 is a perspective view of yet another embodiment of the present invention showing a plurality of three row configurations joined to form an array with three primary spans and a plurality of openings formed in the array by removing selected panel receivers/pods.

FIG. 38 illustrates yet another embodiment of the present invention illustrating an array 360 similar to the array 350 of FIG. 37, but the array of FIG. 38 further incorporates a plurality of gaps or open spaced 368 that are formed by removing selected pods from a selected row/span. Gaps 367 enable mounting of the intermediate columns 316. Three spans 362, 364 and 366 are shown in this embodiment. The removal of the pods in this manner may be useful for achieving one of many purposes, such as to modify wind/snow-loading conditions, to provide additional sunlight under the array, or to provide a desired visual impression. The increased amount of sunlight under the array will also facilitate better plant growth that may be desirable in some installations where landscaping under the array incorporates selected vegetation.

Figure 39:
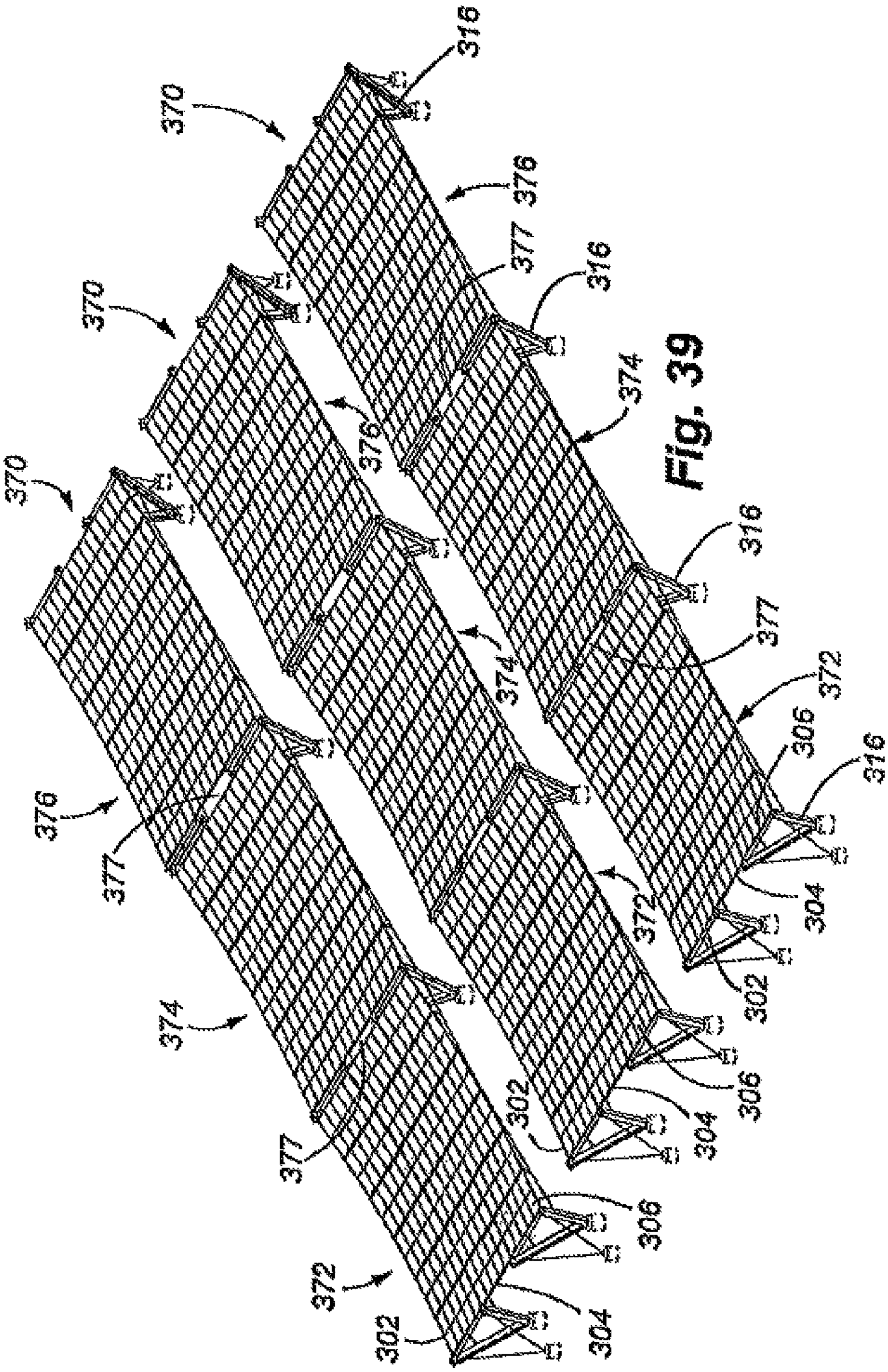
FIG. 39 is a perspective view of another embodiment of the present invention showing three groups of three row pod configurations spaced apart from one another.

Referring to FIG. 39, yet another preferred embodiment of the present invention is illustrated showing three spaced arrays 370, and each array 370 having three primary spans 372, 374, and 376, as well as the three row configuration of rows 302, 304, and 306. In the embodiment of FIG. 39, instead of providing an interconnecting row 304 of pods, there is complete separation among the arrays 370. Gaps 377 provide mounting spaced for the intermediate columns 316. This embodiment may be used in an installation where it may be necessary to provide gaps between the arrays due to the presence of interfering structures or natural obstacles, such as trees, lighting poles, etc. Safety requirements may also be accommodated by the gaps so that emergency vehicles with large heights are able to more easily access the areas between and under the arrays. Alternatively, it may be desirable for the installation to have a greater amount of sunlight between pod groups that is achieved by the spaced arrays.

Figure 40:
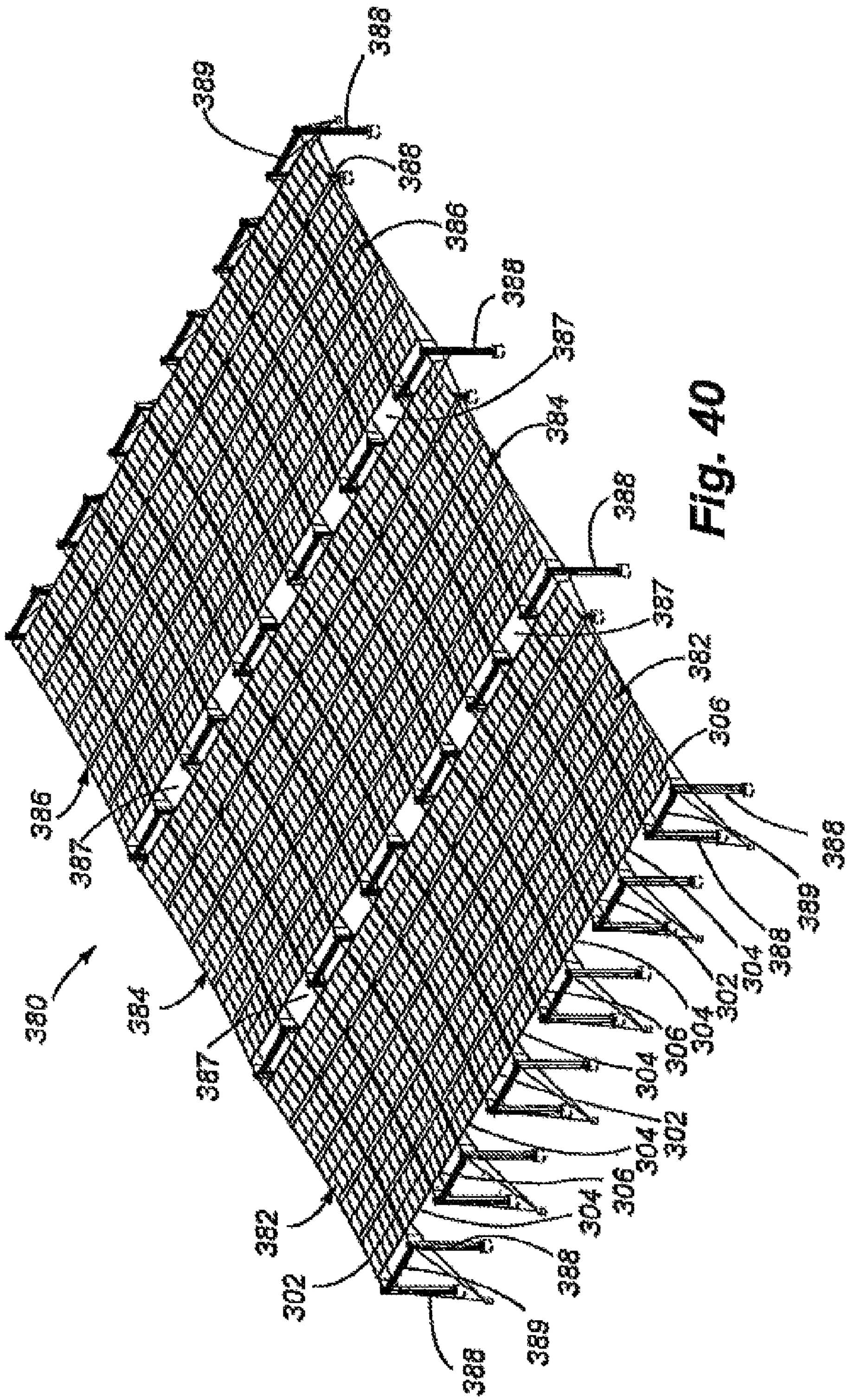
FIG. 40 is a perspective view of yet another embodiment of the present invention showing a plurality of three row configurations joined to form an array with three primary spans and incorporating different columns.

FIG. 40 illustrates yet another embodiment of the present invention shown as array 380 comprising three primary spans 382, 384, and 386. This embodiment also incorporates the three-row configuration of rows 302, 304, and 306 and the interconnecting rows 304 between each three-row grouping. Gap 387 provides mounting spaced for the intermediate columns 388. In this embodiment, the columns 388 are pairs of spaced vertical members, with an interconnecting and horizontally oriented cross support 389.

Figure 41:
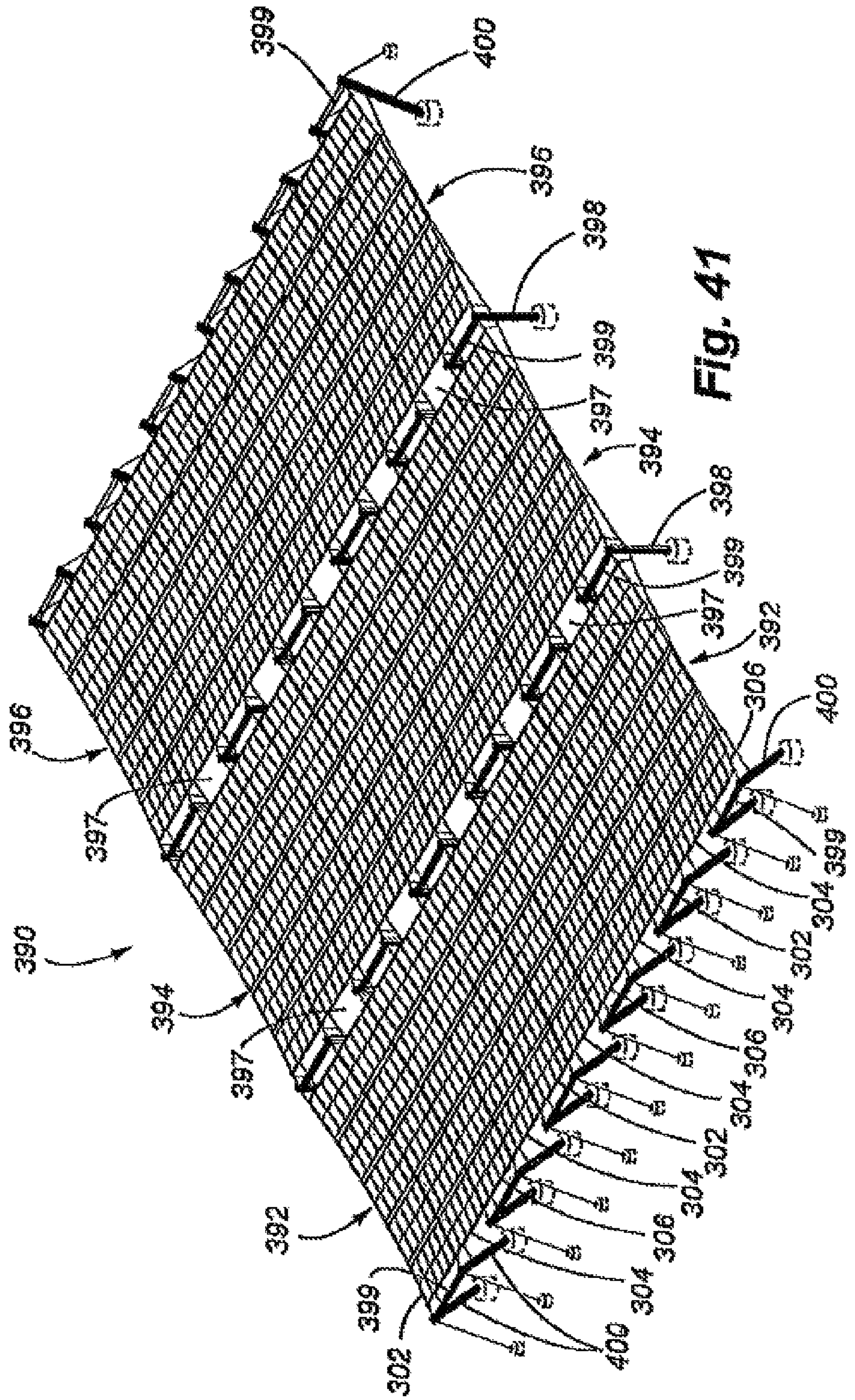
FIG. 41 is a perspective view of yet another embodiment of the present invention showing a plurality of three row configurations joined to form an array with three primary spans similar to the embodiment in FIG. 41, but incorporating exterior columns extending at an angle.

FIG. 41 illustrates yet another preferred embodiment of the present invention, showing an array 390 comprising three primary spans 392, 394, and 396, as well as the repeating arrangement of the three row configuration of rows 302, 304, and 306 and the interconnecting rows 304 between each three row grouping. Cross-support cables or bars 399 are provided between the upper ends of the columns. In this embodiment, the most outward or end group of columns 400 extends at an angle from the ground, while the interior columns 398 extend substantially perpendicular from the ground. Gaps 397 provide mounting spaced for the interior column 398.

The embodiments of FIGS. 27-41, are particularly suited as ground mount solar arrays, meaning that the height of the columns extends a shorter distance above the ground, such as eight to fifteen feet. The primary purpose of the ground mount solar arrays is to produce electricity. These ground mounts can be located in an area that may not be suitable for other construction purposes or may be used to fill in unusable spaced within a commercial or industrial area to produce power. Because of the lower height at which the solar panels are mounted, there is less of a safety concern as compared to overhead mounted solar panels. Accordingly, in the design of the ground mount fewer supporting materials are required, resulting in significant cost savings. For example, row 304 is suspended between rows 302 and 306 thus eliminating the need for additional column supports for that particular row of pods.

For the embodiments of FIGS. 27-41 as mentioned, the cable arrangement is similar to what is disclosed with respect to the embodiment of FIG. 14. Cables 308 extend substantially parallel to one another and have substantially the same curvature. Cables 310 are disposed below cables 308 and also extend substantially parallel to one another. Cables 310 have generally opposite curvatures as compared to cables 308. Cables 312 extend substantially perpendicular between cables 308 and 310. The gaps 309 between adjacent rows of pods, as well as the gaps 313 between adjacent pods in a row can be modified to best match the particular purpose of installation, as well as to provide the necessary support and airflow through the gaps in order to best handle wind and snow loading conditions.

Figure 42:
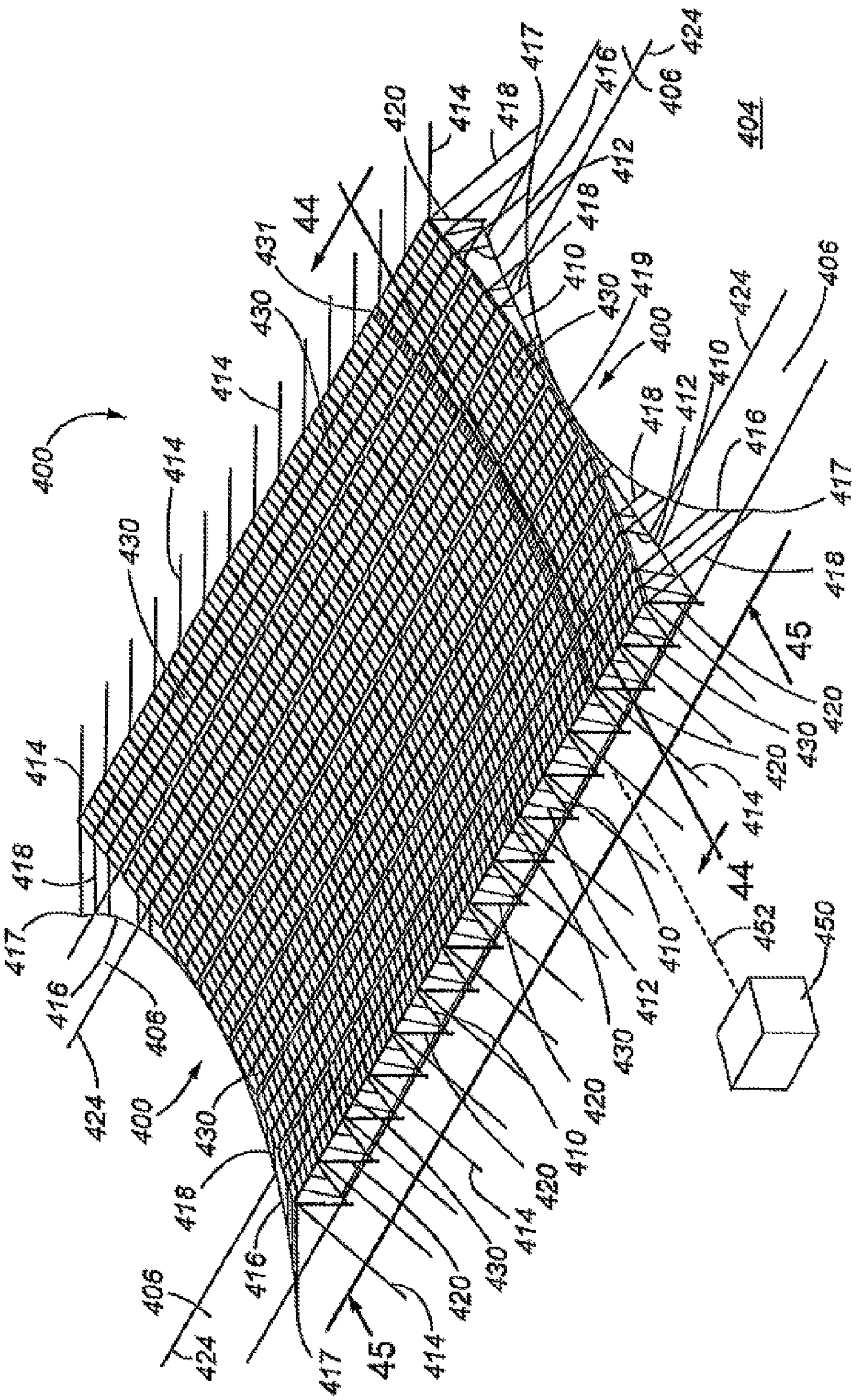
FIG. 42 is a perspective view of yet another embodiment especially adapted for installation over an aqueduct.

FIG. 42 illustrates another preferred embodiment of the present invention in a solar panel array 400 that is especially designed to be installed over a linear extending ground feature, such as a road or aqueduct. In the southwest region of the United States, aqueducts are used to transport large quantities of water from reservoirs to municipalities. The aqueducts are typically concrete-lined waterways that carry water within a bed 404 of the aqueduct. The sides of the aqueduct are defined by banks 406 that extend above the liquid level 424 of the waterway. In the case of array 400, it is designed to span the width of the aqueduct wherein the end of columns 420 are positioned outside or exterior of the sloping banks 406. The array 400 provides an effective way in which to shade the aqueduct, thereby reducing evaporation that naturally occurs in the aqueduct. Preferably, the array is mounted closely over the aqueduct in order to also disrupt or block wind which would normally freely flow over the aqueduct, thus, the solar panel also acts as a wind break to further prevent evaporation. Because of the remote location of many portions of various aqueducts, the solar arrays can be easily installed over the aqueducts without concern for interfering with other man-made structures.

FIG. 42 also illustrates an optional power substation 450 that is placed near the array 400, in which power is downloaded from the array 400 through power transfer line 452. Particularly in remote locations, one or more power stations 450 may be required in order to most efficiently store energy produced by the array 400, or to transmit the power to another substation.

Figure 43:
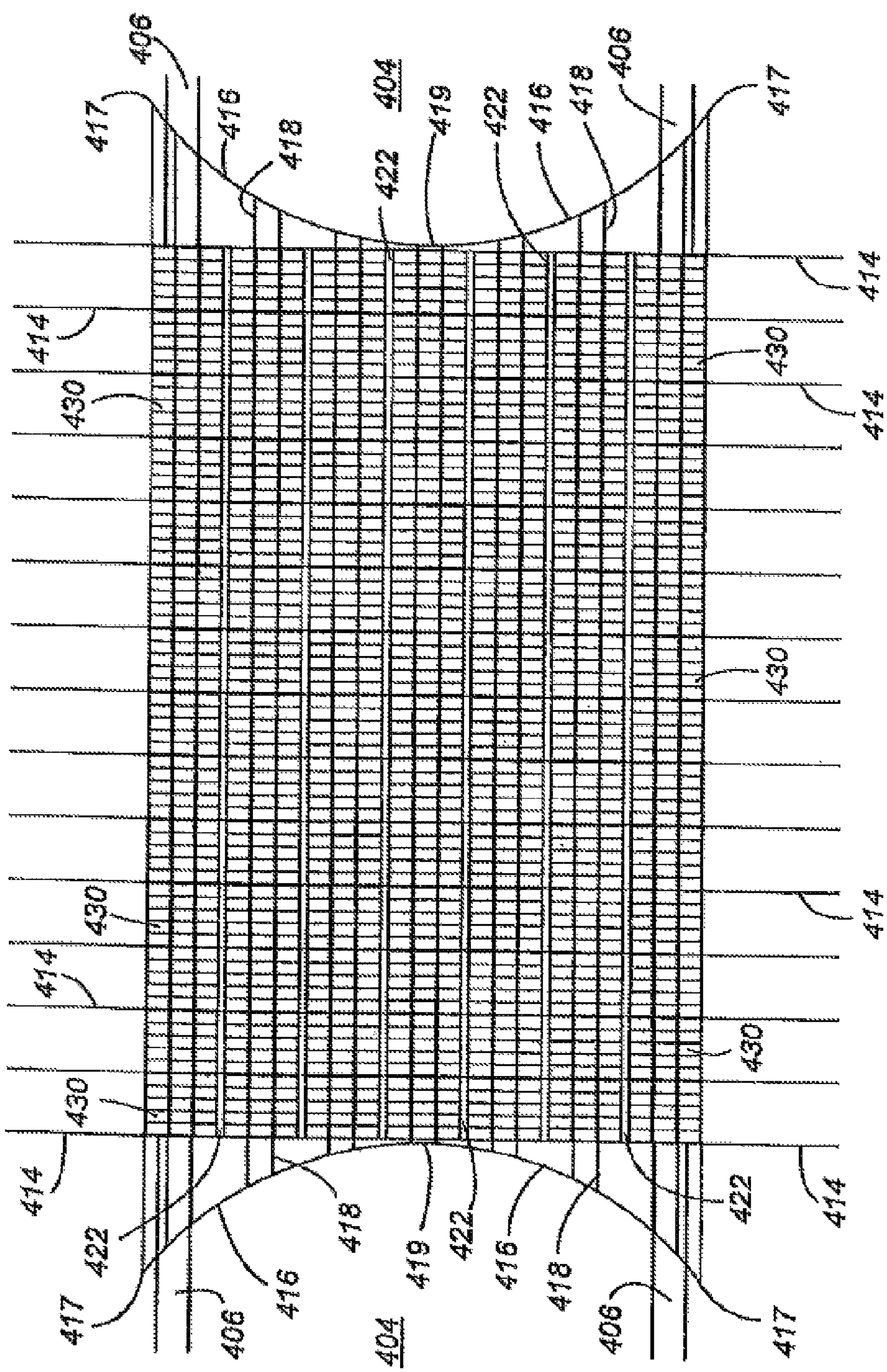
FIG. 43 is a plan view of the embodiment of FIG. 42.
Figure 44:
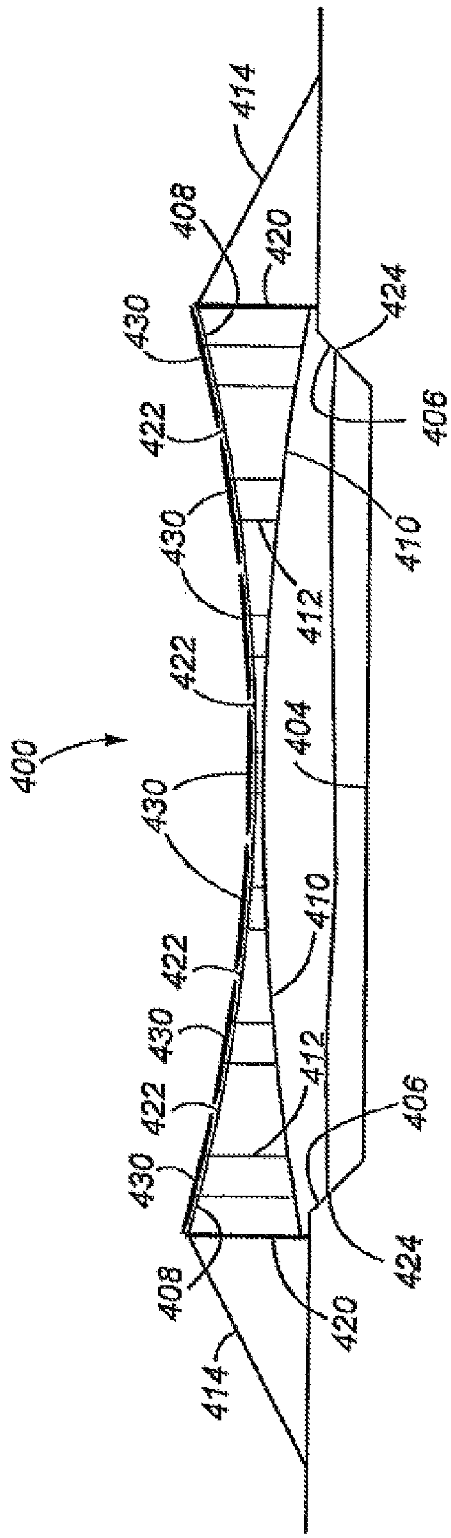
FIG. 44 is an elevation view taken along line 44-44 of FIG. 42.

Referring also to FIGS. 43 and 44, the array 400 comprises a plurality of upper main support cables 408 that are secured to upper ends of the respective end columns 420. A complementary lower main support cable 410 spans between lower ends of the respective end columns 420. A plurality of anchor cables 414 provide additional support for the end columns 420. The anchors in FIGS. 42 and 43 have been omitted for clarity. As with the previous embodiments, a plurality of interconnecting cables 412 connect the respective upper and lower support cables 408 and 410. The upper cables, lower cables, and interconnecting cables can again be defined as respective cable trusses. On each longitudinal end of the array 400, a catenary cable 416 spans the aqueduct, and has a center portion connected at the longitudinal center 419 of the array. At this longitudinal center 419, the upper cable 408, lower cable 410, and catenary cable 416 intersect. A plurality of interconnecting catenary cables 418 extend longitudinally and interconnect the catenary cable 416 to the upper support cable 408. The array 400 comprises a plurality of pods/receivers 430 each containing a number of solar panels. The pods 430 can be selectively spaced from one another thus forming gaps 422. The columns 420 are placed exteriorly of the banks 406 so that the array 408 effectively covers the entire width of the aqueduct.

In order to provide maintenance for the array, a walkway 431 may be incorporated on various portions of the array so a person can walk to locations on the array to replace damaged solar panels or other components of the system. The walkway would replace one row of solar panels in each adjacent pod. The walkway could be made of a lightweight decking material and can also include handrails (not shown). In this figure, only one walkway is shown that extends transversely across the aqueduct; however additional walkways can be provided to allow direct access to other areas of the array in both transverse and longitudinal directions.

Figure 45:
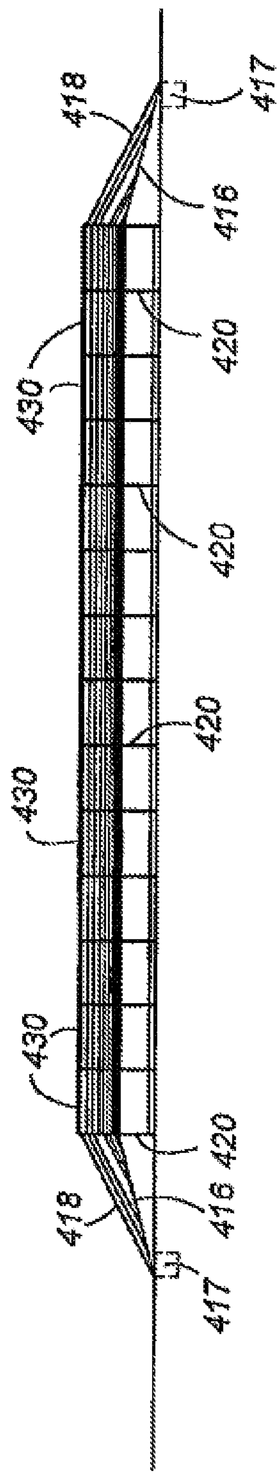
FIG. 45 is another elevation view taken along line 45-45 of FIG. 4.

FIG. 45 is a longitudinal elevation view taken along line 45-45 further illustrating details of the construction. FIG. 45 also illustrates the way in which the catenary cables 416 and the interconnecting cables 418 extend from the opposite longitudinal ends of the array. The catenary cables 416 are anchored at respective anchor points 417 that are also placed preferably in longitudinal alignment with the columns 420.

Figure 46:
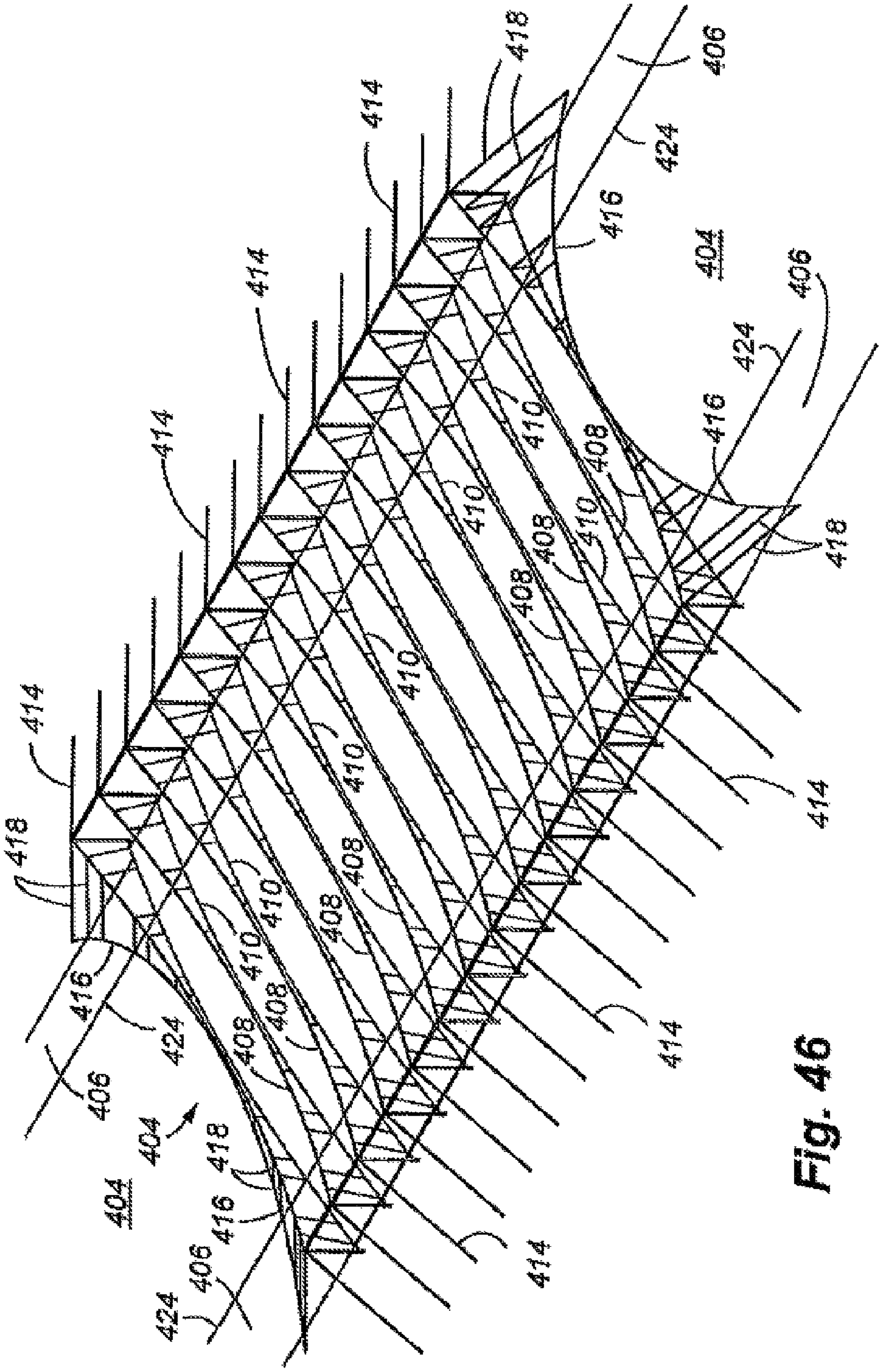
FIG. 46 is a perspective view of the embodiment of FIG. 42 illustrating the solar panels and receivers removed to better illustrate the arrangement of the cables.

FIG. 46 illustrates the array 400 with the pods removed to better show the arrangement of cables to include the upper cables 408, lower cables 410, catenary cables 416, anchor cables 414, and various interconnecting cables.

Figure 47:
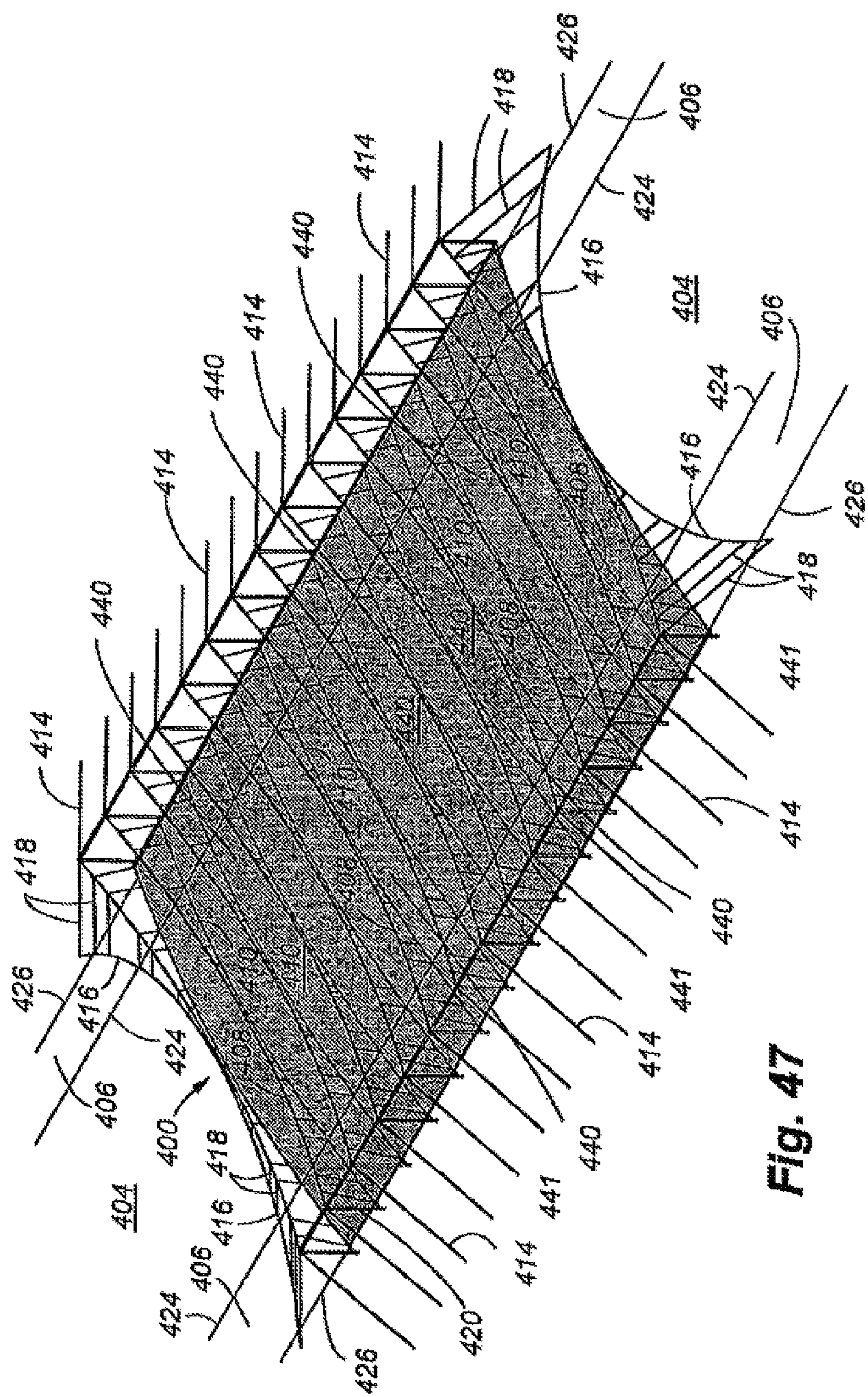
FIG. 47 is another perspective view as shown in FIG. 46, but further illustrating the protective membrane that is mounted to the lower support cables.

Referring to FIG. 47, another feature of this embodiment is to provide a membrane or cover that is suspended from the lower cables 410 so that the membrane can provide additional protection to the waterway to prevent evaporation. As shown in FIG. 47, the membrane 440 extends along the entire length and width of the array in order to provide cover for the aqueduct. Because of the curved arrangement of the lower cables 410, the lateral side edges 441 of the membrane 440 extend close to contacting the ground near the columns 420. Thus, the membrane effectively isolates the aqueduct from airflow in a lateral direction which also contributes in preventing evaporation.

For purposes of covering an aqueduct, the array 400 may extend for many miles and the repeating nature of panel receiver rows easily accommodates an extended length. Because of the vast amount of open space available for installing the array over many remote aqueducts, the array 400 can produce a tremendous amount of power, providing an effective way to prevent evaporation loss for water carried in the aqueduct.

Figure 48:
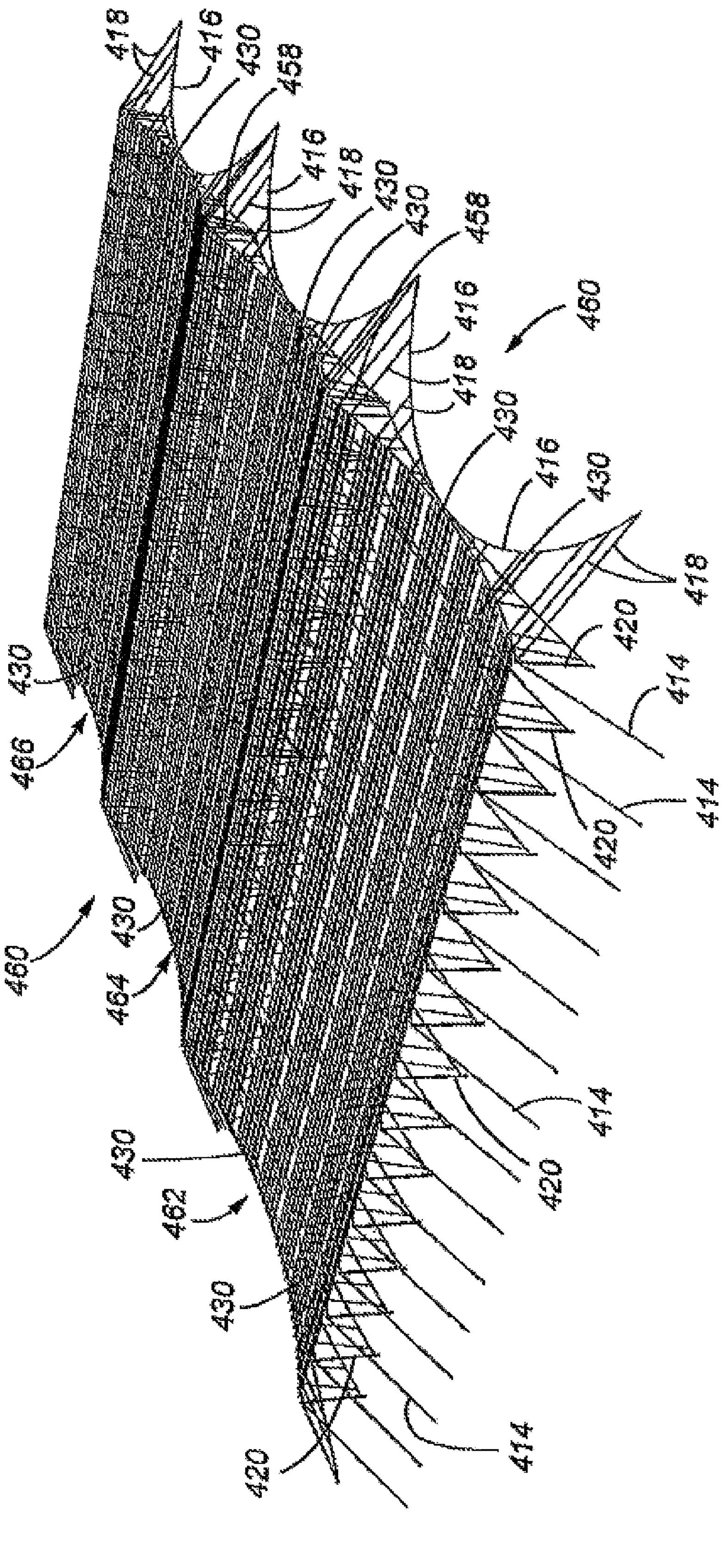
FIG. 48 is another perspective view of yet another embodiment of the present invention.

Referring now to FIG. 48, another embodiment of the present invention is illustrated in the form of an array 460 comprising three spans 462, 464, and 466. Like reference numbers used in this embodiment correspond to the same structural elements disclosed in the prior embodiment. These three spans are supported in the middle of the array by the two pairs of interior column groups 458. This embodiment also includes the catenary cable arrangement 416 on both longitudinal sides of the array to provide additional array support.

Figure 49:
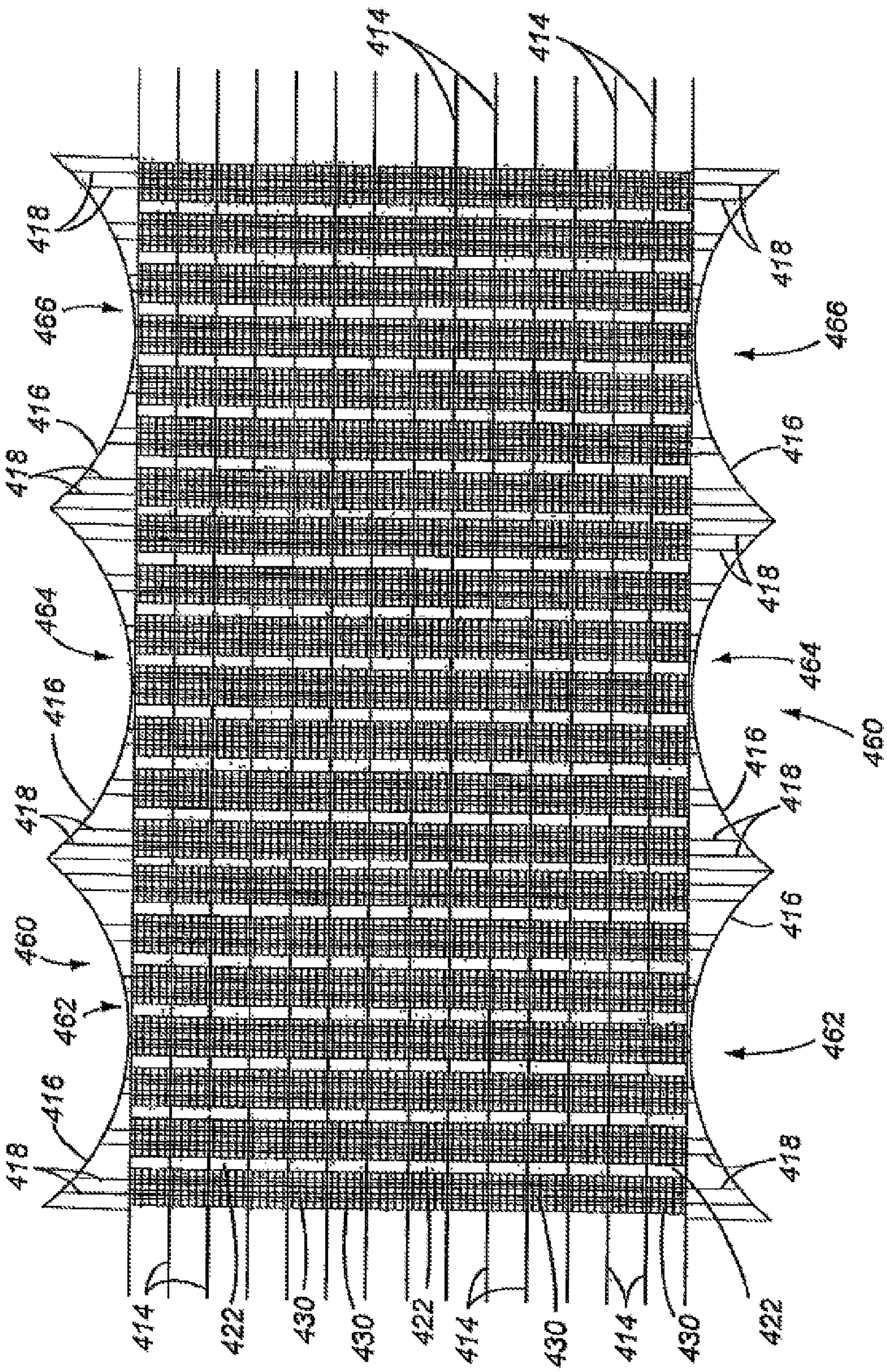
FIG. 49 is a plan view of the embodiment of FIG. 48.

FIG. 49 is a top plan view of the embodiment of FIG. 48 that illustrates the manner in which the anchor cables 414 and catenary cables 416 surround the array to provide support on all sides of the array.

Figure 50:
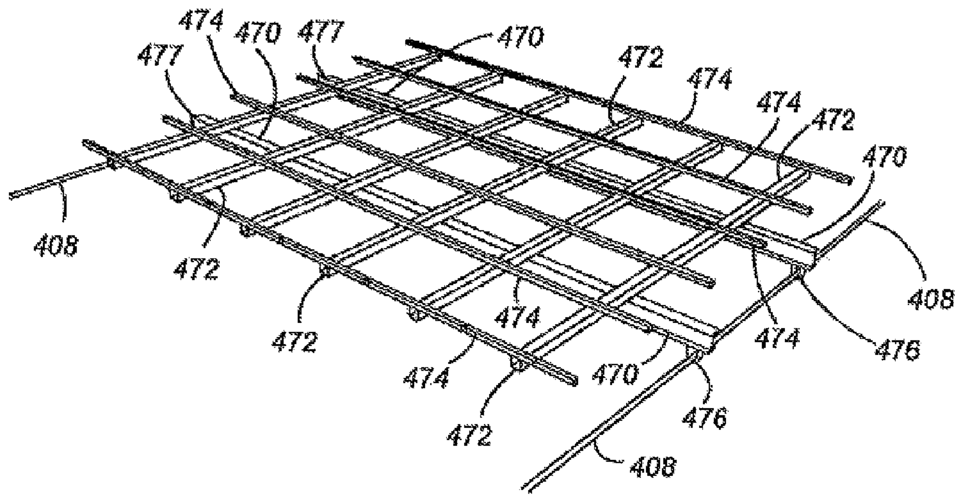
FIG. 50 is a perspective view of another pod or receiver construction in accordance with another embodiment of the present invention.

FIG. 50 illustrates another pod or receiver construction of the present invention. This pod construction is characterized by two main support beams 470 that are spaced from one another and opposite ends of the main beams are secured to cables 408 by cable clamping means 476. A plurality of intermediate struts 472 are spaced from one another and are secured to the pair of beams 470. The intermediate struts 472 are placed transversely with respect to the main beams, and extend substantially parallel with the cables 408. A plurality of solar panel support struts or upper struts 474 are then secured over the intermediate struts 472. The upper struts 474 extend substantially parallel with the beams 470, and extend transversely to the intermediate struts 472 and cables 408.

Figure 51:
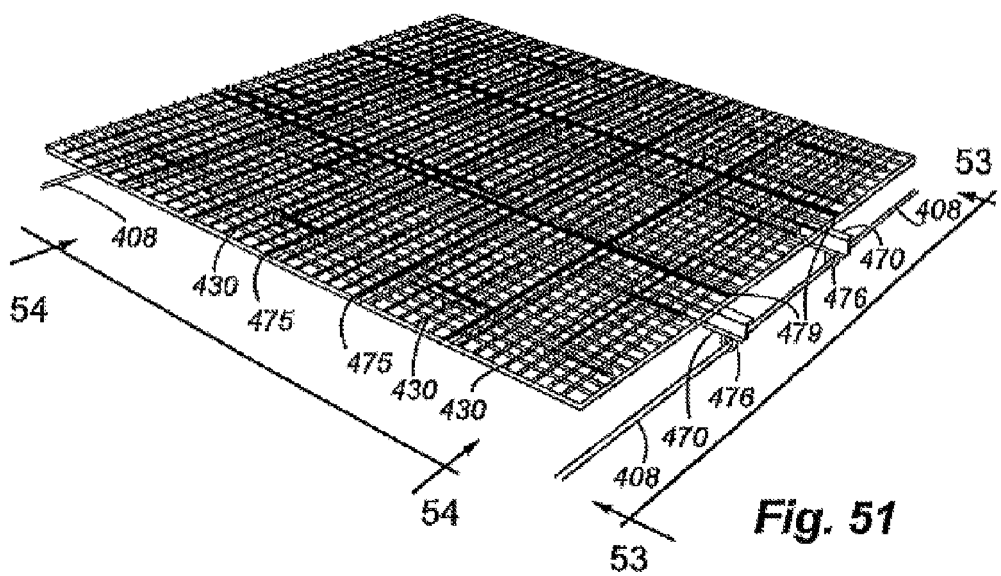
FIG. 51 is a perspective view of the receiver of FIG. 50 with the solar panels mounted thereon.

Referring to FIG. 51, a plurality of solar panels 430 are shown mounted to the upper struts 474. As shown, each of the solar panels 430 are separated from one another by longitudinal gaps 475 that extends parallel with the cables 408, and transverse gaps 479 that extend substantially parallel to the beams 470.

Figure 52:
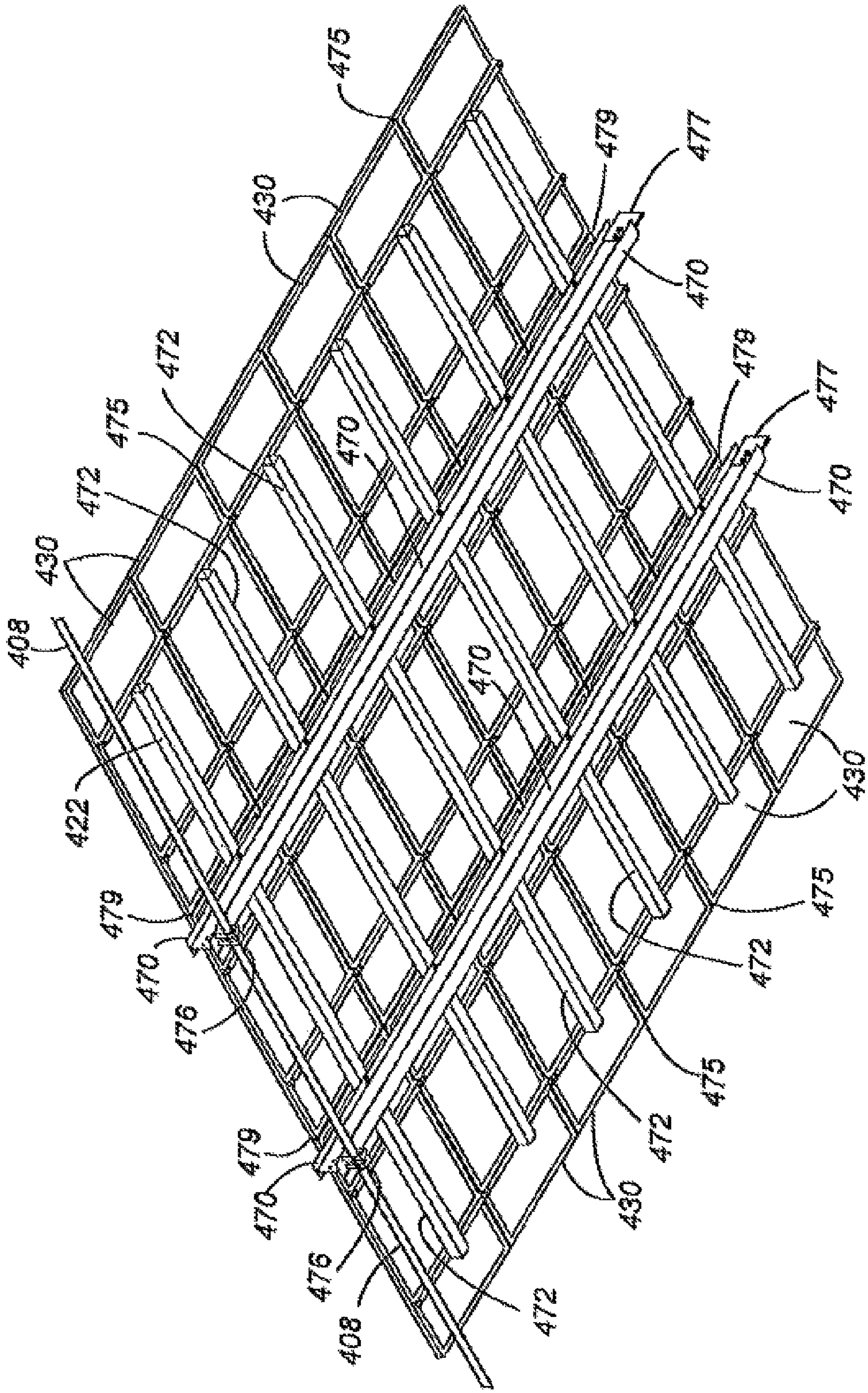
FIG. 52 is a reverse perspective view of the receiver/pod and solar panels of the embodiment of FIGS. 50 and 51.

FIG. 52 illustrates the pod construction from a reverse perspective angle that shows in more detail the manner in which the solar panels 430 are spaced and mounted to the upper struts 474 that overlie the intermediate struts 472 and beams 470.

As also shown in FIG. 52, the beams 470 each include a gusset plate 477 that extends from one end of the beam. The gusset plates 477 are used to interconnect adjacent panels in a row. Therefore, when the pods/panel receivers are placed in series with one another, the gusset plates 477 interconnect the pods. The gusset plates 477 provide additional structural rigidity for the pods as they are mounted to the cables 408.

Figure 53:
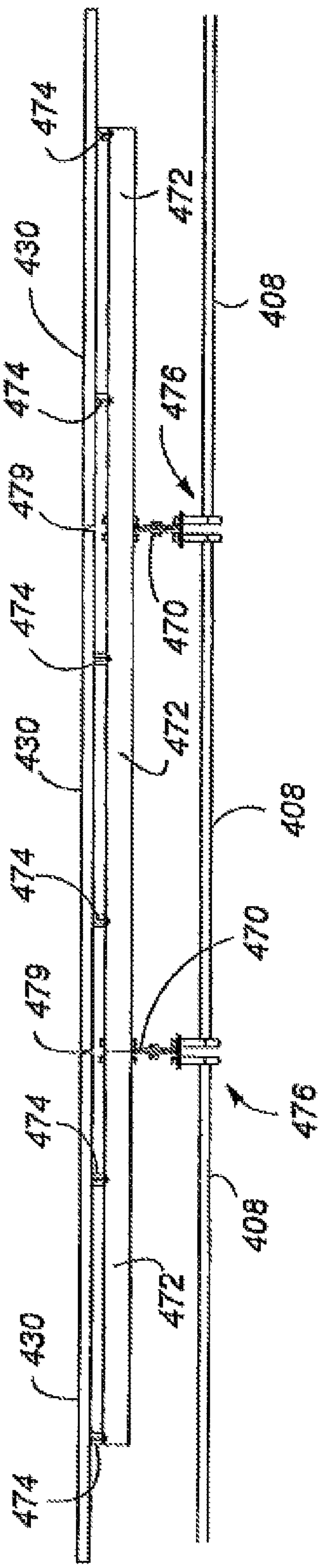
FIG. 53 is an elevation view taken along line 53-53 of FIG. 51.

Referring to FIG. 53, a side elevation view is taken along line 53-53 of FIG. 51. From this side view, it is shown that the transverse gaps 479 separate the respective pods 430 mounted upon upper struts 474. FIG. 53 also shows the cable clamps 476 that comprise a pair of U bolts extending below the beams 470. The U bolts are secured to opposite side flanges of the beams 470 and compress the cables 408 in order to provide a rigid connection between the beams 470 and the cables 408.

Figure 54:
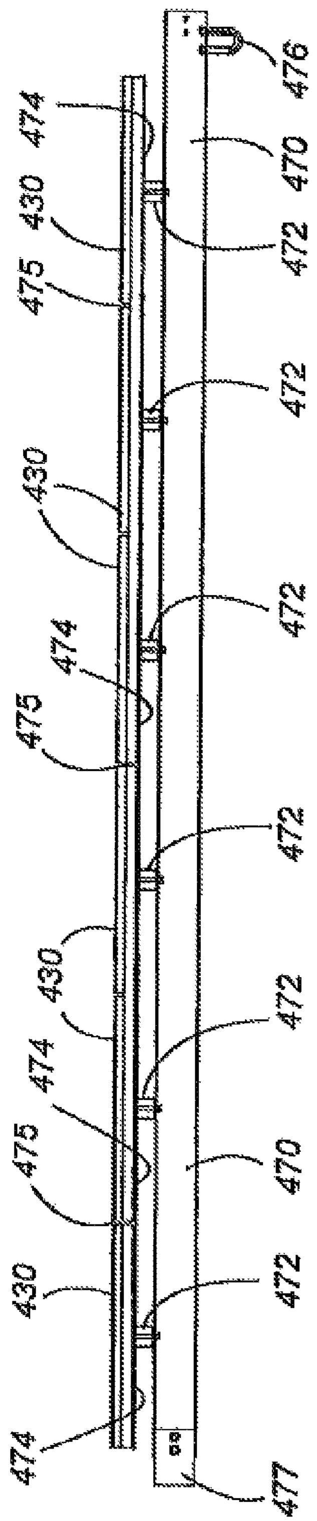
FIG. 54 is another elevation view taken along line 54-54 of FIG. 51.

FIG. 54 is another elevation view taken along line 54-54 of FIG. 51. From this side elevation view, it is also shown how the pods 430 are separated from one another by longitudinal gaps 475 and the manner in which the pods 430 are mounted to the underlying support structure.

The pod or receiver 430 shown in FIGS. 50-54 provide an important solution for preventing torsional forces or torques that may otherwise damage the solar panels. The solar panels are relatively stiff members that can be damaged if they are bent or twisted in an out-of-plane or non-planar fashion. More specifically, the solar panels are substantially flat and the flat upper or lower surface of the panels defines a plane. If the solar panels are twisted or torqued in an out-of-plane fashion, the solar panels can be damaged. FIG. 50 shows the beams 470 connected to the cables 408 that suspend the pod 430. The cables 408 will move based upon various wind and other loading conditions because the cables 408 have some capability to flex or bend; however, adjacent pairs of cables 408 will not always translate or move in an identical fashion, which can cause torsional forces to be transferred to the pods 430. Beams 470 that extend between the cables 408 maintain a constant or rigid planar orientation when used in combination with the intermediate struts 472. Furthermore, a rigid support is provided for the panels which prevents out of plane forces from being transmitted to the solar panels. Thus, any movement transferred to the pod results in a uniform, non-torsional displacement of the entire pod which therefore prevents damage to the panels when mounted to the pods.

Figure 55:
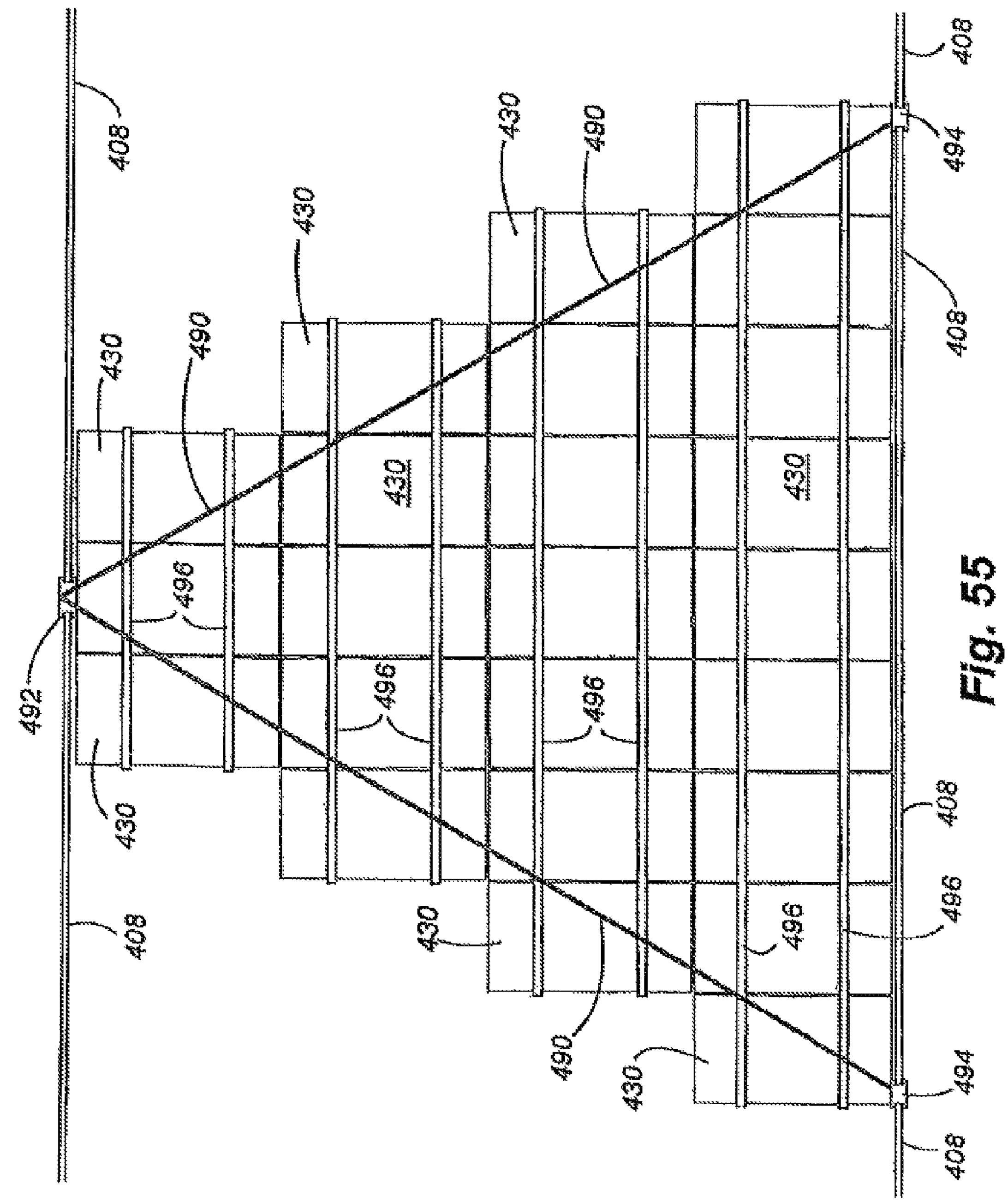
FIG. 55 is a plan view of yet another pod or receiver construction in accordance with another embodiment of the present invention.
Figure 56:
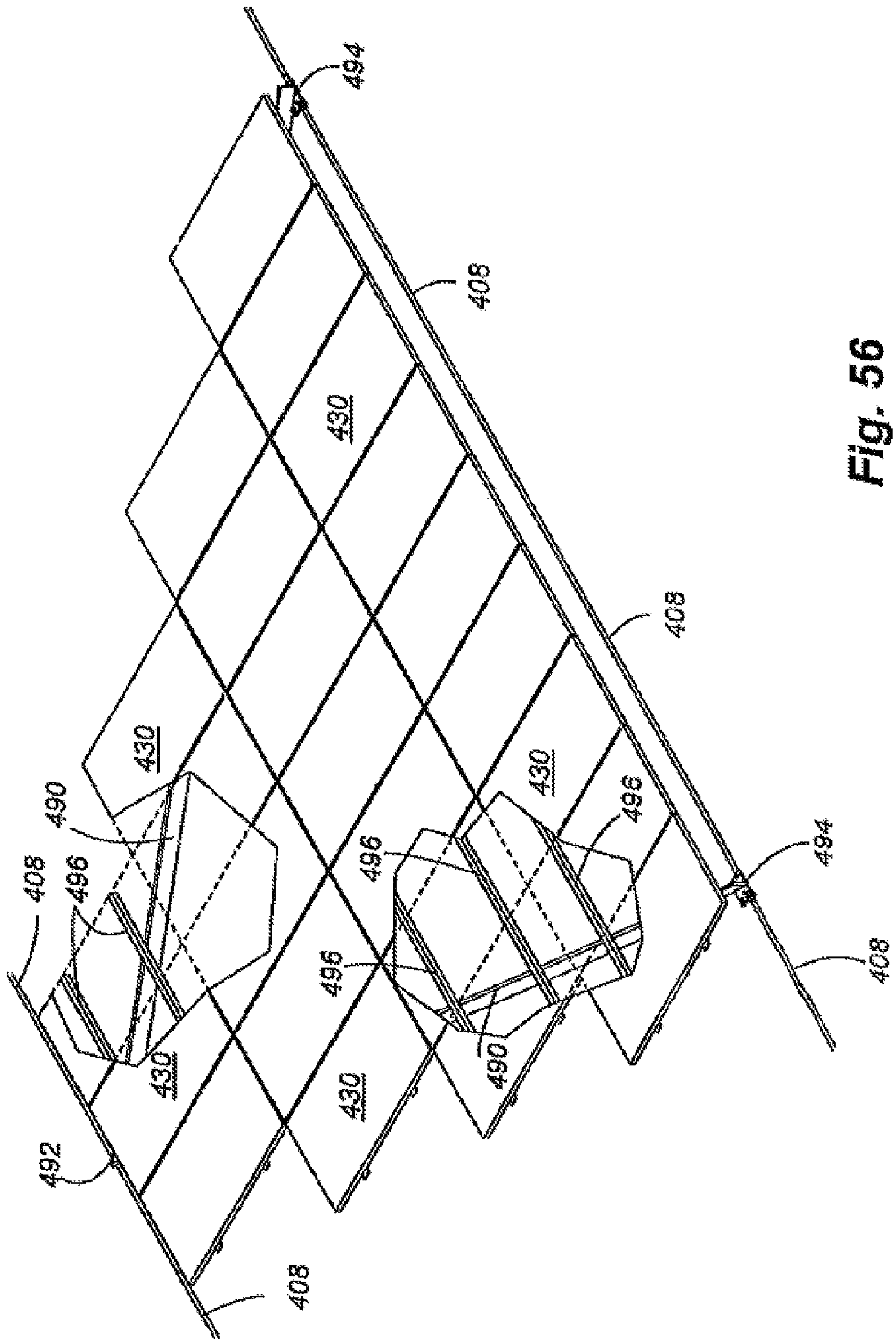
FIG. 56 is a perspective view of the embodiment of FIG. 55 illustrating the pod/receiver construction.

FIGS. 55 and 56 illustrate yet another preferred pod construction in accordance with the present invention. In this pod construction, a triangular configuration is achieved for the solar panels that are mounted to the pod 430. FIG. 55 is a bottom plan view that illustrates this pod construction wherein a pair of diagonal beams 490 extends from an apex connection 492. The beams 490 terminate at respective base connections 494. One cable 408 attaches to the apex 492 and the adjacent cable 408 attaches to the base connections 494. Adjustable U bolts may also be used at the apex connection 492 and the base connections 494 in order to provide a rigid connection from the cables to the beams 490. A plurality of longitudinally extending connecting struts 496 are spaced from one another and are secured to the diagonal beams 490. As shown, there are preferably two struts 496 that support each of the pods 430. The triangular shape of the pod is achieved by the selected lengths of struts 496.

FIG. 56 is a perspective view illustrating how the pods 430 appear when mounted with the triangular configuration.

Figure 57:
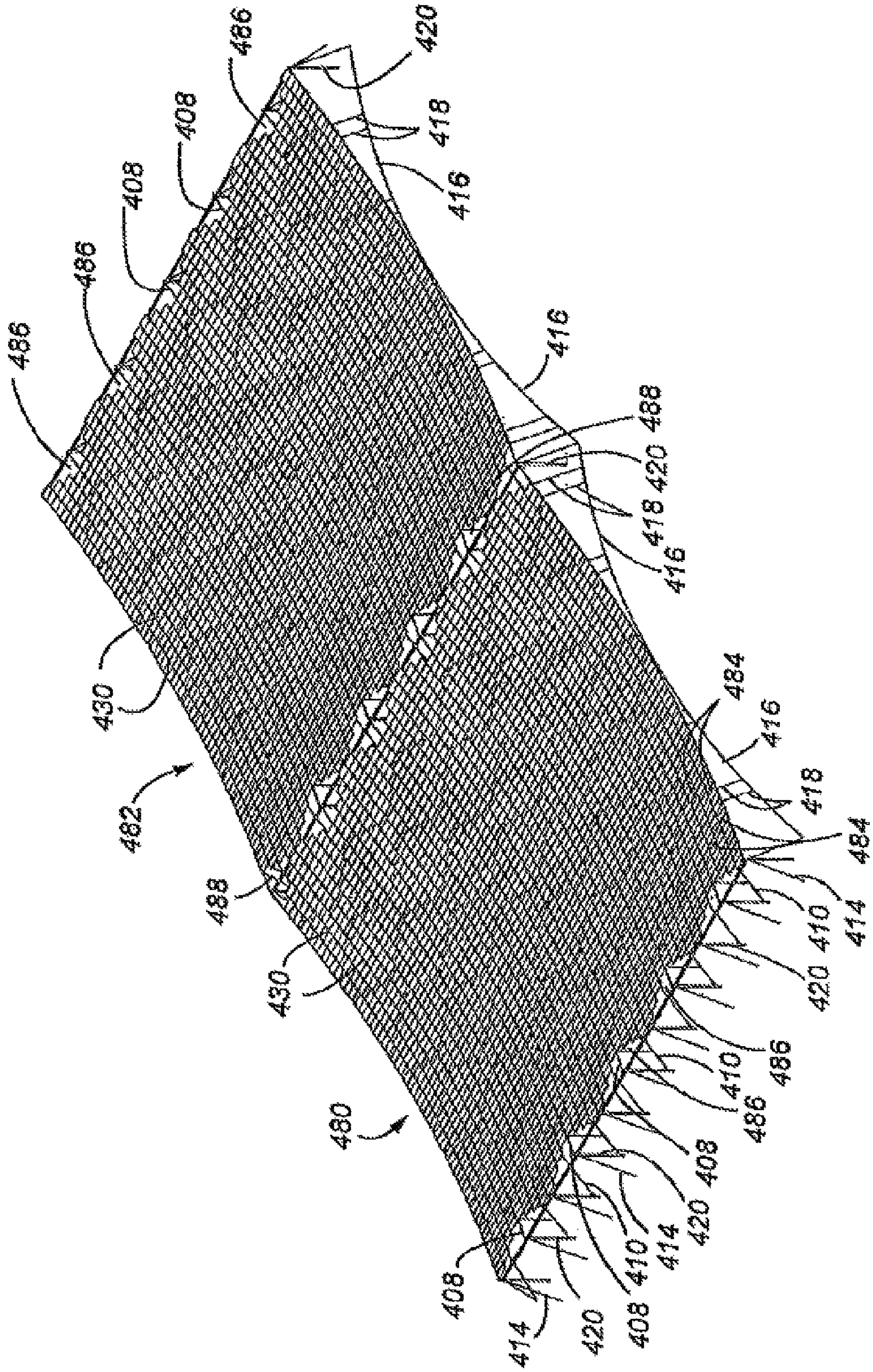
FIG. 57 is a perspective view of an array incorporating the triangular shaped pod/receivers shown in the embodiment of FIGS. 55 and 56.

FIG. 57 illustrates another example of an array wherein two spans 480 and 482 comprise an arrangement of solar panels that are mounted to the triangular pods 430. Like numbers in this figure also correspond to the same structure numbers as discussed above with respect to the embodiments shown in FIG. 42. When the pods 430 are secured to the cables 408, the triangular shaped arrangement of the solar panels allow the pods to be mounted in an overlapping configuration wherein the apex of one pod is mounted adjacent to one base side of the adjacent pod. Gaps 484 define the spaces between the solar panels mounted to adjacent pods. Gaps 486 are present at both opposite ends of the array and which illustrates the mounting arrangement of the triangular pods. In the center portion of the array, there is also a larger shaped gap 488 which again is produced by the triangular shape of the pods as mounted to the cables 408.

Figure 58:
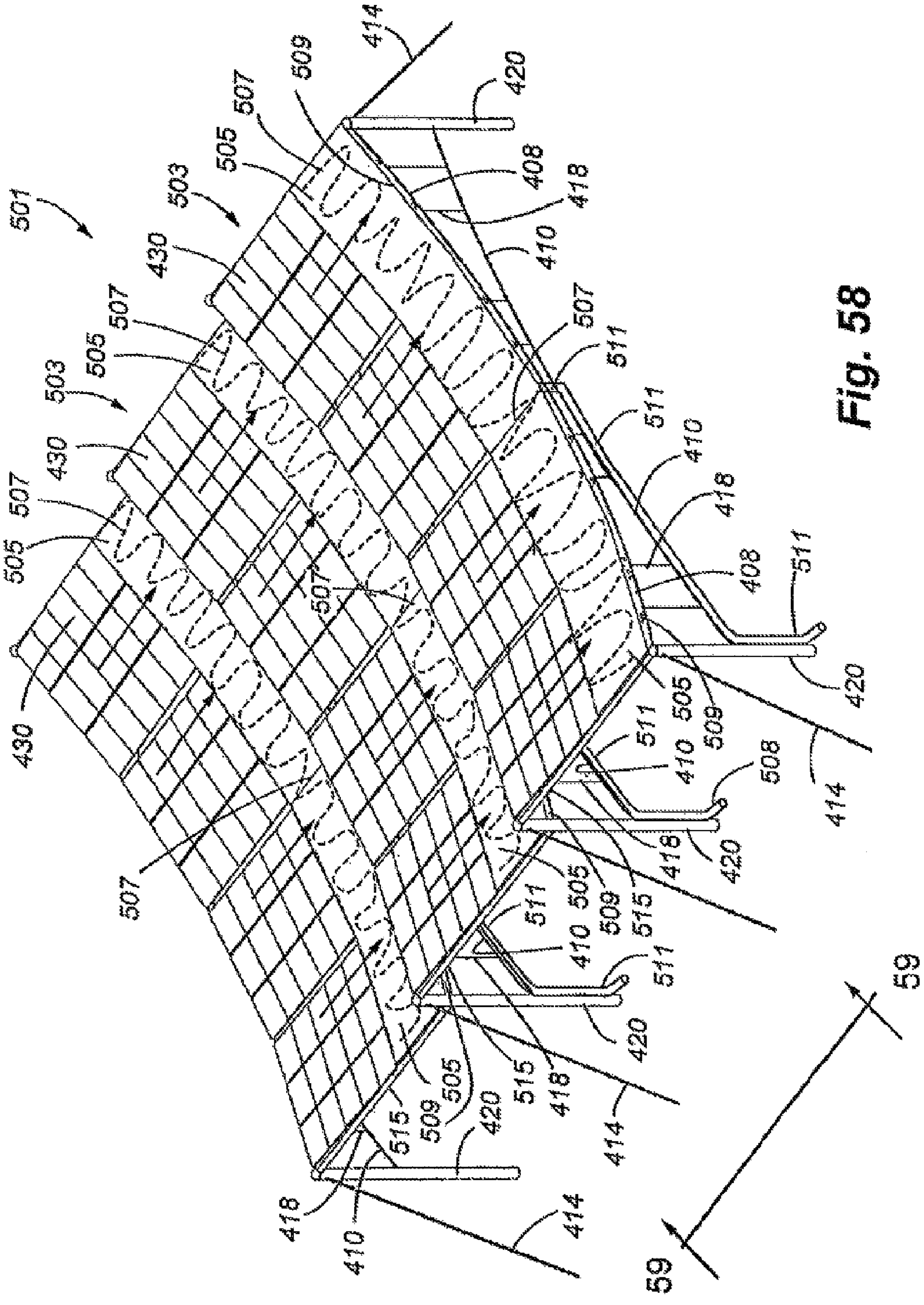
FIG. 58 is a perspective view of yet another embodiment in accordance with the present invention.
Figure 59:
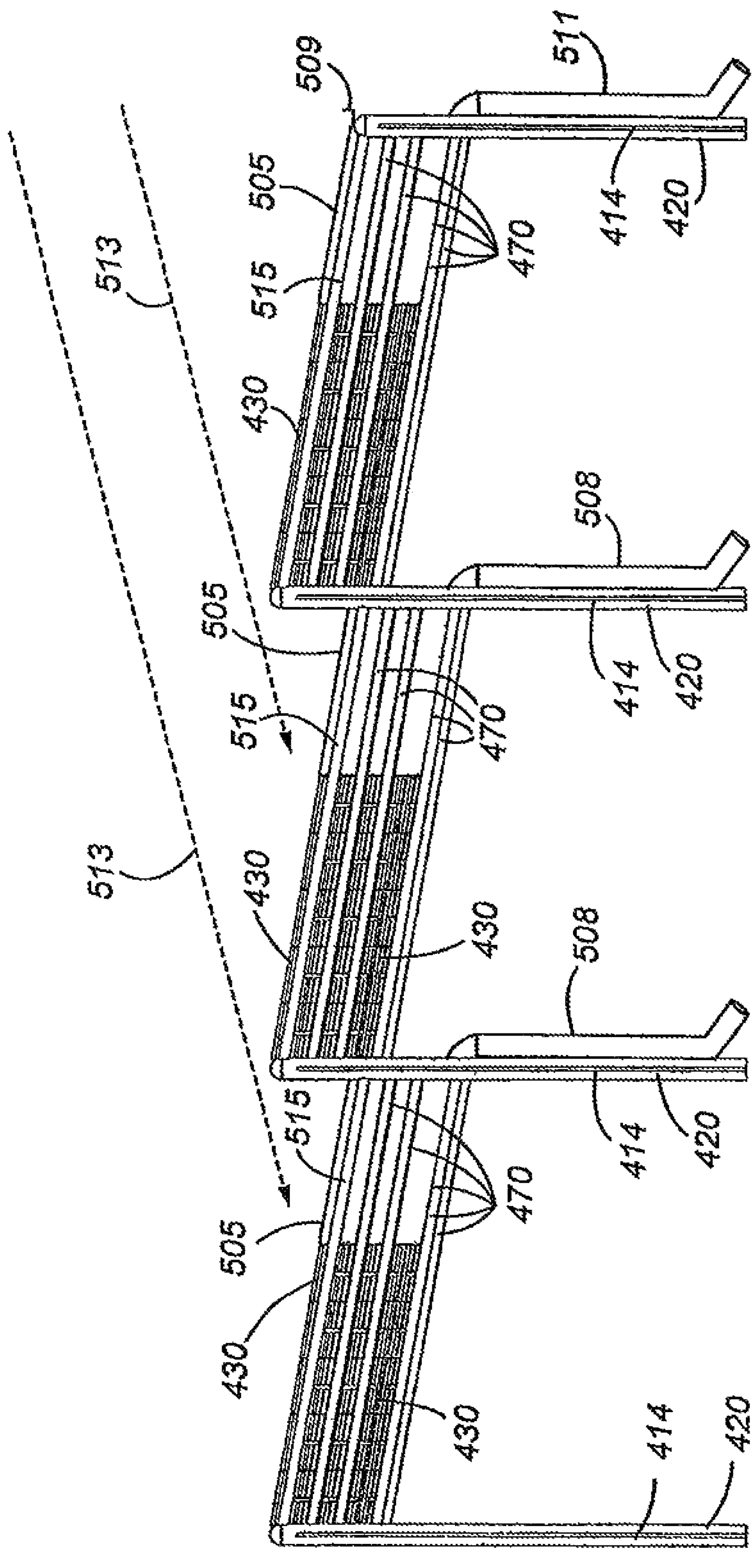
FIG. 59 is a side elevation view taken along line 59-59 of FIG. 58 illustrating further details of this embodiment.

FIGS. 58 and 59 illustrate yet another embodiment of the present invention in the form of an array 501 that is especially adapted for use in colder climates in which snow and ice are present during winter months. In this array 501, a plurality of rows 503 of pods are arranged in a parallel fashion and supported by respective cables and columns. Again, the same reference numbers used in this embodiment correspond to the same elements set forth above with respect to the prior embodiments. This particular embodiment shows that the pods 430 are tilted or canted at an angle. The front portion or edge of each of the pods includes heating sheets or panels 505 that extend continuously between the pods, one heating panel being located on each lateral side of the row 503. The heating panels 505 terminate or bisect at the middle 507 of each of the rows 503. Each of the heating panels or sheets 505 may incorporate a heating element 507, such as an electrical strip heater which is used to warm the panels 505 in order to melt snow or ice accumulating thereon. Referring also to FIG. 59, the incident angle of the sun is shown as dashed lines 513. These lines more particularly indicate the angle of the sun during winter months in which the heating panels 505 would be shaded during a significant portion of the daylight hours. If solar panels were used in lieu of the heating panels 505, then the solar panels would continue to accumulate snow and ice during the winter months, which would eventually cause a significant reduction in the area of the solar panels exposed to sunlight. As mentioned, the heating panels 505 are used to melt snow or ice, which then facilitates drainage of liquid from the pods 430 thereby keeping the array clear from snow or ice during periods of sunlight. Referring specifically to FIG. 58, the directional arrows illustrate that the melted ice/snow will travel downward to collect on panels 505. The crease or seam at the middle 507 constitutes the low point where the water will drain into a gutter 509 that is mounted to the front or facing surface of the heating panel 505. A drain line or downspout 511 is provided to collect the water from the gutter 509. As shown, the downspout 51 is secured to the lower cable 410, and traverses outward to one of the columns 420 where the water is then allowed to drain from the array. Each of the rows 503 includes the same drainage structure to drain water from each of the pods 430 in the row. Additional support may be provided between the cables 408 by cross supports 515 that interconnect the adjacent columns 420. The angle at which the pods are disposed can be modified to account for the position of the sun in the winter months. Thus, the area of the heating panels 505 can be minimized thereby increasing the available surface area for producing power from the pods 430.

Figures 60, 60A:
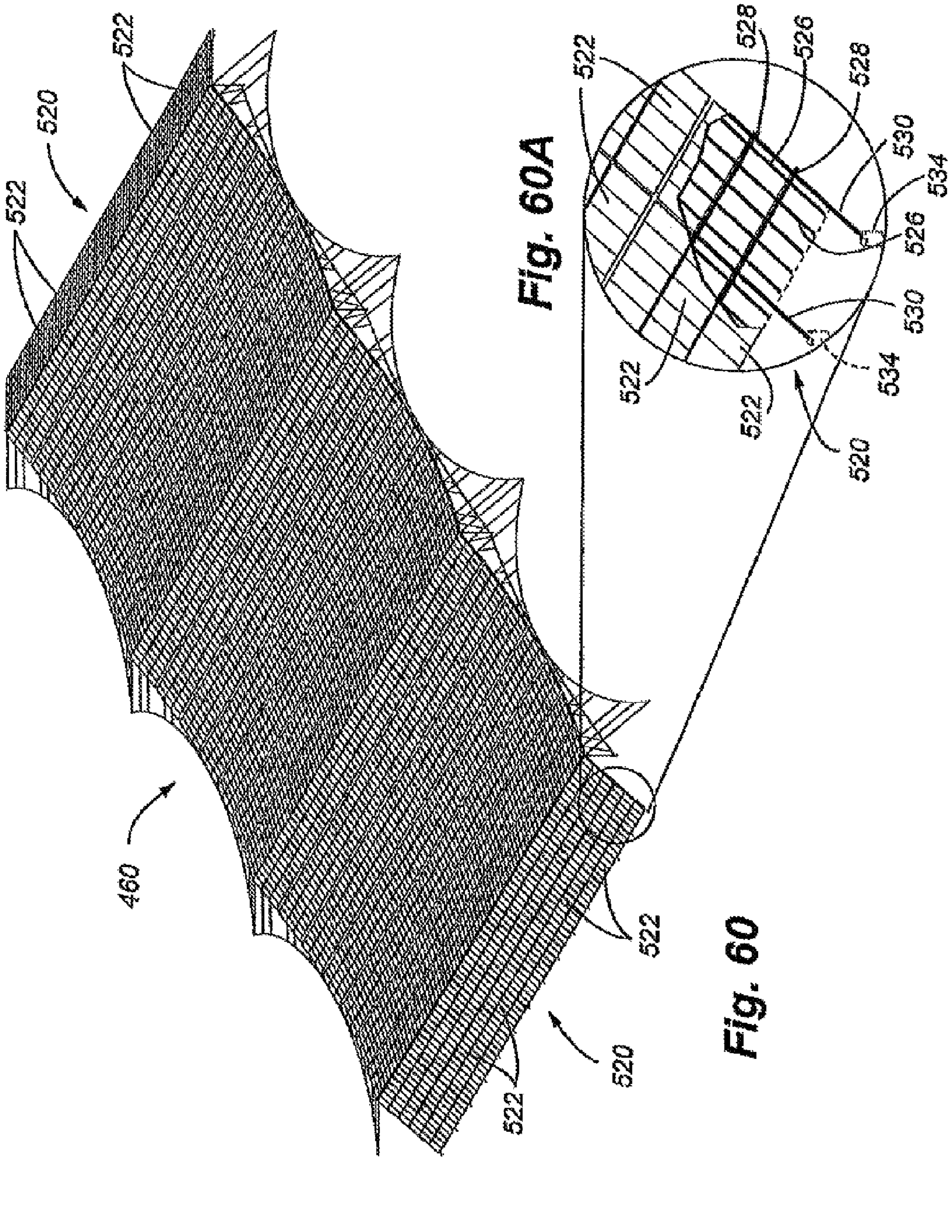
FIG. 60 is a perspective view of yet another embodiment of the present invention incorporating a pair of airfoils at each end of the array.
FIG. 60A is an enlarged fragmentary perspective view of one of the airfoils and specifically illustrating an example pod/receiver construction.

FIG. 60 illustrates yet another preferred embodiment of the present invention that adds an airfoil feature 520 which comprises a plurality of pods that extend from one side or end of the array to the ground. As shown in FIG. 60, there are two airfoil features, one at each longitudinal end of the array 460. The airfoil 520 can utilize the same pod and panel construction as used on the array 460. FIG. 60A illustrates an alternative construction for a receiver/pod that can be used to secure the solar panels 522. As shown in FIG. 60A, a frame arrangement including a plurality of vertical struts 526 and a plurality of horizontal struts 528 are used to support the solar panels 522. Strut extensions 530 can be used to secure the pods to anchors 534 set in the ground. Alternatively, in lieu of a strut extension 530 that makes direct connection with an anchor, a rod or cable may extend coterminous with one of the vertical struts 526 in order to secure the pods between the array 460 and the ground.

Because high wind conditions could damage the array 460, the purpose of adding airfoils 520 is to stabilize the array 460 during high wind conditions by making the array more aerodynamically shaped.

Although the embodiment of FIG. 60 illustrates that an airfoil 520 comprises additional solar panels, it is also contemplated that the airfoil 520 could be made of a fabric, or some other material that does not act as a sun collecting unit. The benefits of providing better aerodynamics would still be achieved with such an airfoil in which a lower pressure is experienced in the area under the array, while a greater pressure exists above the array in order to stabilize the array during high wind conditions.

Figure 61:
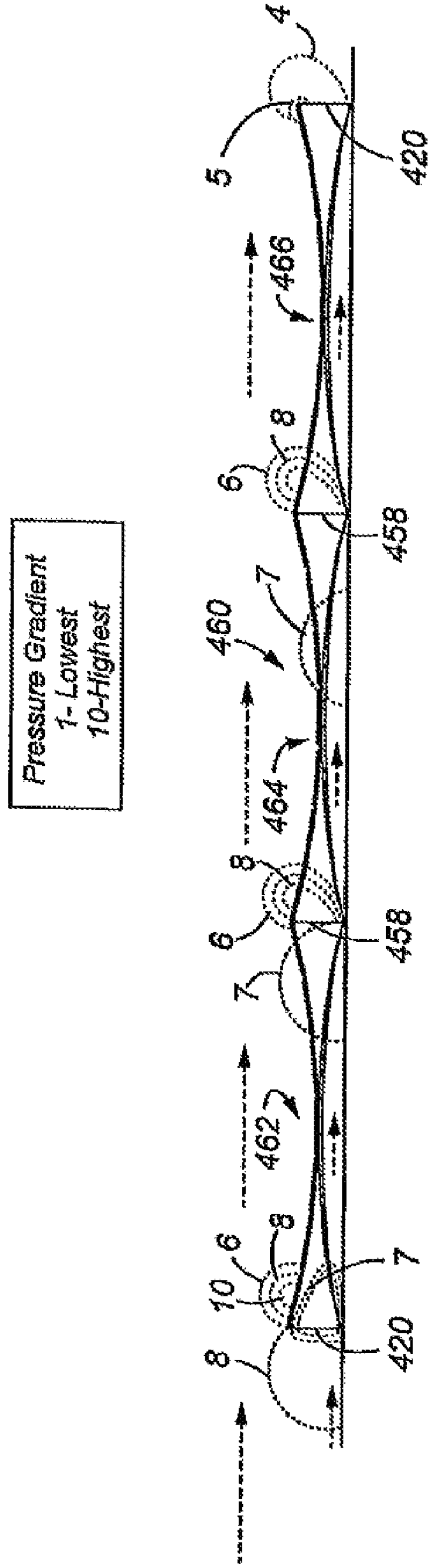
FIG. 61 is a side elevation view of one of the arrays of the present invention and specifically showing pressure patterns that are exerted upon the array based upon air flow traveling over and through the array.
Figure 62:
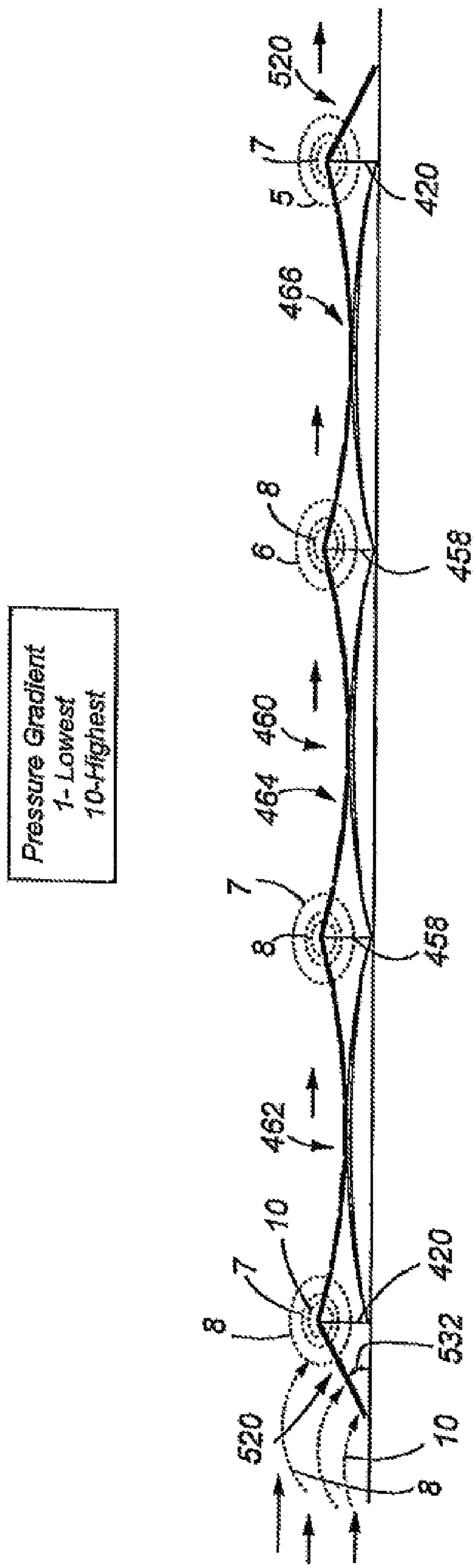
FIG. 62 is another elevation view of the array illustrated in FIG. 61 but further incorporating airfoils that change the resulting airflow pattern as air contacts the array.

Referring to FIGS. 61 and 62, side elevation views are provided to illustrate how airflow, specifically wind, creates pressure gradients on the array 460 with and without the use of airfoils 520. FIG. 61 illustrates an array 460 without airfoils. Directional arrows show an airstream that flows over and through the array. In FIG. 61, the high pressures areas are indicated by the circular or curved lines, and these lines are labeled on a scale from 1 to 10, 1 being the lowest pressure and 10 being the highest pressure areas. As shown, the highest pressure areas form on the leading edge of the array. Pressure areas are also formed over the respective columns 458 and 420. These higher pressure areas over the columns 458 and 420 are generally advantageous for holding down the array during high wind conditions. That is, the higher pressures over the columns are transmitted as downward forces to the columns that help to hold the columns in place during high wind conditions. However, the particularly high pressure area located at the leading edge of the array is problematic in that this high pressure could cause damage to the front portion of the array, and can otherwise degrade the stability of the array by lifting the front portion of the array away from the ground. Furthermore, significant airflow passes through and underneath the array which can also cause additional movement and vibration of the cables and columns. Referring to FIG. 62, the airfoils 520 are added to the array, and the pressure gradients have changed such that most of the pressure is located on top of the array, and there is very little pressure underneath the array due to the airfoils 520 directing the airflow over the top of the array. A higher pressure area is created just upstream of the airfoil 520; however, because of the angled orientation of the airfoil 520, this increases the downward force of the wind which further stabilizes the array in high wind conditions. In fact, as the wind speed increases, the greater the downward force that is transmitted to the array that assists to stabilize the array. FIG. 62 also shows some high pressure areas located over the columns 458 and 420 that also help in anchoring the array to the ground. With respect to the airfoil located at the trailing edge of the array, a pressure gradient also develops, but it is smaller than the pressure gradient located at the upstream or facing side of the array.

The angle 532 that is formed between the airfoil 520 and the surface upon which the system is mounted can be adjusted to best provide the desired air pressure over the system to avoid system damage during high wind conditions. This angle can be adjusted by lengthening or shortening the span of the airfoil 520 between the column 420 and the mounting surface.

For winds that contact the array in the lateral or transverse direction as opposed to the longitudinal direction, as evidenced by the elevation view of FIG. 62, wind has very little effect on the array since the profile of the array is minimized with little interfering structure with the airflow. The symmetrical nature of how the pods in each row align with one another, as well as the aligned arrangement of the cables and columns provides this minimum aerodynamic profile for minimum wind interference. By provision of the airfoils 520, the array is better able to withstand high wind conditions and stability is actually increased as wind speeds increase.

Figure 63:
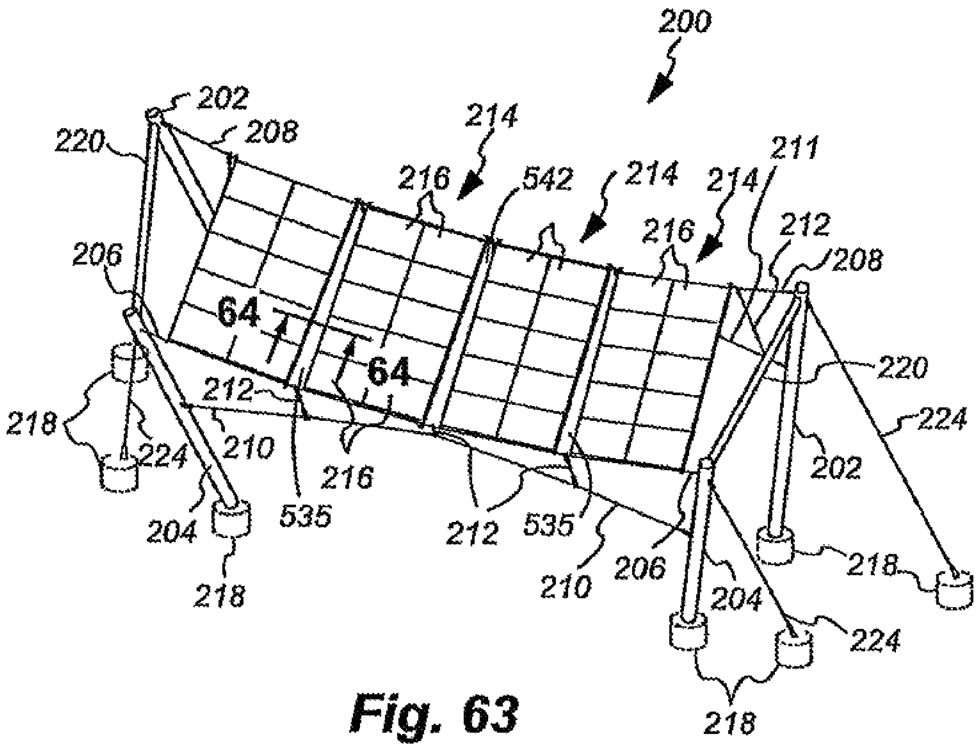
FIG. 63 is a perspective view of the embodiment illustrated in FIG. 14 but further incorporating flexible sealing brackets between the receivers.
Figure 64:
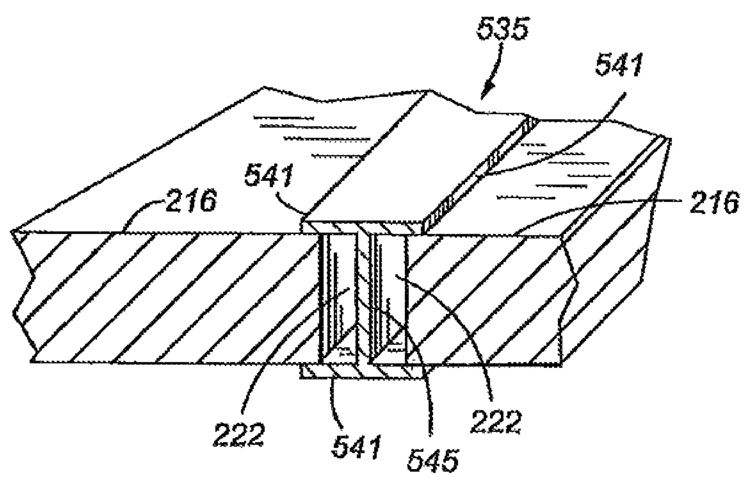
FIG. 64 is an enlarged fragmentary perspective view taken along line 64-64 of FIG. 63 illustrating details of a sealing bracket.

FIG. 63 illustrates a modification to the embodiment of FIG. 14. In FIG. 63, the gap or spaced 222 between the pods 214 is filled with a flexible sealing bracket 535 as shown in detail in FIG. 64. In the event it is undesirable for water to pass through the gaps between the pods 214, such as when the array is used for a protective parking structure, the flexible sealing bracket 535 spans the gap 222 and interconnects the facing ends of adjacent solar panels 216. The bracket 535 is shown as an I-beam having a pair of flanges 541 interconnected by a web 545. The ends of the solar panels 216 are frictionally engaged between the upper and lower flanges 541 on each side of the web 545. The brackets 535 can be made from flexible and elastomeric material such as synthetic rubber. Because the bracket 535 is flexible, some shifting or movement is allowed between the facing solar panels 216 in order to dampen or absorb movement of the cables which otherwise may cause a torsional force to be transmitted to the panels.

It shall be understood that the preferred embodiments of the present invention may incorporate any one of the pods/receiver constructions to best fit the particular installation needs. Thus, in some installations, it may be preferable to have curved struts as opposed to straight struts, or vice versa. The particular pod/receiver construction can also be selected based upon its structural rigidity and capability to mount a selected number of solar panels. The number of struts/beams used in any of the pods/receiver constructions can be selected to minimize required materials, but satisfy the rigidity and strength requirements for the particular installation.

Additionally, it shall be appreciated that the number of solar panels mounted to each pod can be configured for the particular installation. Thus, the pods may contain more or less solar panels as compared to what is illustrated in the preferred embodiments.

The flexible electric cables 82*a* and 82*b* may be incorporated in each of the embodiments of the present invention in order to allow each of the solar panel arrays to be coupled to a substation for gathering of produced power. As also mentioned, the solar panel arrays may be electrically coupled to sources of stored electric power such as batteries or fuel cells. Other arrangements of electrical cables may be used to most effectively transfer power from the solar panels to the power storage location or to a substation.

It will also be appreciated that due to the unique manner in which the solar panels may be supported by the modular nature of the pods, there is almost a limitless combination in the shape and size of an array that can be constructed for installation. The cables and columns can be arranged to provide the necessary support for not only very differently sized and shaped arrays, but also arrays being either ground mounted or overhead mounted.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

Figure 65:
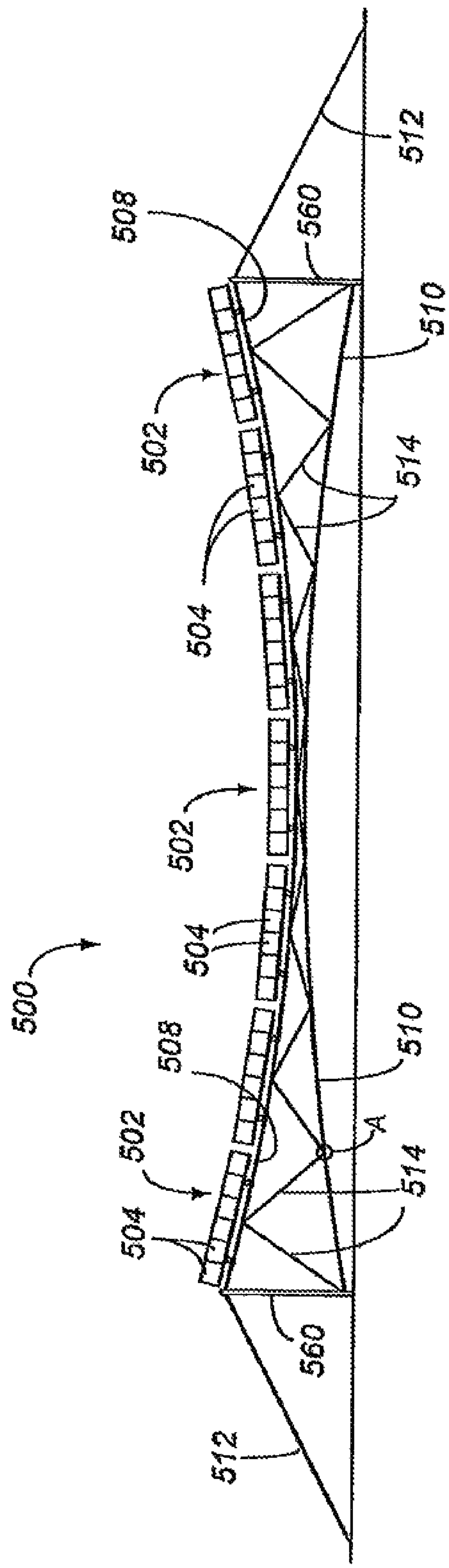
FIG. 65 is an elevation view of another preferred embodiment of the present invention including an adjustable tensioning device.

FIG. 65 illustrates another embodiment of the present invention in which a capability is provided for selectively tensioning one or more of the cables used to support the solar panels. This embodiment shows a solar panel array 500 including a plurality of solar panels 504 mounted to respective pods/receivers 502. Vertical columns 560 are arranged at ends of a span in which an upper main cable 508 and a lower main cable 510 extend between the columns 560. A continuous interconnecting cable 514 traverses between the upper and lower cables. Anchor lines/cables 512 connect to the upper ends of the columns 560 and extend to the ground adjacent the columns.

Continuous interconnecting cables 514 may be selectively tensioned in order to provide the adequate rigidity and support for the overhanging pods 502. Detail A in FIG. 65 is enlarged in FIG. 66 to illustrate a tensioning device/mechanism 516 used to selectively tension cable 514. It shall be understood that each one of the points of intersection between cable 514 and the upper cable 508 and lower cable 510 may include a respective tensioning device 516. In the event that each of the intersection points include a tensioning device, the cable 514 can therefore be conveniently tensioned along its entire length by only having to secure and manipulate the free end of the cable.

Figure 66:
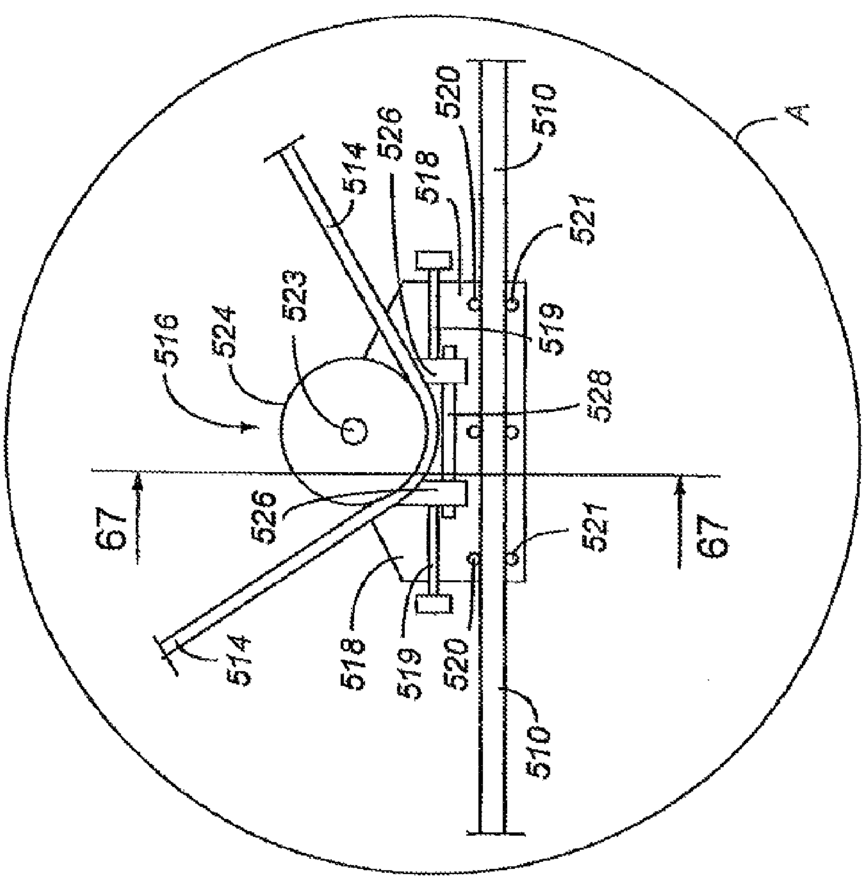
FIG. 66 is an enlarged view of a portion of FIG. 65 illustrating the adjustable tensioning device.

Referring specifically to FIG. 66, the tensioning device 516 is shown in connection with one preferred embodiment of the present invention. Lower cable 510 acts as the mounting support in which to selectively tension the cable 514. The tensioning device 516 is characterized by a base 518 in the form of a plate, and a plurality of cable clamps 521 that are used to secure the base 518 to the lower cable 510. Alternatively, another base plate 518 (not shown in FIG. 66) can be used in which the other elements of the tensioning device 516 are located between the base plates, and the base plates are secured to the cable 510 by the use of threaded bolts in lieu of the cable clamps 521.

Figure 67:
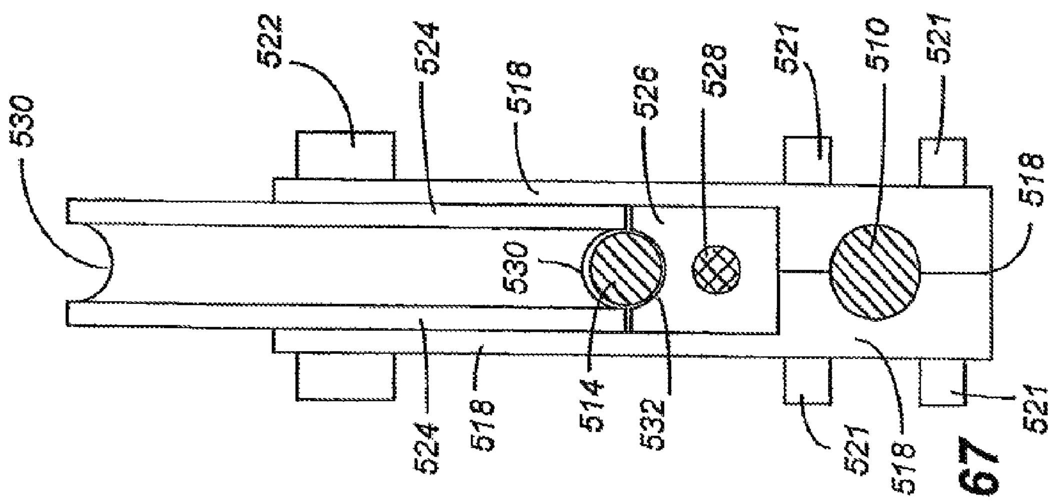
FIG. 67 is a cross sectional view taken along line 67/67 of FIG. 66 illustrating further details of the adjustable tensioning device.

A hub 523 is rotatably secured to an upper end of the base 518 and the hub mounts a roller 524 which receives the cable 514. Also referring to FIG. 67, additional details of the tensioning device are shown. After the cable 514 has been placed under a desired amount of tension, locking members 526 engage the cable 514 and hold the cable 514 against the roller 524. The locking members 526 may be provided in pairs by use of an interconnecting adjusting rod 528 which spaces the locking members 526 at a desired distance for optimum engagement against the cable 514. Locking pins/bolts 519 lock the locking members 526 in place against the cable 514. The locking pins 519 may be routed through threaded openings (not shown) in the base 518 or may otherwise be attached to the base 518 so that one end of the locking pins can engage the locking members 526. As shown in FIG. 67, a channel 530 is formed in the roller 524 to receive the cable 514. FIG. 67 also shows an abutting pair of base plates 518 having a complimentary opening formed therethrough for receiving the lower cable 510. The base plates 518 are secured to one another to hold the cable 510 as by the cable clamps/bolts 521.

The tensioning device illustrated in FIGS. 66 and 67 may be used for selective tensioning of any of the cables in the system of the present invention. This cable tensioning capability can also be modified such that only selected tensioning devices have a locking feature for locking the cable to be tensioned, while other tensioning devices simply have rollers that allow the cable to move through the device so that the cable is locked in place at another of the tensioning devices.

Figure 68:
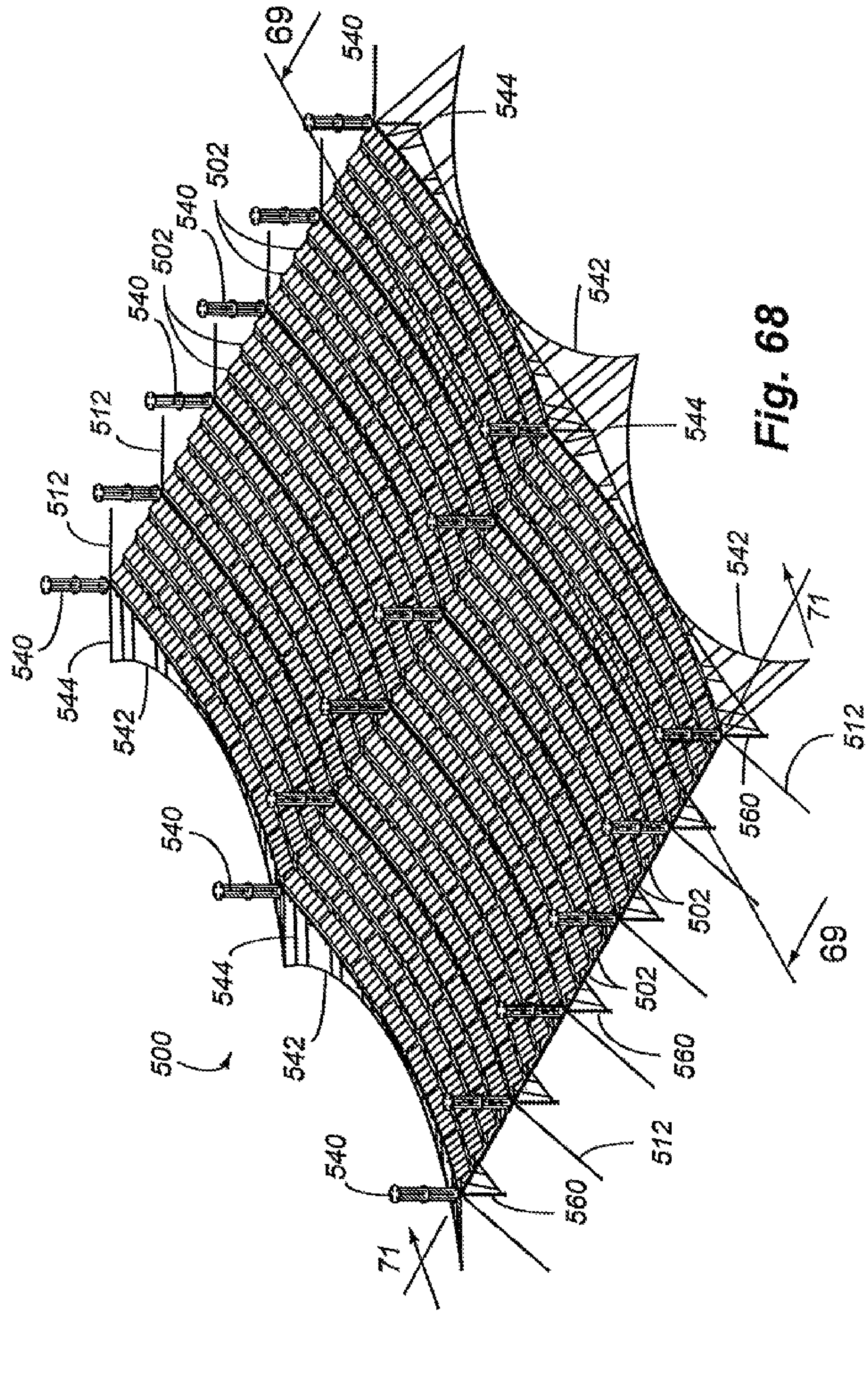
FIG. 68 is a perspective view of another embodiment of the present invention including a plurality of vertical axis windmills mounted to columns of the solar panel array.
Figure 69:
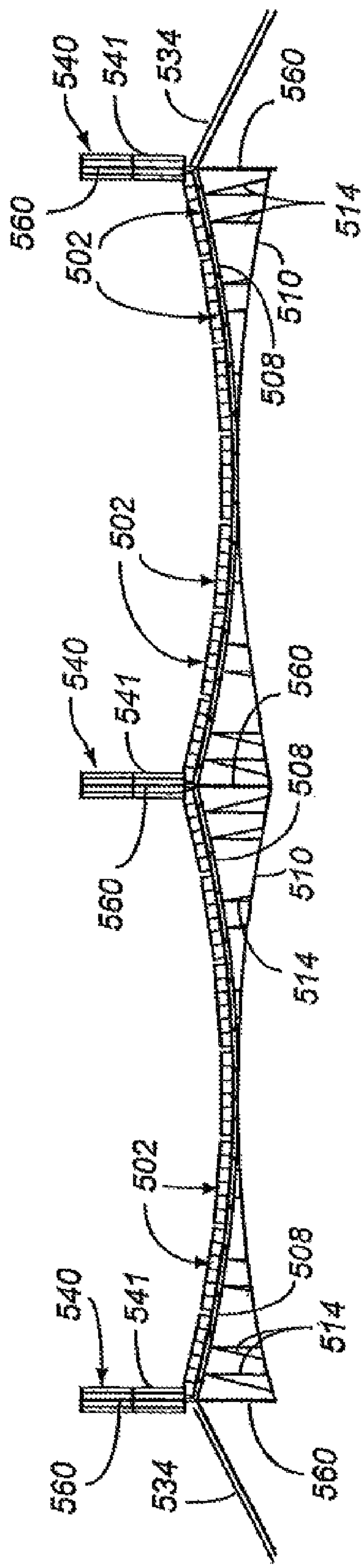
FIG. 69 is an elevation view of the embodiment of FIG. 68 taken along line 69-69 further including airfoils connected to opposing ends of the array for modifying airflow over the array and thereby enhancing the ability of the windmills to produce power.
Figure 70:
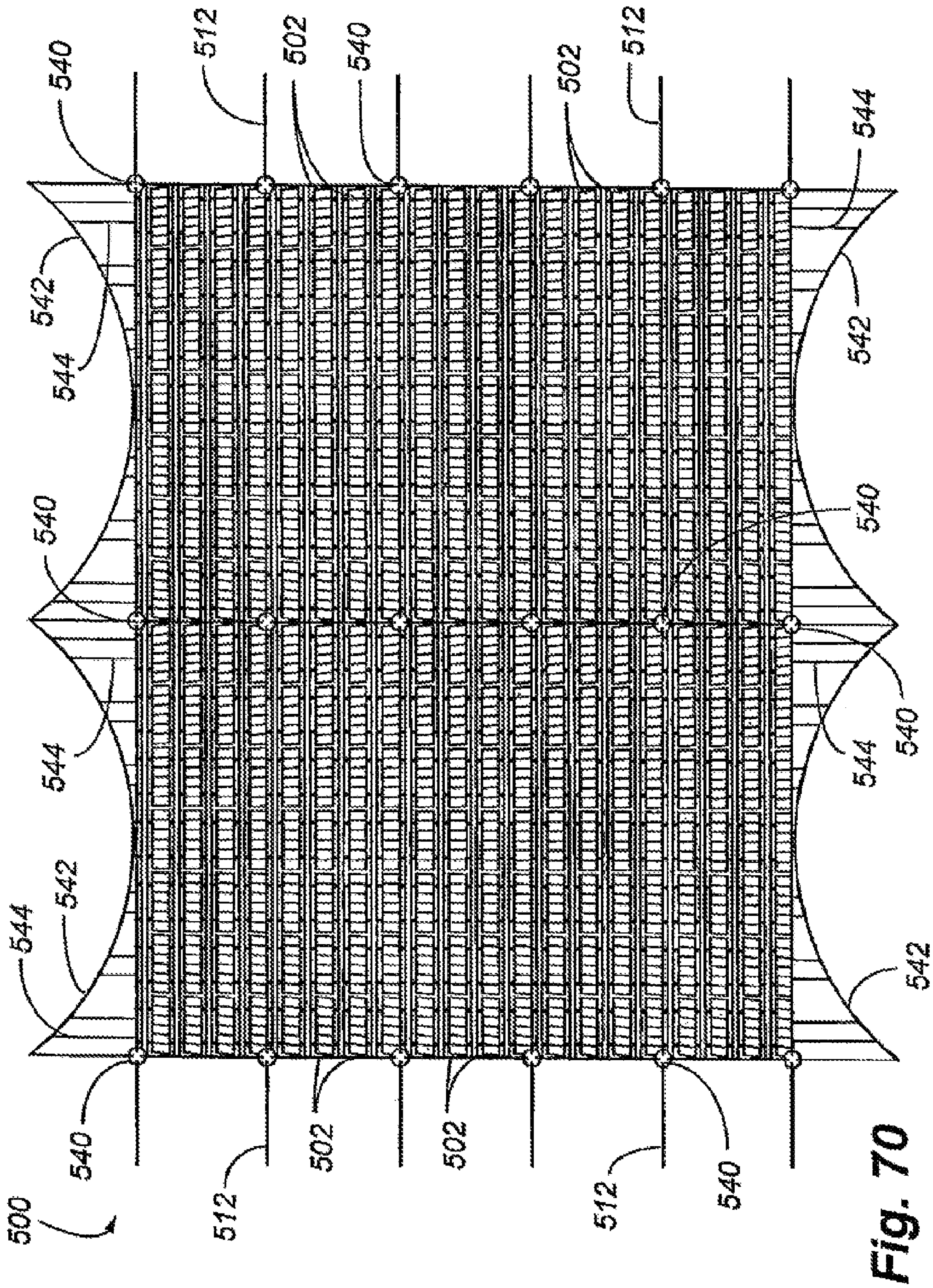
FIG. 70 is a plan view of the embodiment of FIG. 68.
Figure 71:
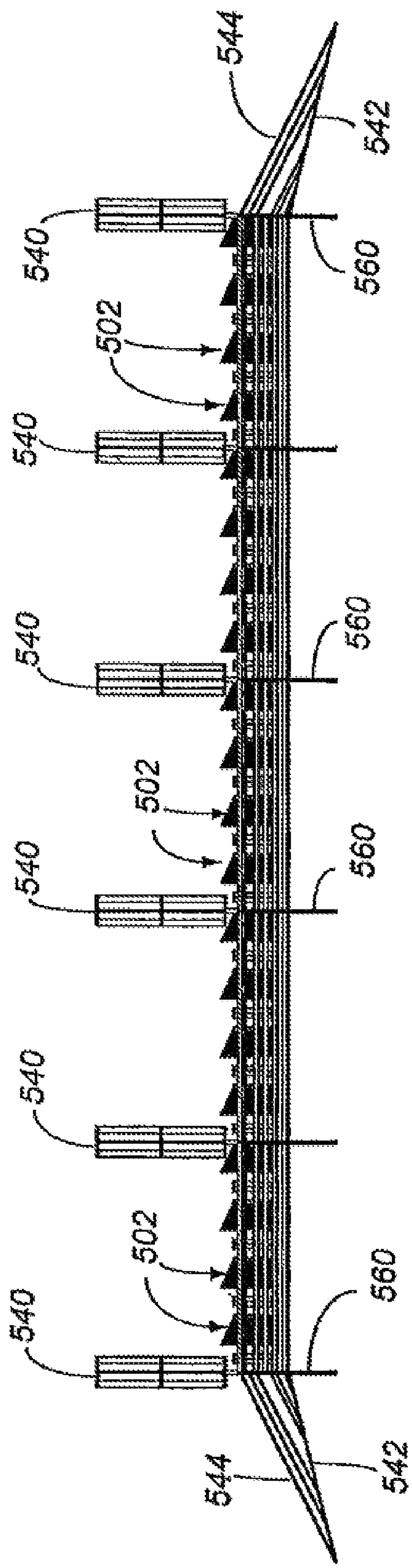
FIG. 71 is a cross-sectional view taken along line 71/71 of FIG. 68 illustrating further details of the embodiment of FIG. 68.

FIGS. 68-71 illustrate yet another preferred embodiment of the present invention. Two spans of pods 502 are hung between outer rows of columns 560 and one interior row of columns 560. Catenary cables 542 are also shown along with their corresponding catenary interconnecting cables 544. In this embodiment, the solar panel array 500 is provided in which a supplementary means is provided for producing power in the form of vertical axis windmills 540 that are selectively mounted to the columns 560. A vertical axis windmill in the present invention includes those power producing windmills that rotate about an axis that extends vertically. Vertical axis windmills of the type shown in FIG. 68 have a number of advantages in terms of spaced savings, efficiency in producing power, and minimizing materials. One example of a vertical axis windmill includes a Ropatec™ windmill. As shown, the same columns 560 which support the pods 502 can also be used as the central support which remains stationary in the windmill, and about which rotate the blades or fins of the windmill. As best seen in FIGS. 69 and 71, the vertical axis windmill 540 has blades or vanes that are configured in a circular cage 561 about the column 560. The cage 561 rotates about the column 560 as powered by wind that strikes the blades of the cage. Thus, the vertical axis windmills 540 incorporate the columns 560 which are extended in length to provide a central support for the surrounding cage 561. FIG. 69 also illustrates airfoils 534 that can be used to modify the airflow over the array. As discussed above with respect to FIG. 62, varying pressure gradients may be established by including or not including airfoils. Also, whether airfoils are used or not, there is a tendency for air traveling over and around the array to have a higher pressure at the locations of the columns 560. Therefore, mounting the vertical axis windmills about the locations of the columns provides increased airflow speed which in turn, increases wind energy that can be used to drive the windmills. This unique aspect of the present invention in terms of creating optimal pressure gradient conditions around the vertical axis windmills can greatly enhance the overall power production of the system. FIG. 70 is a plan view of the embodiment of FIG. 68, illustrating the locations of the vertical axis windmills. FIG. 71 shows how the vertical axis windmills 540 are formed as part of the columns 560, and wherein the vertical axis windmills extend above the level of the solar panels thereby ensuring that the desired arrangement and spacing of the solar panels is not disrupted.

Figure 72:
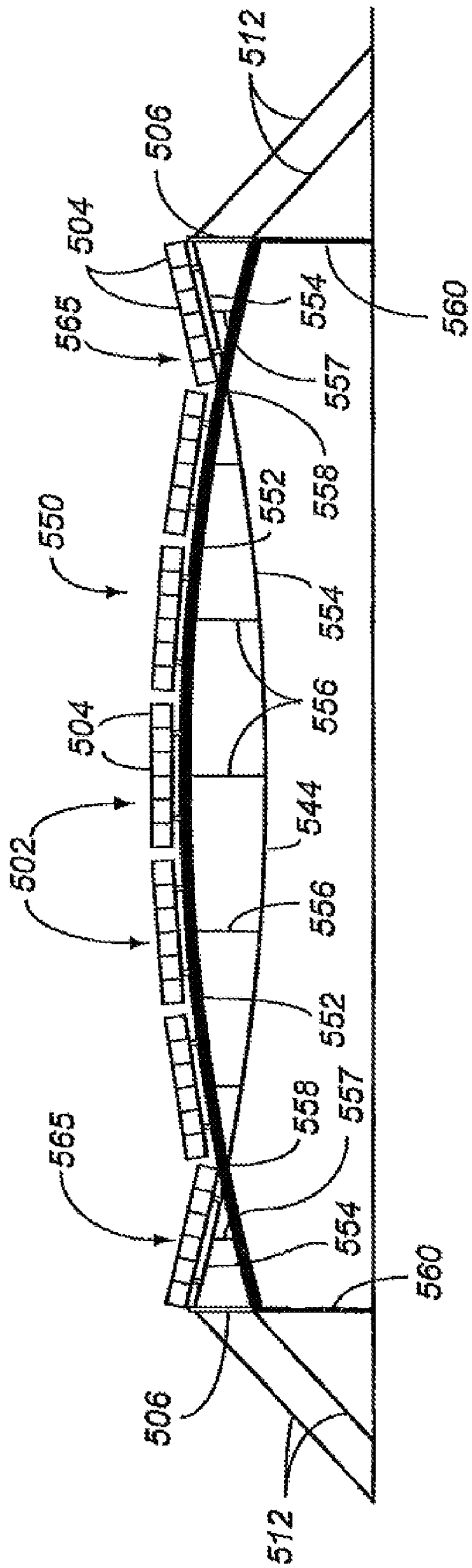
FIG. 72 is an elevation view of another embodiment of the present invention incorporating a combination of tension and compression members in a truss enabling a convex and concave mounting of solar panels.

FIG. 72 illustrates another preferred embodiment of the present invention in which a compression truss structure is utilized to support an overlying convex arrangement of pods 502 with solar panels 504. More specifically, FIG. 72 illustrates an upper main support member 552 and a plurality of pods/receivers 502 mounted on the upper support member 552. The upper member 552 can be a cable, or can be a rigid member such as a tube in which the upper support member can also function as the roof top or roof support for an underlying structure (not shown) located beneath the solar panel arrays. A lower main support cable 554 is also provided along with a plurality of interconnecting compression members 556 that interconnect the upper support member/cable 552 to the lower support cable 554. The interconnecting compression members 556 may be standard pipe, structural tubes, or other rigid supports. The convex mounted solar panels 504 on the pods 502 therefore produce a compression force against the truss formed by the combination of the upper and lower cables and the interconnecting compression members. FIG. 72 also provides a unique arrangement in which the pods mounted closest to the columns 560 are reverse or concave mounted. In this reverse mounting, the reverse or concave mounted pods 565 are mounted on the lower cables 554 that extend above the upper cable/support 552 since the lower cable 554 continues in an upward arc as shown. The points where the cables/supports 552 and 554 intersect are shown as inflection or intersection points 558. The cables 552 and 554 may be secured to one another at these inflection points 558 by pivot connections.

Figure 73:
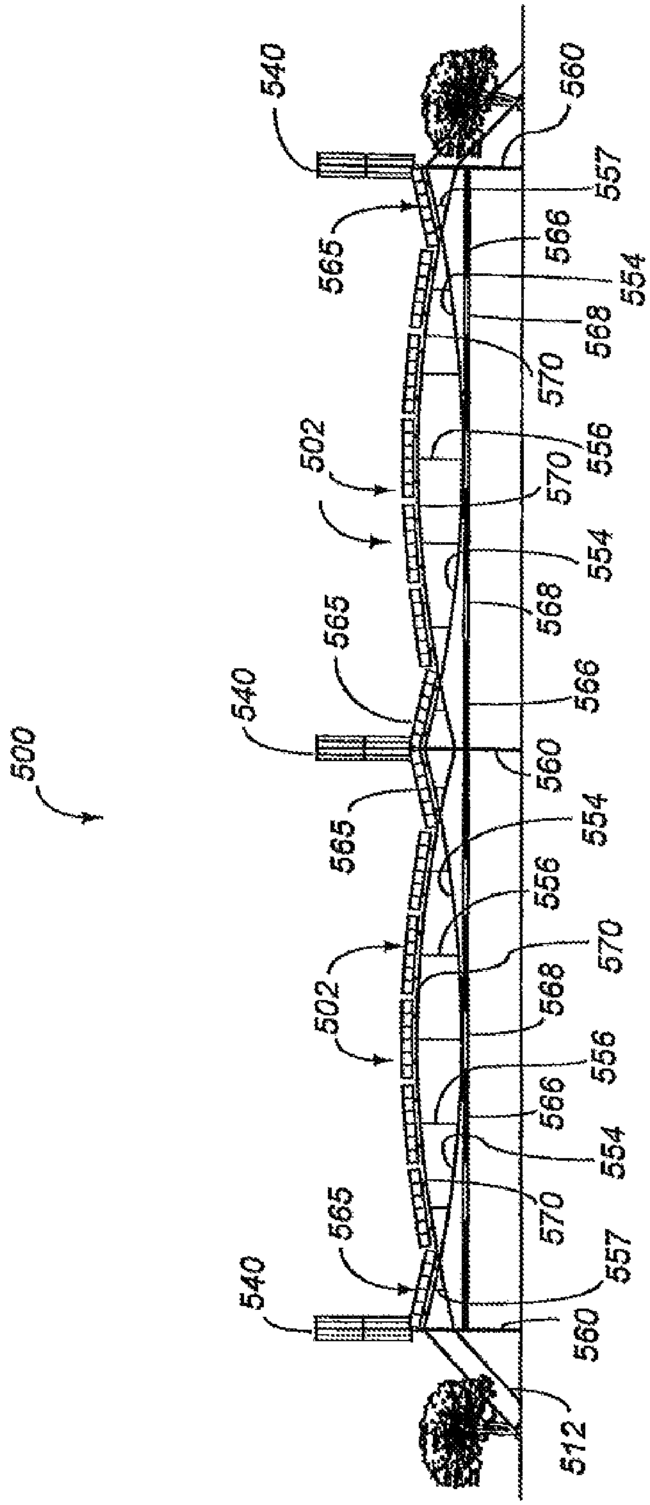
FIG. 73 is an elevation view of the embodiment of FIG. 72 showing an additional span of pods and vertical axis windmills incorporated in an installation of the solar panel array with a building.

FIG. 73 illustrates a modification to the embodiment of FIG. 72 in which two spans are provided along with vertical axis windmills 540 located at the columns 560. The embodiment of FIG. 73 illustrates that the solar panel arrays 500 are used to cover a structure such as a building having a roof 566, and one or more skylights or openings 568 formed in the roof 566. Also in FIG. 73, the upper main support is shown as a cable 570 in which compression trusses are defined by pairs of upper and lower cables 570 and 554, and interconnecting vertical compression members 556. The embodiment of FIG. 73 also provides the crossing arrangement of the upper and lower cables in which the reverse mounted end pods 565 are located adjacent to the columns. The embodiment of FIG. 73 is ideally suited for incorporation within a building structure. The columns 560 may be vertical columns of the building or load bearing walls of the building. As mentioned, the vertical axis windmills 540 provide supplementary power and the combination of the windmills and the solar panels may provide adequate power for most of the operating requirements for the underlying building.

In lieu of element 566 denoting a roof with openings, element 566 may also denote some other type of protective covering such as a an impermeable membrane made of plastic or a permeable membrane of cloth to provide shelter under the array of solar panels. For example, if the solar array is intended to cover crops, the element 566 may denote a covering of a particular density/porosity allowing a desired amount of sunlight passage best suited for the particular crop chosen. The covering can also be used to protect the crop from hail damage thus the covering can also be constructed to strength specifications to withstand potential hail damage.

Figure 74:
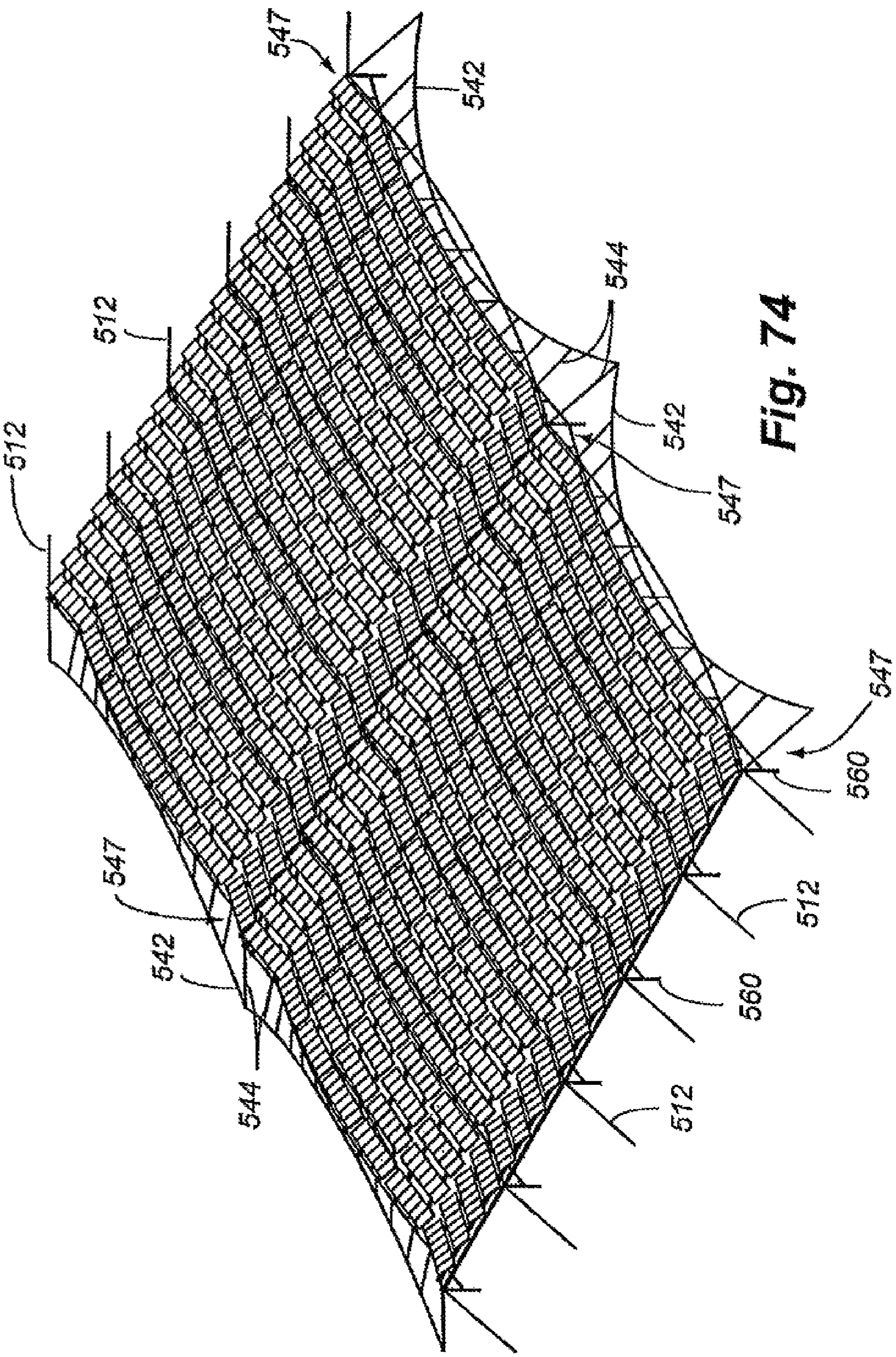
FIG. 74 is a perspective view of a solar panel array as shown in the embodiment of FIG. 73, with the vertical axis windmills and the underlying roof structure removed for clarity to show the arrangement of the array.

FIG. 74 is a perspective view of the embodiment of FIG. 73 with the windmills 540 and the roof 566 removed for clarity. As shown, the reverse mounted pods 565 form humps 547 at the center area of the array as well as at the opposing ends of the array. This reverse mounting of the pods 565 may be useful in preventing inadvertent shading of the end mounted pods by the convex pattern of pods 502 located interiorly of the outer pods.

Figure 75:
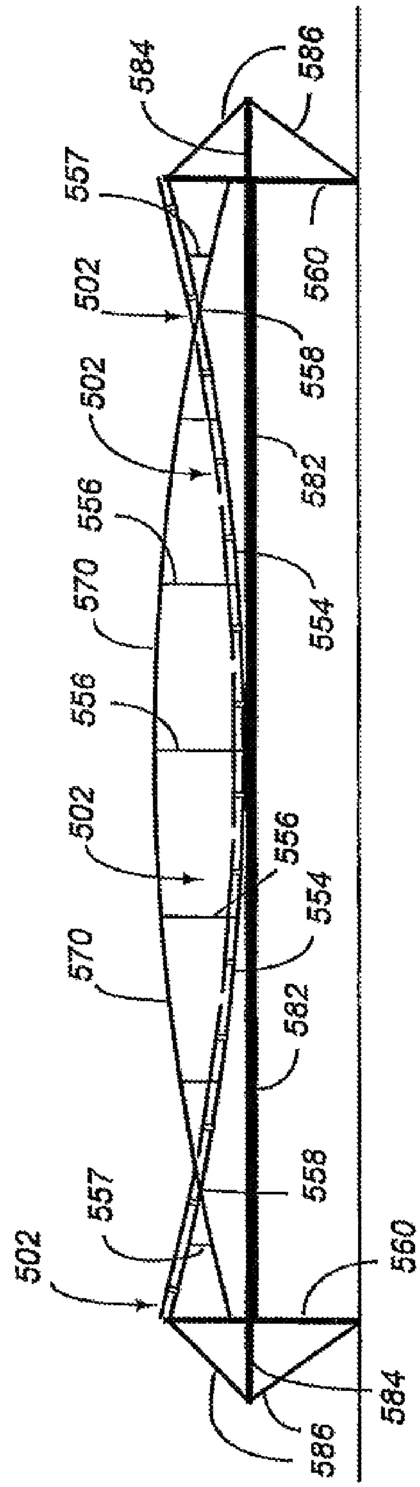
FIG. 75 is an elevation view of yet another embodiment of the present invention illustrating a compression truss with solar panels mounted on the lower main cable producing a concave arrangement of the solar panels.

Referring to FIG. 75, a further alternative arrangement is provided with respect to a compression truss, and the manner in which pods 502 may be mounted to the compression truss. In the example of FIG. 75, the pods 502 are all mounted on the lower main cable 554. This embodiment may also be incorporated over a building structure in which the building has a roof defined by member 582, and the columns 560 could be vertical column supports of the building structure and/or load bearing outer walls of the building. The roof/member 582 may extend outwardly from the building and beyond the most outer or peripheral vertical supports 560. Roof extensions or overhangs 584 may be used to secure cables 586 or tensioning rods to produce the necessary lateral anchoring for the solar panel array. Thus, the overhangs 584 eliminate the need to anchor the columns with anchor lines that extend to the ground. Also in the example of FIG. 75, it is noted that the vertical interconnecting members 557 underlying the outermost pods 502 are in compression, while the members 556 are in tension. Thus, in this embodiment, the members 556 could be cables in lieu of rigid members and the members 557 could be rigid members.

Figure 76:
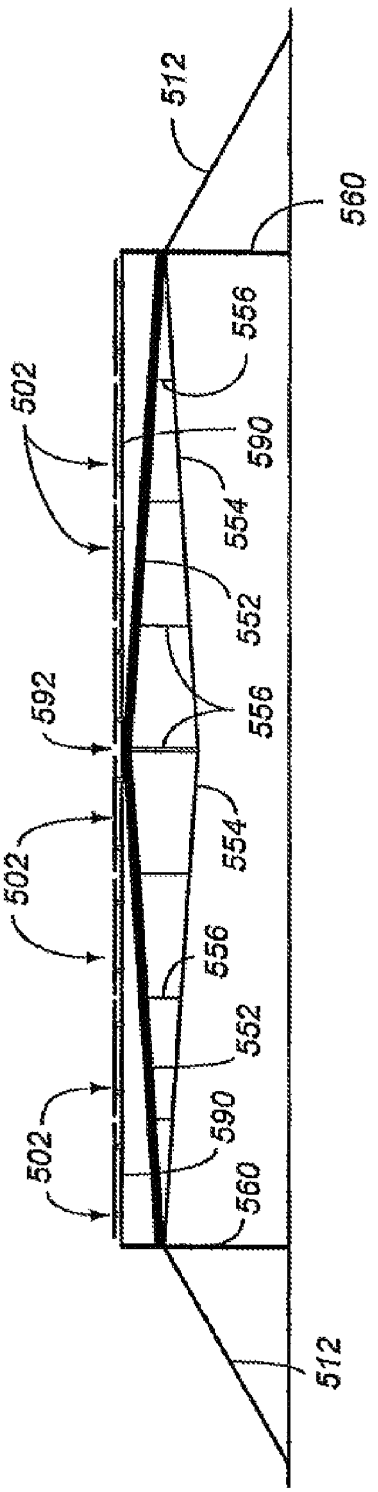
FIG. 76 is an elevation view of another embodiment of the present invention illustrating a compression truss for supporting a solar panel array disposed in a horizontal plane, and the truss also used to support a roof or covering incorporated in the array.

Referring to FIG. 76, yet another embodiment is provided in which a compression truss is used to support a solar panel array. The upper member 552 in this embodiment can either be the roof of the structure, or an upper chord defining the upper main support of the compression truss defined, and the pods 502 are mounted above the roof. Specifically, the pods 502 can be mounted on a horizontally extending rigid support member 590 which in turn, rests on the upper member 552 along an apex or upper ridge 592.

Figure 77:
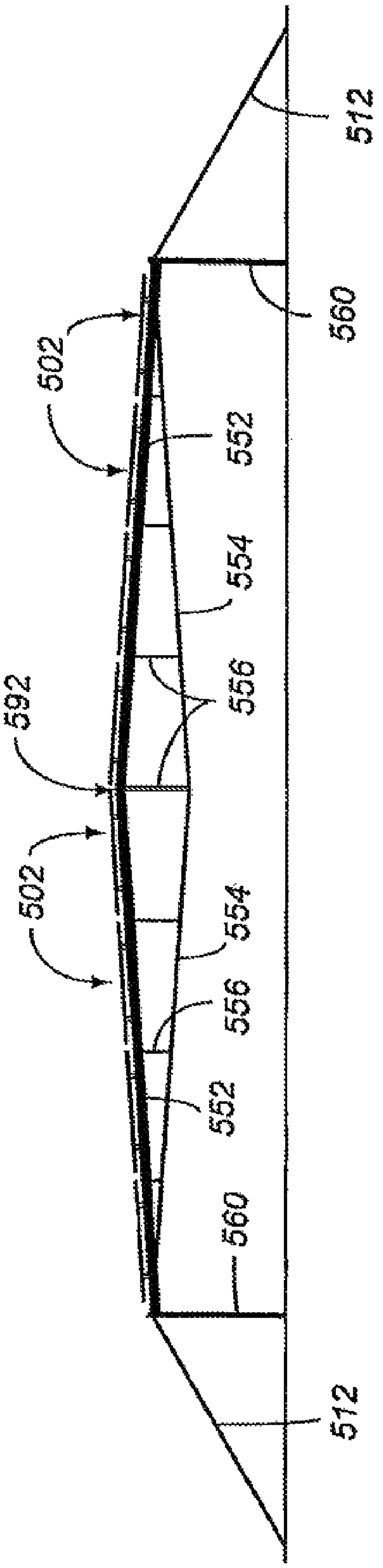
FIG. 77 is another elevation view of another embodiment of the present invention illustrating a compression truss for supporting a solar panel array, and the truss also used to support a roof or covering incorporated in the array in which the array follows the contour of the roof/covering.

Referring to FIG. 77, yet another embodiment is shown in which the pods 502 are mounted upon upper support 552, which again may be the roof of the structure or a separate support. In this configuration, the pods 502 follow the contour of the roof and thus present a wedge shaped configuration in the view according to this figure.

Figure 78:
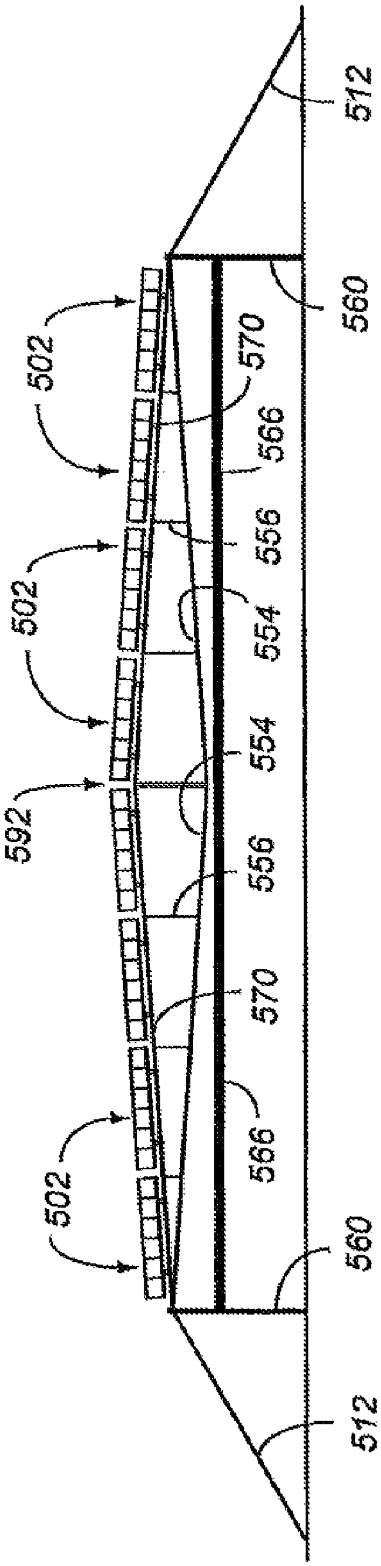
FIG. 78 is another elevation view illustrating a compression truss for supporting solar panels and a building roof or covering disposed below the solar panels.

Referring to FIG. 78, yet another arrangement shown with respect to a compression truss in which the pods 502 are mounted to the upper main cable 570, and the truss with the solar panel array is disposed above the roof 566 of the structure.

Figure 79:
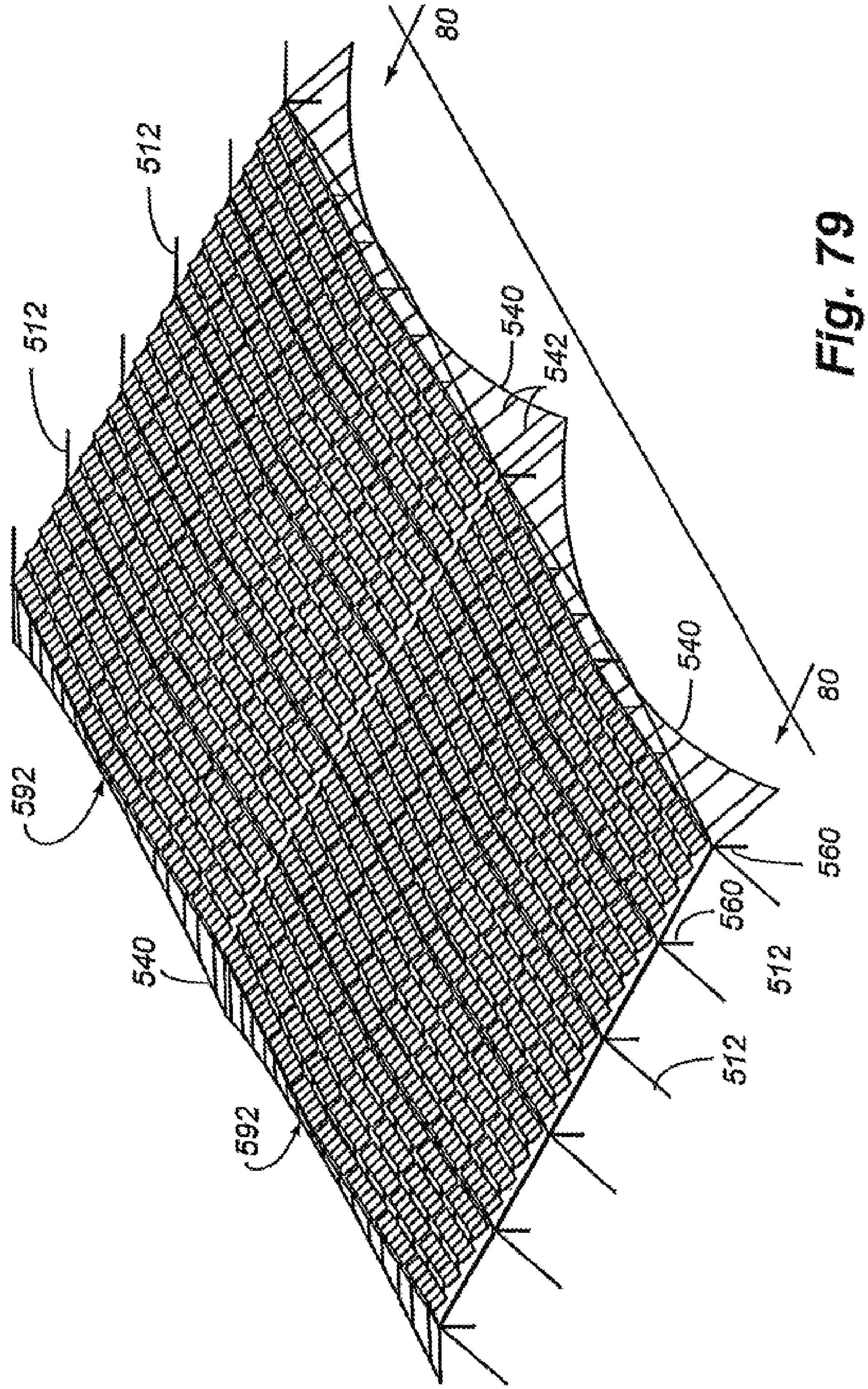
FIG. 79 is a perspective view of an embodiment showing two spans of a compression truss arrangement.
Figure 80:
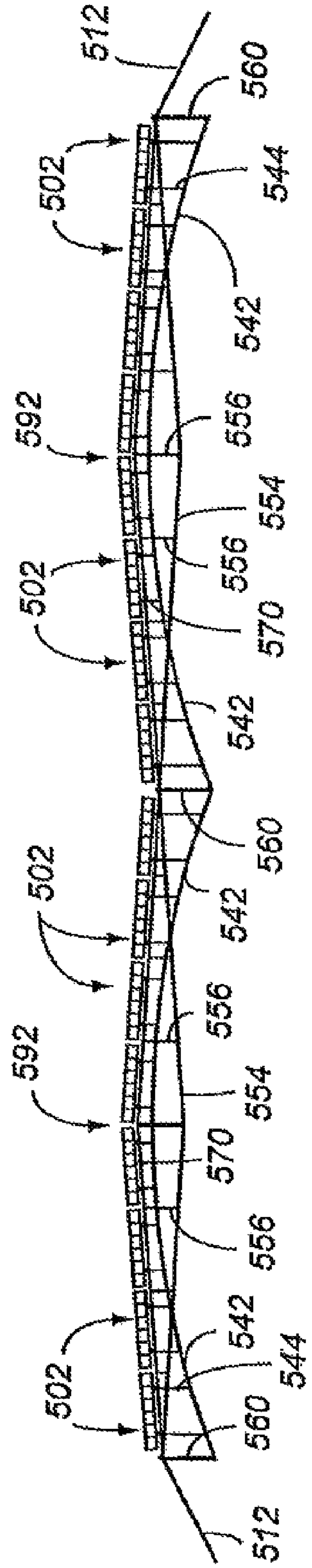
FIG. 80 is an elevation view taken along line 80-80 of FIG. 79.

FIG. 79 illustrates a double span of the embodiment of FIG. 78 in which the upper main cables 570 directly receive each of the pods/receivers 502. FIG. 80 is an elevation view of the embodiment of FIG. 79.

Figure 81:
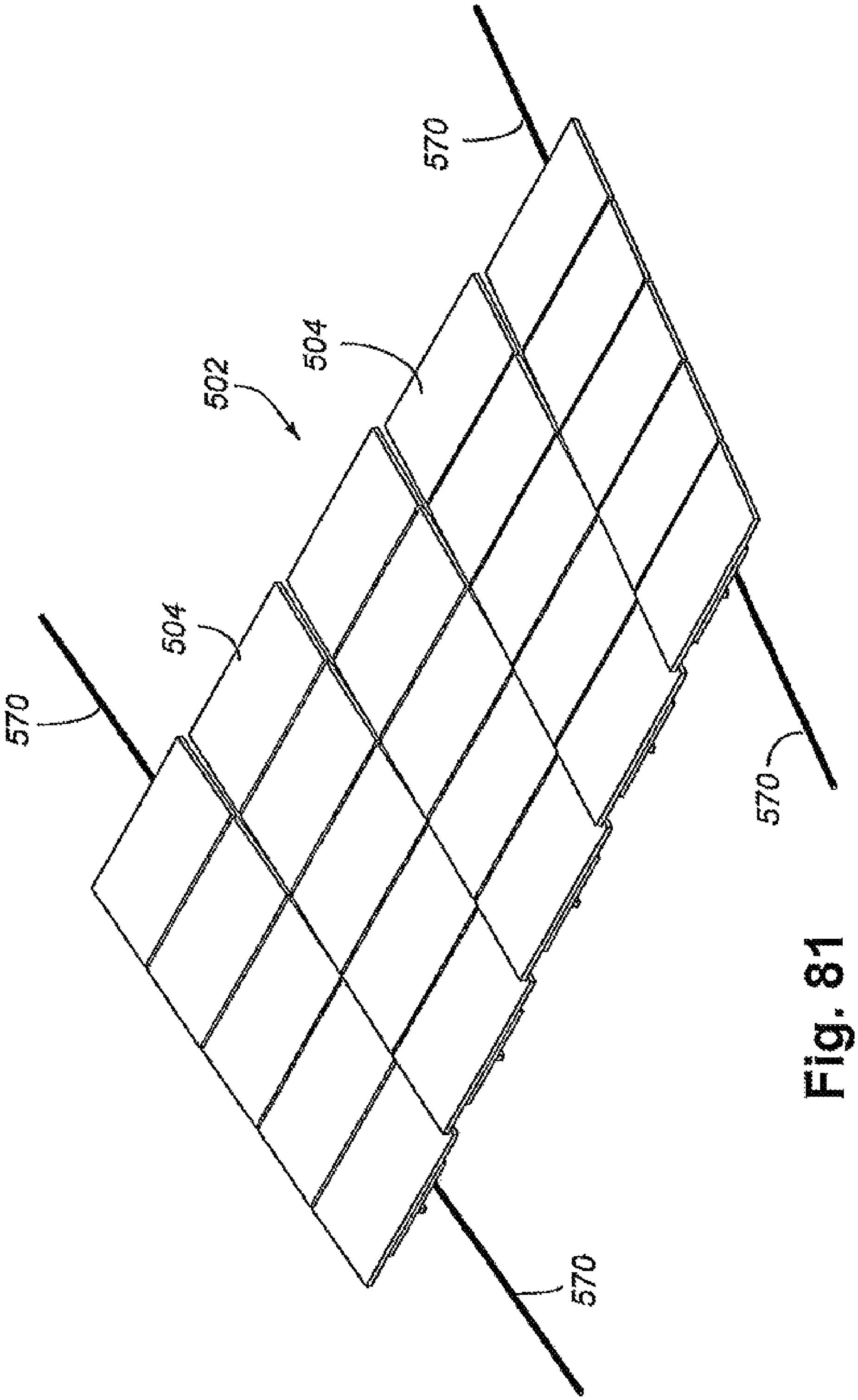
FIG. 81 is a perspective view of a panel receiver or pod supporting a plurality of solar panels arranged to form a complex shape in which the solar panels extend at different angles as supported between pairs of adjacent cables.

Referring to FIG. 81, in yet another embodiment of the present invention, it is contemplated that the solar panels may be arranged to have complex curved or irregular shapes. It may be necessary for the solar panels to cover a structure or object that has an irregular shape or it may be necessary for the array to avoid an underlying structure having an irregular shape. In lieu of simply eliminating solar panels at that particular location, the present invention provides a means by which the solar panels may remain in a continuous extension creating a complex shaped solar panel array. As shown in FIG. 81, each of the adjacent groups of panels 504 within the pod 502 extend at different angles producing a complex shaped pod. As also shown, the groups of panels 504 extend at these differing angles based upon the orientation of the cables 570 that extend in a non-parallel manner.

Figure 83:
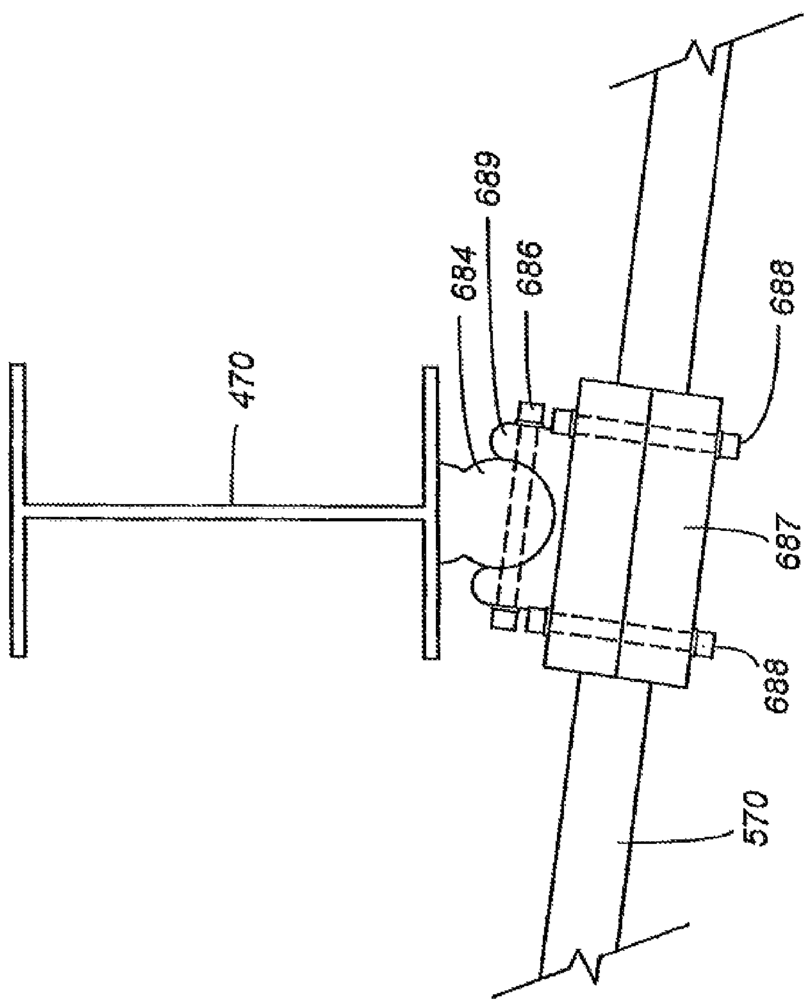
FIG. 83 is a greatly enlarged fragmentary elevation view of a connection between the upper support cable and a main support beam of the pod utilizing a ball joint construction.
Figure 84:
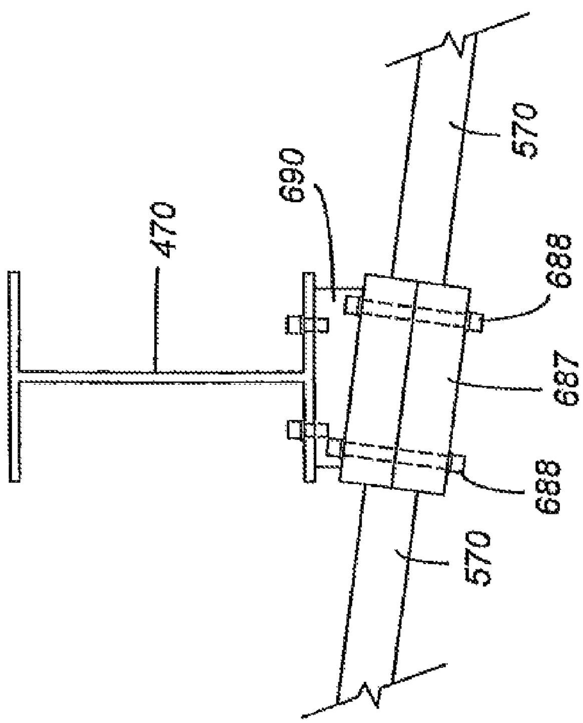
FIG. 84 is another greatly enlarged fragmentary elevation view of the connection between a support cable and a main support beam of the pod utilizing shims or wedges to achieve the desired offset orientation between the cables and the main support beams of the pod.

This rotated/irregular arrangement of the pod 502 can be achieved by angularly adjustable connections between the pod members and the cables as discussed with respect to FIGS. 83 and 84.

Figure 82:
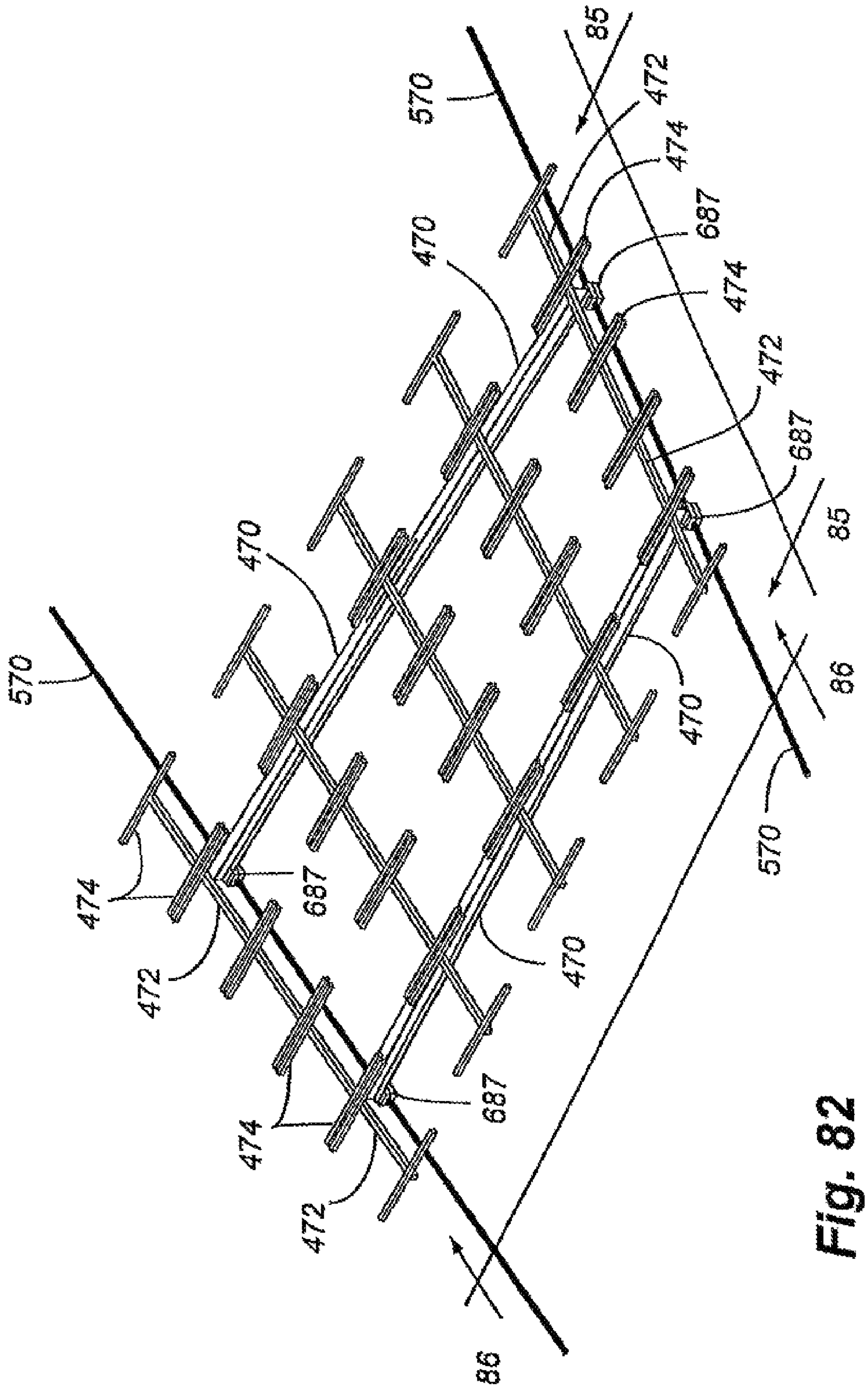
FIG. 82 is a perspective view of the embodiment of FIG. 81 in which the solar panels have been removed to expose the receiver/pod construction.

FIG. 82 illustrates the embodiment of FIG. 81 with the panels 504 removed thus exposing the components of the pod 502. The construction of the pod in FIG. 82 is similar to what is shown in the embodiment of FIG. 50, and the same reference numbers used in FIG. 82 are used to denote the same structural members as shown in FIG. 50. The difference between FIGS. 50 and 82 is that the supports 474 in FIG. 82 are not shown as extending continuously between the cables 570 and rather, are separated and individually mounted to the supports 472. The individual mounting of supports 472 allows adjacent groups of panels 504 to separate from one another in the desired irregular configuration.

FIG. 83 is an enlarged fragmentary elevation view of the connection details between a beam 470 and a cable 570 utilizing an angularly adjustable connection in the form of a ball and socket combination. Specifically, this figure illustrates a clamping block 687 used to support the connection. Bolts 688 secure the block 687 to the cable 570. A socket 689 is integrally formed with the block 687 and receives a ball extension 684 extending from the beam 470. A rotation control pin 686 is used to limit or otherwise define the rotational capability of the beam 470 with respect to the cable 570. As shown, the beam 470 can therefore be secured to the cable 570 and yet can be oriented in a desired angular orientation to produce a pod having the complex shape. It is also contemplated that the pin 686 can be removed therefore allowing the beam 470 to freely rotate within the geometric limits of the ball joint connection.

FIG. 84 is another enlarged fragmentary elevation view of the connection details between a beam 470 and a cable 570 in which the desired orientation of the beam to the cable is achieved by use of another type of angularly adjustable connection in the form of shims 690 that are inserted between the block 687 and the beam 470. The shim 690 is simply bolted between the exposed surface of the block 687 facing the beam and the facing surface of the beam flange. The shims 690 are can be a single piece or a plurality of shim elements stacked on one another to provide the desired orientation of the beam to the cable.

Figure 85:
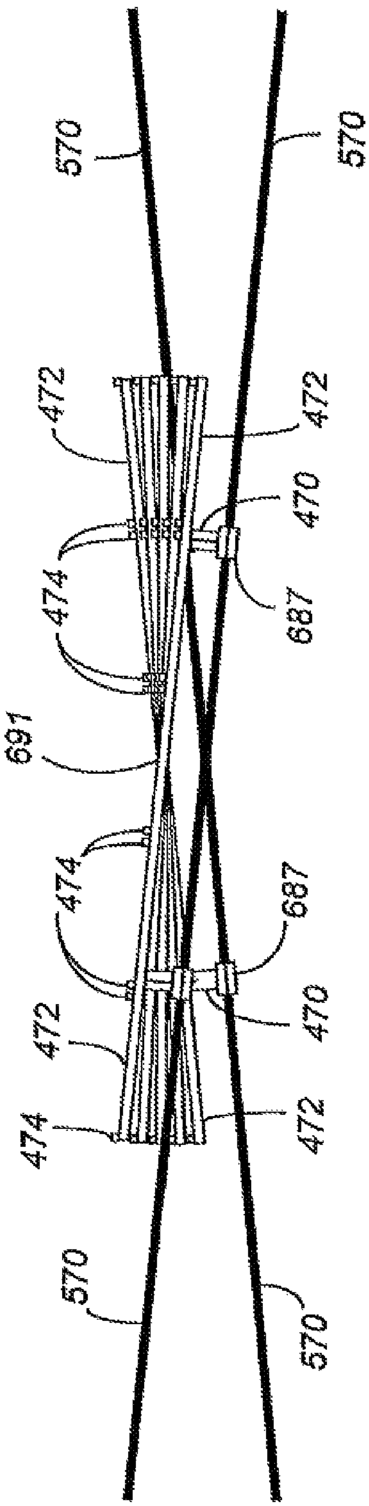
FIG. 85 is an elevation view illustrating the orientation of the pod elements and supporting cables without the solar panels mounted as taken along line 85-85 of FIG. 82.

FIG. 85 is an elevation view taken along line 85-85 of FIG. 82 showing how the intermediate struts 472 are placed in their unique angular orientations with respect to the cables 570. In the example of FIG. 85, the orientation of the struts 472 result in the appearance of the struts being progressively rotated about an axis 691.

Figure 86:
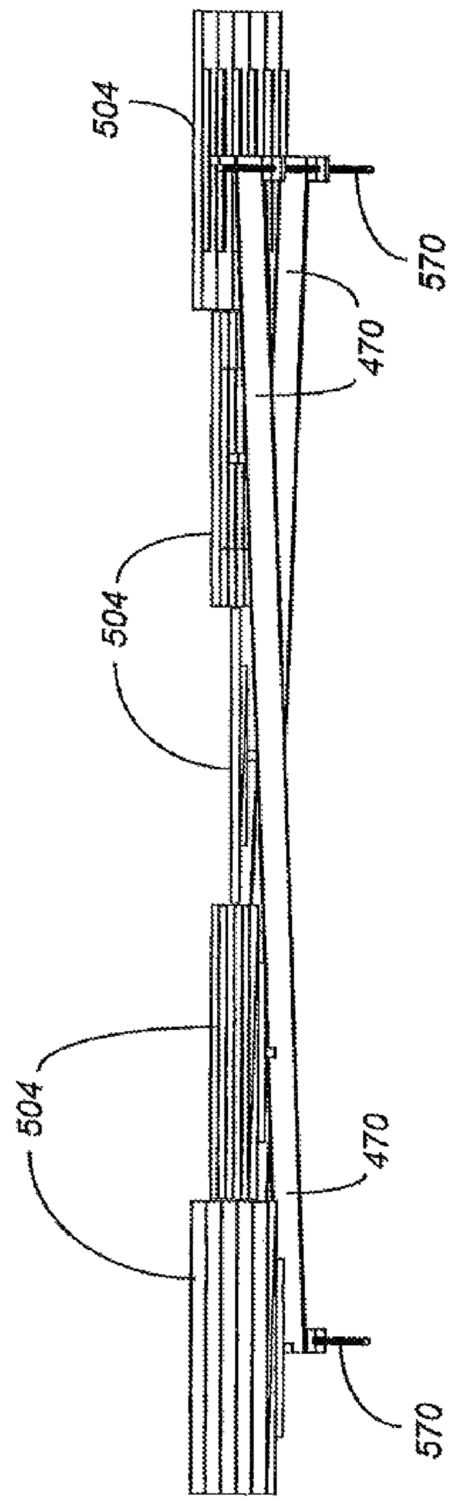
FIG. 86 is an elevation view taken along line 86-86 of FIG. 82 illustrating the solar panels mounted to the receiver.

FIG. 86 is an elevation view taken along line 86-86 of FIG. 82 showing the panels 504 mounted to the pods. The beams 470 connect to the cables 570 that extend out of plane with one another therefore resulting in the irregular shaped group of panels 504 on the pod.

Figure 87:
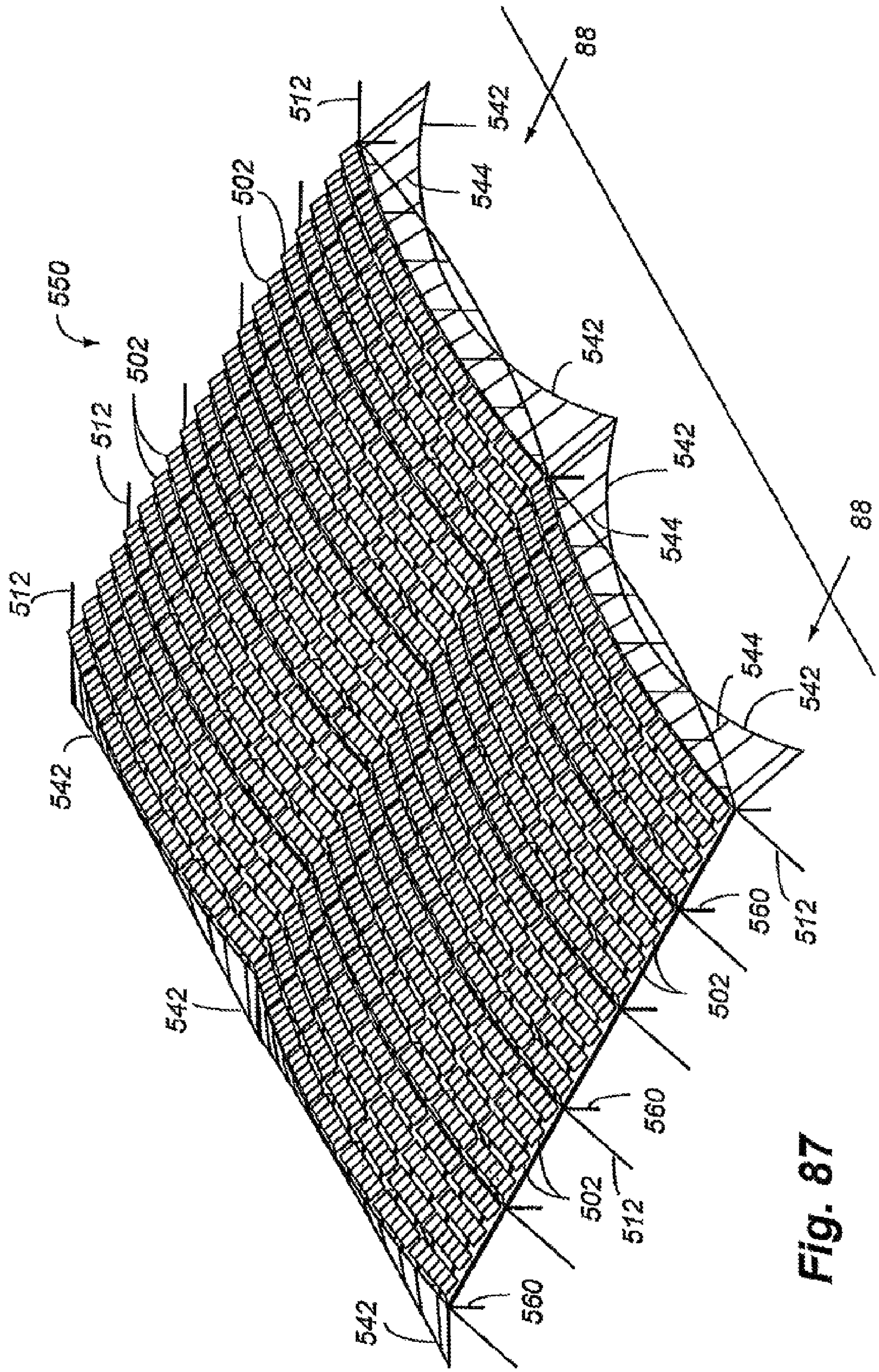
FIG. 87 is a perspective view of another embodiment having two spans of convex mounted pods incorporating compression trusses.
Figure 88:
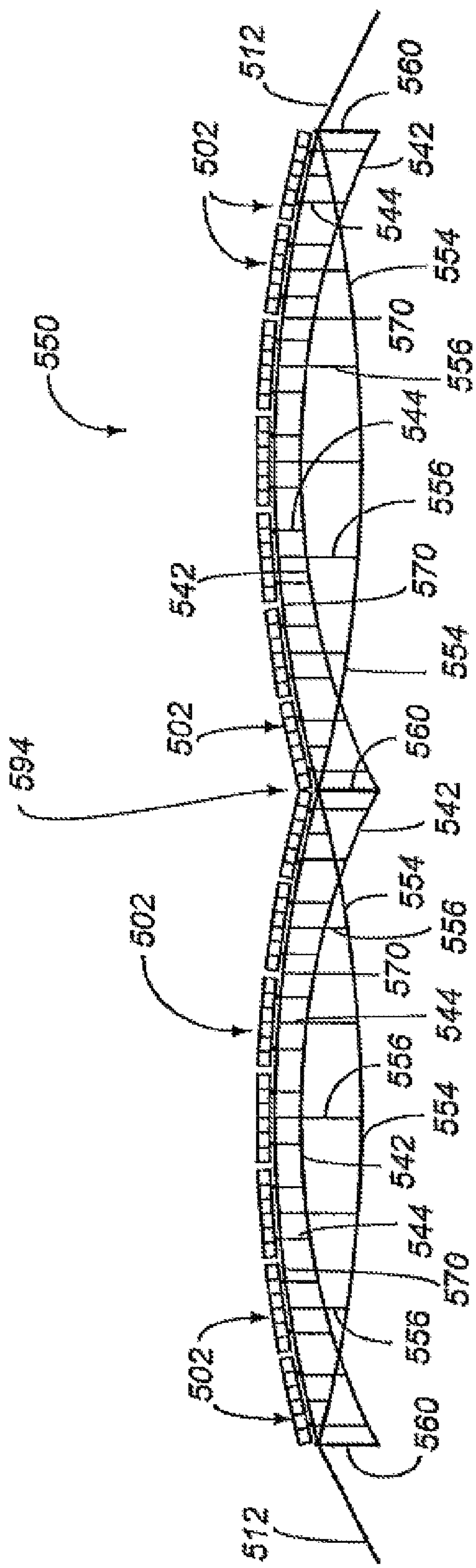
FIG. 88 is an elevation view taken along line 88-88 of FIG. 87.

FIG. 87 is a perspective view of another embodiment of the present invention in which compression struts are utilized for mounting of pods 502 in a convex arrangement of two spans of pods. Referring also to the elevation view of FIG. 88, the convex arrangement of the spans results in a trough or lowered area 594 that extends between spans. This embodiment therefore differs from the embodiments shown in FIG. 72-74 in that the upper cable 570 and lower cable 554 do not cross one another between the columns 560; therefore there is no inflection point and no reverse mounting of the pods such as those pods 565 shown in FIG. 72.

Figure 89:
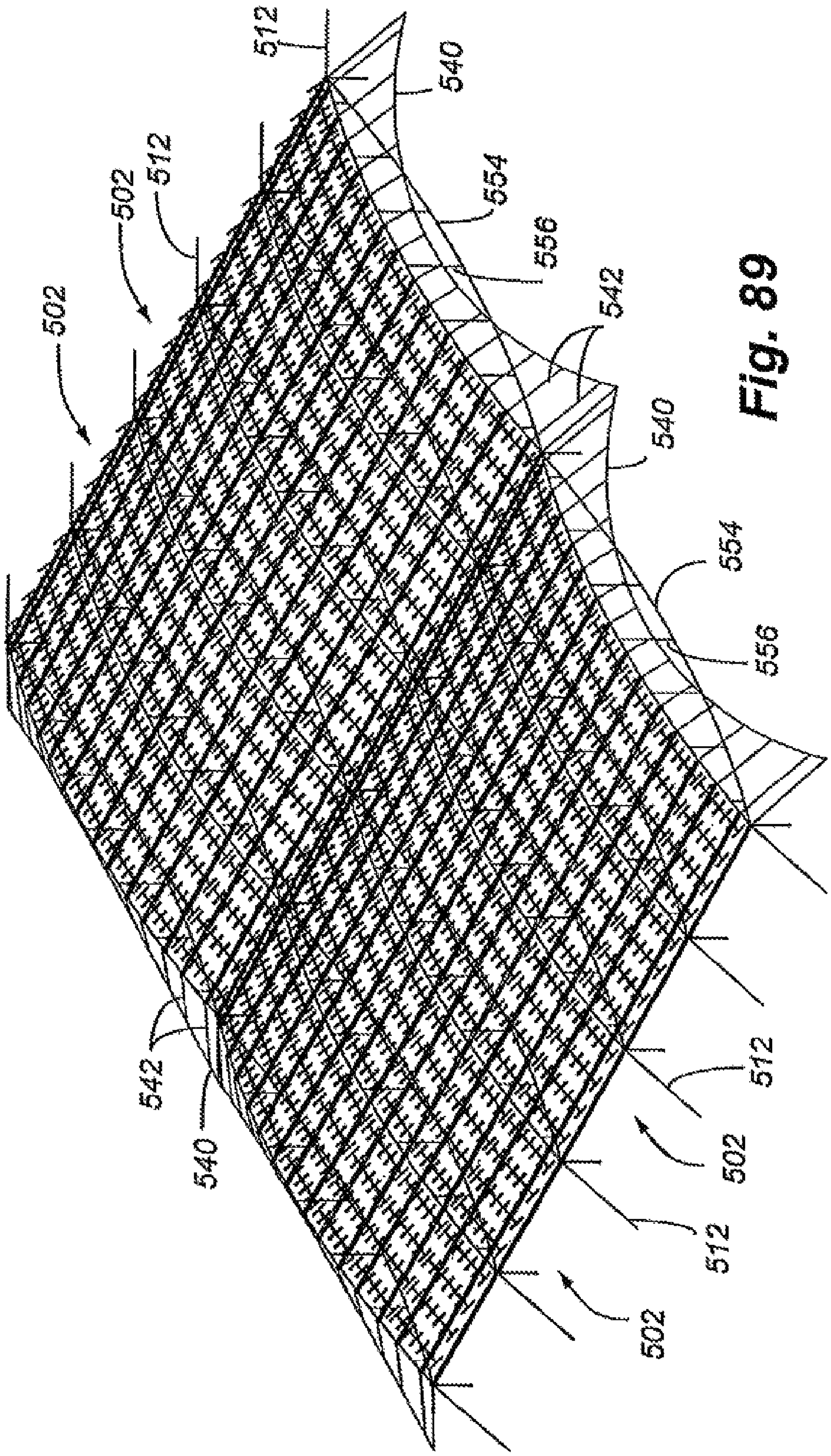
FIG. 89 is the perspective view of FIG. 87 with the solar panels removed to expose the pod constructions.

FIG. 89 is another perspective view of the embodiment of FIG. 87 but showing the array with the panels removed thus exposing the pods.

Figure 90:
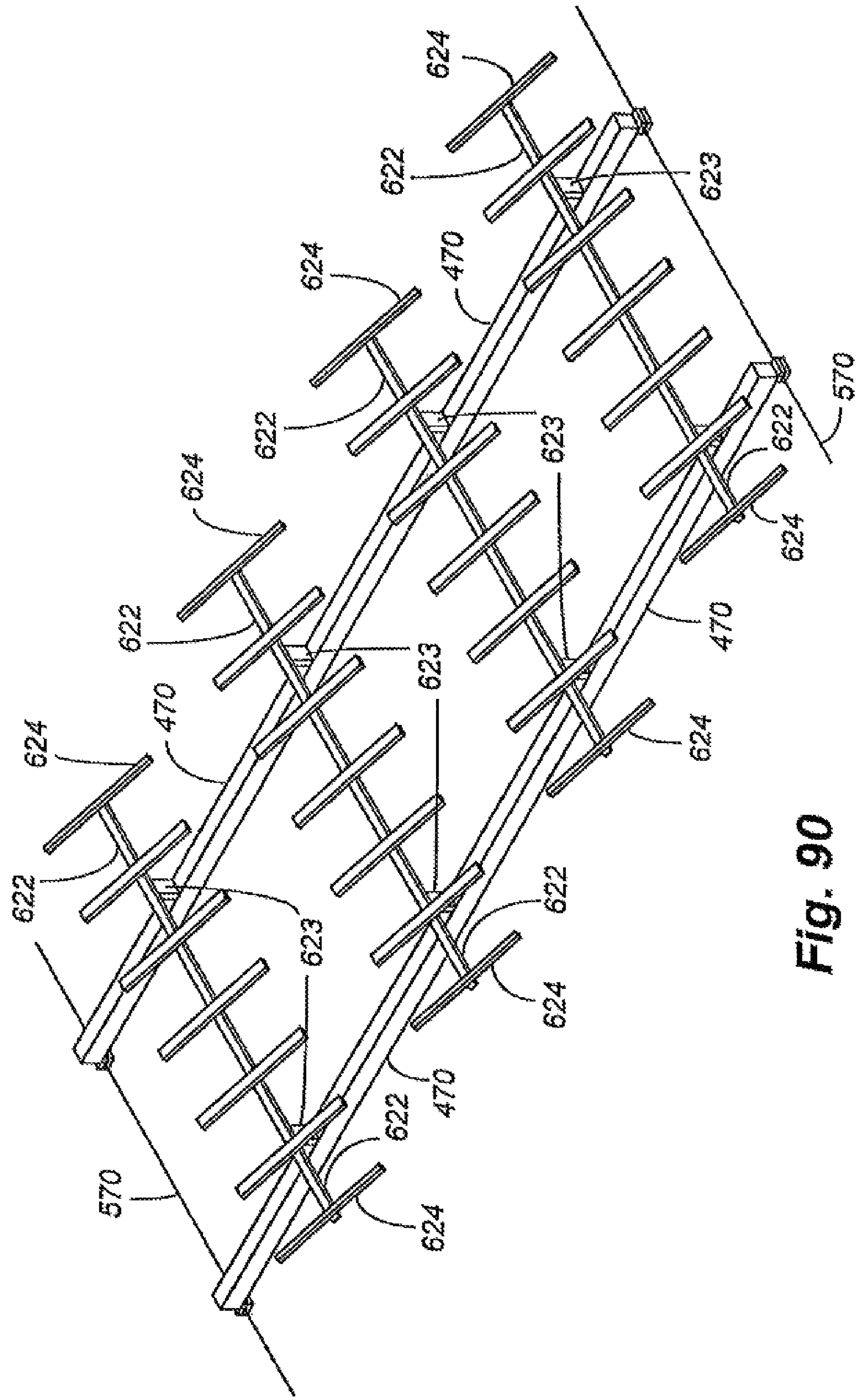
FIG. 90 is an enlarged fragmentary perspective view of a pod in the embodiment of FIG. 89 with the solar panels removed to expose the particular construction of the pod elements.

FIG. 90 is an enlarged perspective view of a pod detailing the construction of the pod to include the various supports and struts. Specifically, FIG. 90 shows a pod construction including a pair of main beams 470 that extend between cables 570 and a group of four elevated strut assemblies that result in the panels being oriented at a desired angle with respect to a plane defined as extending along the beams 470 and between the cables 570. Each of the strut assemblies includes a riser 623 extending above the beams 470, a cross strut 622 extending orthogonally and interconnecting the beams 470, and panel support struts 624 that directly mount the solar panels. The angled connection between the upper ends of the risers 623 and the cross struts 622 may be selectively adjusted by the use of replaceable shims such as the one shown in FIG. 83 in a bolted arrangement in which the shims are fixedly mounted between the upper ends of the risers and the facing surfaces of the struts.

Figure 91:
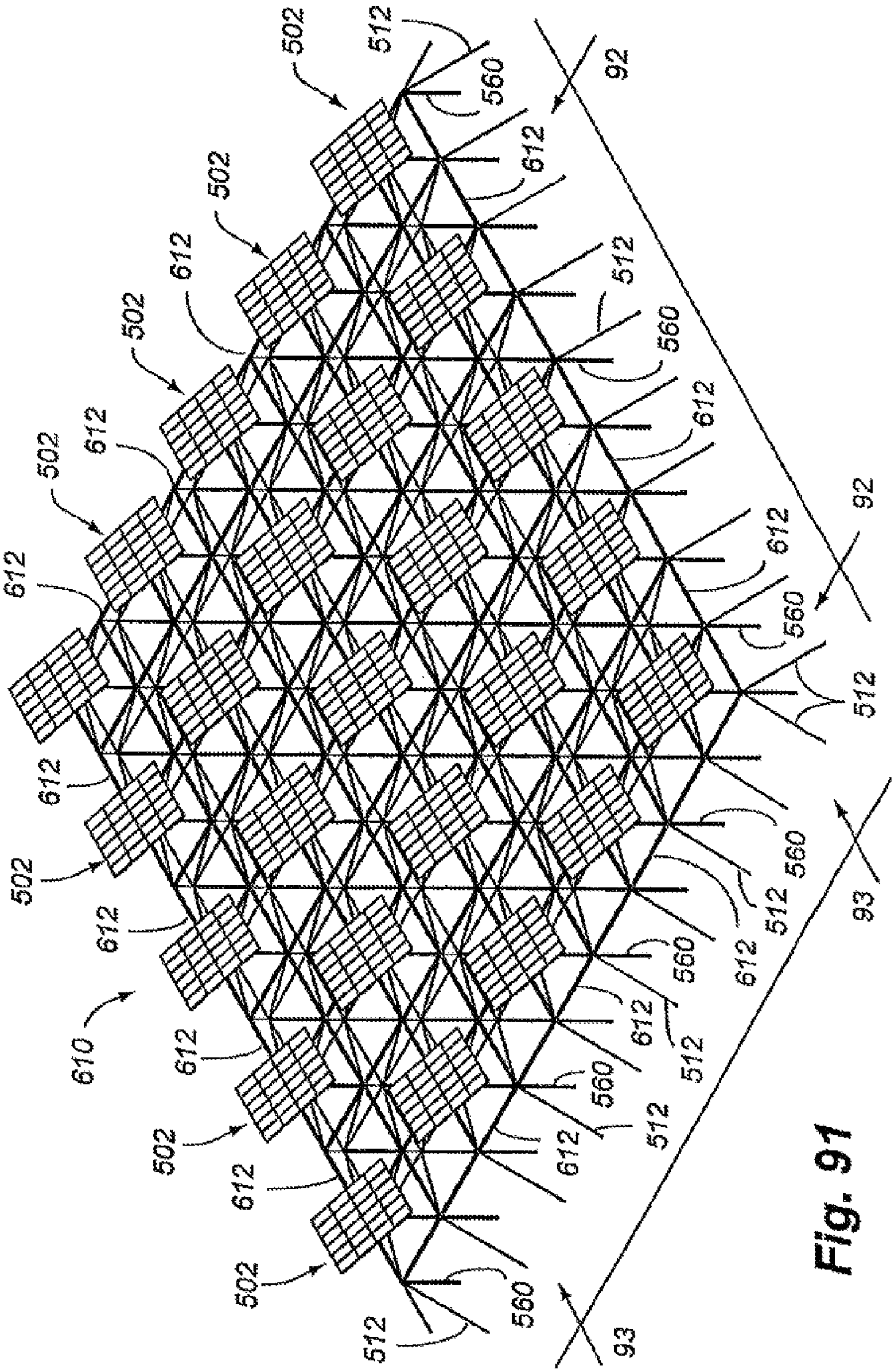
FIG. 91 is a perspective view of another embodiment of the present invention that may incorporate a dual tracking capability with respect to orientation of the pods in two separate adjustments in order that the pods may track the sun by rotation in two separate axes.

FIG. 91 illustrates another preferred embodiment of the present invention in a solar panel array 610 that provides pods 502 with a dual axis tracking capability. More specifically, the pods 502 may be rotated in two distinct axes to allow the panels to track the location of the sun as the earth rotates as described in more detail with respect to FIG. 95. One axis of rotation is about the vertical supports 618, and the other axis of rotation is about a horizontal plane thereby enabling the pods to be canted or tilted at a desired angular orientation.

The embodiment of FIG. 91 is especially adapted for large open areas in which the solar panels can be disposed in a very large array for maximum power production and the minimum disruption of the ground under the array invites a dual land use application. The spacing of the pods is generally greater as compared to the previous embodiments resulting in less shade produced by the array. The increased amount of passing sunlight between the pods enables a great variety of crops that can be grown directly under the array. The overall support structure for the pods 502 requires minimum materials thereby minimizing disruption of the soil under the array. The only required columns 560 are those that extend around the periphery of the array thereby leaving the land undisturbed that lies between the peripheral columns.

Figure 92:
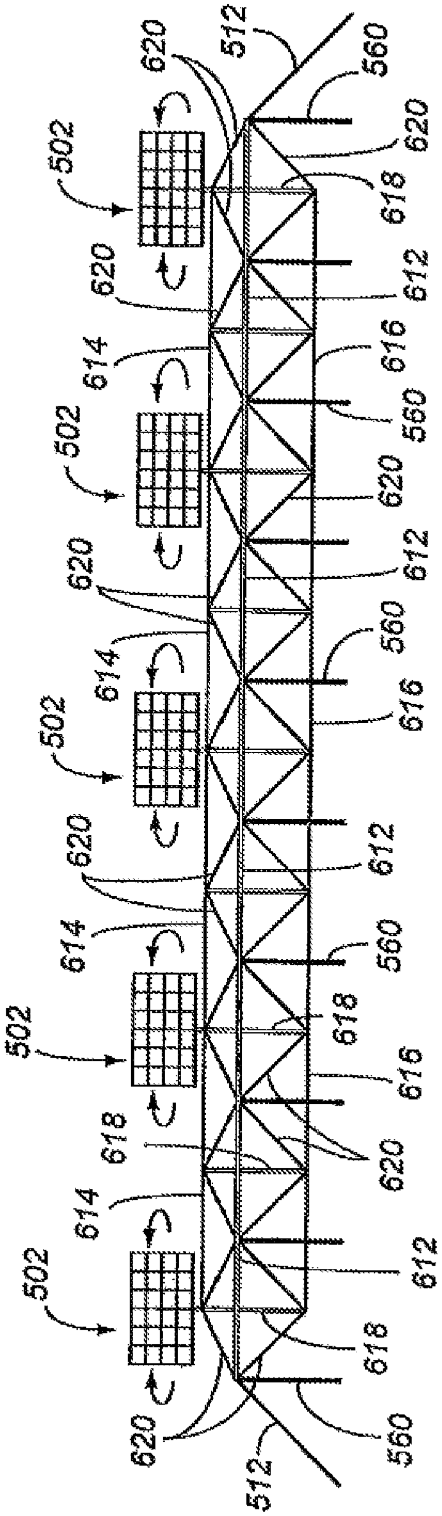
FIG. 92 is an elevation view taken along line 92-92 of FIG. 91.
Figure 93:
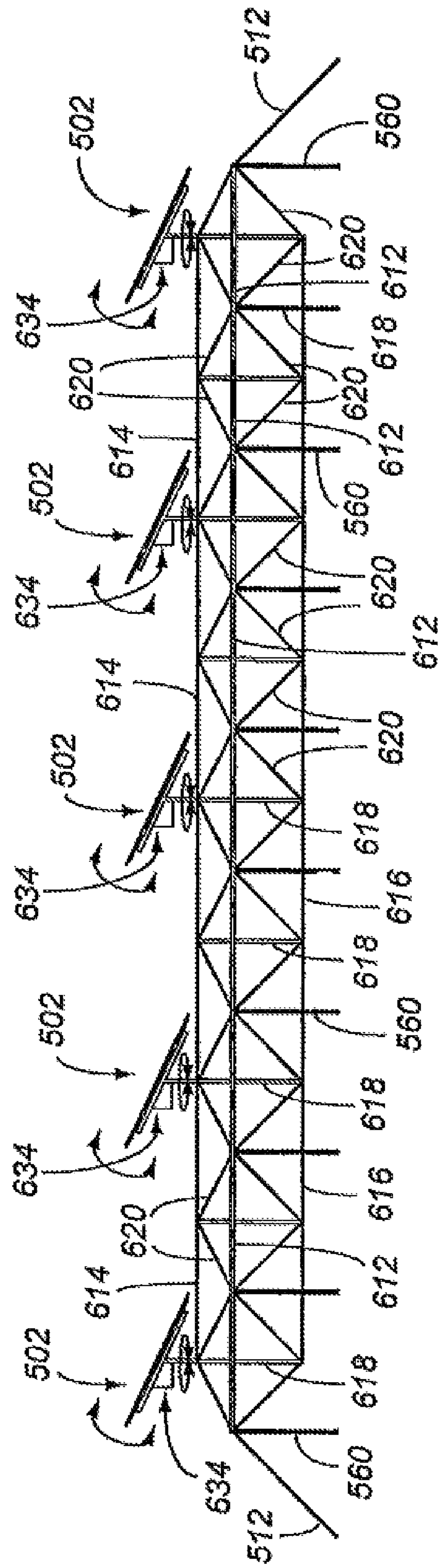
FIG. 93 is an elevation view taken along line 93-93 of FIG. 91.
Figure 94:
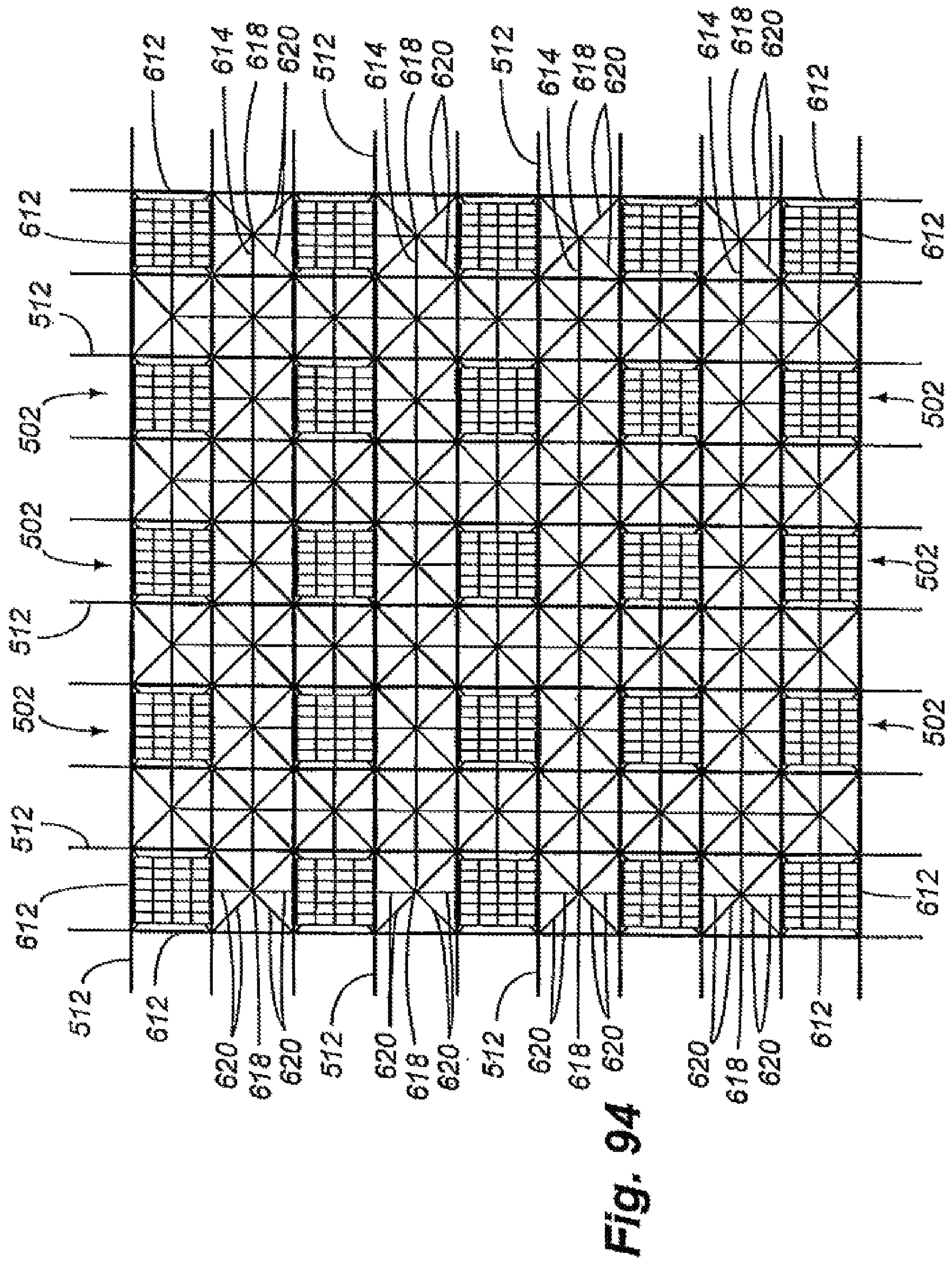
FIG. 94 is a plan view of FIG. 91.

Referring also to FIGS. 92-94, it is shown that the exterior columns 560 and anchor lines 512 provide the peripheral support for the array 610, while a series of suspended trusses support the pods in the interior portion of the array. Rigid horizontal support members 612 interconnect the upper ends of the columns 560, and also traverse longitudinally and transversely across the array thereby tying the array together in a unitary construction. A series of trusses are provided to extend within the interior portion of the array thereby eliminating the need to provide intermediate columns in the interior of the array. The trusses are each defined by the combination of a horizontal support 612, upper main cable 614, lower main cable 616, and a plurality of interconnecting and diagonally extending cables 620. Vertical supports 618 carry the pods 502 and as shown, the supports 618 are suspended above the level of the ground with lower ends secured to lower main cable 616. The upper main cable 614 provides upper stability to the vertical supports while the horizontal supports 612 further stabilize the supports 618.

Figure 95:
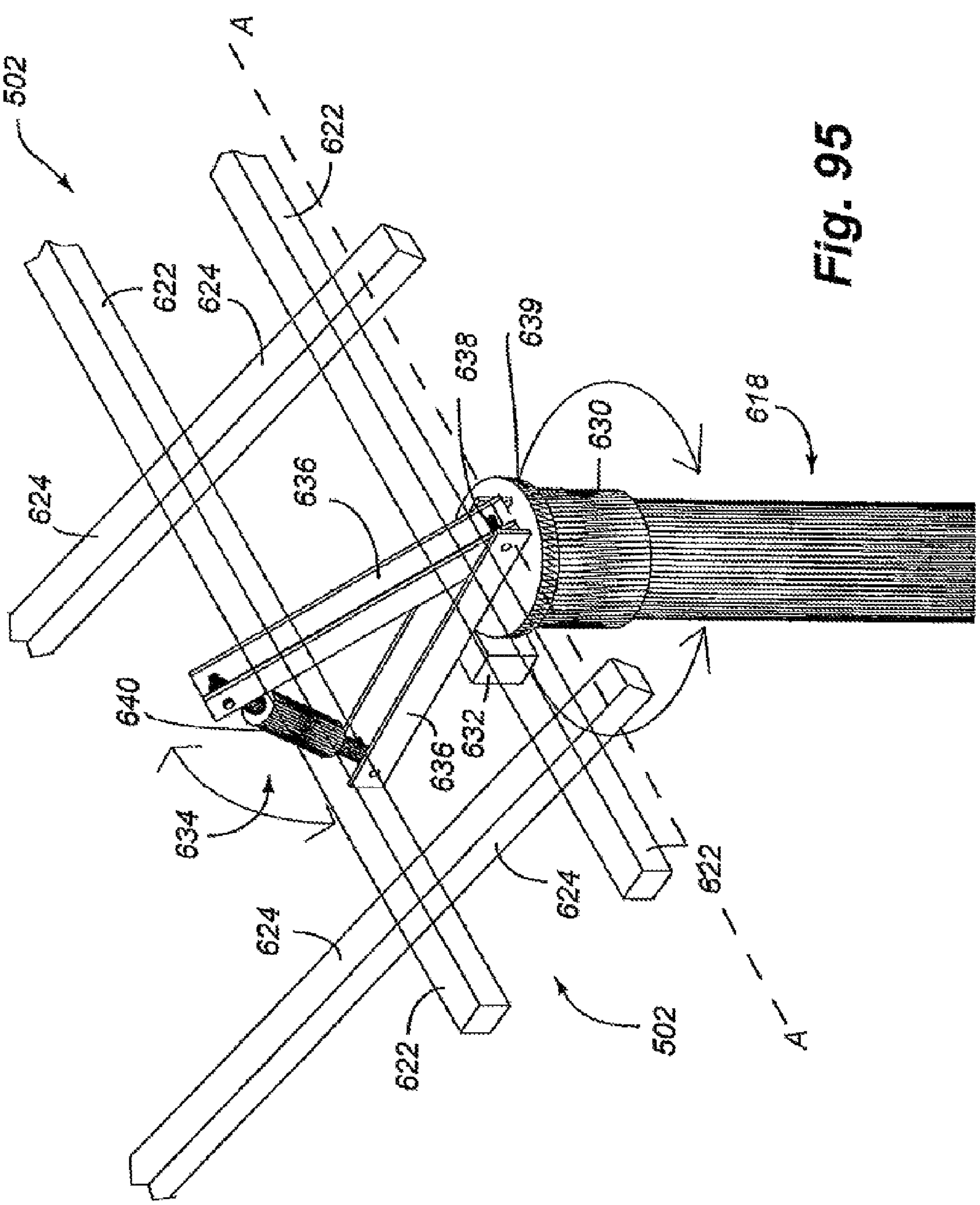
FIG. 95 is an enlarged fragmentary perspective view of a dual axis tracking mechanism provided in connection with the present invention and incorporated by way of example in the embodiment of FIG. 91.

FIG. 95 is an enlarged fragmentary perspective view with the solar panels removed to illustrate details of the pod construction that enables the dual tracking function. The pod construction in this embodiment includes horizontal and orthogonally oriented struts 622 and 624 respectively. This strut arrangement is similar, for example, to what is shown in the pod illustrated at FIG. 26. Rotation of the pod about the vertical axis defined by vertical support 618 is achieved by a tracking mechanism defined by a rotatable cap 630 driven by a motor 632 mounted to the adjacent strut 622. The motor 632 has a drive shaft (not shown) that interfaces with a series of external gears 639 disposed on the upper periphery of the rotating cap member 630 to provide incremental rotation of the pod about this vertical axis. In order to rotate the pod about the horizontal axis A-A, a tilt mechanism 634 is provided with tilt supports 636, a hydraulic lift 640, and a pinned connection 638. The hydraulic lift 640 raises and lowers the movable upper support 636 thereby allowing the pod to be placed at the desired angular orientation. The hydraulic lift 640 may be powered itself by another motor (not shown) so that independent rotation capability is provided in the two distinct axes.

Figure 96:
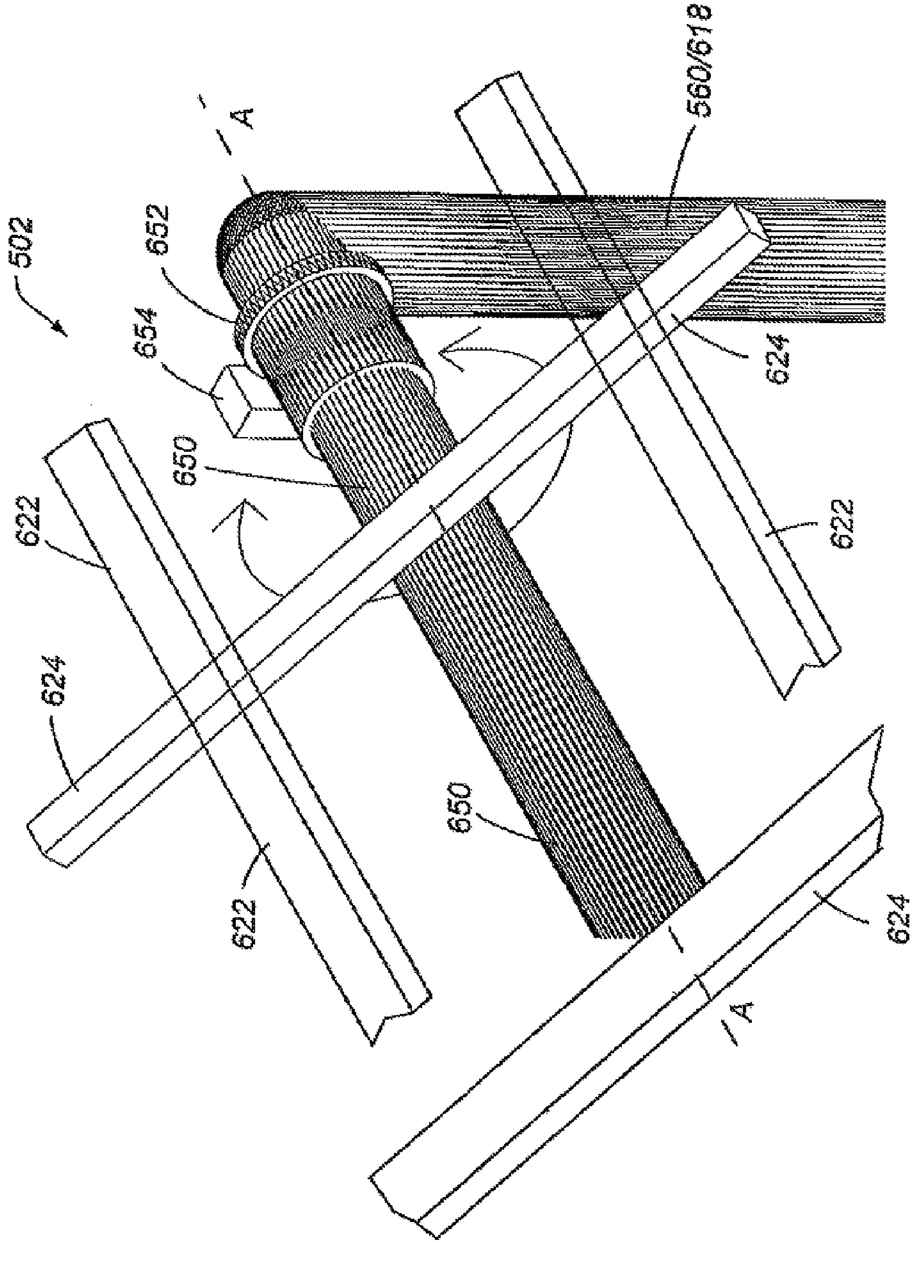
FIG. 96 is an enlarged fragmentary perspective view of a single axis tracking mechanism provided in connection with the present invention and incorporated by way of example in the embodiment of FIG. 91.

In accordance with another aspect of the present invention, in lieu of providing a dual axis tracking capability, it is also contemplated that the present invention can provide a signal axis tracking capability as shown with respect to the embodiment of FIG. 96 in which the pod is rotatable about axis A-A. In FIG. 96, the pods are mounted on a horizontal support 650 that can extend across the entire span of the array, or at selected locations along the span of the array in which it is desired to have a single axis tracking capability. Accordingly, in lieu of mounting the pods 502 to the vertical members 618, the pod construction can be simplified by eliminating the members 618 and providing the single horizontal support 650. In lieu of eliminating the vertical supports 618, the supports 618 can be used to support the horizontally extending support 650 at intermediate points along a span. A motor 654 is used to rotate the horizontally extending support 650 in which a series of externally mounted gears 652 mate with a drive shaft (not shown) of the motor for incremental rotation control.

Certain cable trusses may be difficult to install as they have a tendency to twist or rotate until they are connected to the transversely extending pod beams. These difficult to erect trusses are primarily those with the upper and lower main cables and compression struts used to interconnect the upper and lower main cables. To facilitate ease of construction, the present invention provides a temporary truss assembly that provides the necessary rigidity to support the truss in a stationary condition as it is assembled. Accordingly, referring to FIGS. 97-100, this aspect of the invention will be explained.

Figure 97:
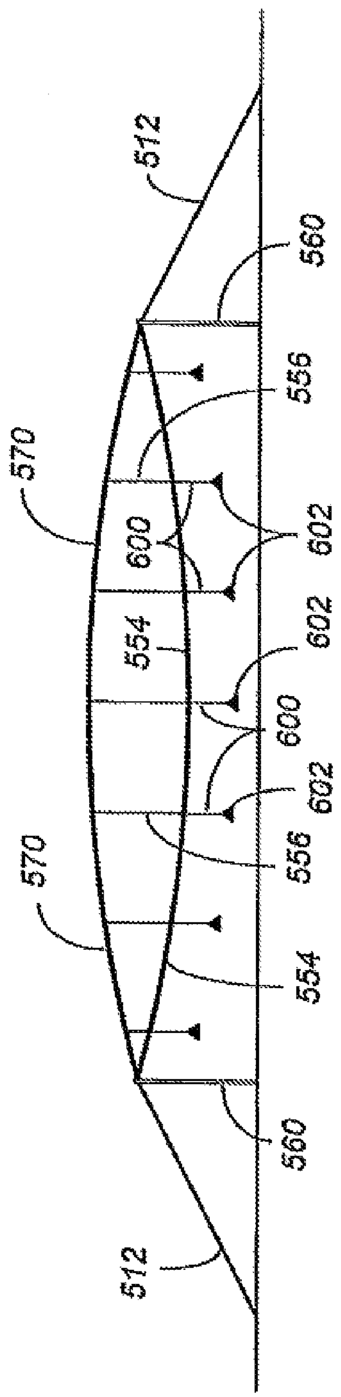
FIG. 97 is an elevation view of weights that can be used to stabilize a truss during construction of the array in accordance with another aspect of the present invention.

First referring to FIG. 97, an elevation view is provided showing a construction step in the creation of an array incorporating compressions trusses The compression trusses each include upper cable 570, lower cable 554 and interconnecting compression members 556. The compression truss may be first assembled on the ground and then placed upright in the vertical orientation as illustrated. Once a plurality of compression trusses is assembled, they may be spaced apart from one another in the orientation in which they are to accept the respective pods. When the compression trusses are oriented vertically, a plurality of weights 602 may hang from the truss by hangers 600. The weights 602 help to stabilize the truss in a desired vertical orientation once at least some of the main pod beams are connected in their transverse orientation between the trusses. The weights 602 also cause the compression trusses to be pre-stressed so that the trusses extend in the desired orientation to readily accept the pods without significant additional shifting or adjustment of the trusses or the pods. Once the pods are mounted between the parallel spaced trusses, the weights 602 can be selectively removed. Thus, use of the weights 602 can significantly reduce any undesirable shifting or misalignment of the trusses which otherwise makes mounting of the pods more difficult.

Figure 98:
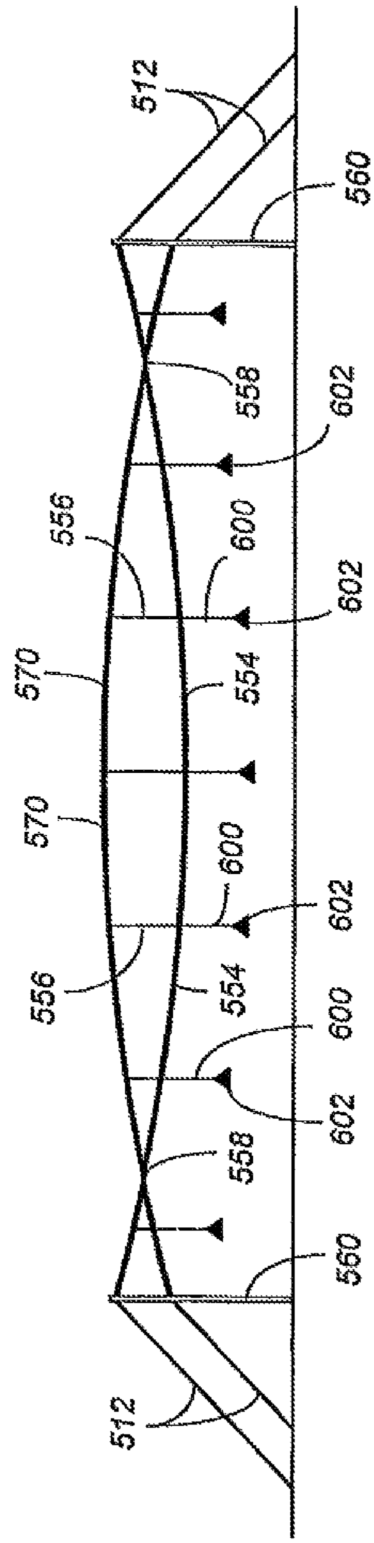
FIG. 98 is an elevation view of another type of truss in which weights can be used to stabilize the truss during construction of the array.

FIG. 98 illustrates another example of a truss and the manner in which the weights 602 may be hung to stabilize trusses during construction. In this figure, the weights 602 can be hung along the span so that both the upper and lower main cables receive pre-stressing forces to correctly align the truss for final positioning with respect to the pods.

Figure 99:
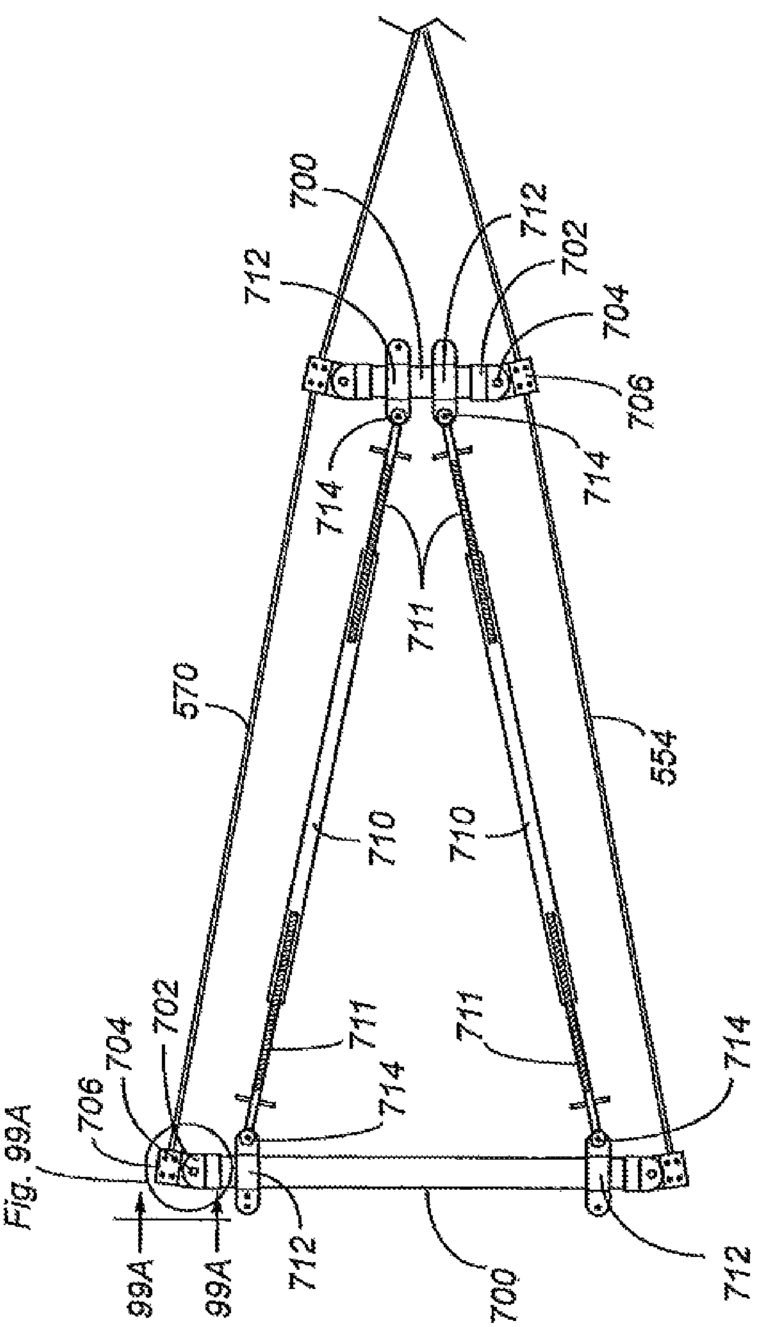
FIG. 99 is an enlarged fragmentary elevation view of a temporary truss support assembly that can be used during construction of a truss.
Figure 99A:
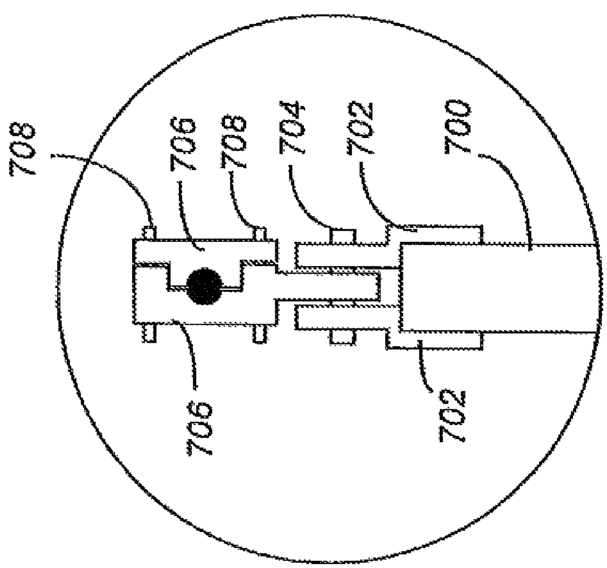
FIG. 99A is an enlarged view of a portion of FIG. 99 detailing the construction of the connection between the temporary truss support and a cable of the truss.

Referring to FIG. 99, it is also contemplated that the trusses can be constructed including the use of a plurality of temporary supports to orient each of the truss members in the desired positions. One or more of the temporary supports may remain to complete the truss assembly in which the temporary supports are compression members. The temporary supports include interconnecting tubes or posts 700 that perform the same function as the interconnecting compression members 556. Thus, the tubes/posts 700 may also remain in the final step of the truss construction as members 556, or the tubes 700 can be replaced with interconnecting cables. The tubes 700 are secured to the upper and lower cables 570 and 554 by pinned connections as detailed with respect to FIG. 99A. As shown in the enlarged view of FIG. 99A, each end of the tubes 700 are secured within a primary connecting bracket 702. A pin 704 connects the primary bracket 702 to a cable clamping mechanism 706. The mechanism 706 may be of two part construction as shown with bolts 708 which secure the mechanism 706 to the adjacent cable 570. The tubes 700 may rotate about the pins 704, or it is also contemplated that pin 704 can be replaced with a rigid element thereby preventing any rotation of the tube 700 with respect to the upper and lower cables when a more rigid truss construction is desired. A plurality of tubes 700 can be located along the truss to provide the necessary temporary rigidity to the truss, and the tubes 700 can be connected to one another as by adjustable rods 710. The ends of the rods 710 connect to the tubes 700 as by secondary brackets 712 that may also incorporate a pinned feature so that the ends of the rods 710 can rotate about pins 714 incorporated in the secondary brackets 712. The length of the rods 710 can be adjusted by the turnbuckle threaded arrangement of the rods in which threaded members 711 are received within threaded openings formed at each end of the rods 710.

Figure 100:
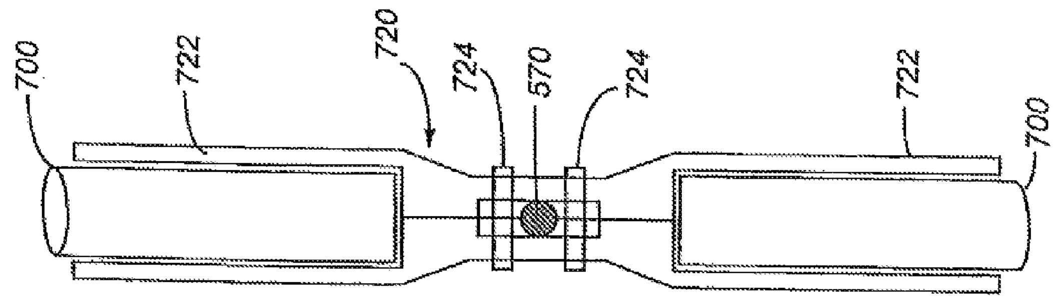
FIG. 100 is an elevation view of a type of temporary or permanent truss support feature enabling truss components such as two compression members of the truss to extend on opposing sides of a cable.

FIG. 100 is an elevation view of another feature of the temporary or permanent support features of a truss in which the primary bracket extends on both sides of the supporting cable. More specifically, FIG. 100 shows a primary bracket 720 with opposing receiver ends 722 that can receive a pair of tubes 700. The bracket 720 may be in two piece construction in which the halves are joined to secure the tubes 700. A series of bolts 724 interconnect the halves as shown. This arrangement for the tubes 700 allows temporary or permanent support to a truss in which the truss may support an overhead vertical support design, such as the vertical supports 618 shown in FIGS. 92 and 93.

Figure 101:
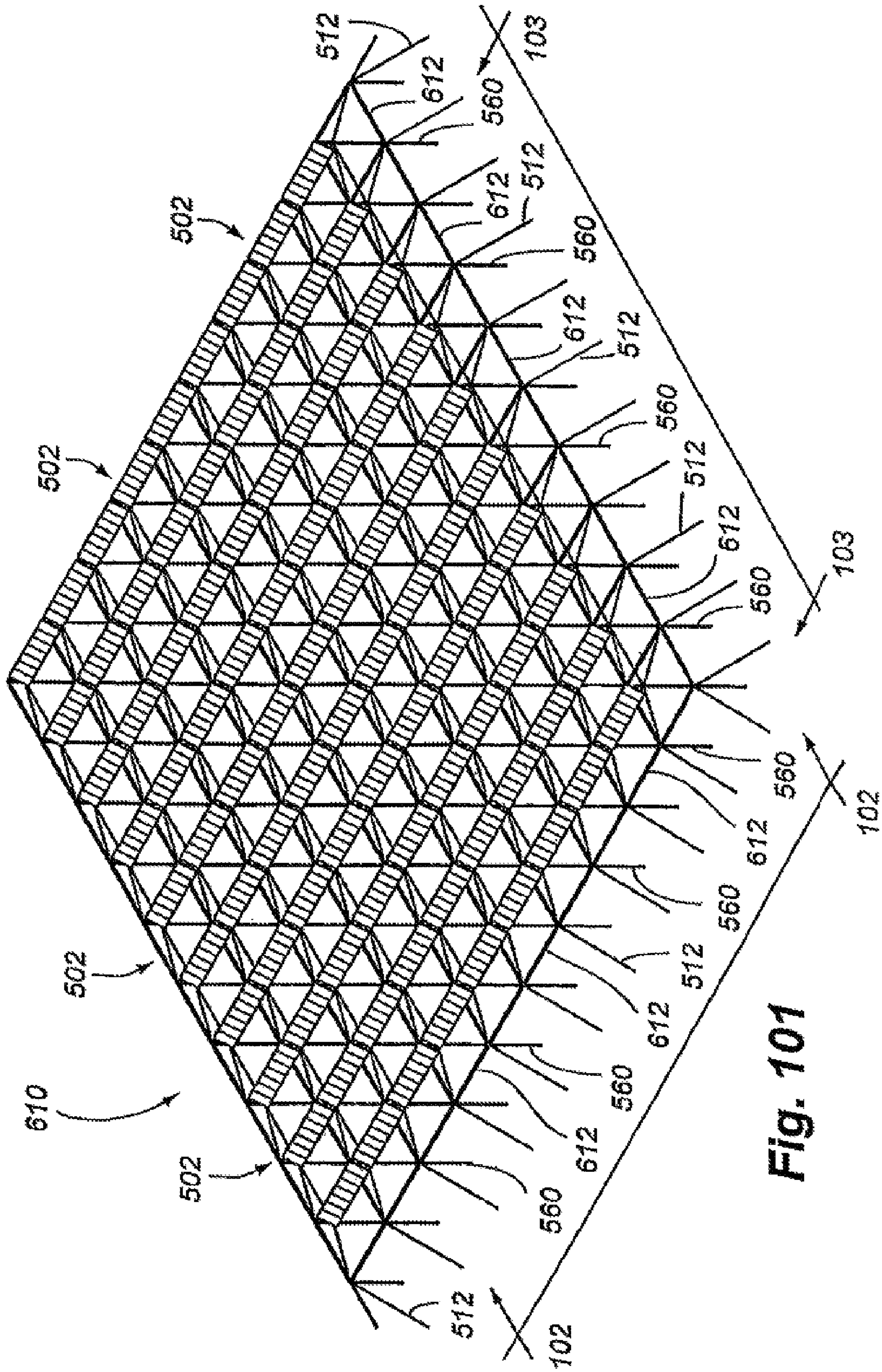
FIG. 101 is a perspective view of another preferred embodiment of the solar panel array in accordance with the present invention in which a single tracking capability is provided for linear extending rows of solar panels.
Figure 102:
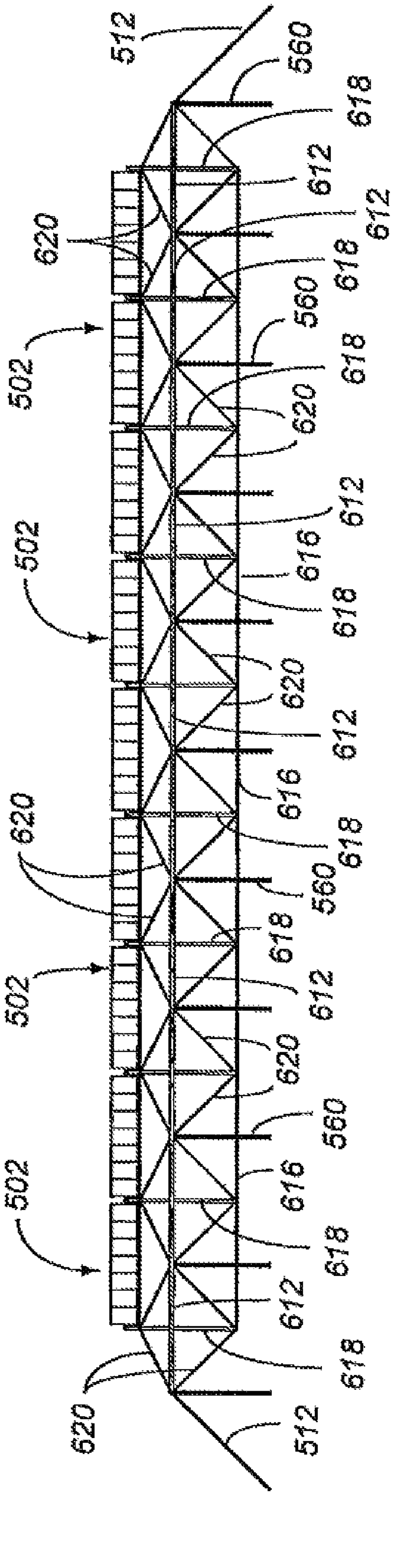
FIG. 102 is an elevation view taken along line 102-102 of FIG. 101.
Figure 103:
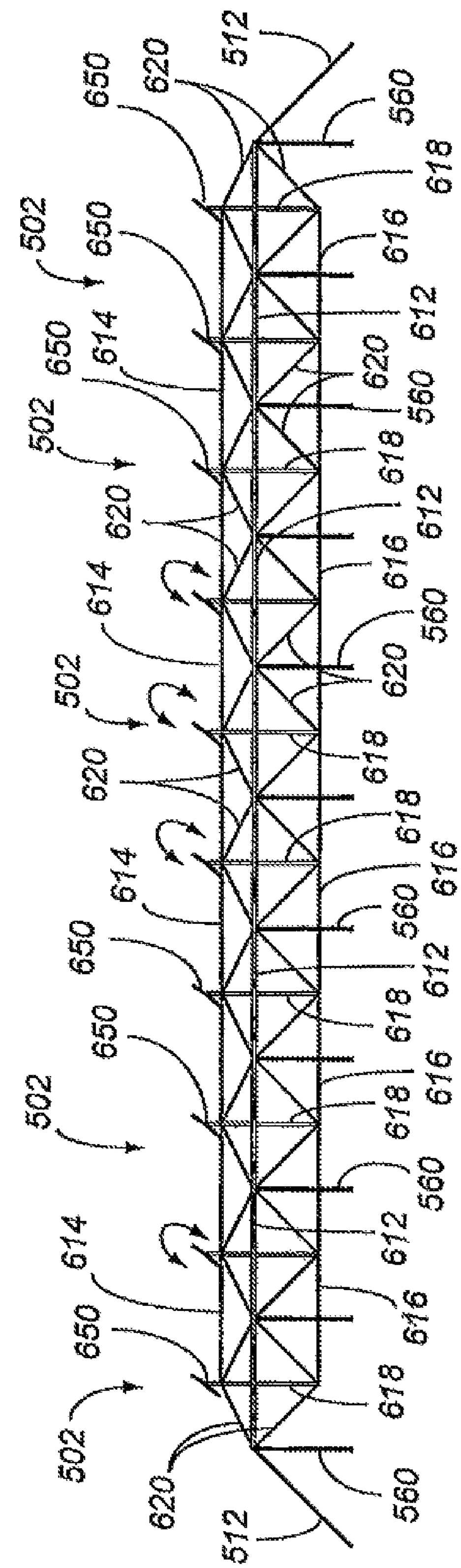
FIG. 103 is an elevation view taken along line 103-103 of FIG. 101.
Figure 104:
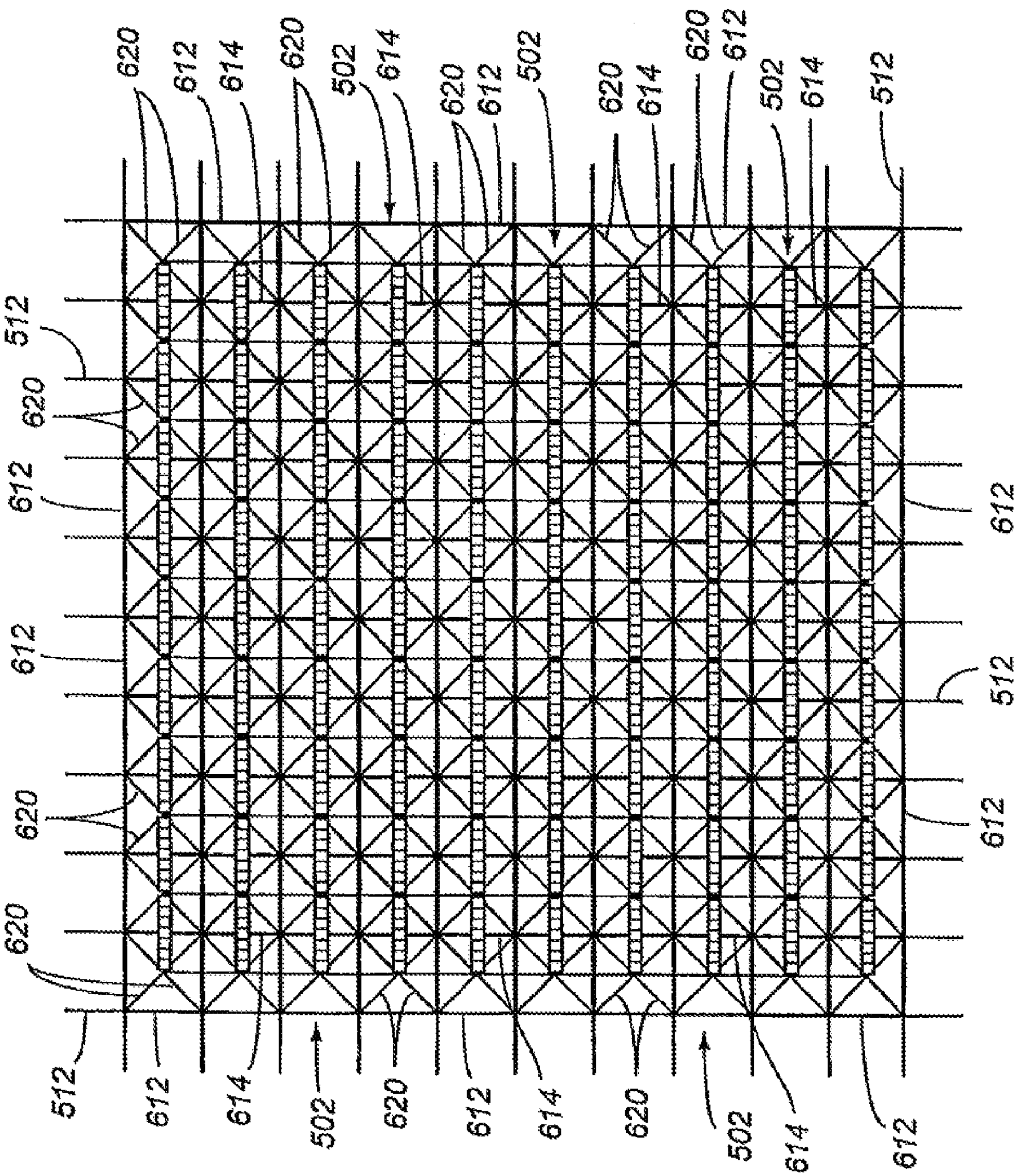
FIG. 104 is a plan view of the embodiment of FIG. 101.

FIGS. 101-104 provide yet another embodiment of the present invention. FIG. 101 is a perspective view showing that general support structure in this embodiment is the same as illustrated with respect to the embodiment of FIGS. 91-94. More specifically, the support structure for the solar panel array in this embodiment includes columns 560 that are located around the periphery of the array, horizontally extending support members 612, upper cables 614, lower cables 616, and interconnecting cables 620. The distinction in this embodiment however is that the pods 502 are not mounted for dual axis tracking capability but rather, are mounted for single axis tracking capability, such as illustrated in FIG. 95. More specifically, it is shown that the vertical support 618 provides interior support for a horizontal member, such as horizontal support 650 as shown in FIG. 95, to which the pods 502 are mounted. FIGS. 102-104 illustrate the linear arrangement of the pods 502 and the relatively larger spacing of the pods as compared to the prior embodiments. Thus, this embodiment is also conducive to the dual land use as described with respect to the embodiment of FIGS. 91-94.

Figure 105:
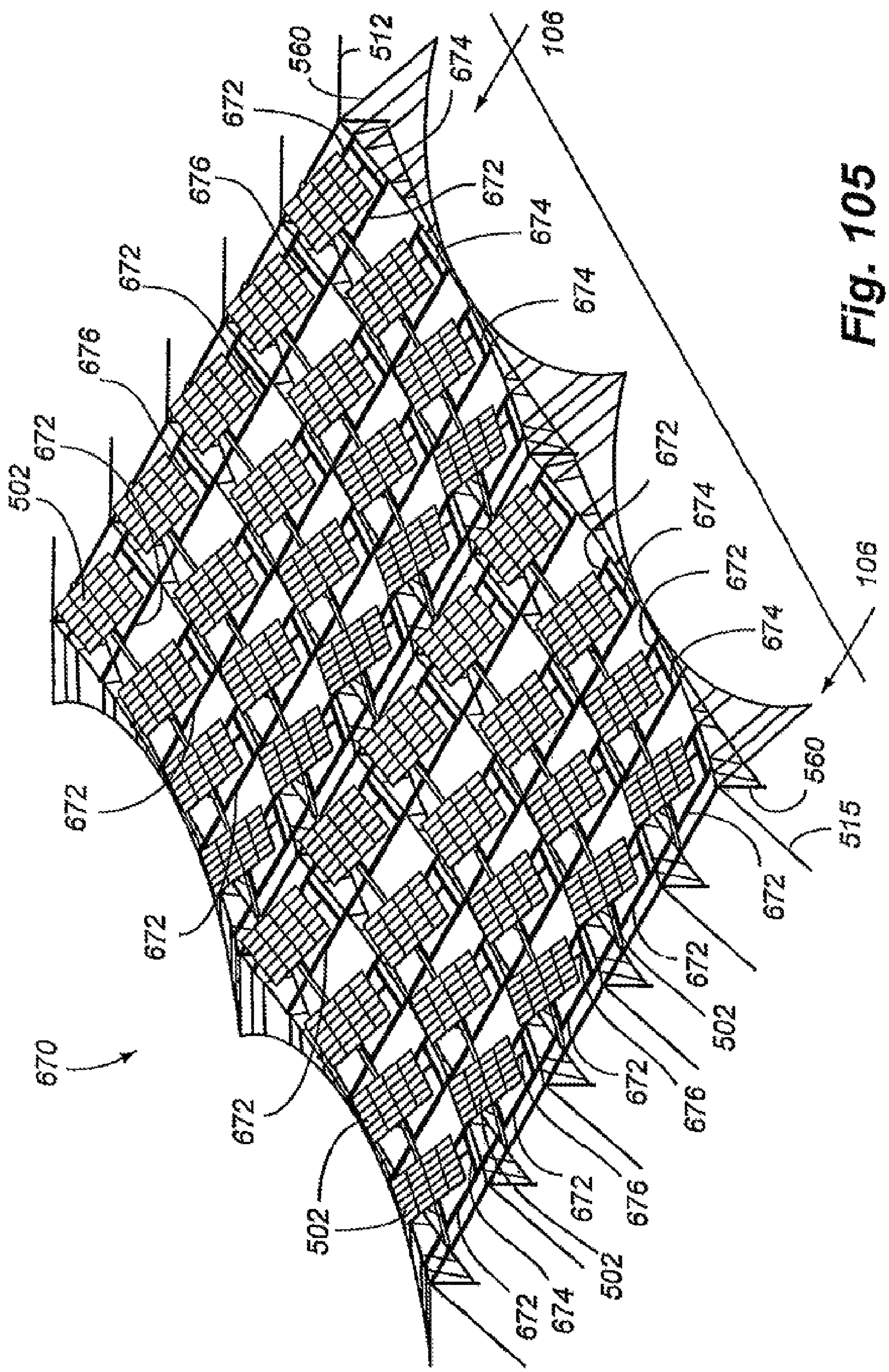
FIG. 105 is a perspective view of another embodiment of the present invention in which a single tracking capability is provided for solar panels that are individually controllable with respect to the tracking function.
Figure 106:
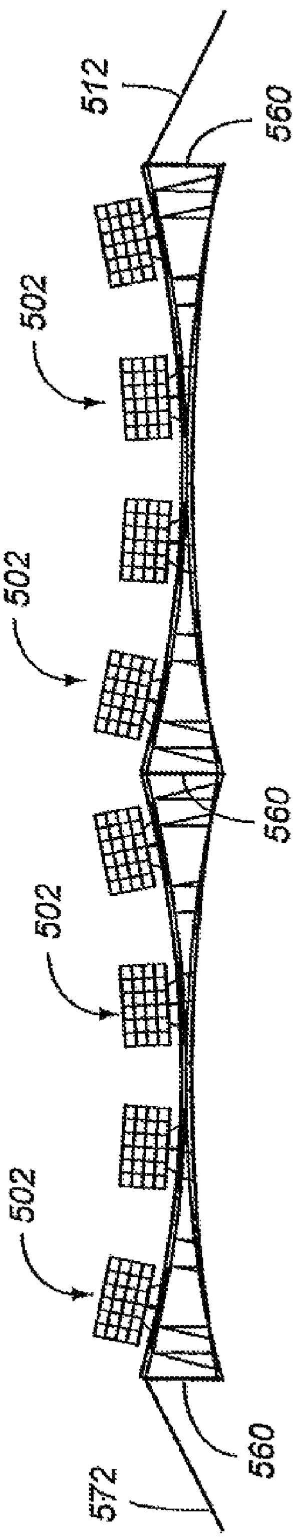
FIG. 106 is an elevation view taken along line 106/106 of FIG. 105.
Figure 107:
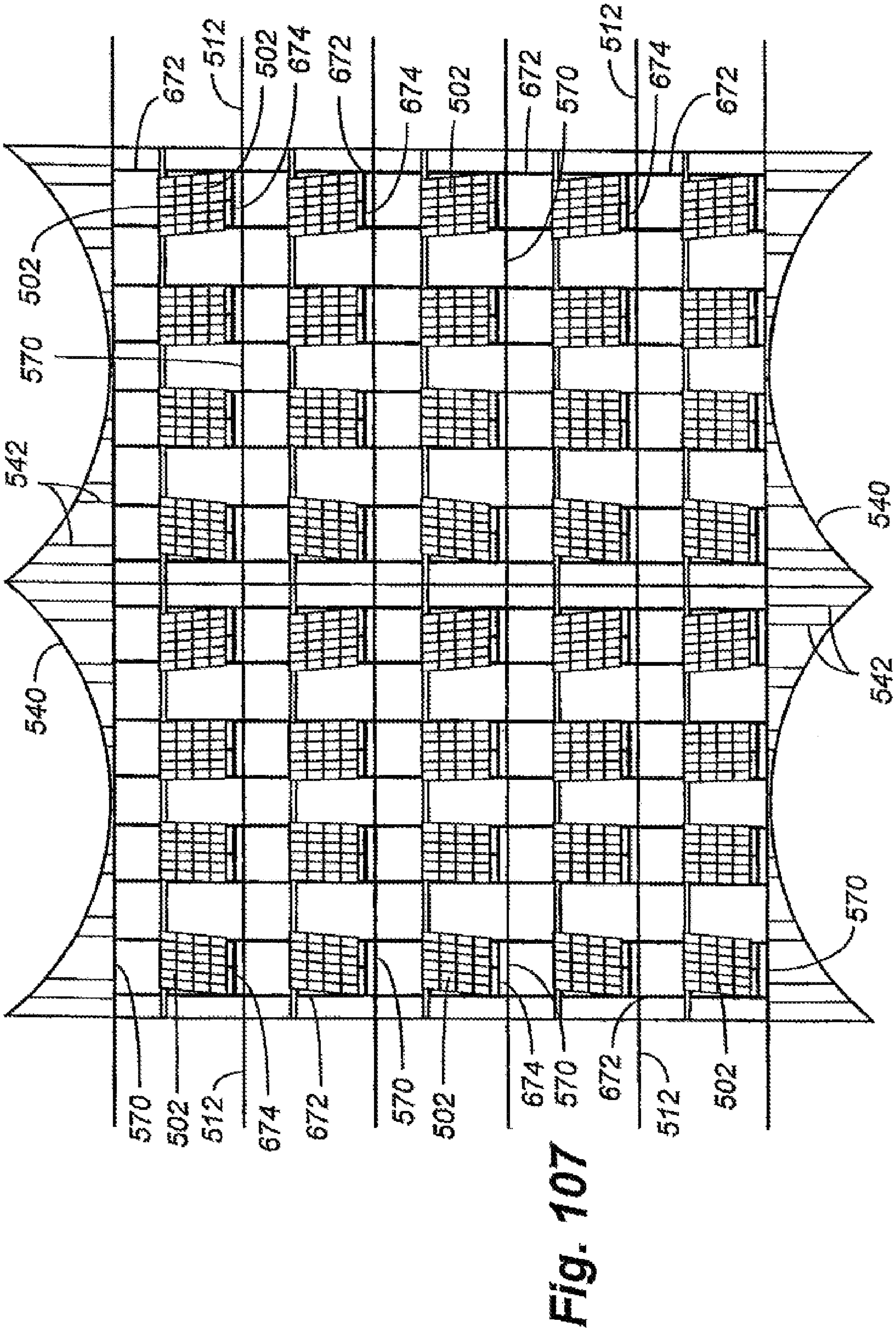
FIG. 107 is a plan view of the embodiment of FIG. 105.
Figure 108:
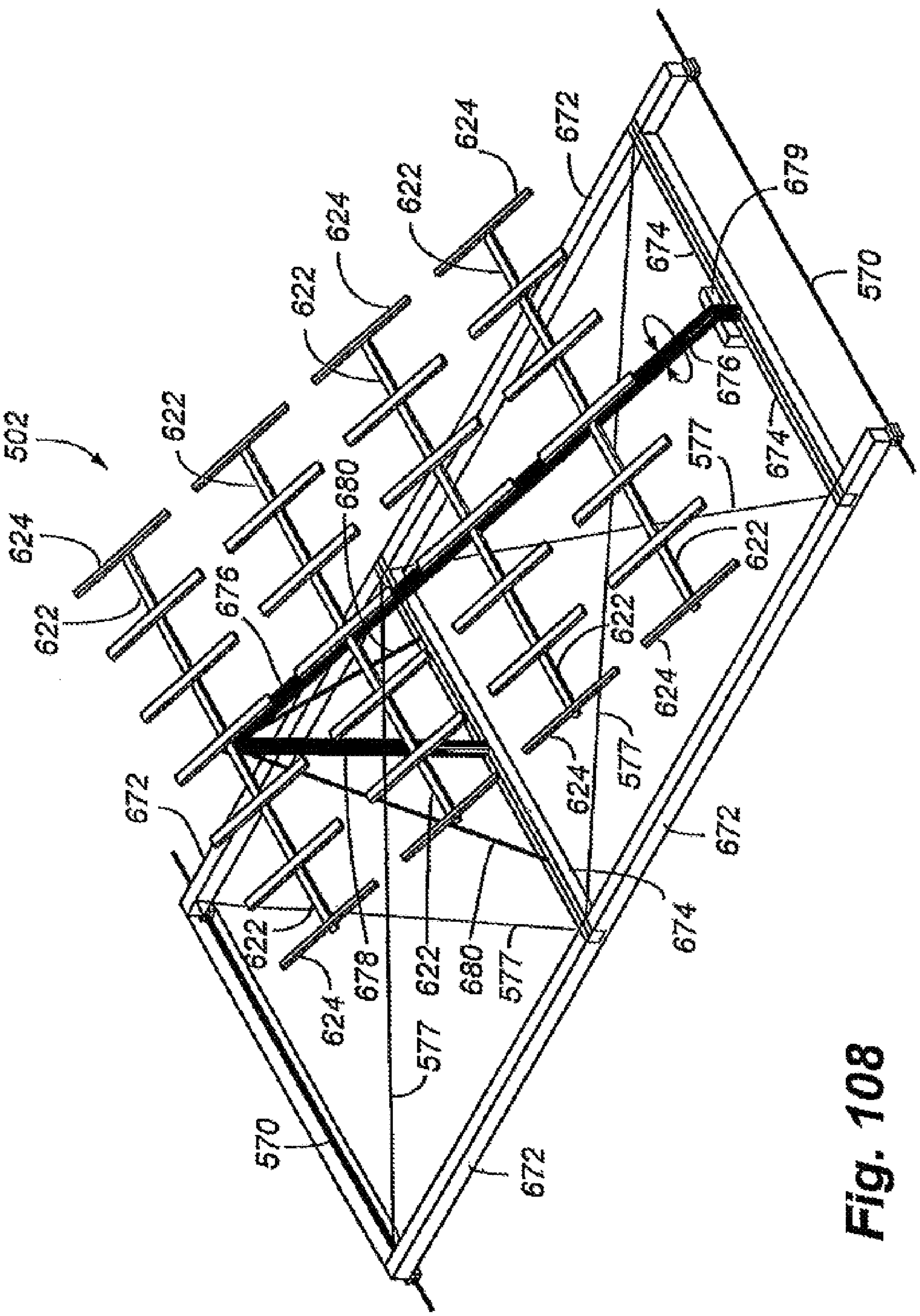
FIG. 108 is an enlarged fragmentary perspective view of a pod in the embodiment of FIG. 105 with the solar panels removed to expose the construction of the pod elements.

FIGS. 105-108 illustrate yet another embodiment of the present invention in which single tracking of the pods can be achieved. FIG. 105-107 show that the pods 502 are mounted again in a greater spacing as compared to many of the earlier embodiments. The enlarged perspective view of FIG. 108 provides yet another example of a particular pod construction that can be used for a single tracking feature of the present invention. The solar panels have been removed to illustrate the pod construction. The pod in this example comprises main beams 672 that extend between adjacent cables 570, along with stiffening supports 674 spaced between the beams 672. Additional torsional resistance can be provided with crossing cables 577. A riser 678 is connected at its lower end to one of the supports 674 and the riser 678 extends above the cables 570. Cables 680 can be used to support the vertical extension of the riser 678. Struts 622 and 624 are provided for direct mounting of the solar panels. Diagonal strut 676 supports the struts 622 and 624. The single axis tracking is achieved by the rotation of diagonal strut 676 by a motor 679 mounted adjacent to the strut 676 as shown.

Figure 109:
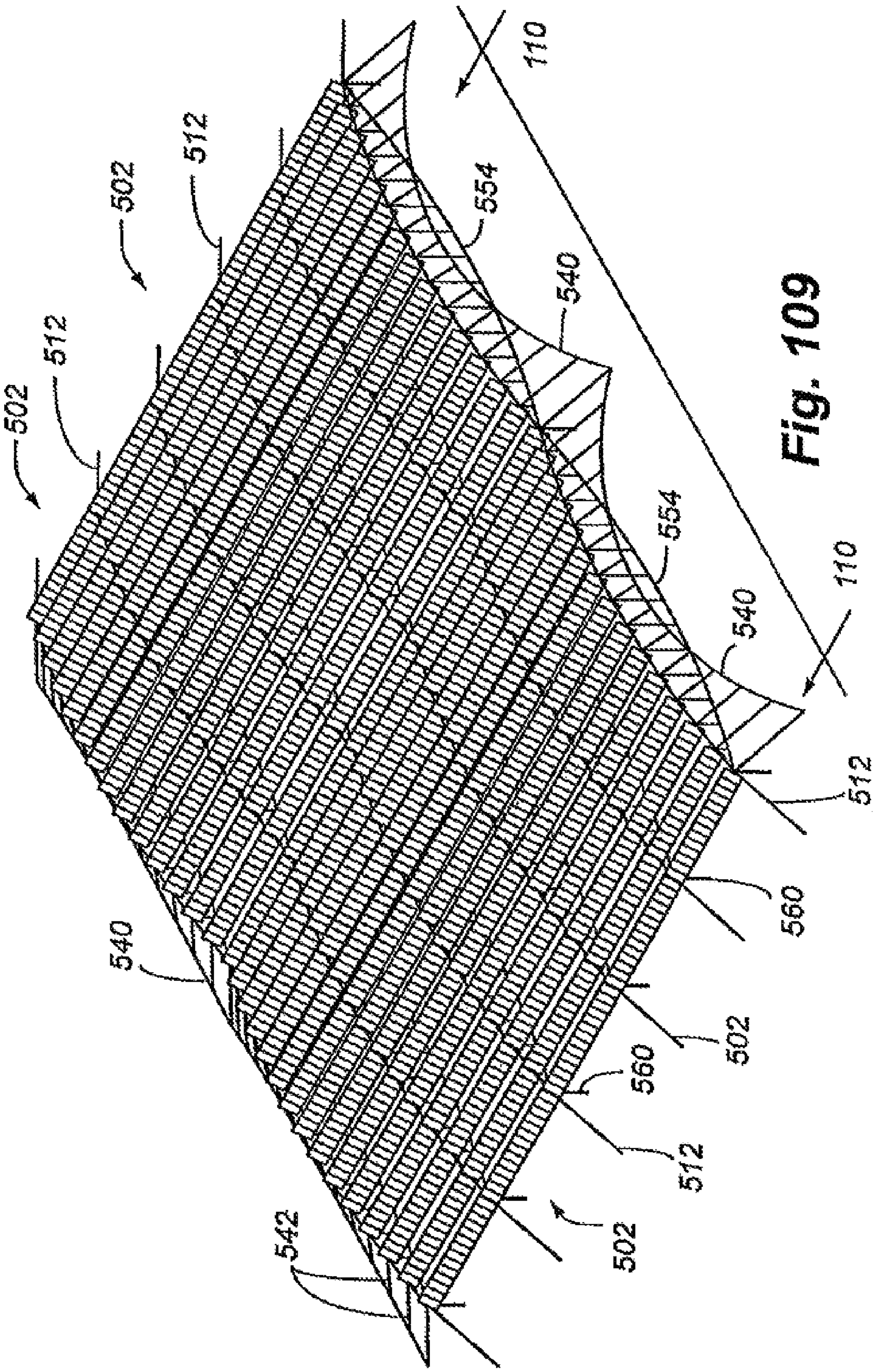
FIG. 109 is a perspective view of yet another embodiment of the present invention showing two spans of convex mounted pods with single axis tracking capability and pods mounted to follow the counter of the upper cables.
Figure 110:
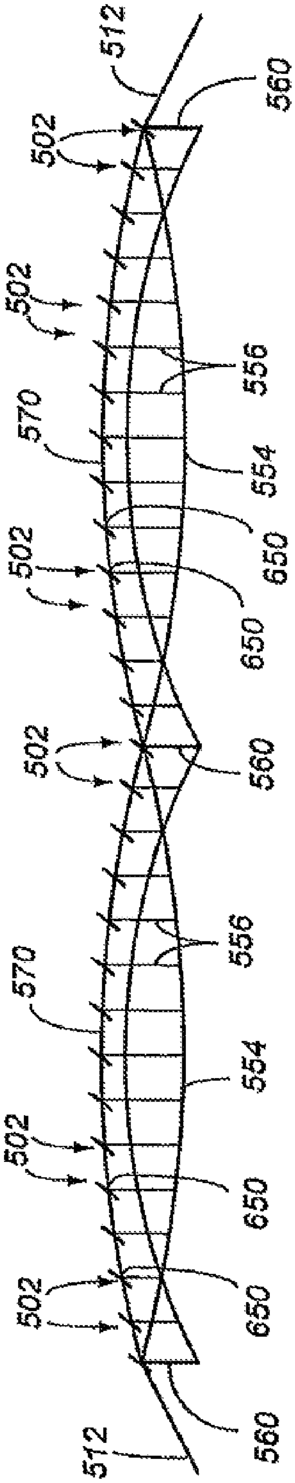
FIG. 110 is a side elevation view as taken along lines 110-110 of FIG. 109.
Figure 111:
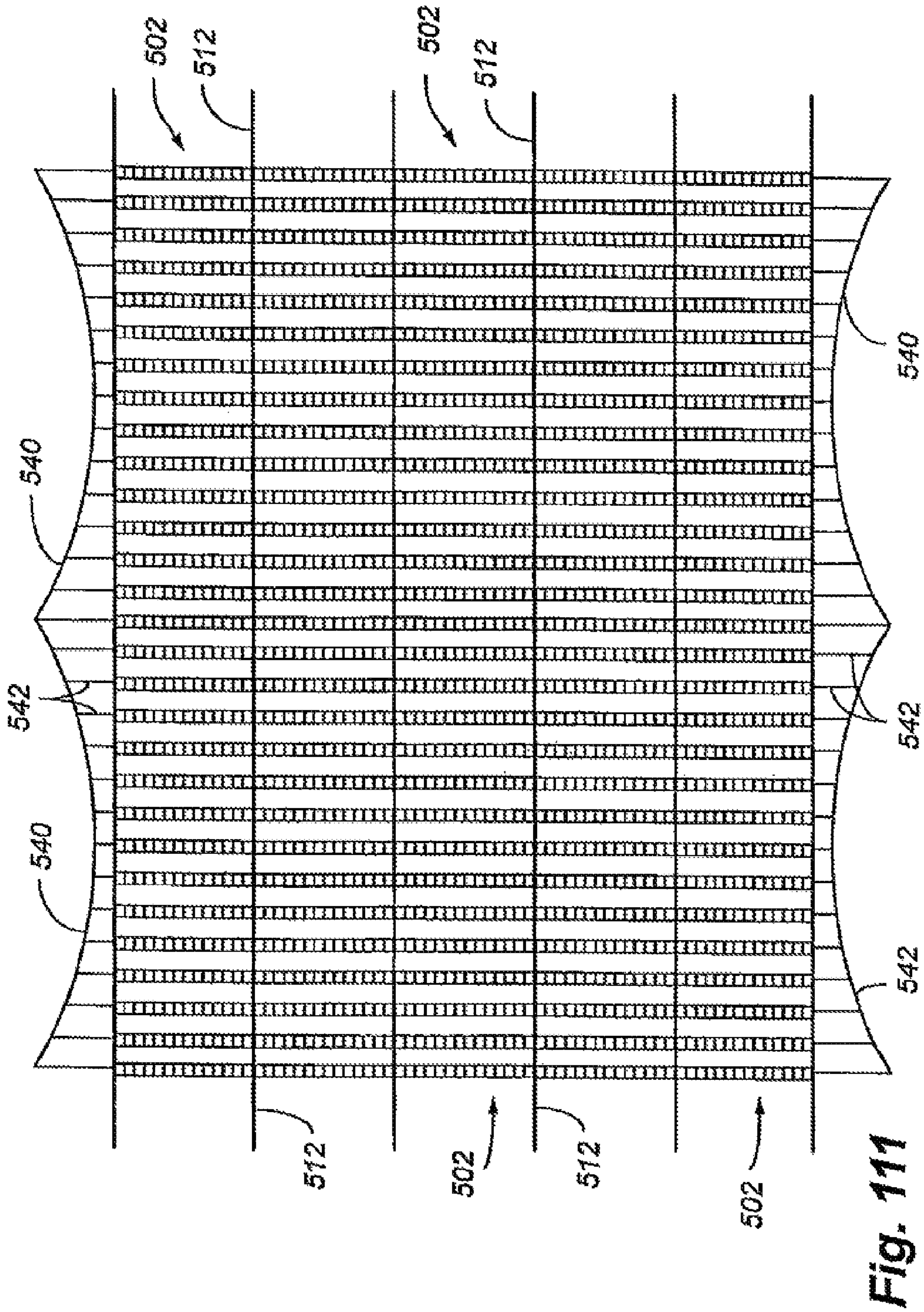
FIG. 111 is a plan view of the embodiment of FIG. 109.

FIGS. 109-111 illustrate yet another preferred embodiment of the present invention in the form of an array supported by compression trusses, and in which the pods 502 are disposed for single axis tracking along a horizontal rotation axis. As shown in FIGS. 109 and 110, the pods are disposed such that they are mounted at a height even with the upper support/cable 570. The pods are intended to have the ability to rotate about a horizontal axis and therefore, the pod construction shown in FIG. 96 can be adopted for this embodiment in which the pods are rotatable about one or more horizontally extending members 650.

Figure 112:
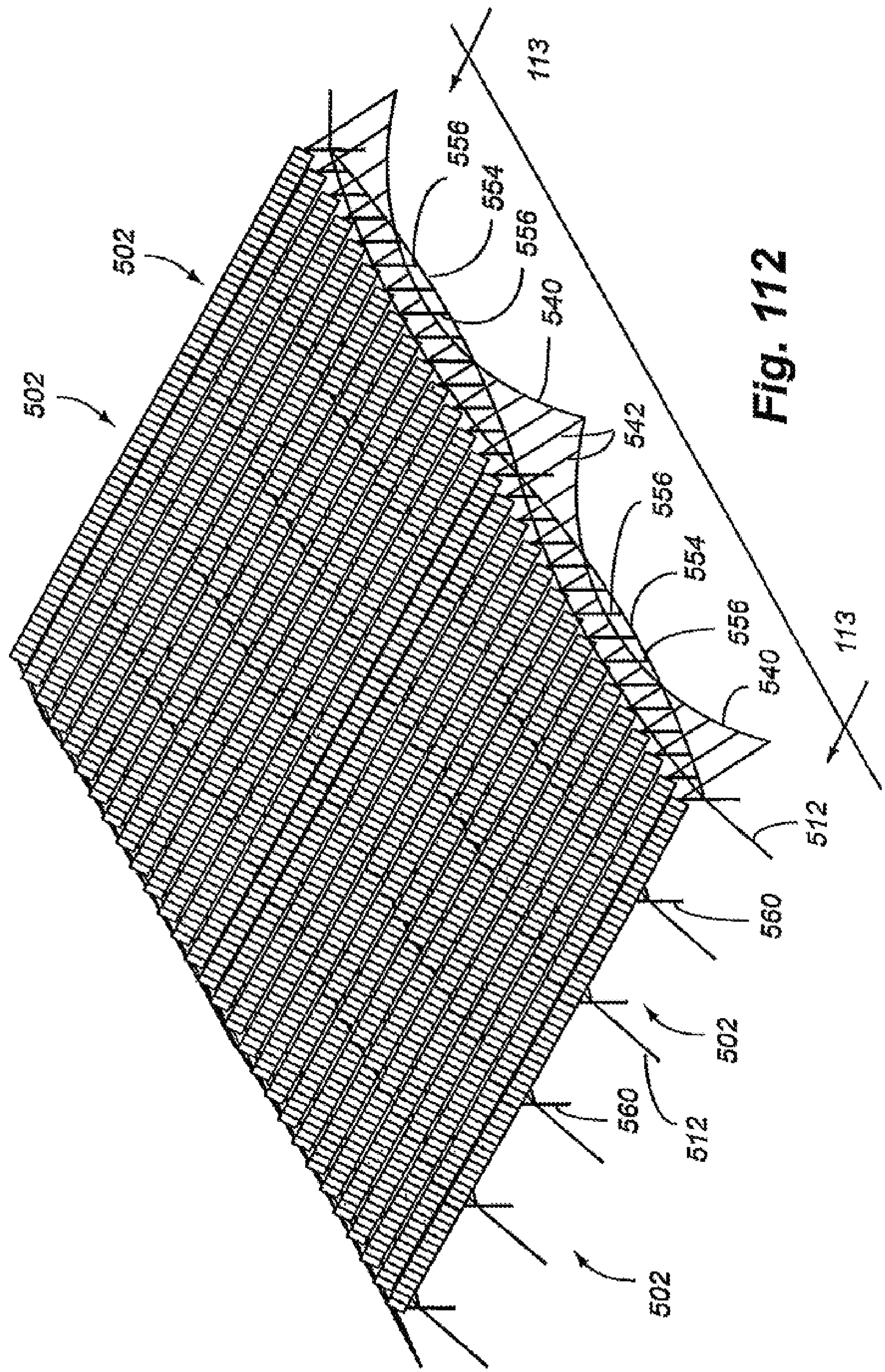
FIG. 112 is a perspective view of yet another embodiment of the present invention showing two spans of convex mounted pods with single axis tracking capability and pods mounted to achieve a planar configuration.
Figure 113:
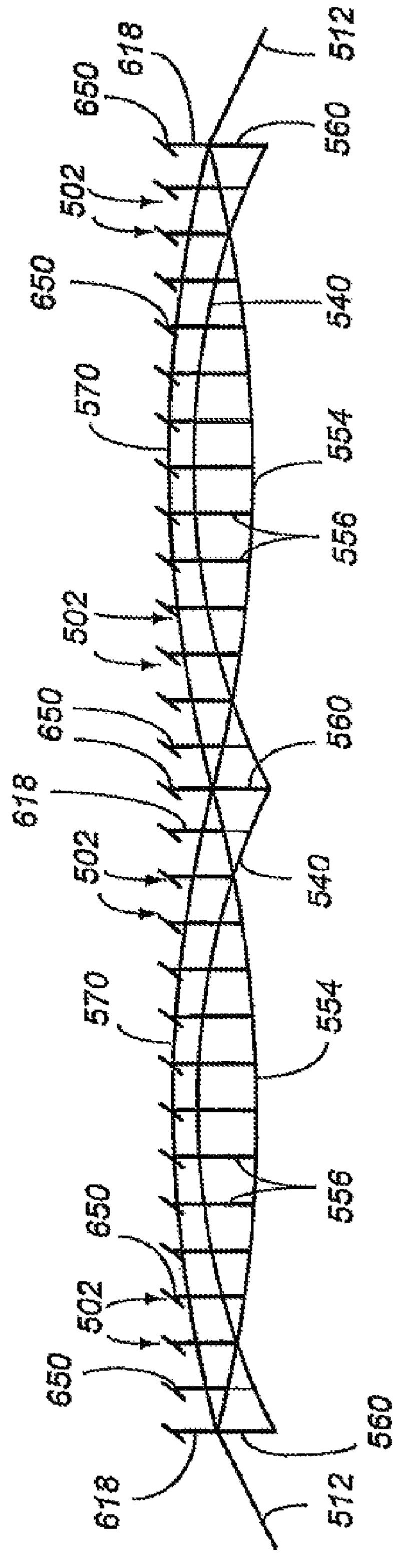
FIG. 113 is a side elevation view as taken along lines 113-113 of FIG. 112.

FIGS. 112 and 113 provides another embodiment similar to the embodiment illustrated in FIGS. 109-11 in which a single tracking function can be realized. The distinction in the embodiment of FIGS. 112 and 113 is that the pods 502 are mounted at the same height across the entire solar panel array, and the pods do not follow the shape of the compression trusses. This uniform height for the pods is achieved by extending the compression members 556 beyond the upper and lower cables. This configuration is best seen in FIG. 113 where the compression members 556 extend at varying heights above or at the level of the upper cable 570 to present the pods 502 in the linear orientation. The construction of FIG. 100 may be adopted in which tubes 700 that extend above the cable 570 may be selected in length to provide the linear orientation of the pods 502. This particular arrangement for the pods in FIGS. 112 and 113 may be advantageous to prevent inadvertent shading that may occur by a convex mounted arrangement of the pods. The construction of FIG. 100 may also be adopted to provide the single axis tracking capability in this embodiment.

Figure 114:
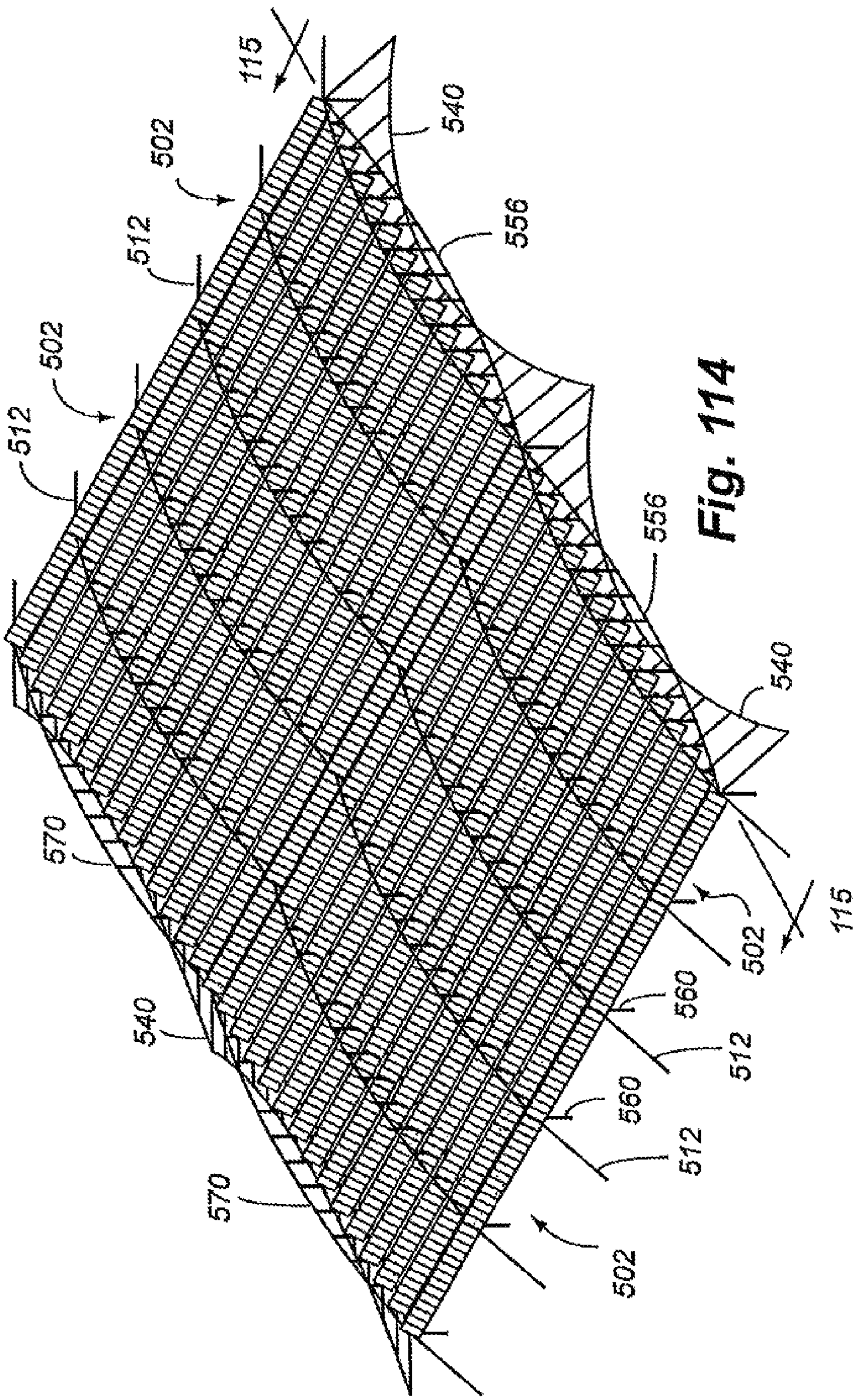
FIG. 114 is a perspective view of yet another embodiment of the present invention showing two spans of convex mounted pods with single axis tracking capability and pods mounted to achieve a planar configuration in which the pods are located midway between the upper and lower cables of the trusses.
Figure 115:
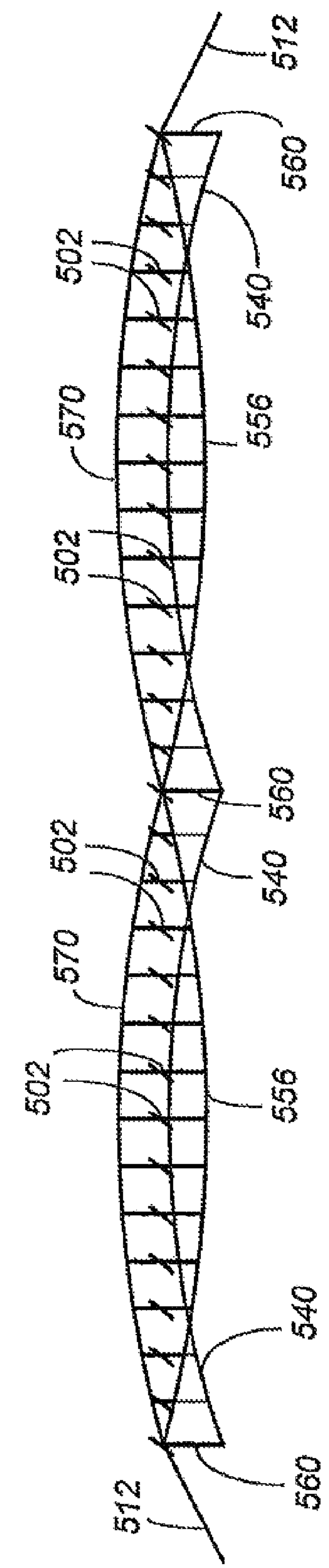
FIG. 115 is a side elevation view as taken along lines 115-115 of FIG. 114.

FIGS. 114 and 115 illustrate yet another preferred embodiment of the present invention including a solar panel array that incorporates a single axis tracking capability for pods that are arranged in linear and horizontally extending groups/rows. Referring to FIG. 115, the distinction in this embodiment is that the pods are mounted at a height between the upper cables 570 and the lower cables 554. Thus, the pods reside at a height which substantially bisects a horizontal line extending between the upper and lower cables. This arrangement of the pods may be advantageous for locations where high winds are a concern, and a lower disposition of the pods closer to the ground may reduce the wind loading on the overall structure. The construction of FIG. 100 may also be adopted to provide the single axis tracking capability in this embodiment.

Figure 116:
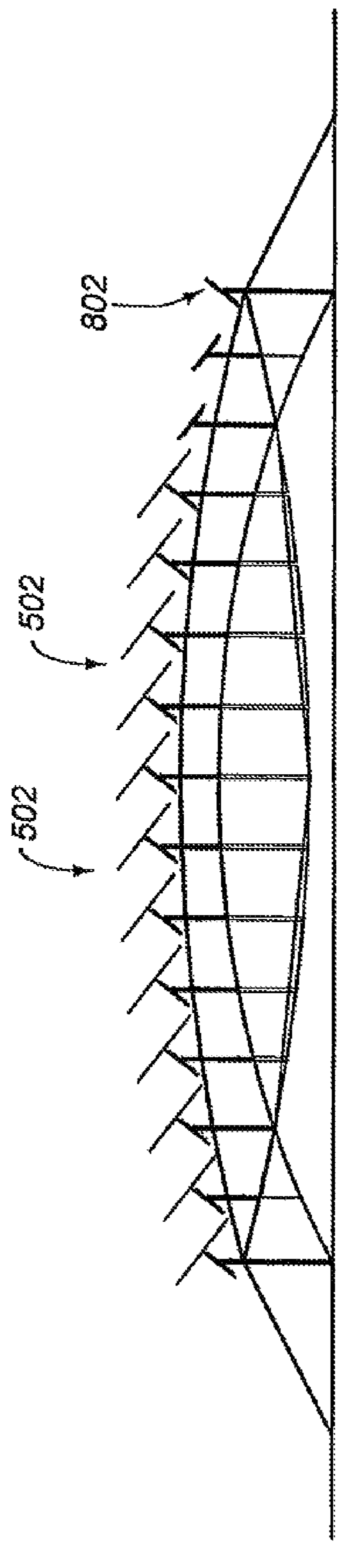
FIG. 116 is a side elevation view illustrating the a single tracking capability of the present invention to reverse orient pods in order to handle shading conditions produced by the array.

FIG. 116 illustrates yet another embodiment in which the single tracking feature allows selected pods to be rotated at a reverse inclination to account for shading that may inadvertently occur by the overall arrangement of the pods in a convex or concave arrangement. As shown in this figure, all of the pods 502 are oriented in a right-facing orientation, while the pod 802 is oriented in a left facing orientation.

Figure 117:
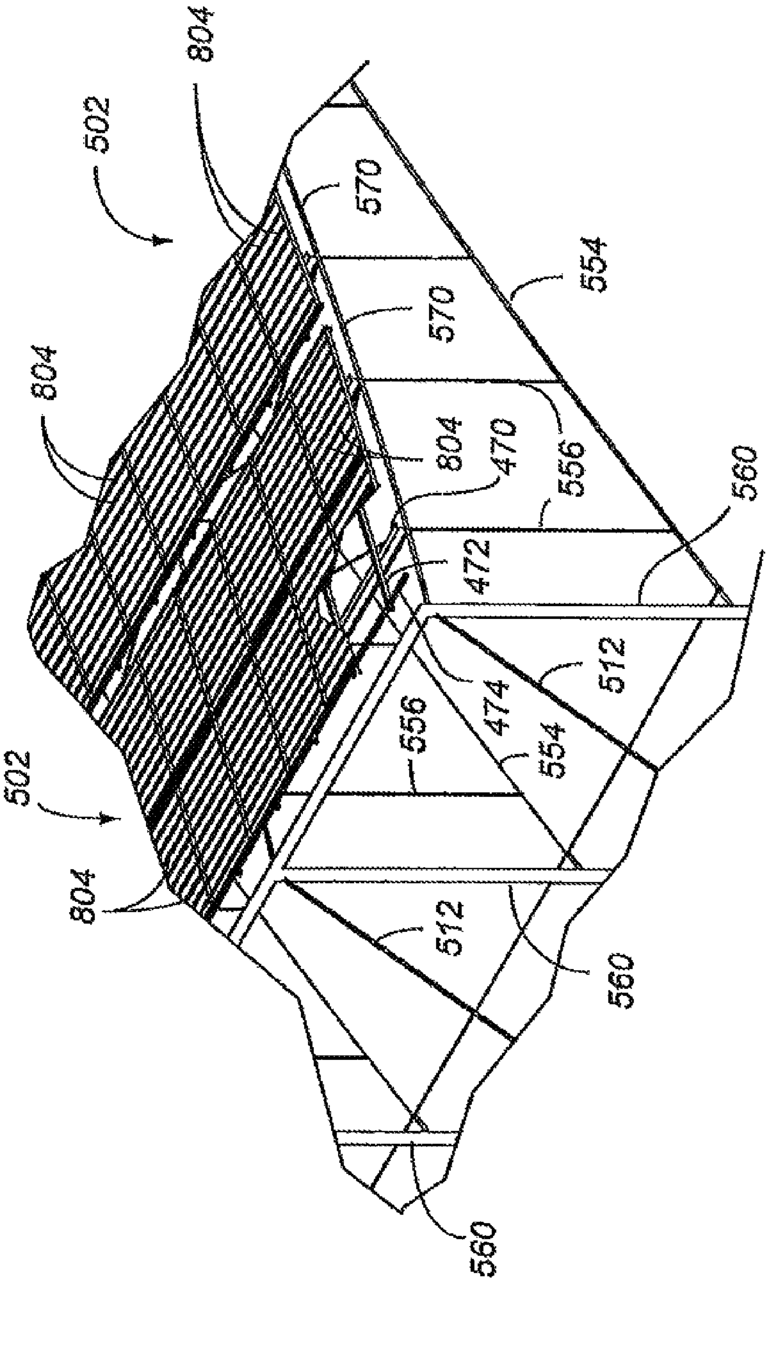
FIG. 117 is an enlarged fragmentary perspective view of a representative embodiment of the present invention incorporating tube or cylindrical shaped PV elements.

FIG. 117 is a partial fragmentary perspective view of an embodiment of the present invention in which tubular shaped PV elements are provided. As mentioned, there are a number of advantages in using tubular shaped PV elements, and such PV elements are ideally suited for use with the cable supporting systems of the present invention. The tubular PV elements 804 can be supported by any of the pod constructions illustrated in the present invention. The linear spacing of the PV elements can be chosen to allow the desired amount of sunlight to pass through the array. Alternatively, a reflecting membrane may be incorporated to allow reflected light to be used to supplement power generation. A membrane, such as a covering/membrane 440 shown in FIG. 47 may be used for purposes of reflecting light back onto the PV elements. The membrane may be coated with a reflective composition, or the membrane may be constructed of a reflective material. Although FIG. 117 shows one example of an embodiment that incorporates the tubular PV elements 804, it shall be understood that any of the embodiment of the present invention can be modified as shown in the FIG. 117 to receive the tubular PV elements in lieu of the solar panels 504. Additionally, the tubular PV elements may be provided in combinations with the panels 504 in selected pods and selected portions of an array.

Figure 118:
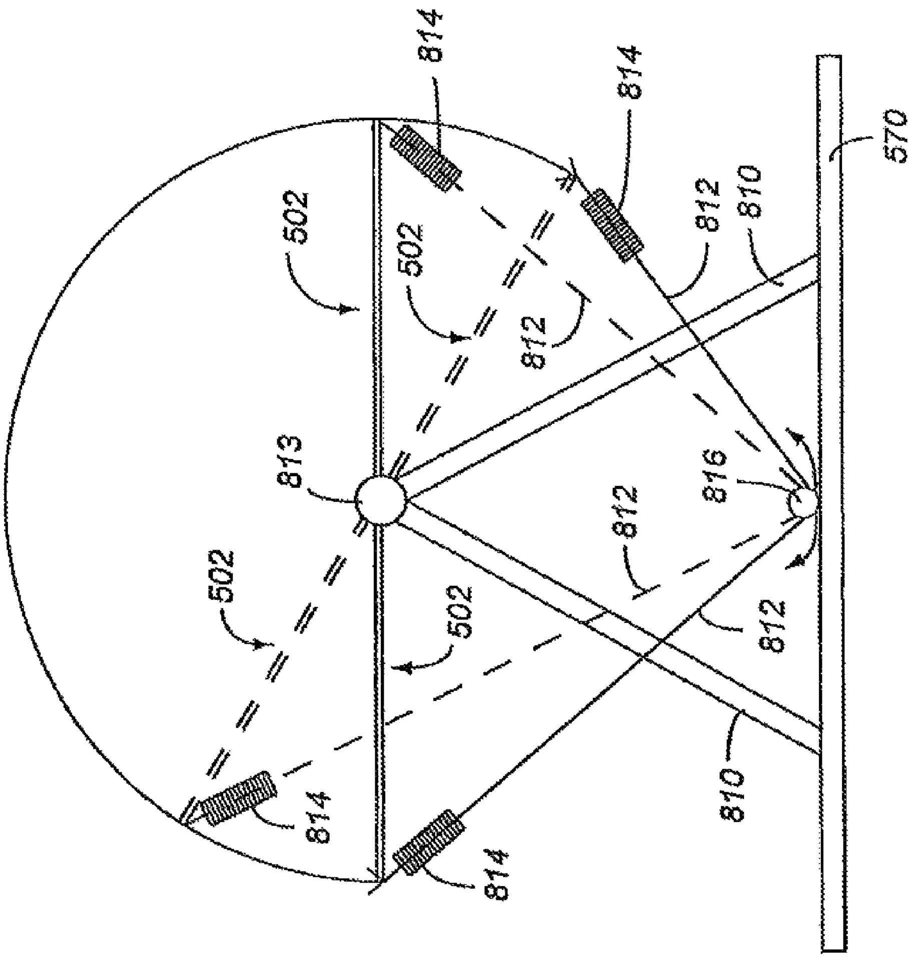
FIG. 118 is a schematic view of another single axis tracking mechanism in accordance with the present invention in which a biasing capability is provided to allow for some range of allowable rotation of the pods in response to high winds.

FIG. 118 is a schematic elevation view of yet another embodiment of the present invention showing a single axis tracking capability in which the pods 502 are able to slightly rotate in a biased arrangement to compensate for high wind gusts or other inclement weather situations in which a rigid connection might otherwise damage the tracking hardware. More specifically, FIG. 118 shows an upper cable 570 of a truss and a pair of diagonal support members 810 mounted to the upper cable. The support members 810 converge and support a horizontally extending rotational member 813 which provides rotation along a horizontal axis. Rotational member 813 may be rotated by a motor (not shown), such as the arrangement of the motor 654 that rotates horizontal member 650 shown in FIG. 96. The pod 502 is mounted to the rotational member 813 at a point generally midway along the length of the pod. FIG. 118 also provides a biasing cable 812 and springs/biasing elements 814 located at opposite ends of the cable 812. The cable 812 is secured at its opposite ends to the opposing ends of the pods 502. The cable 812 is routed through a roller 816 mounted to the pod truss or mounted to the cable 570. The pod 502 and other pods mounted to the rotational member 813 are angularly adjusted by the single axis tracking assembly, and the gearing of the tracking assembly is such that there is some amount of small rotational capability compensated for by the biasing elements 814. The biasing elements 814 are able to bias needed rotation of the pods to prevent damage to the tracking assembly in the event a wind force would otherwise cause undue stress on the pods or the tracking assembly. A rigid and unbiased connection between the tracking assembly and the pods and support members is subject to greater damage in the high wind conditions.

It is contemplated within the present invention that the single and dual tracking capabilities of the pods carrying the solar panels be controlled by an automated system in which one or more controllers are programmed to provide output signals to the tracking mechanisms. The controller(s) automatically adjust the orientations of the pods based upon a computer program that most efficiently orients the pods for capture of sunlight. Accordingly, the controller(s) may be computing devices with appropriate software/firmware to generate appropriate signals/commands to the motors which control the rotation of the installed tracking mechanisms. The automated system may provide offsite control for an operator in which the controller(s) communicate with the tracking mechanisms by a wireless communications protocol. A web based solution can be provided in which the operator is provided various user interface options for controlling the tracking mechanisms. The user interfaces may also provide the user the ability to manually adjust the pods to account for other circumstances in which it may be desirable to adjust the positioning of the pods.

Figure 119:
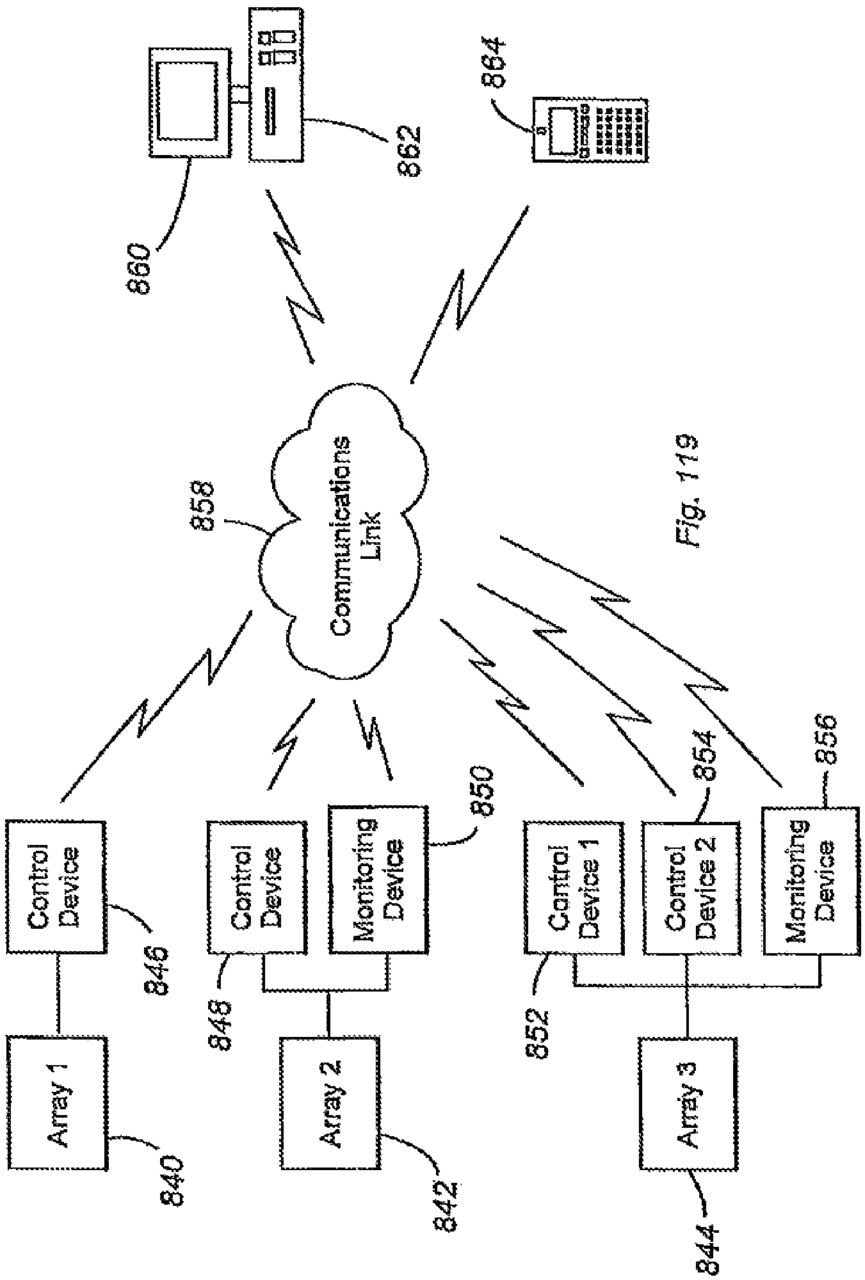
FIG. 119 is a schematic diagram of a control system in connection with another aspect of the present invention.

In connection with this automated system, FIG. 119 is provided to illustrate one preferred embodiment of the control system of the present invention that is used to control various operating parameters of the solar panel arrays. FIG. 119 specifically illustrates three separate and remotely located solar panel arrays, marked as Array 1, 840; Array 2, 842; and Array 3, 844. Each of the arrays has one or more control devices which control some aspect of the operation of the corresponding arrays. As illustrated, Array 1 has control device 846, Array 2 has control device 848, and Array 3 has two control devices, 852 and 854. The control devices may include motors that are used to operate tracking mechanisms to adjust the positions of the pods. The control devices could also be peripheral systems that enhance the operation of the arrays, such as an automatic cleaning system that generates a spray of water to clean the arrays. Arrays 2 and 3 are also shown as having monitoring devices 850 and 856 that may be used to monitor some aspect of the operation of the arrays. For example, the monitoring devices 850/856 could be devices to include electrical energy monitoring devices that monitor the electrical output of the arrays, temperature sensors, and/or cameras that allow an operator to view the arrays within the surrounding environmental conditions.

Each of the control and monitoring devices of the arrays communicate with at least one controller 862 through a communications link 858 such as the Internet. The controller 862 is depicted as a conventional computer with a user interface 860 in the form of a user screen. The controller 862 may include software/firmware that sets forth control parameters for adjusting the angular positions of the arrays based upon seasonal changes in which the sun traverses different paths across the sky as the earth rotates. The controller 862 generates control signals that are sent through the communication link 858, and received by the control and monitoring devices. Each of the arrays can be continually controlled in order to maximize the positioning of the arrays with respect to orientation of the individual pods for receiving maximum sunlight. It is also contemplated that a hand-held controller 864 could also operate the arrays in the same manner as the controller 862.

One clear advantage of the system shown in FIG. 119 is the ability to remotely and centrally control a plurality of arrays located at different locations. Individual control parameters can be generated by the controller for each array at each separate location thereby providing great flexibility for a control system in which electrical energy output is maximized.

Figure 120:
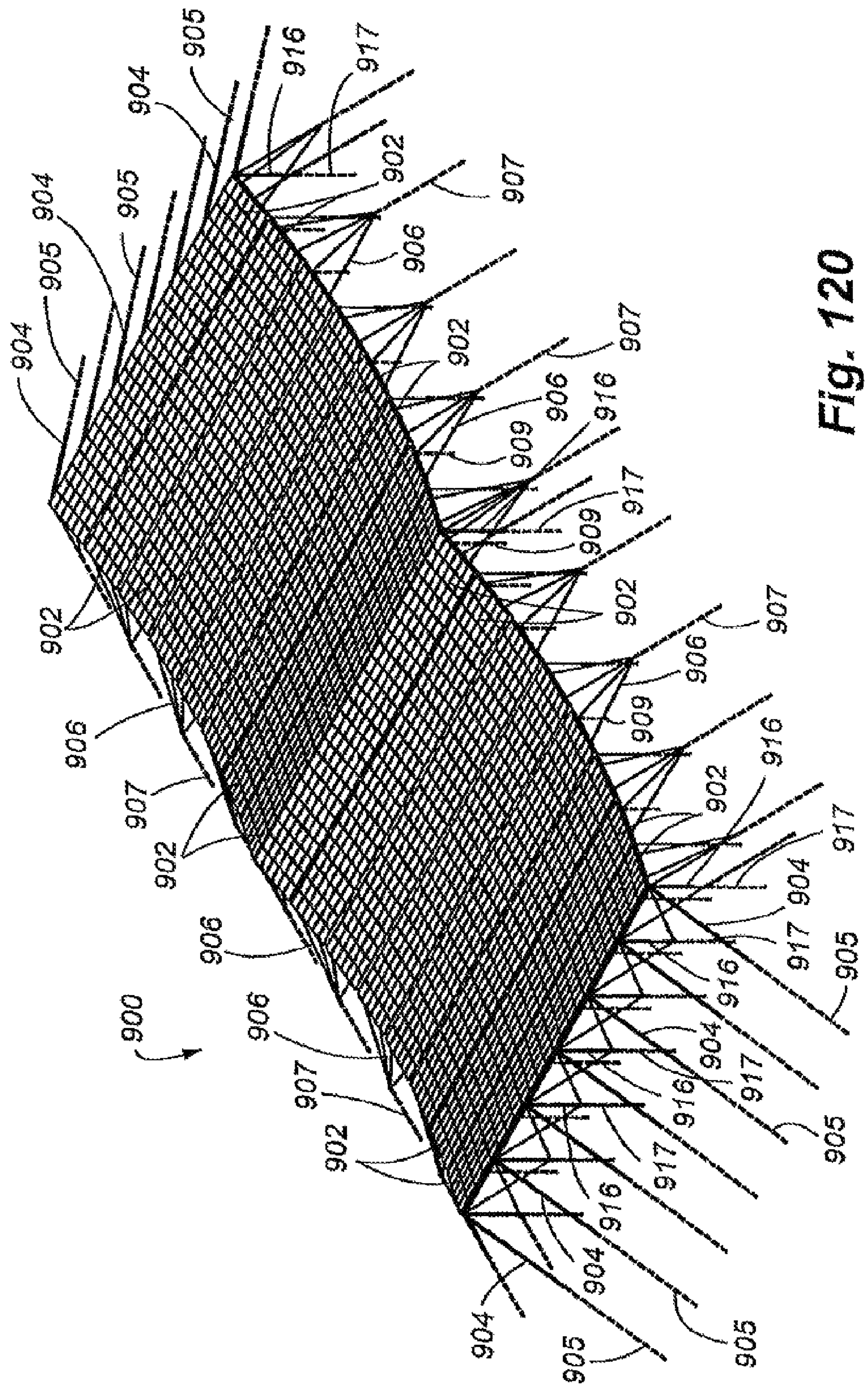

FIG. 120 illustrates another solar panel array 900, and more particularly, an array that has a number of elements that are anchored to the ground and therefore eliminates some of the required supports. Specifically, the embodiment of FIG. 120 differs from the previous embodiments in that a lower curved supporting cable is not used; rather, a plurality of vertically extending intermediate cables or tie-downs are used that are anchored to the ground. If cables are used, then the cables are attached to subsurface supports, such as helical piles or other foundation elements. In lieu of cables, continuous tie downs can be used in which the tie downs are rigid members and also extend into the ground and therefore act as their own subsurface supports. Also referring to FIGS. 121 and 122, the array 900 includes a plurality of pods 902 that are mounted upon an upper supporting cable. These figures show the array 900 as having two spans; however, it shall be understood that the array may have more or less than two spans, depending upon the number of spans required for the specific application. A plurality of exterior anchor cables or tie-downs 904 is illustrated in which the cables 904 connect to a subterranean pile or foundation 905. The dotted lines shown in FIG. 120 indicate members that lie below the ground. Alternatively, the cables/tie-downs 904 may be continuous rigid members, and therefore the lower ends thereof act as foundations or anchors. On the other lateral side edges of the array, a plurality of converging tie-downs 906 are provided with integral subsurface supports 907. The tie downs 906 comprise a plurality of cables or rigid elements with first upper ends that are secured to the pods, and second lower ends that converge and connect to the subsurface support 907 that acts an anchor or foundation element. Preferably, as shown in FIG. 120, each of the elements are connected to opposite sides of a pod 902 so that each of the pods 902 has two supporting cables/rigid elements anchored to the ground.

Figure 121:
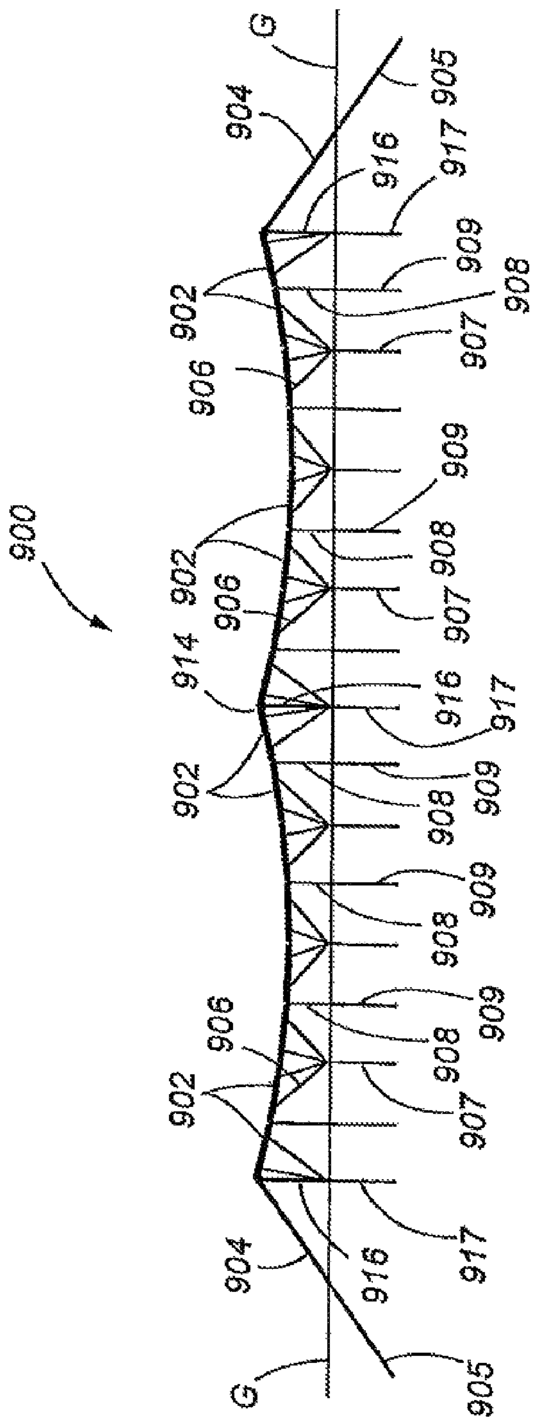

As best seen in FIG. 121, the array 900 further includes a plurality of intermediate tie-downs 908 and corresponding piles or foundations 909. The subsurface supports are shown as being anchored in the ground G. By directly anchoring the intermediate tie downs to the ground G, the lower supporting cables shown in some of the previous embodiments can be eliminated. Further, since the intermediate tie downs are directly supported in the ground, the loading requirements are reduced on the other columns and therefore smaller columns and cables can be used on other areas of the array.

Figure 122:
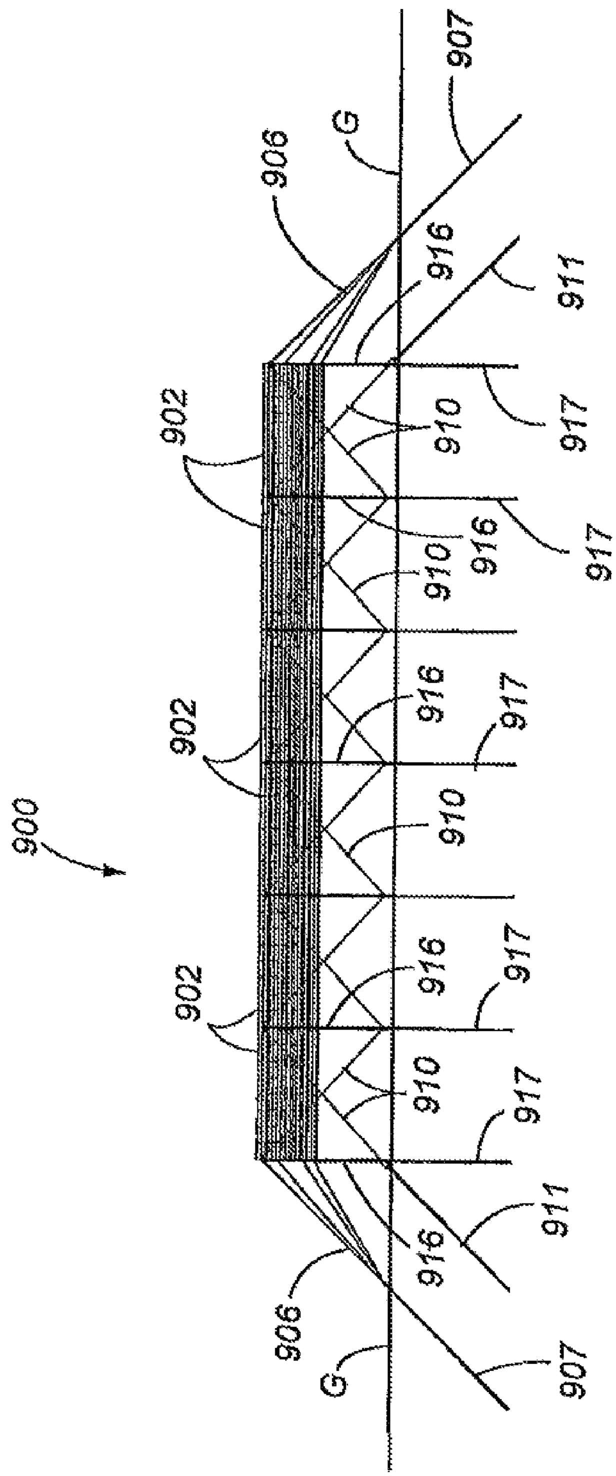

Referring to FIG. 122, the array 900 also includes a diagonal pattern of supporting cables 910, in which opposite ends of the diagonal cable arrangement are anchored as by piles 911. The array further includes end columns 916 that also have corresponding subterranean foundations or piles 917. The subsurface supports again are shown as being anchored in the ground G.

Figure 123:
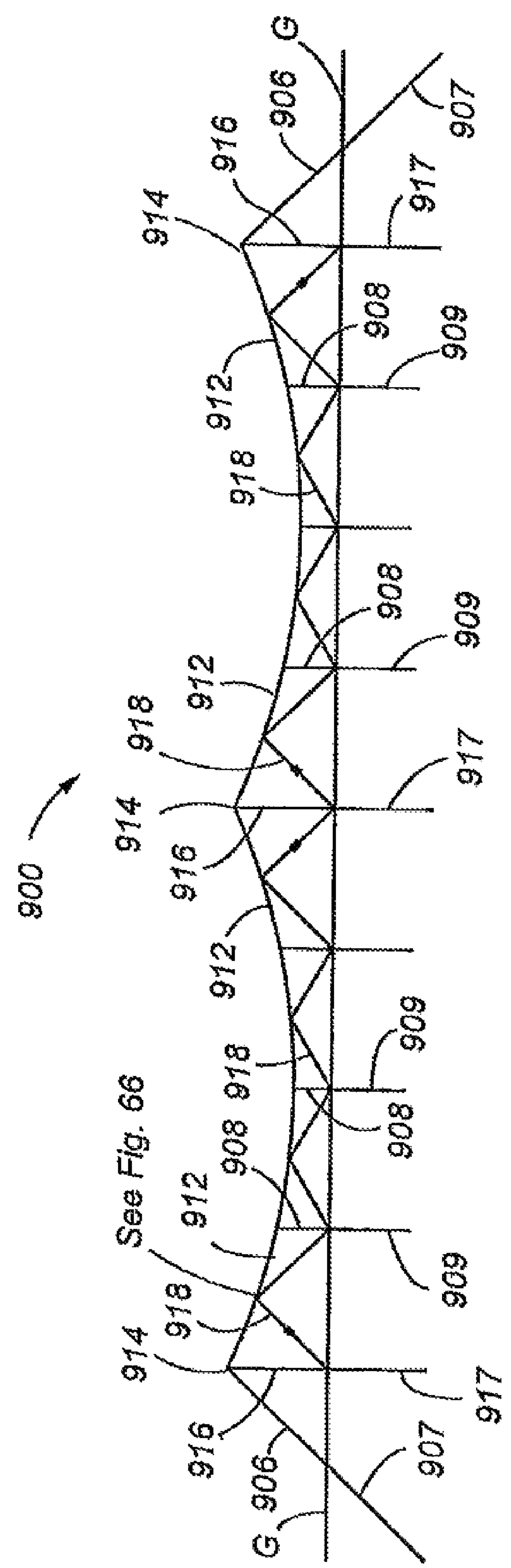

Referring to FIG. 123, a simplified side elevation is provided that illustrates the array 900 also including a continuous tensioning cable 918 in which the cable is fixed at one end of the array, and the continuous cable 918 incorporates a tensioning device such as shown in FIG. 66. The continuous cable can be tightened or loosened to provide the necessary additional rigidity for the array.

Figure 124:
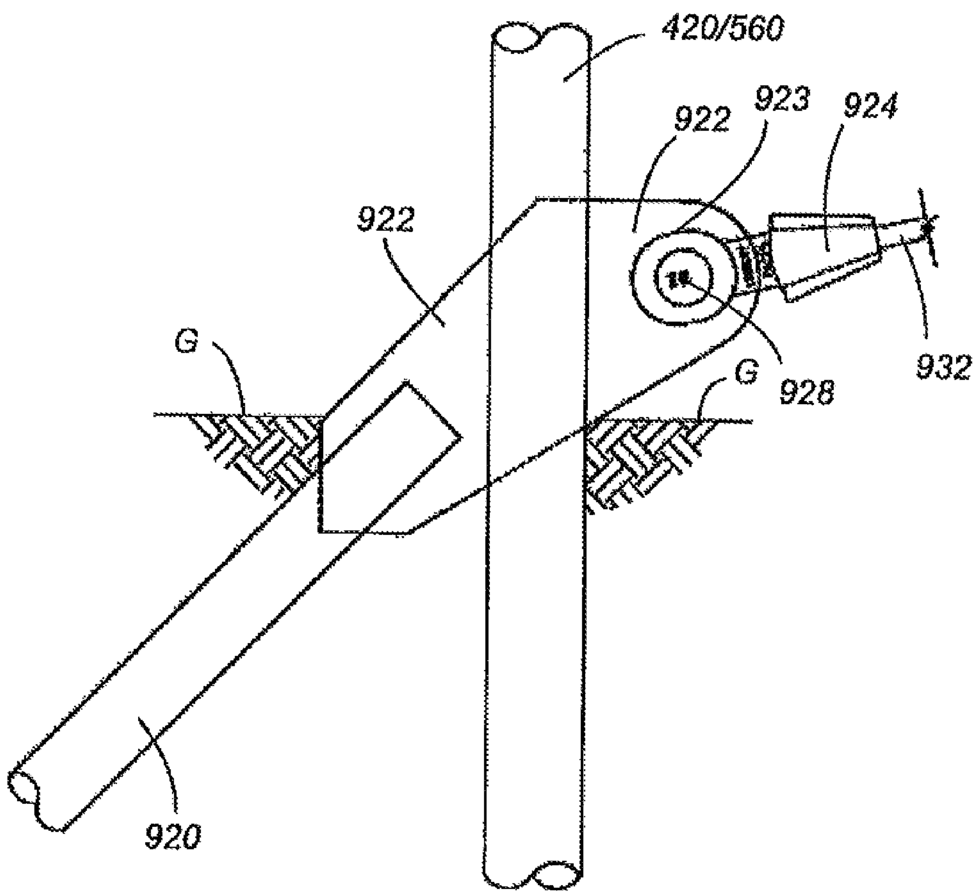

FIG. 124 illustrates an example of a continuous column/foundation, such as columns 420/560 in the previous embodiments, or any of the vertically extending members in the embodiments of FIGS. 120 through 123. These continuous members are both above surface and subsurface supports as shown where the continuous members are anchored in the ground G. A connecting plate 922 is attached, for example by welding, to one lateral side of the column member 420/560. One side of the connecting plate 922 also facilitates the attachment of a supplementary pile or foundation 920, and the opposite side of the connecting plate 922 may include an opening 923 which receives hardware for interconnecting the attachment plate to a cable. For example, the hardware may include a clevis 928, and the clevis in turn connects to a socket connector 924 that secures one end of a supporting cable 932. This continuous column member 420/560 and connecting plate 922 combination provides a simple yet effective way in which to increase array support without adding additional cables and columns.

Figure 125:
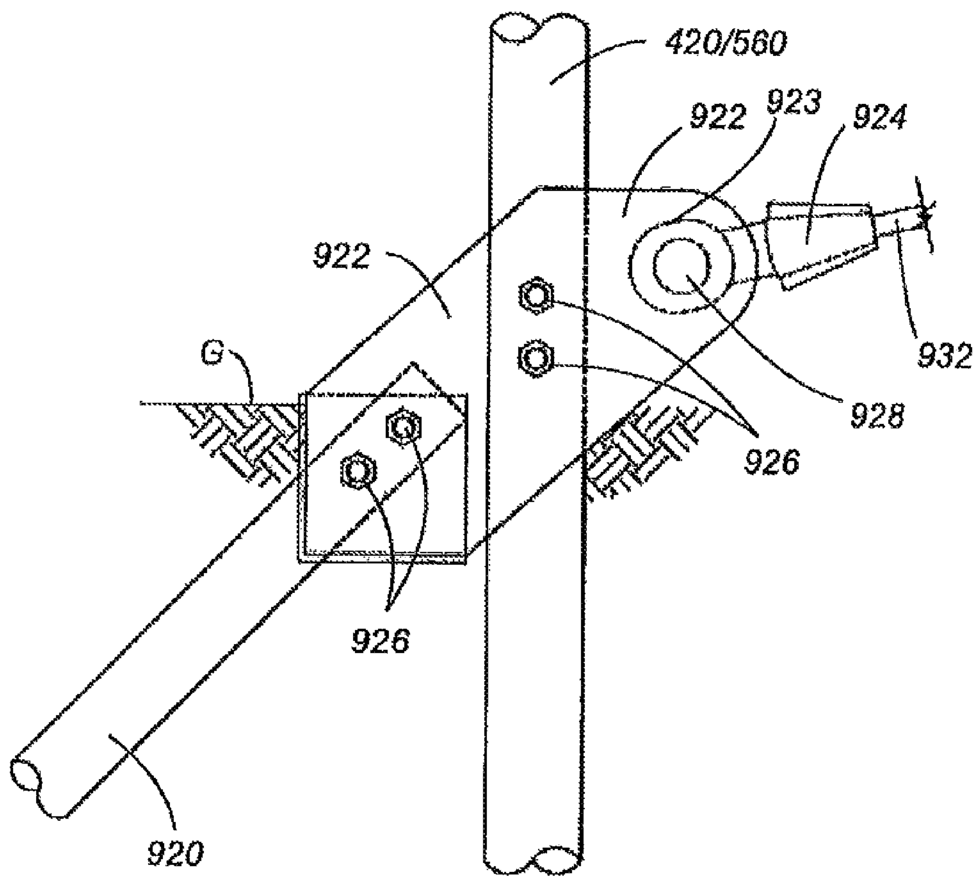

Referring to FIG. 125, yet another example is provided for a continuous column/foundation element in which a connecting plate 922 facilitates attachment for a cable 932 and also a supplementary pile 920. Further, in lieu of welding to the attachment plate 922, bolts 926 are used to secure the supplementary pile 920 and to secure the plate 922 to the continuous column/foundation member.

Figure 126:
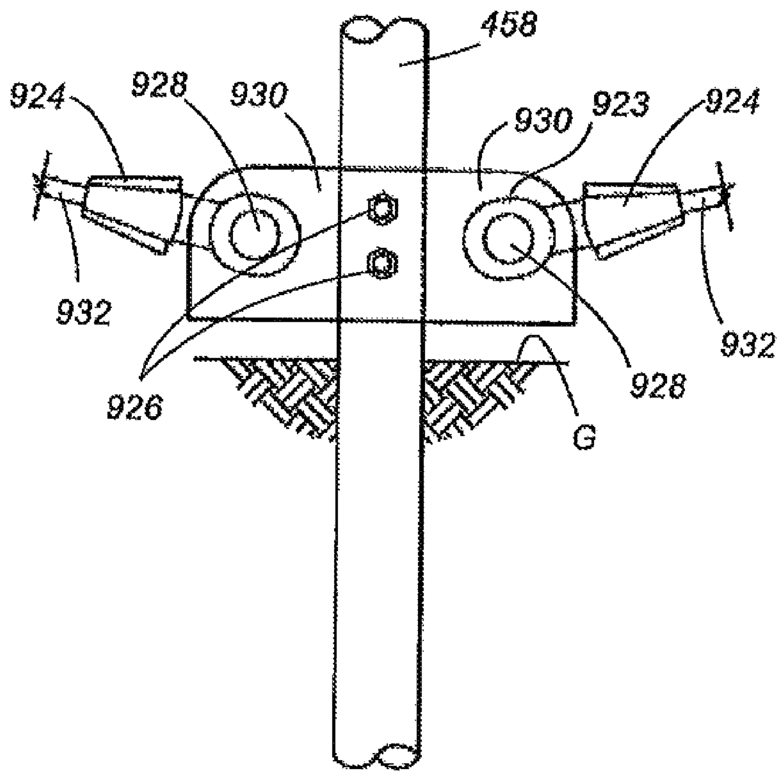

FIG. 126 provides yet another example of a continuous column/foundation element and connecting plate 930 combination in which a pair of cables 932 are attached to opposite sides of the connecting plate 930. Therefore this connecting plate can be used at locations along the array to anchor groups of cables, such as shown in the previous embodiments of columns 458.

FIG. 127 illustrates an upper saddle connection 914 that provides a point at which opposing supporting cables 942 may be connected. For example, the saddle connection 914 can facilitate the connection of upper supporting cables 942 as shown in FIG. 123 and FIG. 121. The saddle connection 914 is characterized by a half-curved supporting plate 940 that is mounted at the upper distal end of a selected column 916. Cable clamps 944 secure the cables 942 to the upper surface of the curved plate 940, and the cables 942 may overlap as shown. The saddle connection 914 provides an effective and accessible way in which to selectively tension the cables and to stabilize pods on both sides of a column. The saddle connection also provides a means to lock the cable in a fixed position relative to the column Referring to FIG. 128, yet another embodiment is provided for a support system of a solar array in which the support system comprises an upper support cable 950, a plurality of vertically extending tie-downs 952, subsurface piles/anchors 954, and a continuous tensioning cable 956. As shown, this embodiment is particularly adapted for mounting of pods 902 across a valley in which the ground G is disposed at various elevations. The vertically extending tie-downs 952 and piles 954 are arranged to provide continuous support across the array. One end of the continuous tensioning cable 956 may be fixed, and each of the inflection points or locations where the cable 956 changes direction may include a tensioning device such as shown at FIG. 66 thereby enabling the cable to be tightened or loosened across the entire length of the array. The tie-downs 952 may either be cables, or the tie-downs 952 may be continuous rigid members and therefore, the portion of the rigid tie-downs 952 buried in the ground can serve as anchors. With the use of the intermediate tie-downs 952, lower supporting cables can be eliminated. The multiple tie-downs that are directly connected to or have an integral foundation element provide superior stability.

In yet another illustrative embodiment, FIG. 129 shows a system for supporting a solar panel array 1000. This embodiment incorporates fewer support elements to provide a low cost, yet structurally stable support system. The system 1000 includes a plurality of solar panel receivers or pods 1012 disposed in an angular arrangement, and supported by pairs of tall columns 1016 and spaced pairs of short columns 1014. Each of the pods carries a number of solar panels 1060. Also referring to FIG. 133, the system includes a first main upper cable 1024 and a second main upper cable 1026 that are used to connect the solar panel receivers or pods 1012 to the columns 1014 and 1016. Longitudinal anchored lines 1028 extend on opposite sides of the array, and are disposed substantially parallel with the longitudinal extension of the cables 1024 and 1026. Anchors 1030 are used to secure the anchor lines 1028 to the ground. The anchors 1030 may include weighted bodies, screw anchors, and the like.

Preferably, the columns 1014 and 1016 have their lower ends sufficiently anchored in the ground so that the columns act as cantilevers that can withstand significant bending moments in all directions. The lower ends of the columns may be connected to screw piles or micro-piles that are screwed or driven into the ground. Alternatively, the columns 1014 and 1016 may be integrated columns with lower ends formed as anchors such that the columns are continuous members and do not require attachment to separate anchor members. For example, the columns 1014 and 1016 can be driven piles or screw piles in which the upper ends of the piles is the visible above ground column sections. Optionally, the embodiment of FIG. 129 may further include grade cables 1033 that extend between the anchors 130 and the respective lower ends of the columns 1014 and 1016. These grade cables provide additional cantilever stiffening to the columns thus eliminating the need for additional transverse support, such as transverse cables or tie-downs that would normally extend transversely away from the columns as compared to the longitudinal direction of the cables 1028. The pods 1012 are separated by gaps 1034 that facilitate air movement through the system, thus reducing wind loading conditions and reduction of harmonic oscillations that may create large pod displacements.

FIG. 133 also illustrates lower diagonal cables 1029 that are joined to the respective upper cables 1024 and 1026 by a connection means such as a plate 1027. Preferably, the lower diagonal cables are joined near the mid-point between the columns, but depending upon terrain restrictions, the lower diagonal cables could be joined at other locations between the columns. For example, if the array was to be mounted fairly close to the ground, the lower diagonal cables could be adjusted to accommodate uneven areas that would normally interfere with the cables. In combination, the cables 1024, 1026, and 1029 form two diagonal sets of columns, the first set comprising cables 1024 or 1026 that extend diagonally to a center point between columns, and cables 1029 that also extend diagonally to the center point as well. Each diagonal set can be considered as having two cable sections jointed at the plate 1027, thus between each column, there are four cable sections as shown although only two continuous cables are required as mentioned since cables 1024, 1026, and 1029 can be continuous between the columns.

Optional support that can be added to the array 1000 may include upper transverse stability cables 1018 that interconnect the upper ends of the opposing set of short and tall columns as shown.

Yet additional optional support to the array can be incorporated in the form of diagonal crossing transverse cables 1050. Referring also to FIG. 133, these cables 150 extend diagonally and cross one another between pairs of short and tall columns. Preferably, upper ends of the cables 1050 are secured near the upper ends of the columns, and the lower ends of the cables are secured near the lower ends of the columns.

FIG. 130 illustrates a front elevation view of FIG. 129. The simplicity yet stability of the support system are further evident in this figure. From the front view, the only visible cables are the anchor lines 1028.

FIG. 131 illustrates an upper plan view of FIG. 129. Of particular note in this plan view is the relatively small profile that exists with the simplified support structure. The profile of the system as a whole only extends beyond the profile of the pods at the locations of the longitudinal cables 128. Thus, the system can be installed within relatively confined spaces since only a few of the support cables protrude a minimal distance beyond the solar panels.

The side view of FIG. 132 also illustrates the relatively small and non-obtrusive profile created by use of the support system. It shall be understood that the location where the cables 1030 contact the ground can be modified to either expand the profile of the array in open spaces, or to contract the profile in the event the array is installed in a more confined location.

In FIG. 133, the solar panels are removed to better illustrate the arrangement of the support cables. Angles $A_1$ and $A_2$ are shown in FIG. 133 showing a generally diagonal arrangement of the upper cables. The angles $A_1$ and $A_2$ are measured from a horizontal plane or line indicated by the dotted lines. The lower diagonal cables 1029 are joined to the upper cables 1024 and 1026 at respective connection plates 1027. The slack in the cables 1024 and 1026 can be varied to provide different angles $A_1$ and $A_2$ to optimize sunlight capture depending on where and at what directional orientations the array is installed. The selected angles $A_1$ and $A_2$ also facilitate drainage of water from the array. Cables 1029 can also extend at the same or similar angles as angles $A_1$ and $A_2$, but these angles of the cables 1029 being measured from a horizontal plane or line (not shown) located at the bases of the columns. Both the upper cables 1024 and 1026, and the lower cables 1029 have enough slack so that they may be joined at the connection plates 1027. Once joined, the cables 1024,1026 and 1029 are appropriately tensioned to provide the necessary rigidity and support between the columns. One method to tension the cables 1024, 1026 and 1029 is to incorporate the tensioning device/mechanism 516 shown in FIG. 66.

FIG. 134 is a perspective view of a plurality of solar panel support spans combined to form a larger solar panel array and constructed per the cable and column support arrangement of FIG. 133 but eliminating the transversely extending crossing diagonal cables. Referring to FIG. 135, the pods 1012 are disposed at the respective angles $A_1$ and $A_2$ such that the pods form a V-shaped configuration as compared to the horizontal plane represented by the dotted lines. In other words, the V-shaped configuration is formed by mounting of the panel receivers between the columns including a bend point located at a center location between the columns to which the cables are mounted.

The selected tensioning of the cables 1024, 1026 and 1029 spanning between the columns will dictate the magnitude of the angles $A_1$ and $A_2$. Although it may be preferable to have single continuous cables 1024, 1026, and 1029 spanning between the columns, it is also contemplated that there can be four separate cable segments between the columns in which the four segments extend diagonally and are jointed at the plate 1027. Each cable segment can be individually tensioned in order to provide the desired alignment and rigidity for the array.

FIG. 136 shows a plan view of the FIG. 134, and one can appreciate the simplicity yet functionality of the system in which support cables are minimized.

FIG. 137 shows the elevation view in which the non-obtrusive yet functional arrangement of support elements serves to minimize materials and labor for installation.

FIG. 138 is another perspective view of a simplified solar panel array support system in accordance with an illustrative embodiment. In this Figure, the pods 1012 are not mounted in the V-configuration of FIG. 129, and rather extend substantially planar between the opposing pairs of short and tall columns. FIG. 138 also represents another preferred embodiment of the present invention that incorporates features disclosed in first embodiment, but the number of elements is reduced to thereby minimize the cost of materials and to ease in construction and maintenance.

FIG. 139 is a front elevation view of FIG. 138 and FIG. 140 is a top plan view of FIG. 138. These figures again illustrate the economical construction of the array by utilization of fewer materials.

FIG. 141 is a perspective view of the embodiment of FIG. 138 with the solar panels and pods removed to view the underlying support cables and columns. As shown, the crossing diagonal cables 1050 interconnect respective short and tall columns 1014 and 1016. As compared to the embodiment of FIG. 133, FIG. 141 does not incorporate diagonal cables 129 and grade cables 1050, and the cables 124 and 126 are tensioned so that they extend substantially co-planar with the upper ends of the columns. This support arrangement in FIG. 141 clearly provides yet additional savings in materials and labor for installation. The columns are preferably constructed with greater cantilever support capacities since fewer cables are provided as compared to the support arrangement of FIG. 133.

FIG. 142 is a perspective view of a plurality of solar panels joined to form a larger solar panel array incorporating the cable and columns support arrangement of FIG. 141 however the columns are shown as having substantially equal heights. The columns in this embodiment are designated as tall columns 1016, but it shall be understood that the columns 1016 can be of any desired height.

FIG. 143 is an elevation view taken along line 143-143 of FIG. 142 and FIG. 144 is an elevation view taken along line 144-144 of FIG. 142. The structural simplicity of this larger array is further evident in these Figures, thus minimizing material costs and efforts in installation.

One particular advantage of providing a plurality of columns disposed in a larger array group shown in FIG. 142 is the creation of an increased number of points that allows for mounting of cables to effectively resist lateral or bending forces experienced by the columns. In a larger array such as shown in FIG. 142, the increased number of cables cooperates with one another to provide greater system support. Thus, the cables 1024 and 1026 serve the dual purpose of mounting the pods and also to provide additional rigidity to the overall support system by strengthening the columns. The embodiment of FIG. 142 also illustrates the minimal profile achieved to maximize the area of the solar panels in a given space. The only elements that protrude beyond the exterior profile of the pods 1012 are the cables 1028.

Referring to FIGS. 145-149, in yet another illustrative embodiment of the invention, a simplified pod structure is provided that minimizes the number of support struts and hardware for mounting of the solar panels. As best seen in FIG. 146 with the solar panels 1060 removed, the simplified pod structure includes a pair of main transverse struts 1062 that extend substantially perpendicular and between the main cables 1024 and 1026. The struts 1062 interconnect the cables 1024 and 1026. A pair of longitudinal struts 1064 is disposed over the cables 1024 and 1026. The longitudinal struts 1064 extend perpendicular to and interconnect the main struts 1062. A plurality of connecting brackets 1066 are mounted on the upper surfaces of the main struts 1062 and the brackets 1066 are used to secure the solar panels 1060 to the main struts. As best seen in FIG. 147, cable receivers 1068 are used to attach the cables 1024 and 1026 to their respective main struts 1062.

The arrangement of the pod support elements shown in the FIGS. 145-149 integrates the necessary structural support to prevent excessive torsional and bending stresses that otherwise may damage the solar panels, yet minimizes the cost of the pods by reducing the required number of elements. Centering the longitudinal struts 1064 over the cables 1024 and 1026 provides additional rigidity to the struts 1064 thereby minimizing the required number of and size of the struts 1064.

FIG. 150 is a perspective view illustrating solar panels mounted to a simplified pod similar to the embodiment shown in FIG. 145, but further including a connecting plate for joining abutting ends of struts thereby enabling a potentially larger group of pods to be secured between cables and columns that are further spaced apart. FIG. 151 is a perspective view of FIG. 150 with the solar panels removed to expose the underlying strut arrangement. The connecting plates 1072 are shown as being centered over one of the cables 1024/1026. Thus, in the event the struts 1062 are not of a sufficient length to overhang the cables 1024/1026 as shown in FIG. 146, the plates 1072 can assist in extending the effective length of the struts 1062. In this arrangement, there is therefore a gap 1070 that exists between abutting pods. This gap 1070 accommodates reduction of wind loading. The plate 1072 can also be configured as a moment connection to allow relative rotation between the abutting pods to reduce torsional resistance between pod sections. FIG. 152 is a reverse perspective view of FIG. 150 illustrating the underside of the support pods. FIG. 153 is an elevation view taken along line 153-153 of FIG. 150;

FIG. 154 illustrates yet another illustrative embodiment of the present invention in which an alternative arrangement for diagonal cables 1072 is used for structural support. The particular cable arrangement for the remaining cables can be as set forth in FIG. 133 or 141. This embodiment is particularly advantages for mounting of the array on uneven terrain or sloping terrain in which more support may be required to accommodate increased bending or shear stresses experienced. This embodiment also shows utility in use of alternating short and tall columns to allow drainage of water from the array, or to facilitate a lower planar profile in which shorter columns may be located at higher points and longer columns are located at lower points. FIG. 155 shows how the embodiment of FIG. 154 can be incorporated on uneven terrain. As illustrated, the diagonal cables 1072 can be arranged to clear the ground. Although FIG. 155 illustrates columns of the same height, it will be appreciated that installing the array of FIG. 154 with both shorter and longer columns has advantages, for example, to lower the overall height of the array.

FIG. 156 is a perspective view of yet another embodiment illustrating an arrangement of cables and columns in which the columns 1014 and 1016 act as stand-alone cantilever supports eliminating the need for transverse extending cables, and only a single upper longitudinal cable 1080 is used between the columns for mounting the struts. This embodiment therefore represents one in which the cables and tie-downs are minimized, and the columns are used as the primary supports for the array. Accordingly, the columns serve as robust cantilever supports to withstand not only bending forces, but also shear and compression forces transferred from the weight of the pods. The columns are therefore sufficiently anchored to withstand greater bending, shear, and compression forces.

FIG. 157 is a perspective view of FIG. 156 in which the pods 1012 have been added, and one section of the array has the solar panels 1060 are removed showing the simplified arrangement of the struts 1082 on the single upper longitudinal cables 1080. As shown, there is a plurality of transversely extending struts 1082 mounted on the cables 1080. The struts 1082 can be mounted to the cables 1080, such as by cable receivers 1068.

FIG. 158 is a perspective view of yet another embodiment illustrating an arrangement of cables and columns similar to FIG. 156, however additional supports are added to include a single transverse cable 1084 disposed between columns and transverse anchor cables 1032. The columns are also shown as substantially the same height.

FIG. 159 is a perspective view of a plurality of solar panel support spans combined to form a larger solar panel array similar to FIG. 134, and constructed per the cable and column support arrangement of FIG. 133, however this array adds optional transverse cables 1032 and diagonal tie down cables 1035.

One common advantage for the embodiments illustrated in FIGS. 129-159 is that they are each well adapted to modular construction techniques in which all of the elements can be pre-fabricated and can be assembled with simple hardware solutions. Moderately skilled labor can install an entire system. The reduced number of elements coupled with prefabrication enables the construction of solar panel arrays at reduced costs and labor.

As described above with respect to the preferred embodiments, solar panel arrays can be supported with truss arrangements characterized as tension, compression or combined tension/compression trusses. Tension trusses include those arrangements of cables in which the upper and lower cables are interconnected with flexible cable members. Compression trusses can generally be characterized as those that have rigid compression members extending at least between the upper and lower cables. The compression trusses may further be characterized by upper and lower members that are rigid, and curved or straight to match the desired shape of the truss. The trusses have shapes to allow convex, concave, or combinations of concave and concave mounted pods. The interconnecting members may be vertically or diagonally oriented. The interconnecting members in the trusses may be a combination of compression members and/or tension members.

In addition to the varying truss configurations, the present invention also provides a number of options in terms of how to employ the columns to support the array. Columns may be interspersed throughout the array in both column and row arrangements. As mentioned with some of the embodiments, it is also contemplated that only perimeter columns are provided, and the spans are supported interiorly with truss arrangements thereby eliminating the need for interior columns.

The solar panel arrays may also be configured to cover a designated area to include areas in which irregularly shaped objects are present and the array can be modified to cover such irregularly shaped objects without having to eliminate solar panels at that location. The individual pods therefore can adopt the unique constructions allowing groups or individual panels to be mounted in offset arrangements.

Although the embodiments primarily show single cables as primary support elements, it is also possible in the present invention to increase the overall load bearing capacity of the array by using multiple cables that span the required distances.

Vertical structural stabilization for the arrays is provided by the combination of trusses which interconnect with columns. The columns are themselves stabilized by anchor lines. Horizontal forces generated perpendicular to the cable trusses are stabilized by linking the truss members of the pods between the trusses. The mechanical linking of the pod struts between the cable trusses creates a single structural member over the entire array which can better withstand forces generated in all directions. Additionally, the manner in which the pod struts are secured to the trusses can either be by a rigid connection, or by a flexible connection.

There are a number of environmental benefits to be achieved at the various solar panel arrays of the present invention. The inherent structural efficiency of the cable trusses requires less construction material. The columns and the anchor lines are the only elements that require contact with the ground and therefore, there is a minimal foundation footprint. Installation of the arrays is therefore capable of being handled by light machinery, which also minimizes disturbance to the existing soil structure and vegetation. Because of the suspended manner of the solar panels, in many cases, the system can be installed without a requirement for grading or reshaping of the land at the installation site.

This solar panel array of the present invention also provides a number of benefits with respect to water conservation. The arrays reduce water evaporation under the arrays, which is particularly advantageous when the arrays are positioned to cover water surfaces, such as canals, aqueducts, storage ponds, small lakes, etc. Also, as contemplated by the discussed embodiments, a drainage system may be provided around the solar panels to collect rainwater/snow and this collected water may be stored for required maintenance and cleaning of the solar panels.

Because of the extremely flexible design parameters achieved with the present invention, spacing of the solar panels can be designed in almost a limitless number of patterns which therefore allows a designer to precisely determine the amount of light that may be allowed to pass through the solar panel arrays to promote ideal growing conditions for vegetation or crops covered by the arrays. In general, the partial shading effect provided by the solar panel arrays provides ideal growing conditions for many cultivated crops. Further, suitable ground cover vegetation can be selected, such as plants that require very little water and may, therefore also reduce fire danger as compared to other vegetation which may normally cover the area.

Dual land use is also achieved by the solar panels of the present invention since the flexible designs provided by the present invention encourage a number of types of structures that may be housed underneath the arrays. For example, the arrays provide a number of options for incorporating buildings under the solar panel arrays, and also using the cables and trusses of the supports to be integrated within the buildings themselves.

The repetitive addition of cable trusses and pods allows the arrays to be built in limitless shapes and sizes which is an ideal solution for installation of the arrays over a number of other manmade structures such as parking lots, roads, and other transportation corridors.

Preassembly of the pods as well as the trusses may be achieved offsite. Therefore, for difficult to access locations in which the arrays may be installed, preassembly of the components prior to arriving at the work site greatly enhances the ability of the system to be installed at such difficult locations. Furthermore, as mentioned with respect to the embodiment of FIGS. 81-86, the pods may be arranged in an irregular manner to cover complex shaped obstacles, or to otherwise traverse an irregular manner based upon the underlying ground conditions.

The varying pod embodiments of the present invention also provide ideal conditions for supporting a number of types of PV/solar panel types to include not only the traditional planar or plate shaped PV/solar panels, but also cylindrical/tubular PV/solar elements which incorporate a self-tracking feature. It shall therefore be understood that any of the embodiments of the present invention can take advantage of either a planar solar panel construction, or use of the cylindrical PV elements.

With respect to durability, the solar panel arrays of the present invention are also ideal since the arrays may incorporate desired aerodynamic properties to prevent damage in high wind conditions. The use of airfoils allows an array to maintain a desired configuration for handling various wind conditions.

Also, the present invention provides a centralized control system whereby an entire array and multiple remotely located arrays can be controlled. This remote control can result in an increased energy output from the system, to protect the system from extreme weather by rotating the panels in a desired configuration to handle wind/other environmental conditions.

The solar panel arrays of the present invention may also incorporate single and dual axis tracking capabilities in order to optimize sunlight capture. The single and dual axis capabilities may be incorporated on various types of truss arrangements to include concave and convex truss arrangements.

While the present invention has been set forth with respect to a number of differing embodiments, it shall be appreciated that other changes or modifications of the invention may be achieved in accordance with the scope of the claims appended hereto.

What is claimed is:

1. A method of supporting a solar panel array comprising:

providing a plurality of columns including a grouping of spaced first, second and third columns, and a grouping of spaced fourth, fifth and sixth columns;

providing a pair of first support cables connected between the first, second and third columns, the pair of first support cables comprising a first upper support cable and a first lower support cable;

providing a pair of second support cables connected between the fourth, fifth and sixth columns, the pair of second support cables comprising a second upper support cable and a second lower support cable;

providing a plurality of compression members disposed between the pair of first support cables and between the pair of second support cables;

disposing the pair of first support cables such that the first upper support cable is above the first lower support cable between the first and second columns, and is below the first lower support cable between the second and third columns;

securing one or more solar panel receivers to the pair of first support cables and to the second pair of support cables; and securing a plurality of solar panels to each panel receiver.

2. The method of claim 1, further comprising disposing the pair of second support cables such that the second upper support cable is above the second lower support cable between the fourth and fifth columns, and is below the second lower support cable between the fifth and sixth columns.

3. The method of claim 2, wherein the plurality of compression members are in compression.

4. The method of claim 1, wherein the pair of first support cables are generally parallel in their respective axial directions.

5. The method of claim 1, wherein the pair of first support cables form an inflection point at the second column.

6. The method of claim 1, wherein the pair of first support cables form a convex profile shape between the first column and the second column.

7. The method of claim 6, wherein the array of solar panel receivers do not follow the convex shape of the pair of first support cables between the first column and the second column.

8. The method of claim 1, wherein the pair of first support cables is suspended continuously between the first, second and third columns.

9. The method of claim 1, wherein the solar panel receivers form an array of solar panel receivers, the array of solar panel receivers generally forming a plane.

10. The method of claim 1, wherein at least one end of the first upper support cable and the first lower support cable is secured to the ground.

11. A system for supporting a solar panel array, the system comprising:

a plurality of columns including a grouping of spaced first, second and third columns, and a grouping of spaced fourth, fifth and sixth columns;

a pair of first support cables connected between the first, second and third columns, the pair of first support cables comprising a first upper support cable and a first lower support cable;

a pair of second support cables connected between the fourth, fifth and sixth columns, the pair of second support cables comprising a second upper support cable and a second lower support cable;

a plurality of compression members disposed between the pair of first support cables and between the pair of second support cables;

one or more solar panel receivers secured to the pair of first support cables and to the second pair of support cables; and a plurality of solar panels secured to each panel receiver;

wherein the pair of first support cables is disposed such that the first upper support cable is above the first lower support cable between the first and the second columns, and is below the first lower support cable between the second and third columns.

12. The system of claim 11, wherein the pair of second support cables is disposed such that the second upper support cable is above the second lower support cable between the fourth and fifth columns, and is disposed below the second lower support cable between the fifth and sixth columns.

13. The system of claim 12, wherein the plurality of compression members are in compression.

14. The system of claim 11, wherein the pair of first support cables are generally parallel in their respective axial directions.

15. The system of claim 11, wherein the pair of first support cables form an inflection point at the second column.

16. The system of claim 11, wherein the pair of first support cables form a convex profile shape between the first column and the second column.

17. The system of claim 16, wherein the array of solar panel receivers do not follow the convex shape of the pair of first support cables between the first column and the second column.

18. The system of claim 11, wherein the pair of first support cables is suspended continuously between the first, second and third columns.

19. The system of claim 11, wherein the solar panel receivers form an array of solar panel receivers, the array of solar panel receivers generally forming a plane.

20. The system of claim 11, wherein at least one end of the first upper support cable and the first lower support cable is secured to the ground.

* * * * *